July 23, 1935. T. CAHILL 2,009,138
ELECTRICAL SPEAKERS AND OTHER SPEAKERS
Original Filed July 3, 1931 32 Sheets-Sheet 2
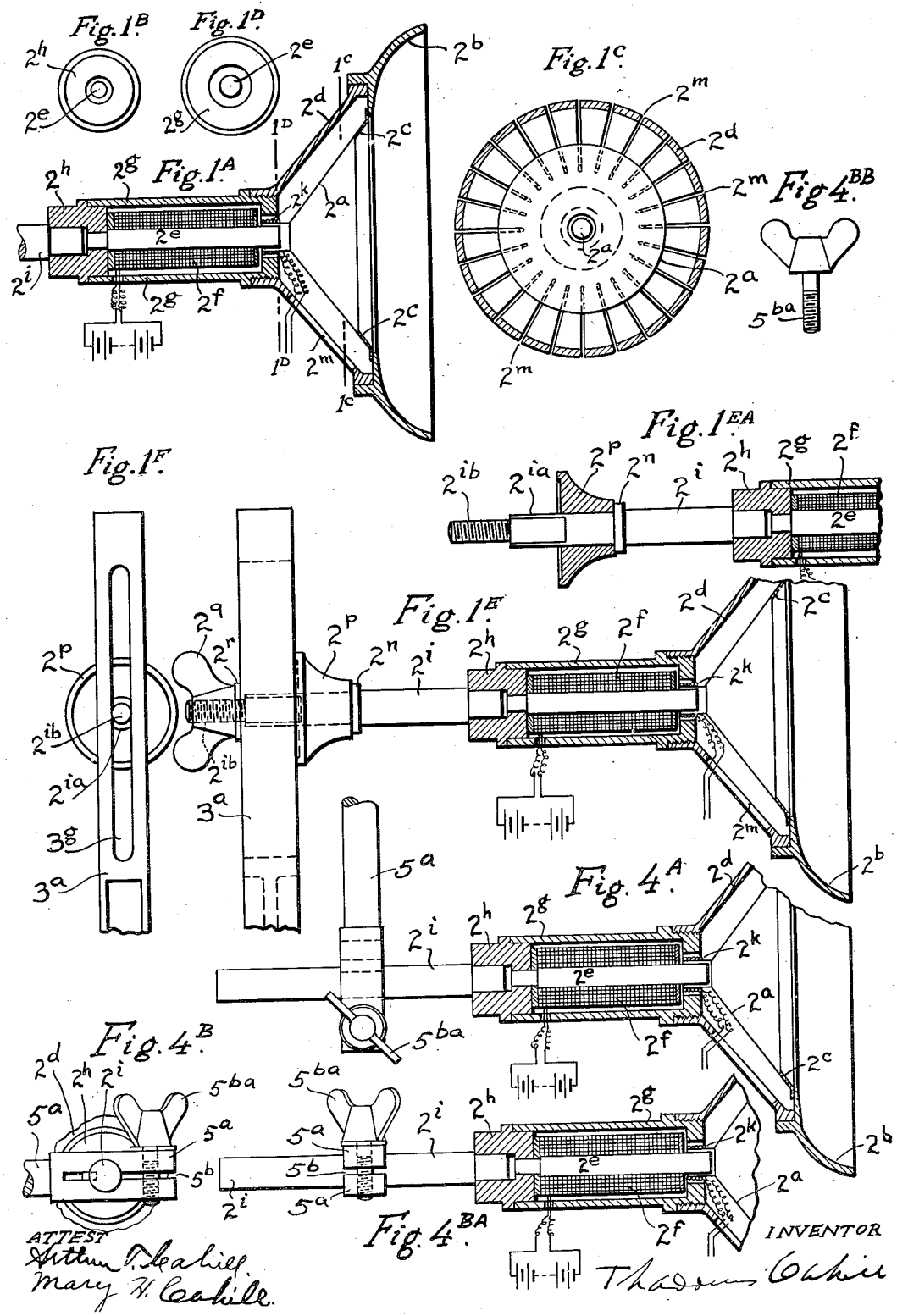

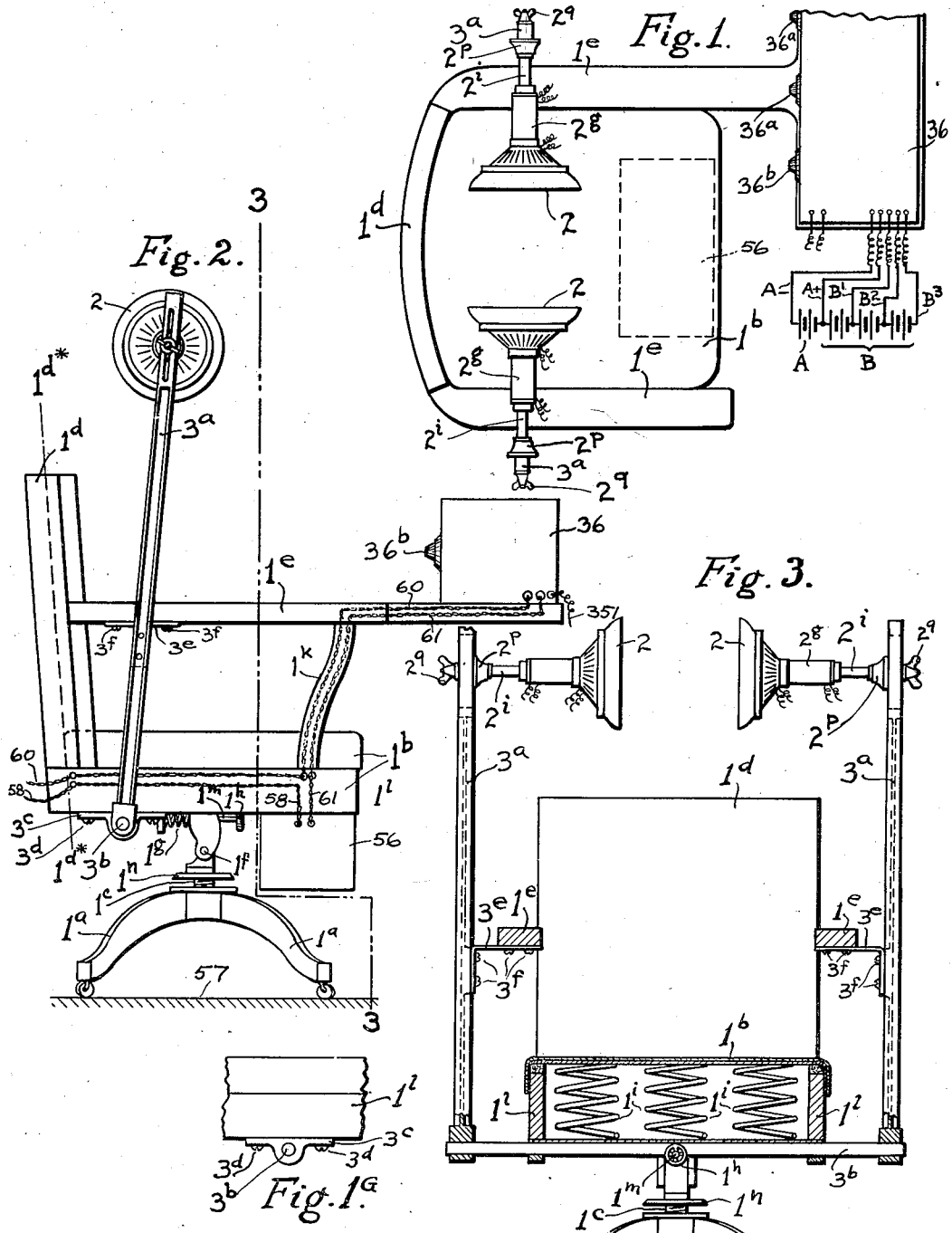

July 23, 1935.  T. CAHILL  2,009,138
ELECTRICAL SPEAKERS AND OTHER SPEAKERS
Original Filed July 3, 1931   32 Sheets-Sheet 3
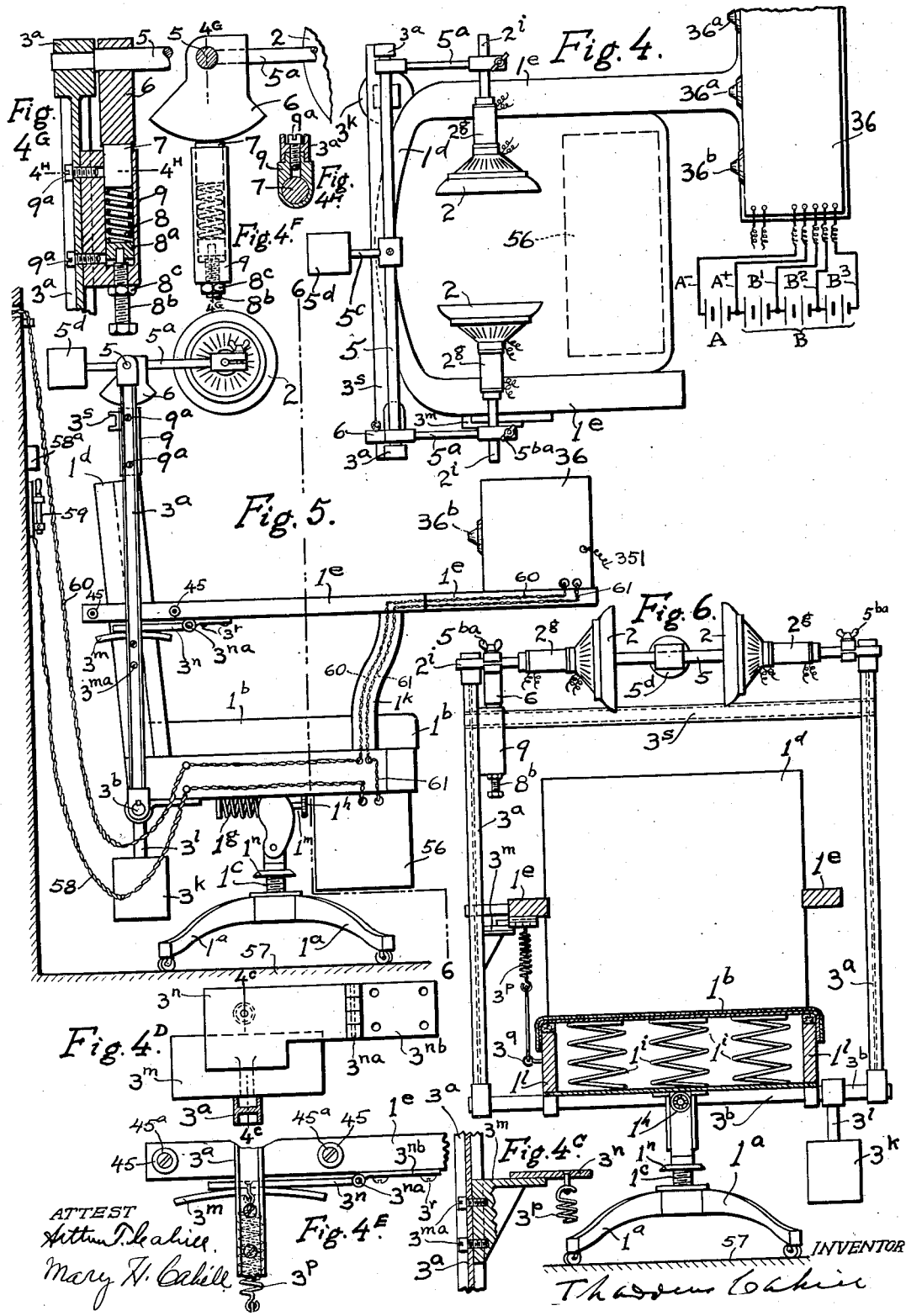

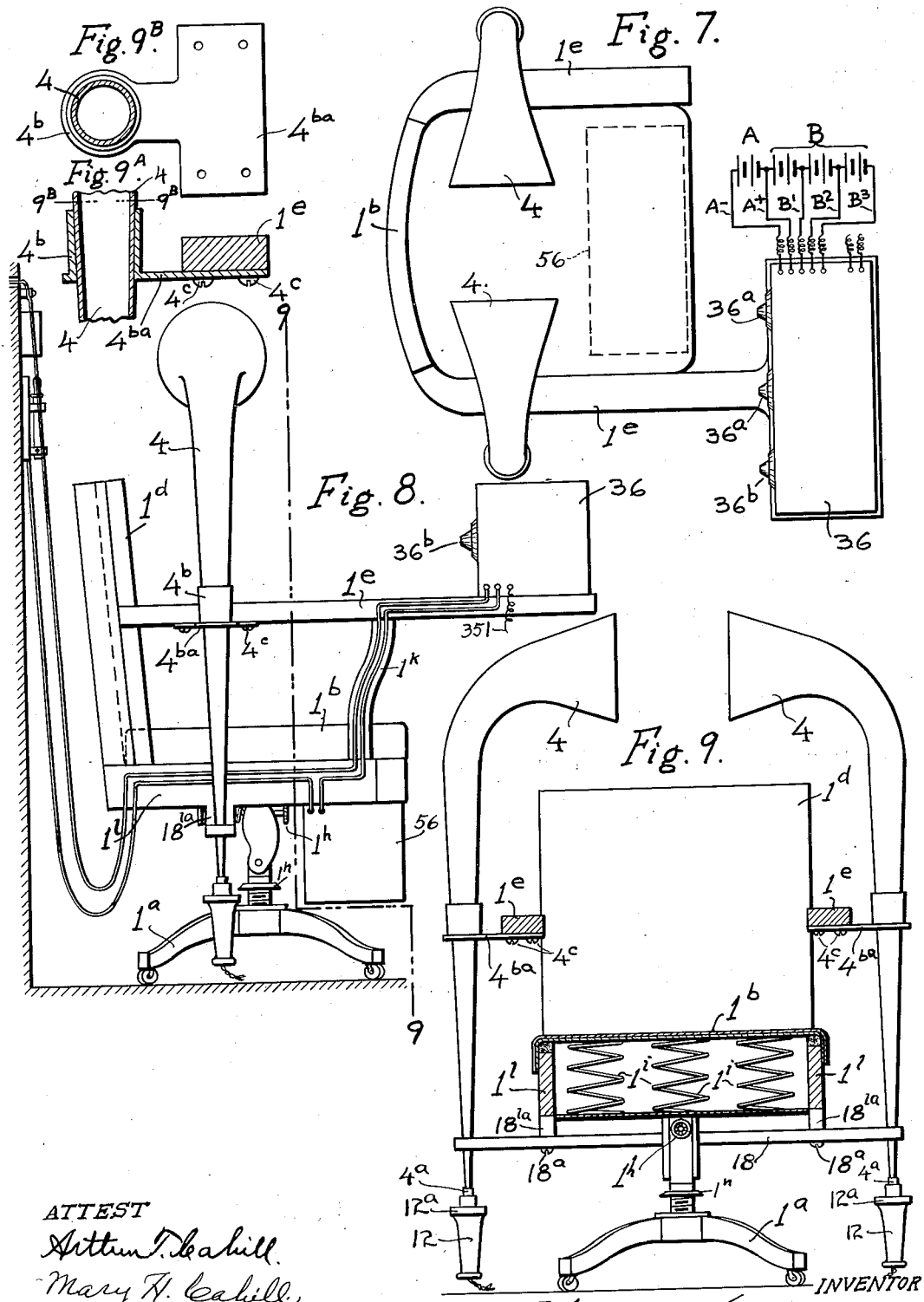

July 23, 1935. T. CAHILL 2,009,138
ELECTRICAL SPEAKERS AND OTHER SPEAKERS
Original Filed July 3, 1931   32 Sheets-Sheet 5
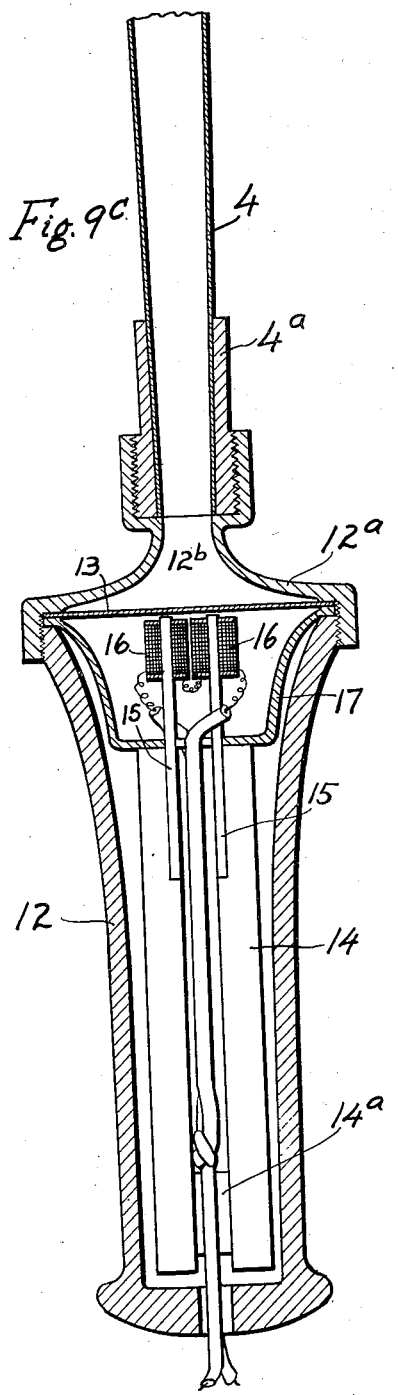
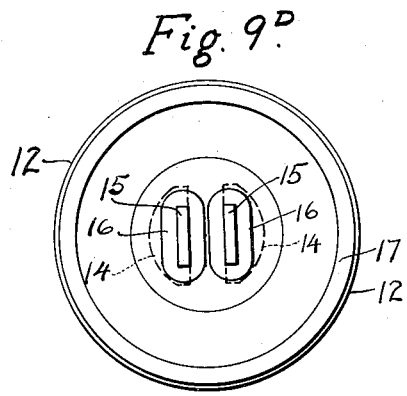
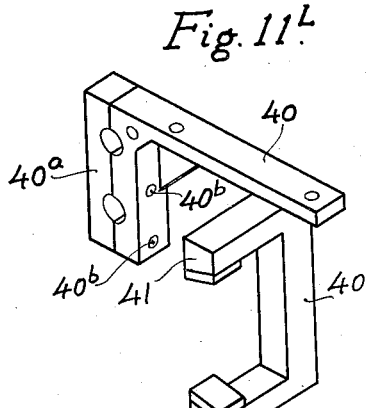
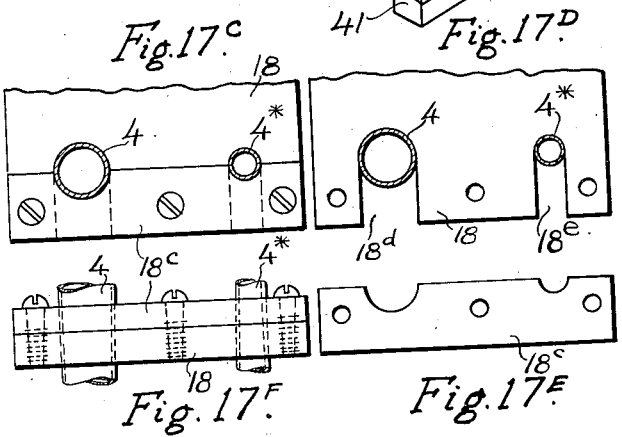
ATTEST
Arthur T. Cahill
Mary W. Cahill
INVENTOR
Thaddeus Cahill

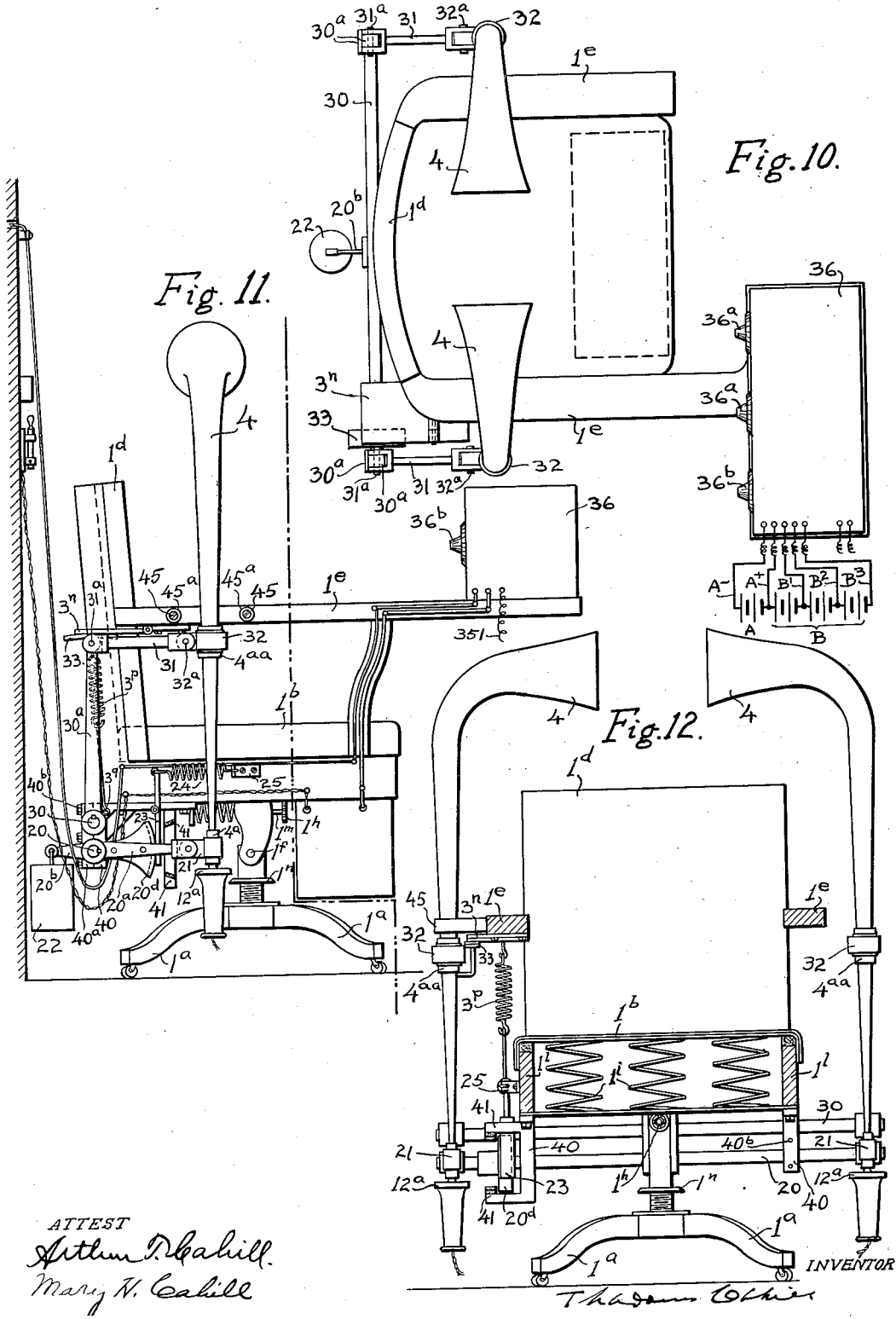

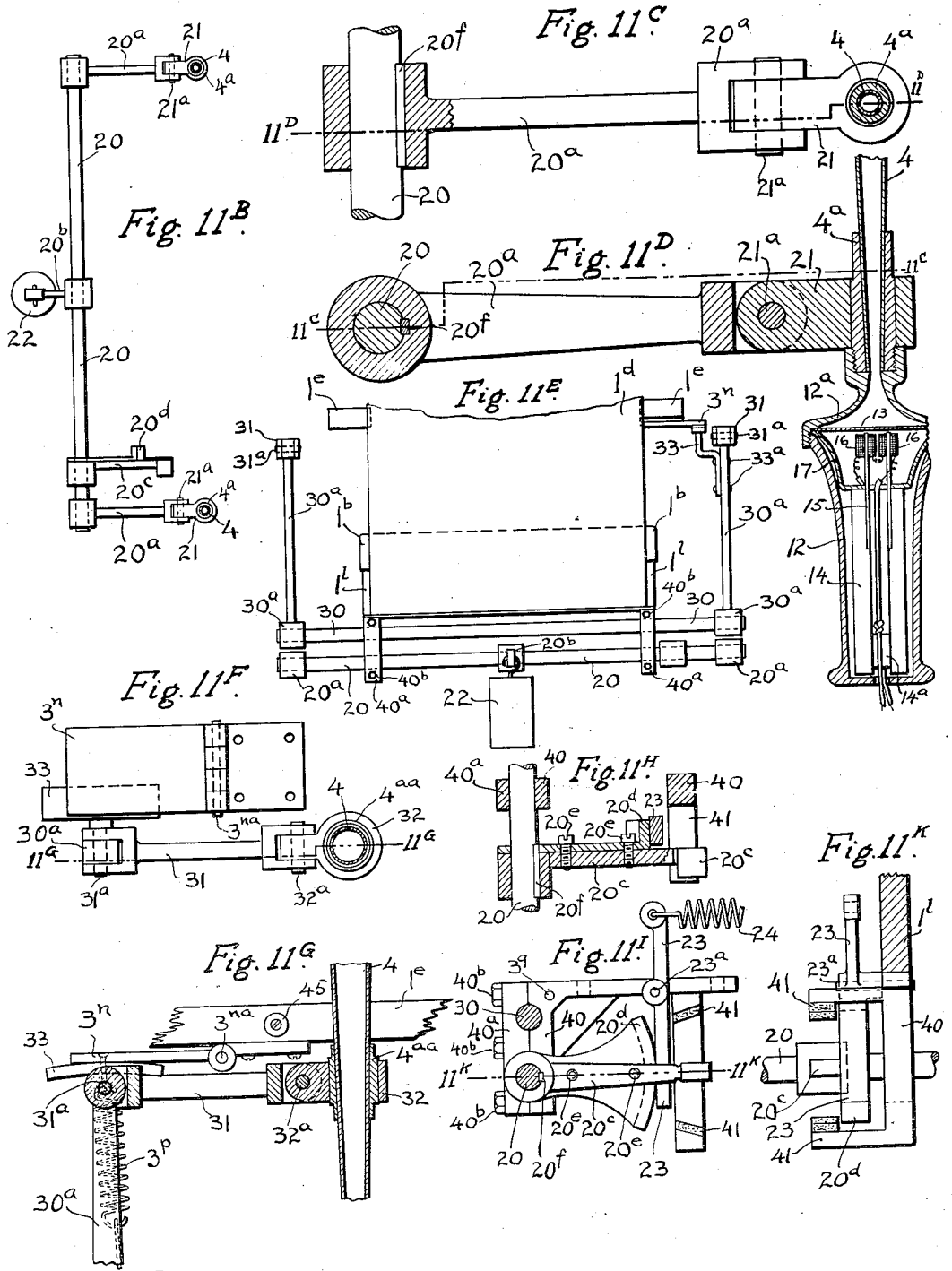

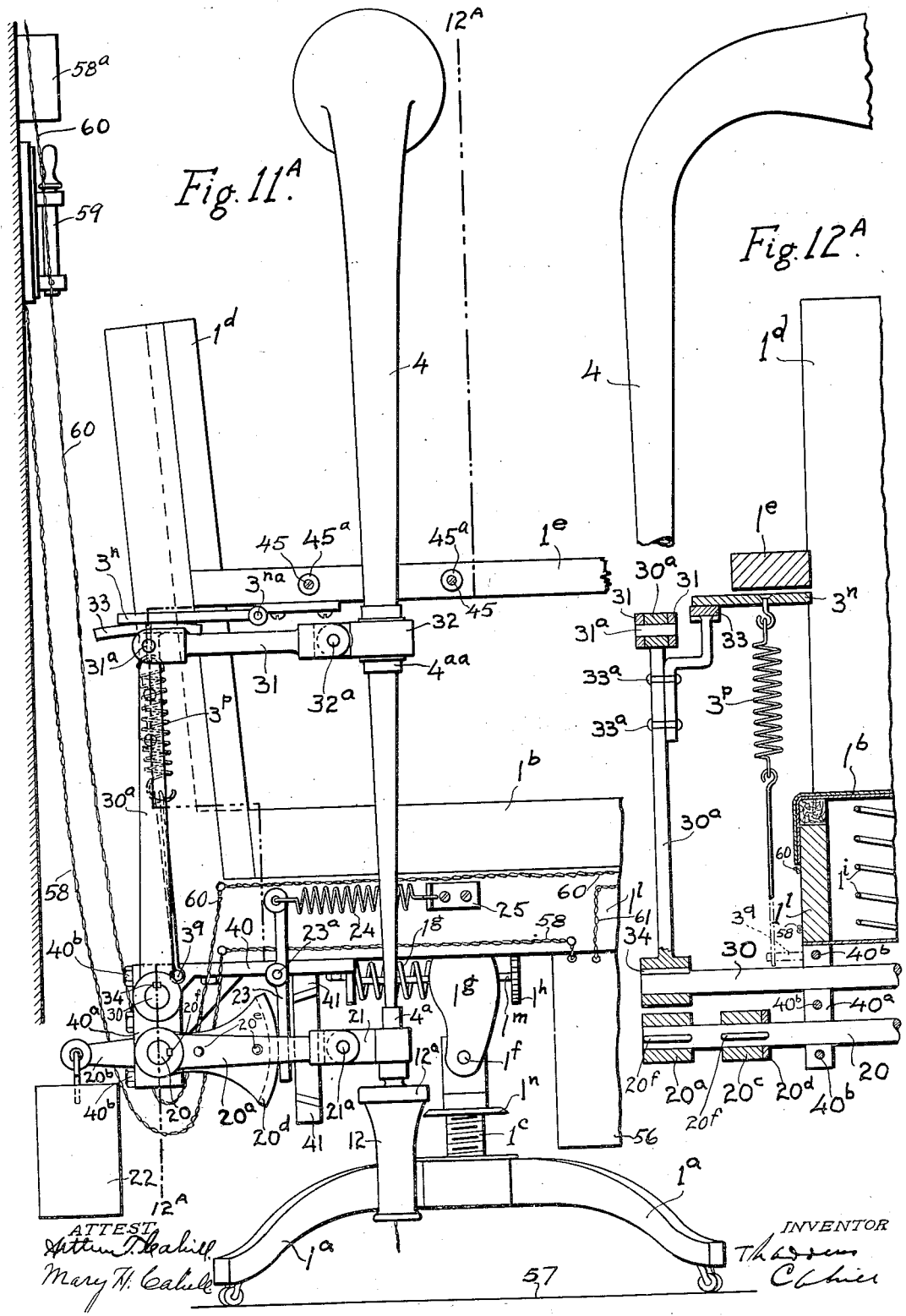

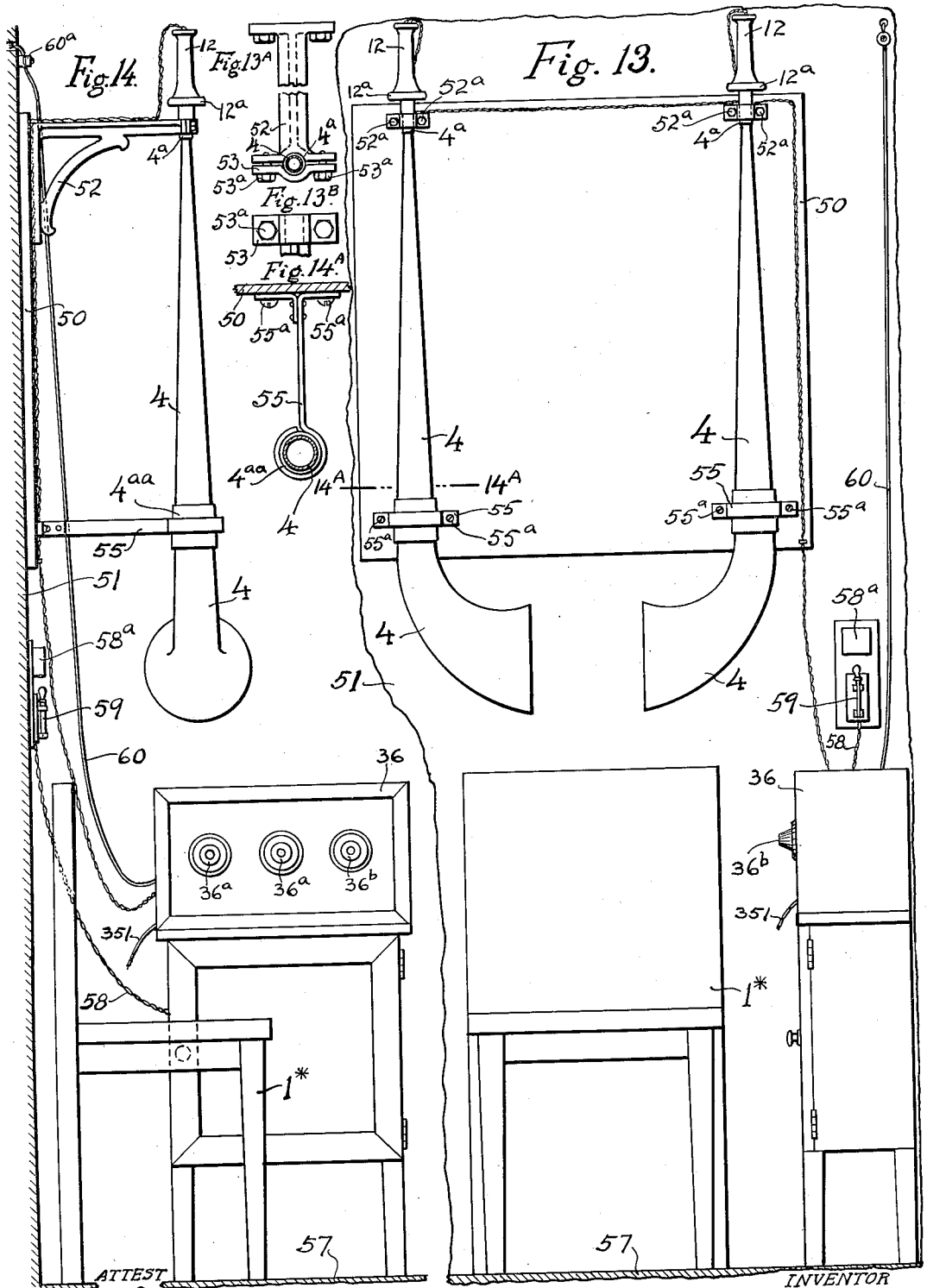

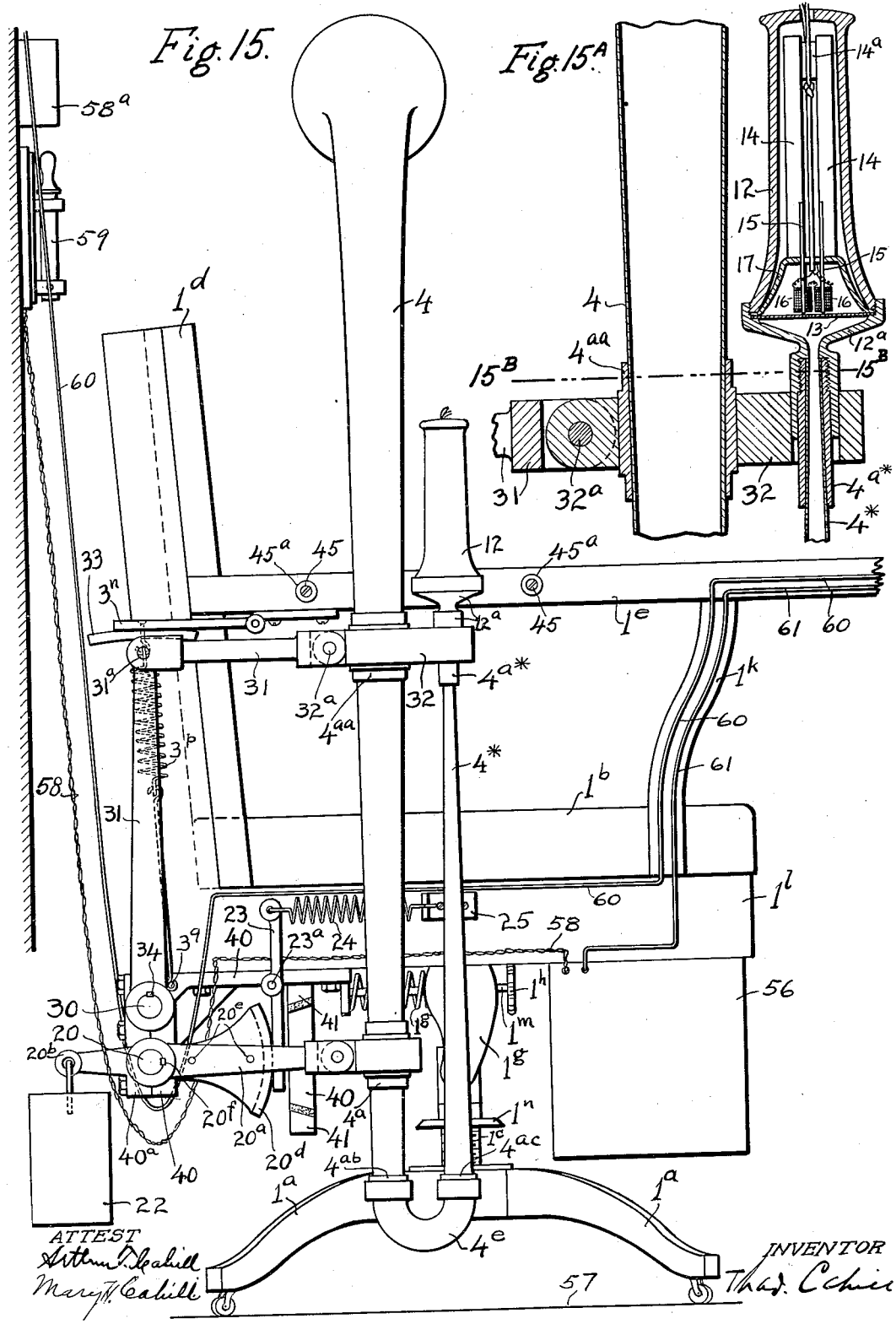

July 23, 1935. T. CAHILL 2,009,138
ELECTRICAL SPEAKERS AND OTHER SPEAKERS
Original Filed July 3, 1931 32 Sheets-Sheet 11
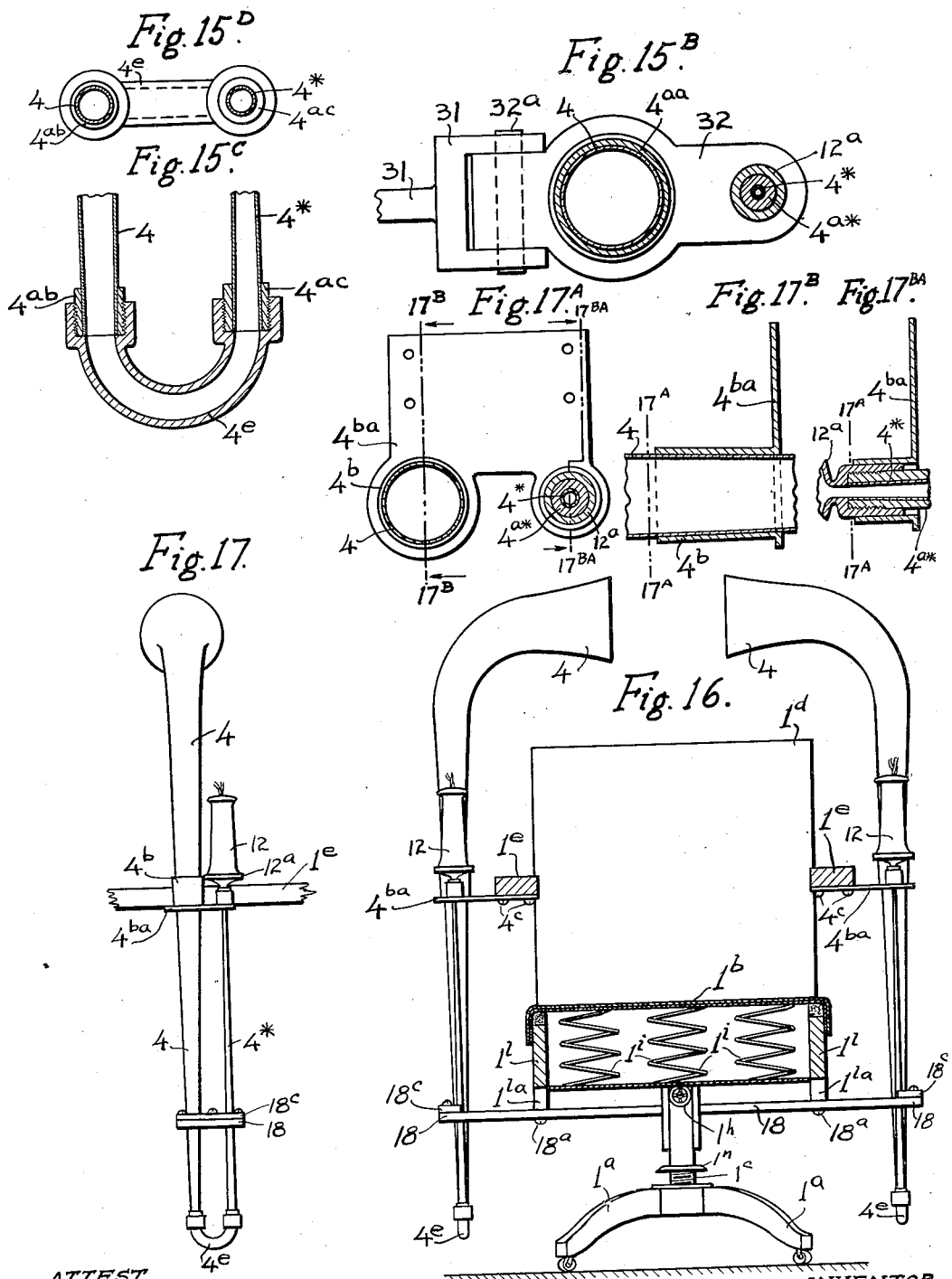

July 23, 1935. T. CAHILL 2,009,138
ELECTRICAL SPEAKERS AND OTHER SPEAKERS
Original Filed July 3, 1931 32 Sheets-Sheet 12
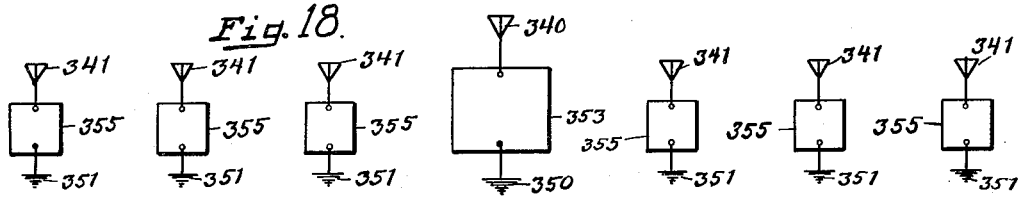

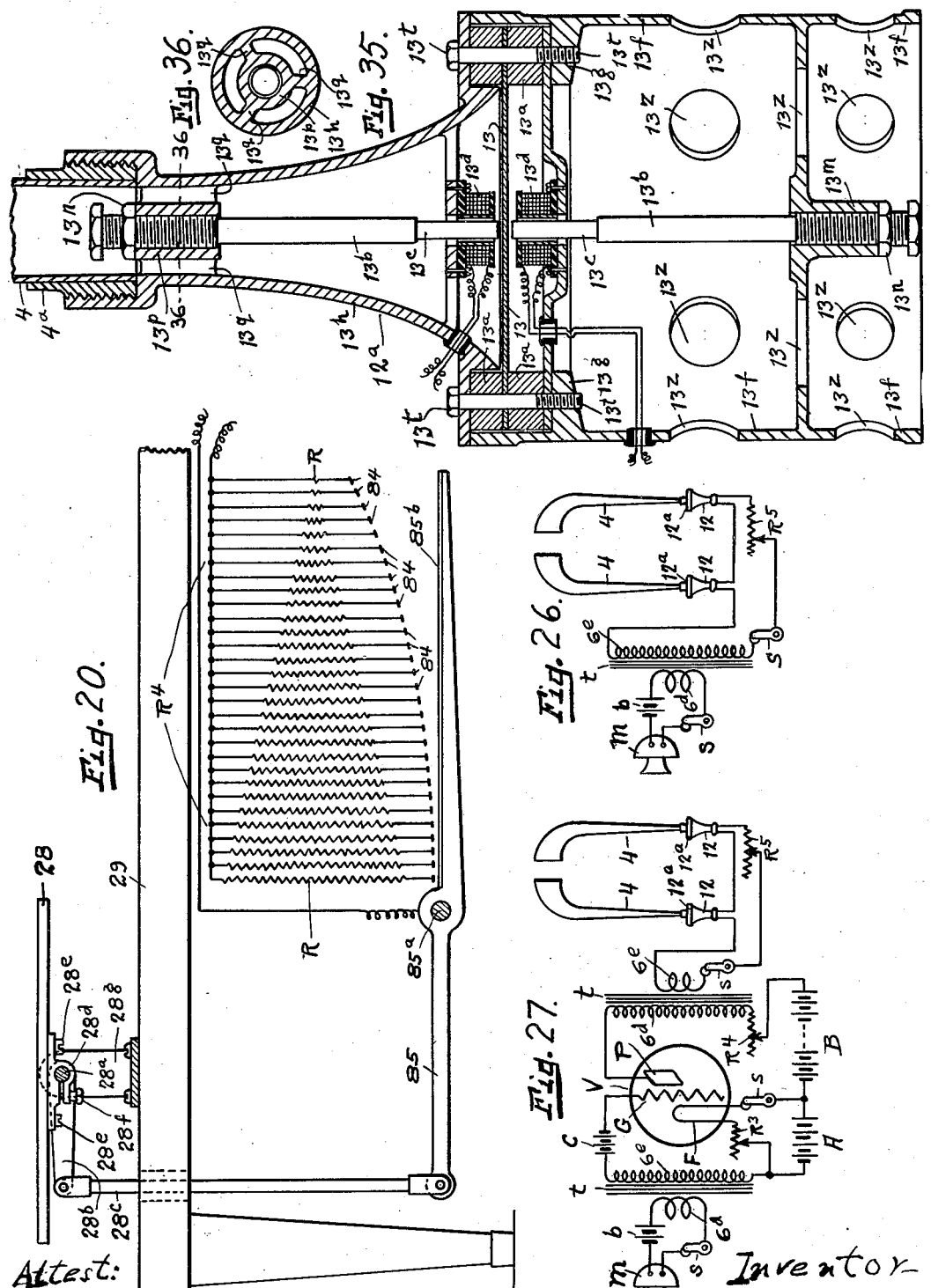

July 23, 1935.  T. CAHILL  2,009,138
ELECTRICAL SPEAKERS AND OTHER SPEAKERS
Original Filed July 3, 1931   32 Sheets-Sheet 14
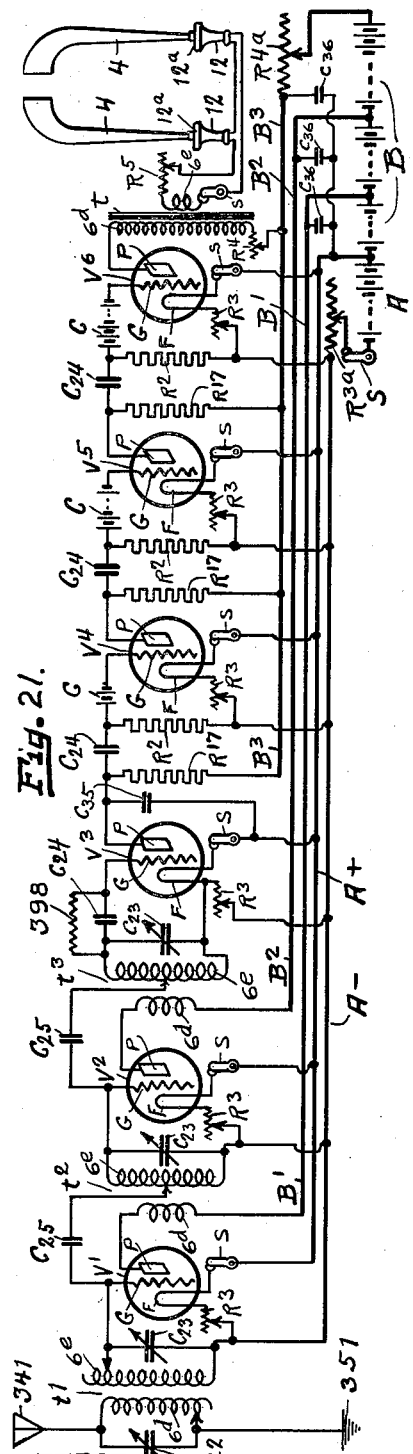
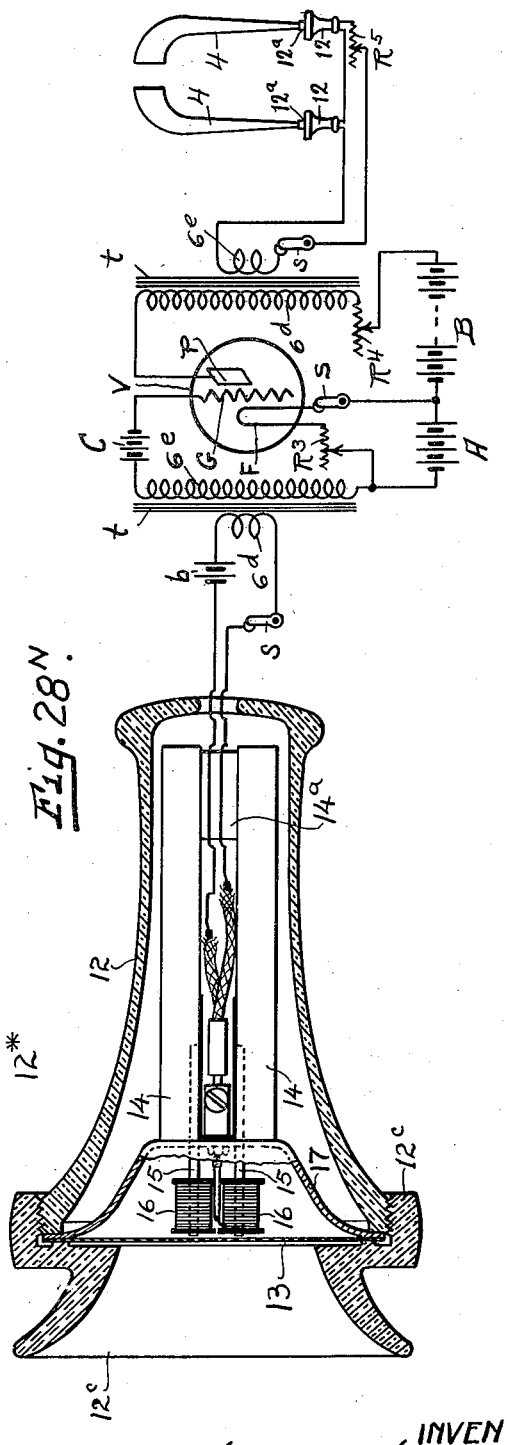

July 23, 1935.  T. CAHILL  2,009,138
ELECTRICAL SPEAKERS AND OTHER SPEAKERS
Original Filed July 3, 1931   32 Sheets-Sheet 15

ATTEST
INVENTOR

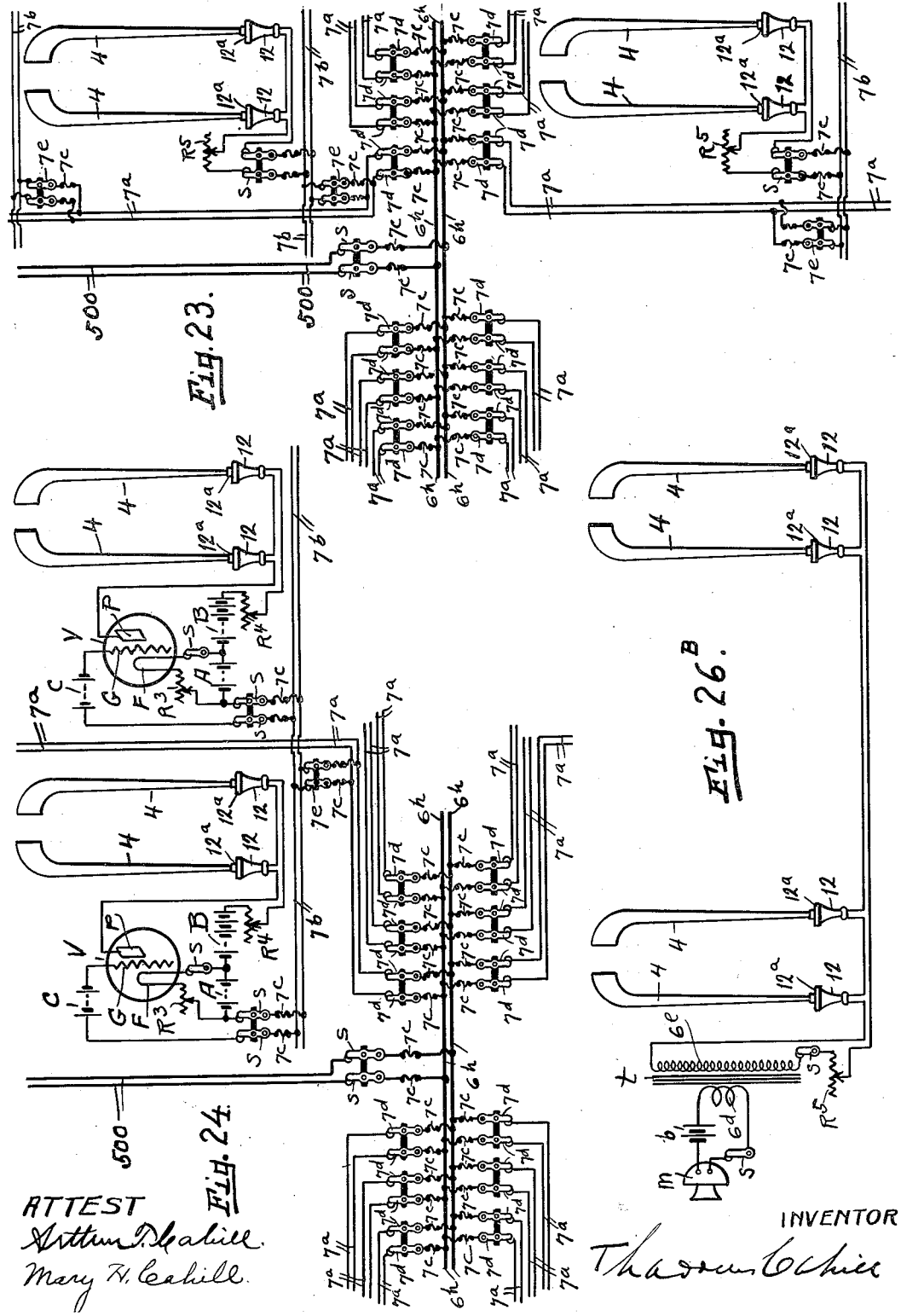

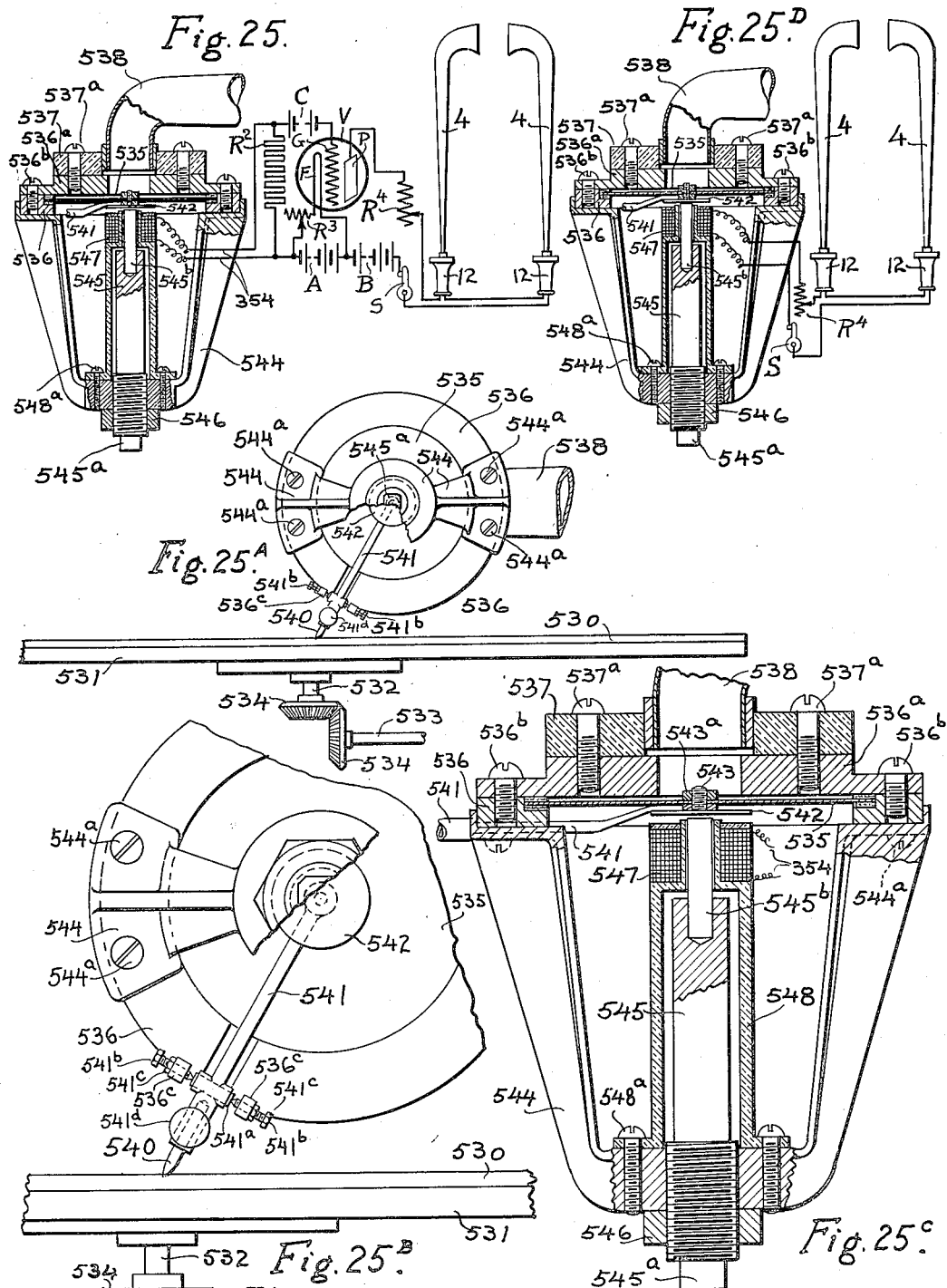

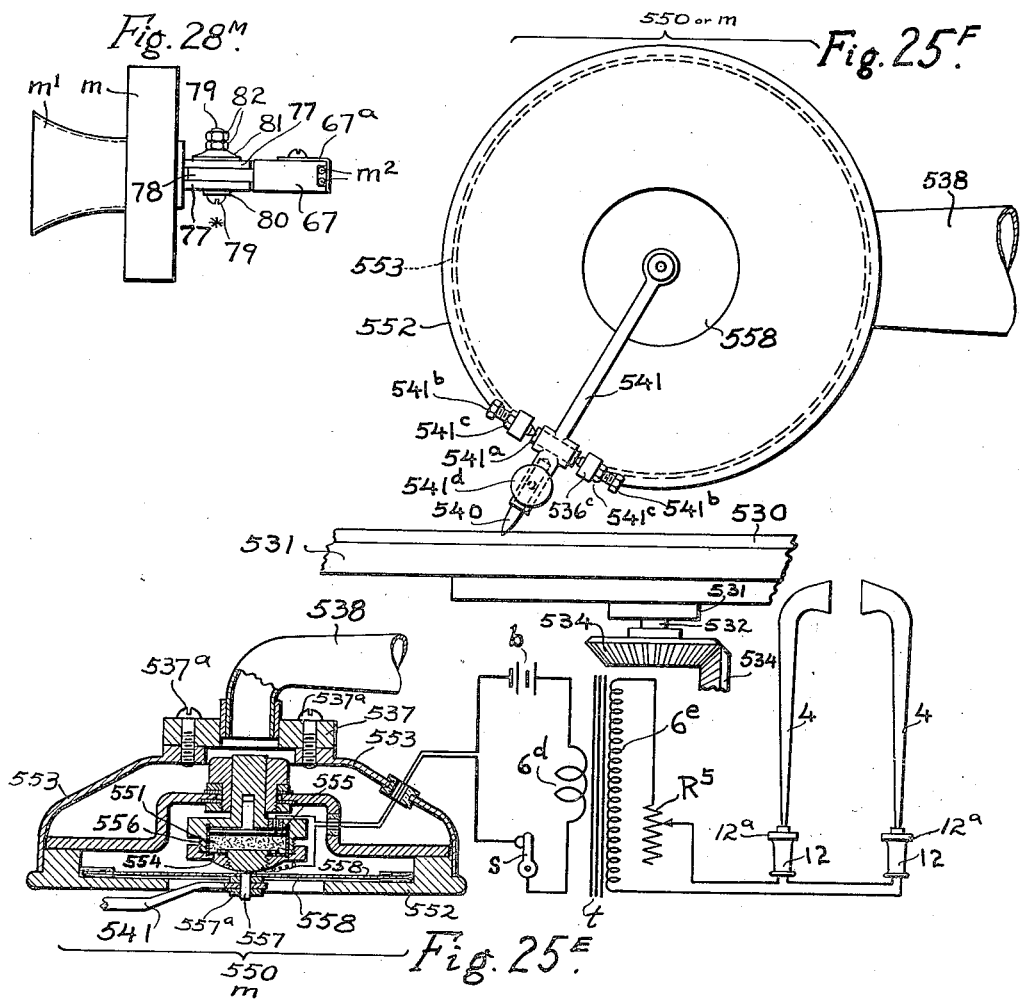

July 23, 1935.  T. CAHILL  2,009,138
ELECTRICAL SPEAKERS AND OTHER SPEAKERS
Original Filed July 3, 1931  32 Sheets-Sheet 19
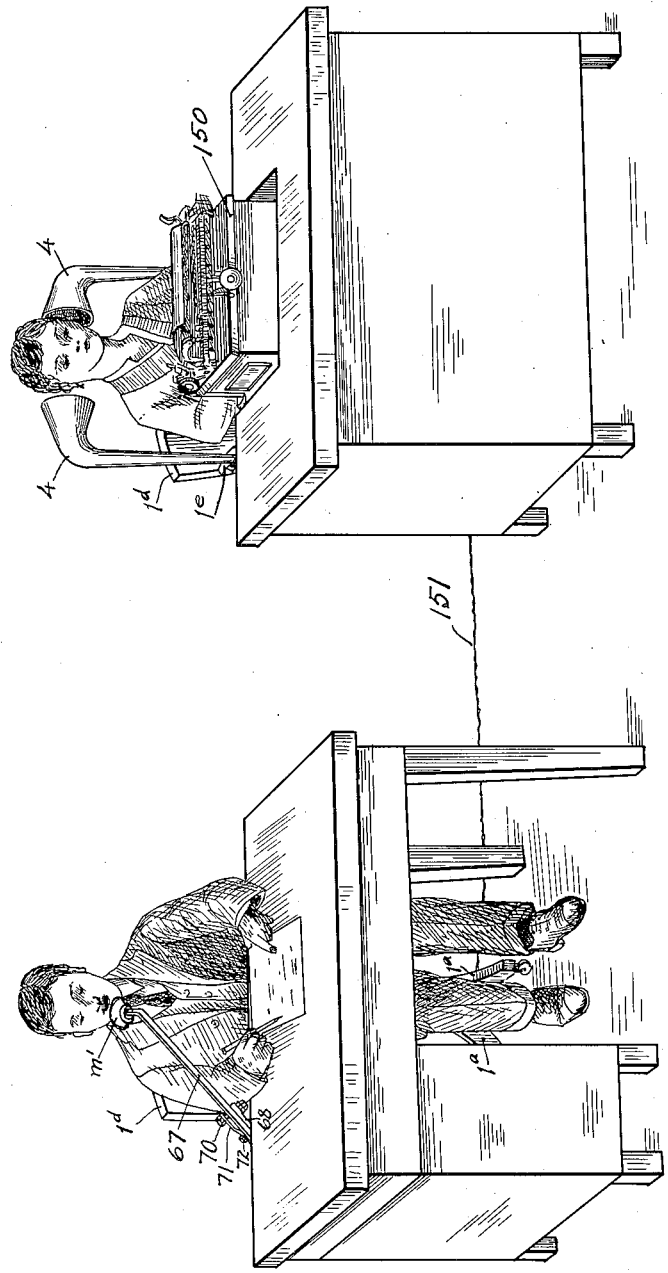

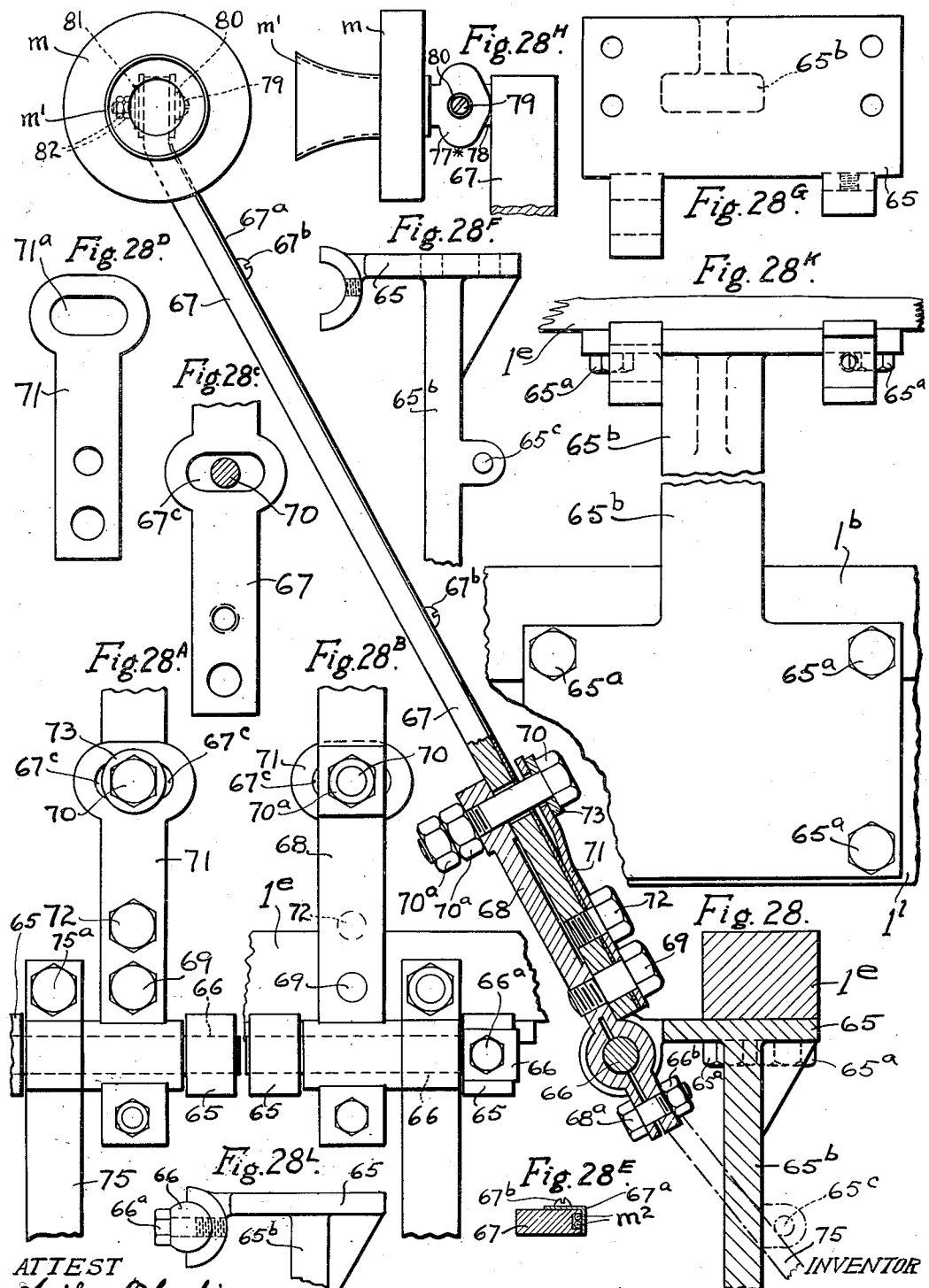

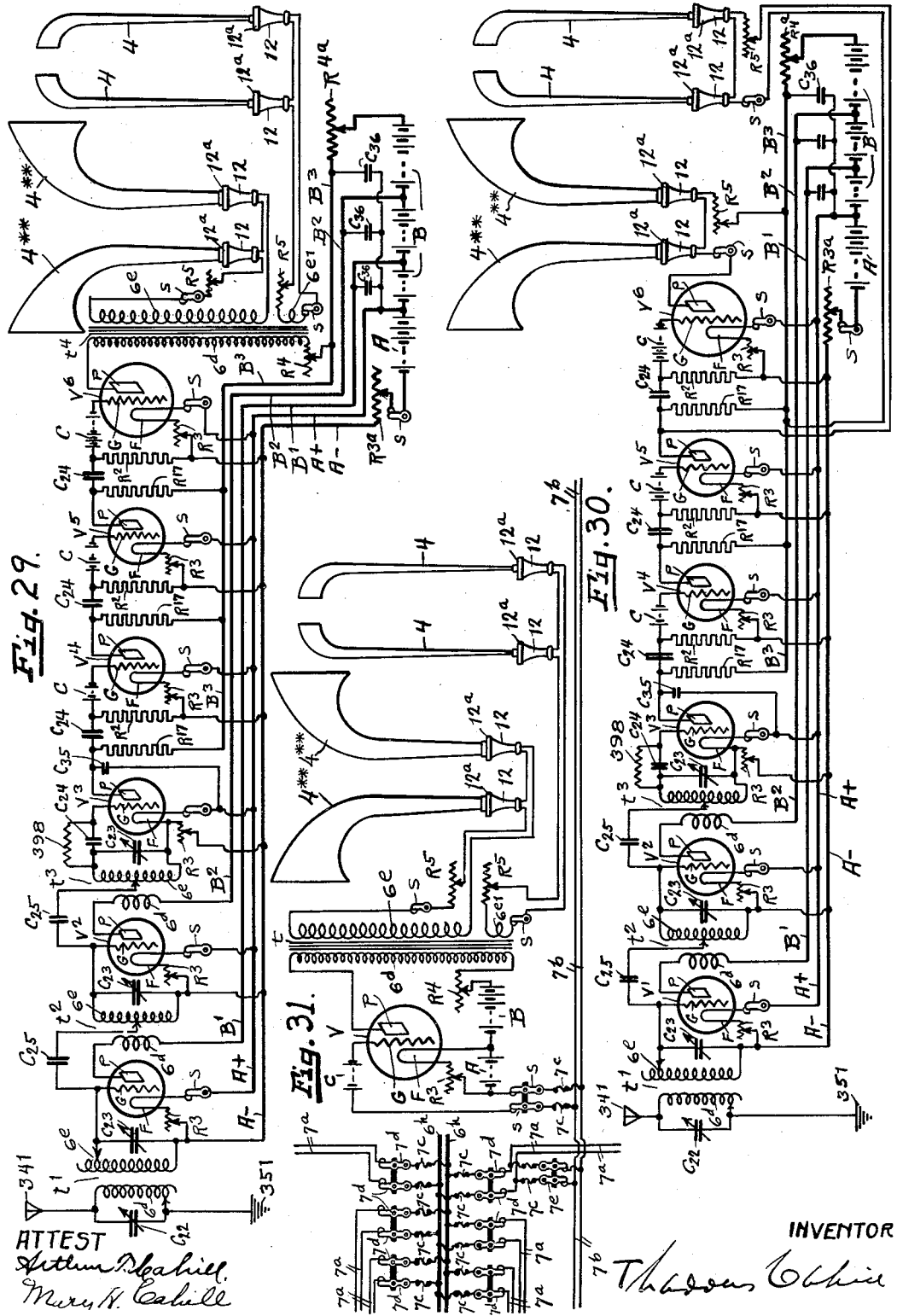

July 23, 1935.  T. CAHILL  2,009,138
ELECTRICAL SPEAKERS AND OTHER SPEAKERS
Original Filed July 3, 1931  32 Sheets-Sheet 22
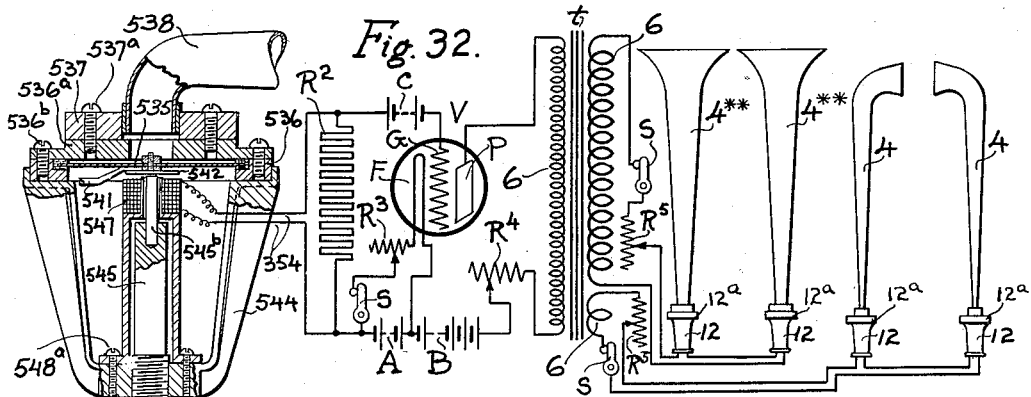
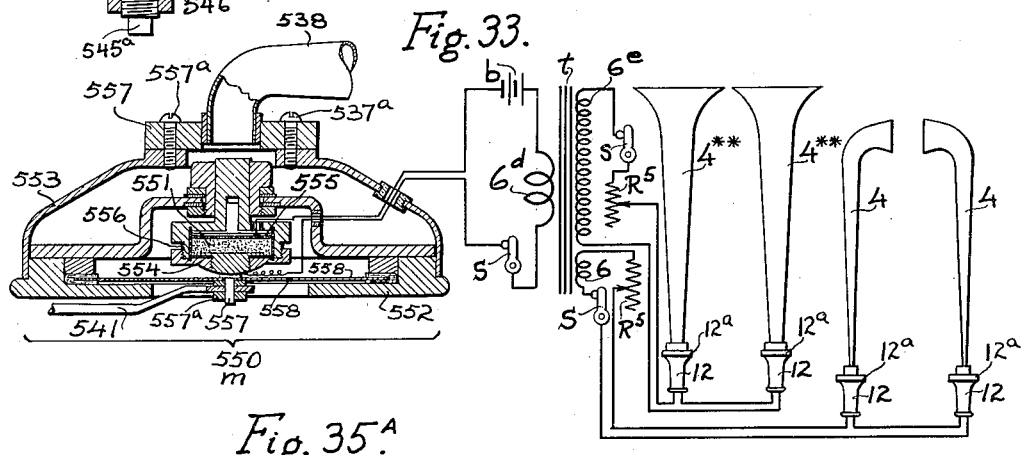
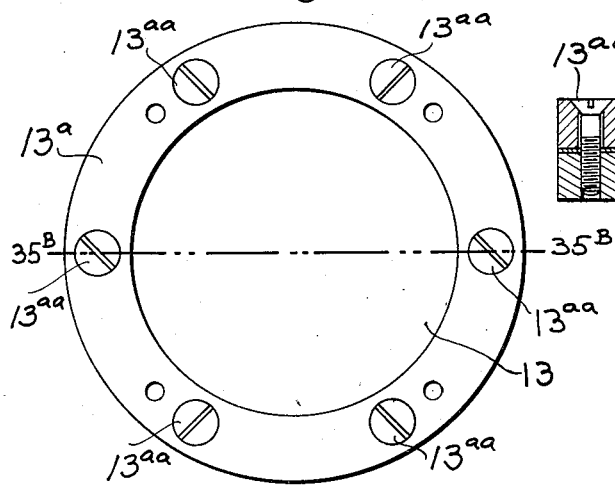
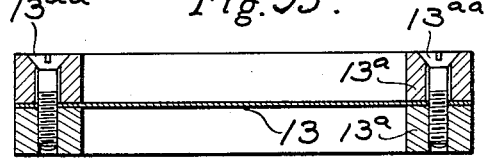
ATTEST
INVENTOR July 23, 1935. T. CAHILL 2,009,138
ELECTRICAL SPEAKERS AND OTHER SPEAKERS
Original Filed July 3, 1931 32 Sheets-Sheet 23

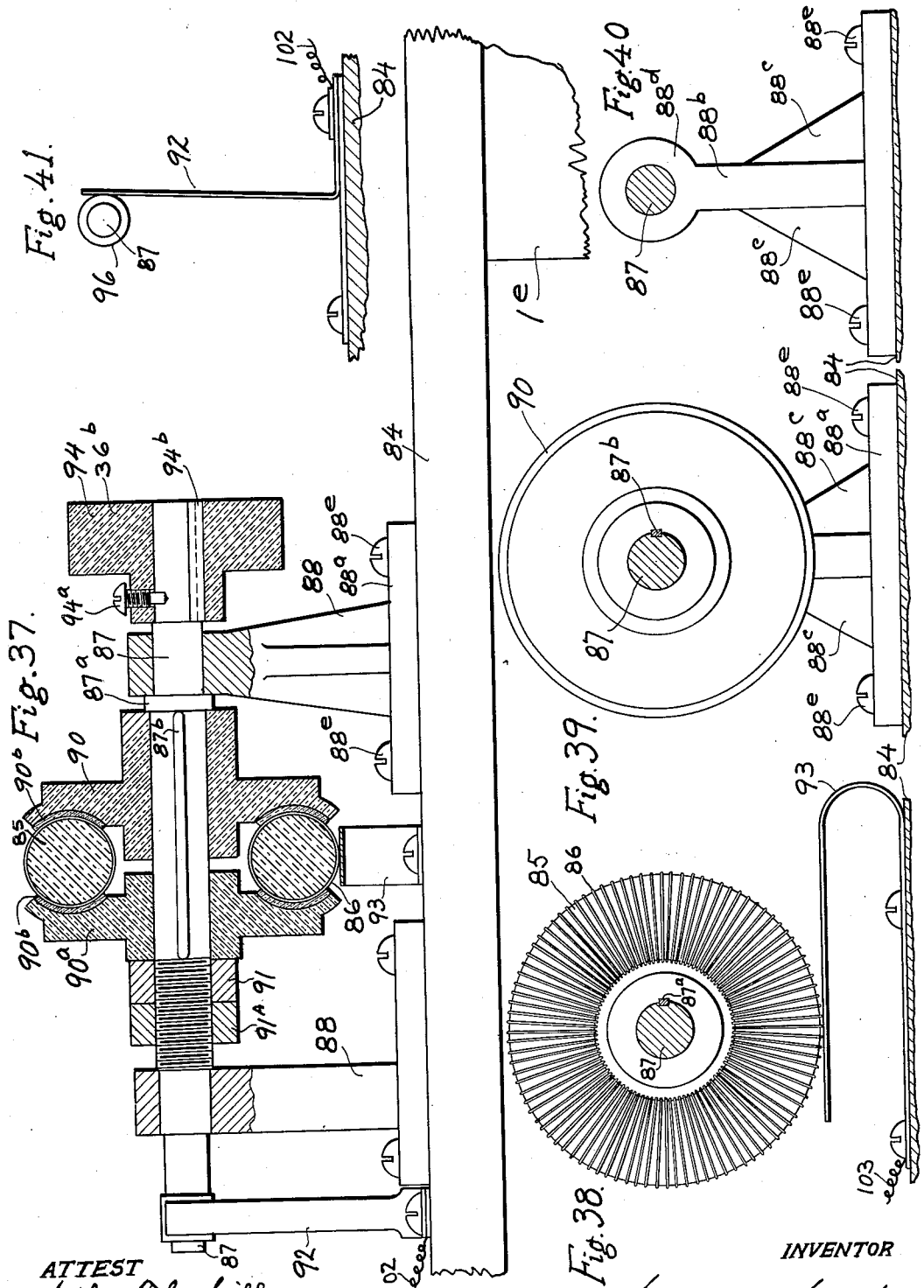

July 23, 1935.  T. CAHILL  2,009,138
ELECTRICAL SPEAKERS AND OTHER SPEAKERS
Original Filed July 3, 1931   32 Sheets-Sheet 25
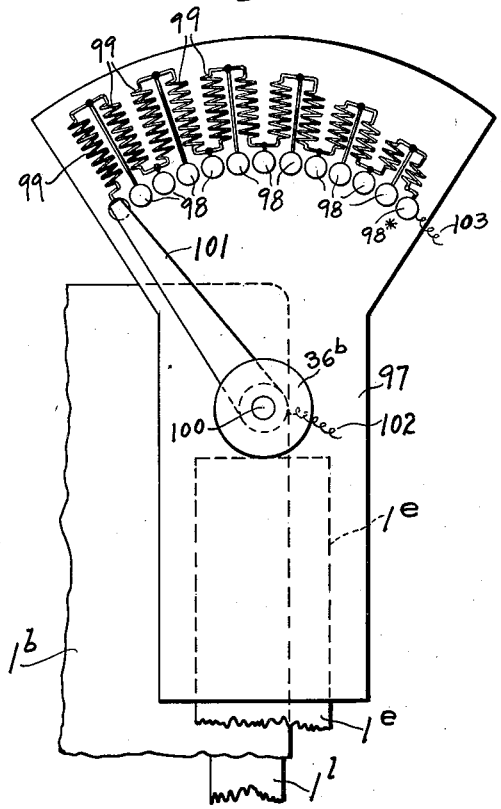
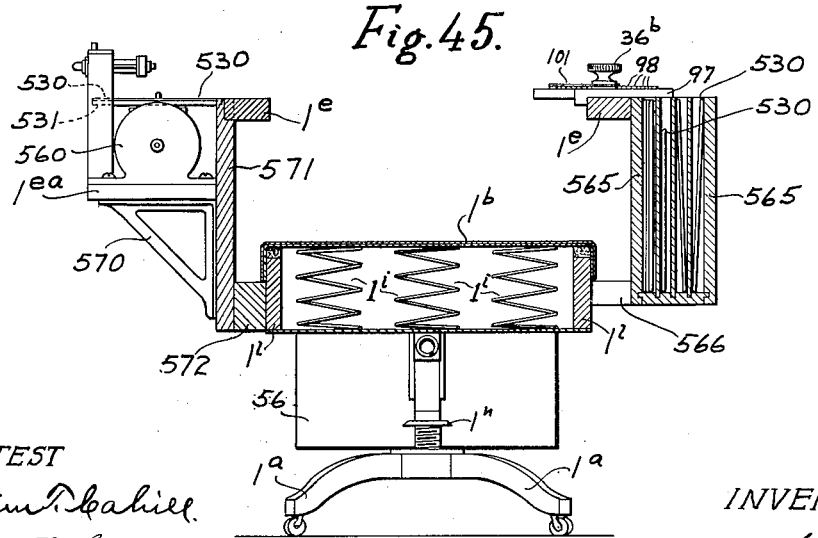
ATTEST
Arthur T. Cahill
Mary N. Cahill
INVENTOR
T. Thaddeus Cahill July 23, 1935. T. CAHILL 2,009,138
ELECTRICAL SPEAKERS AND OTHER SPEAKERS
Original Filed July 3, 1931 32 Sheets-Sheet 26

ATTEST INVENTOR

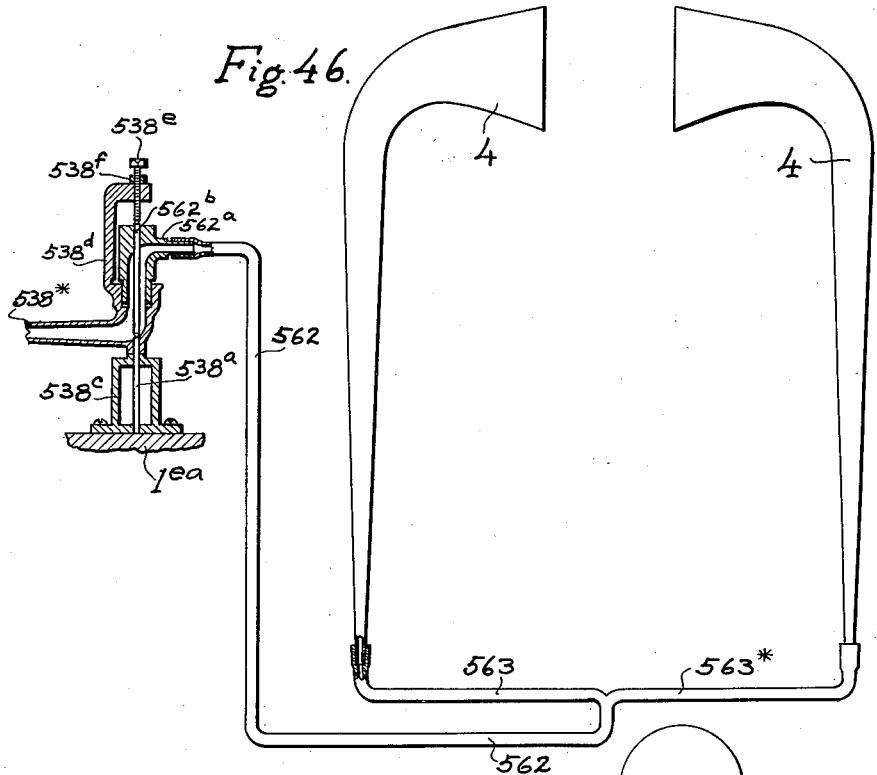
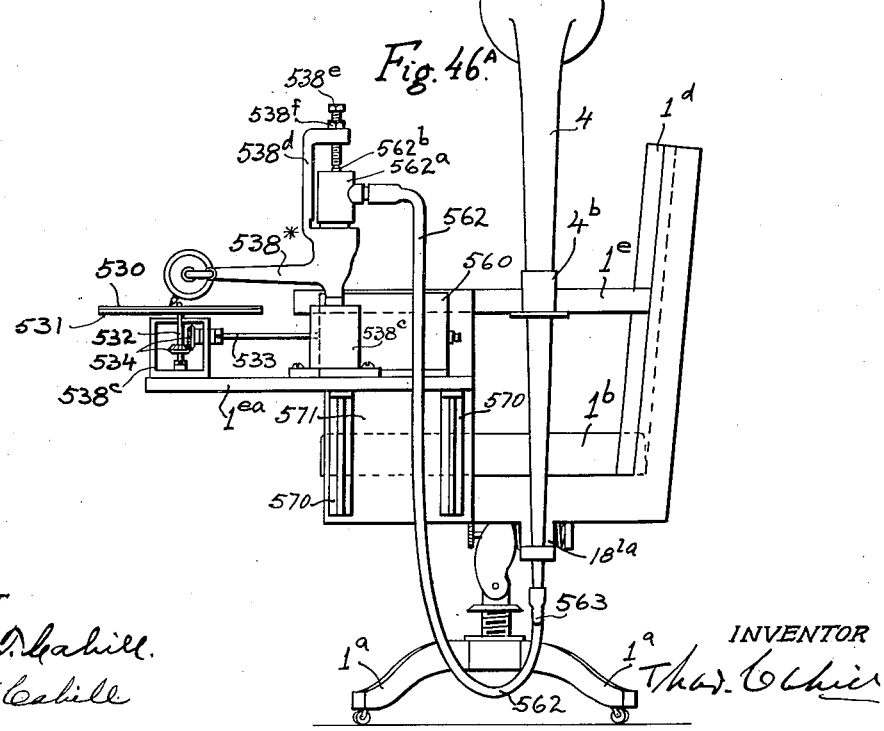

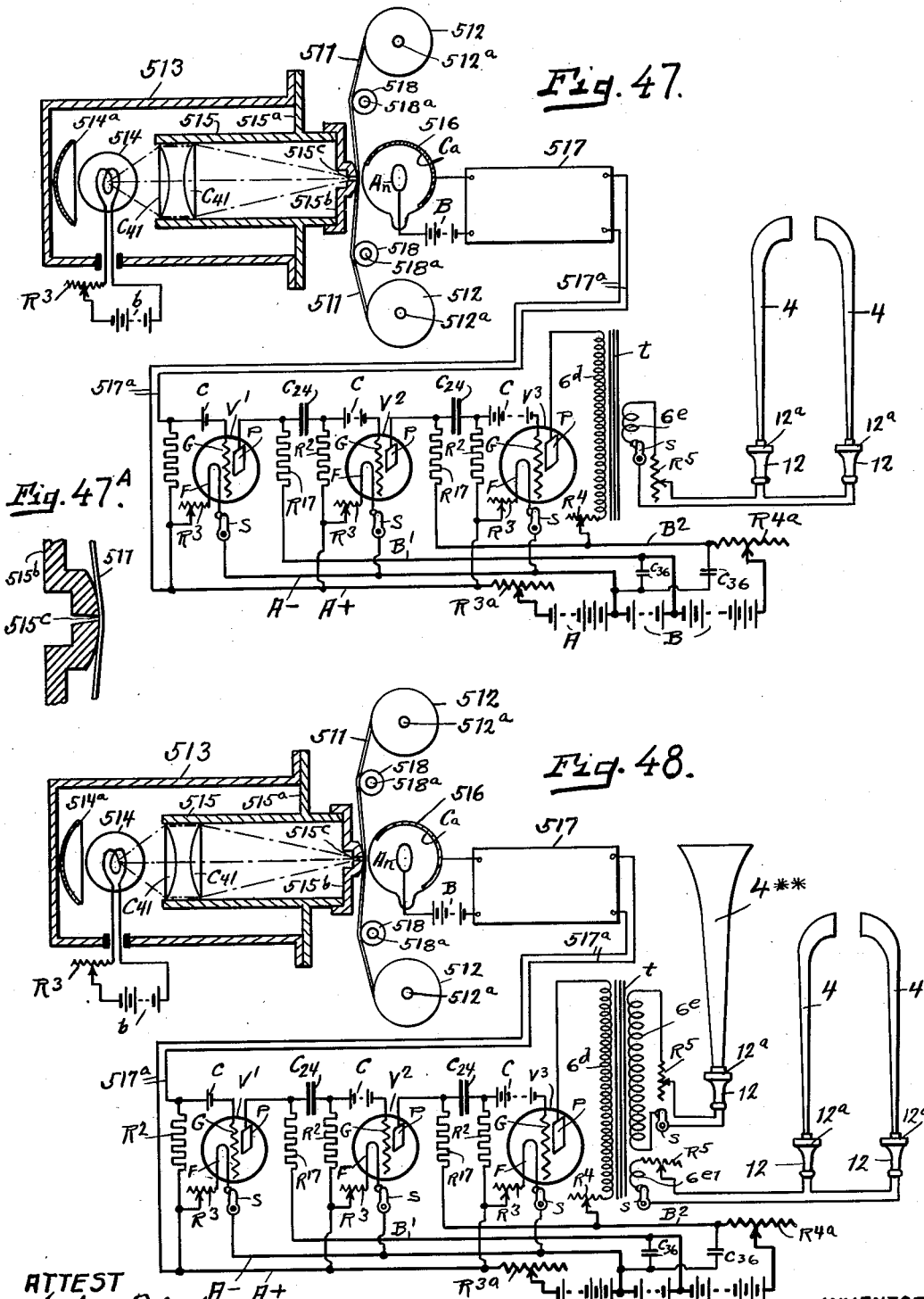

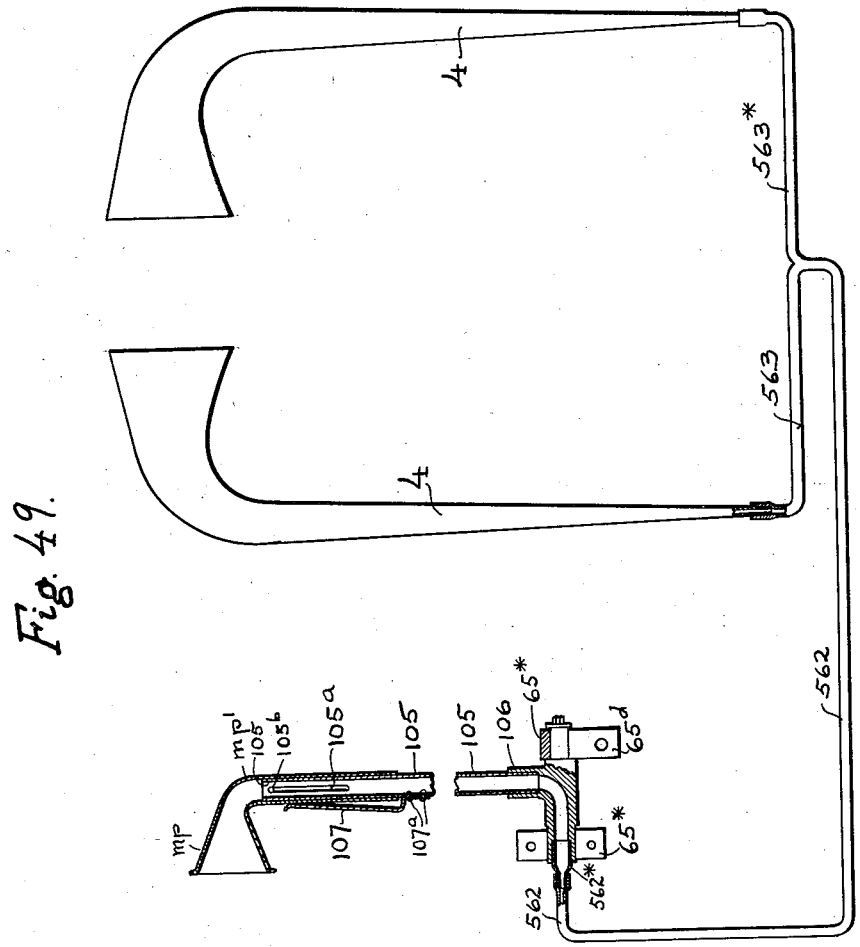

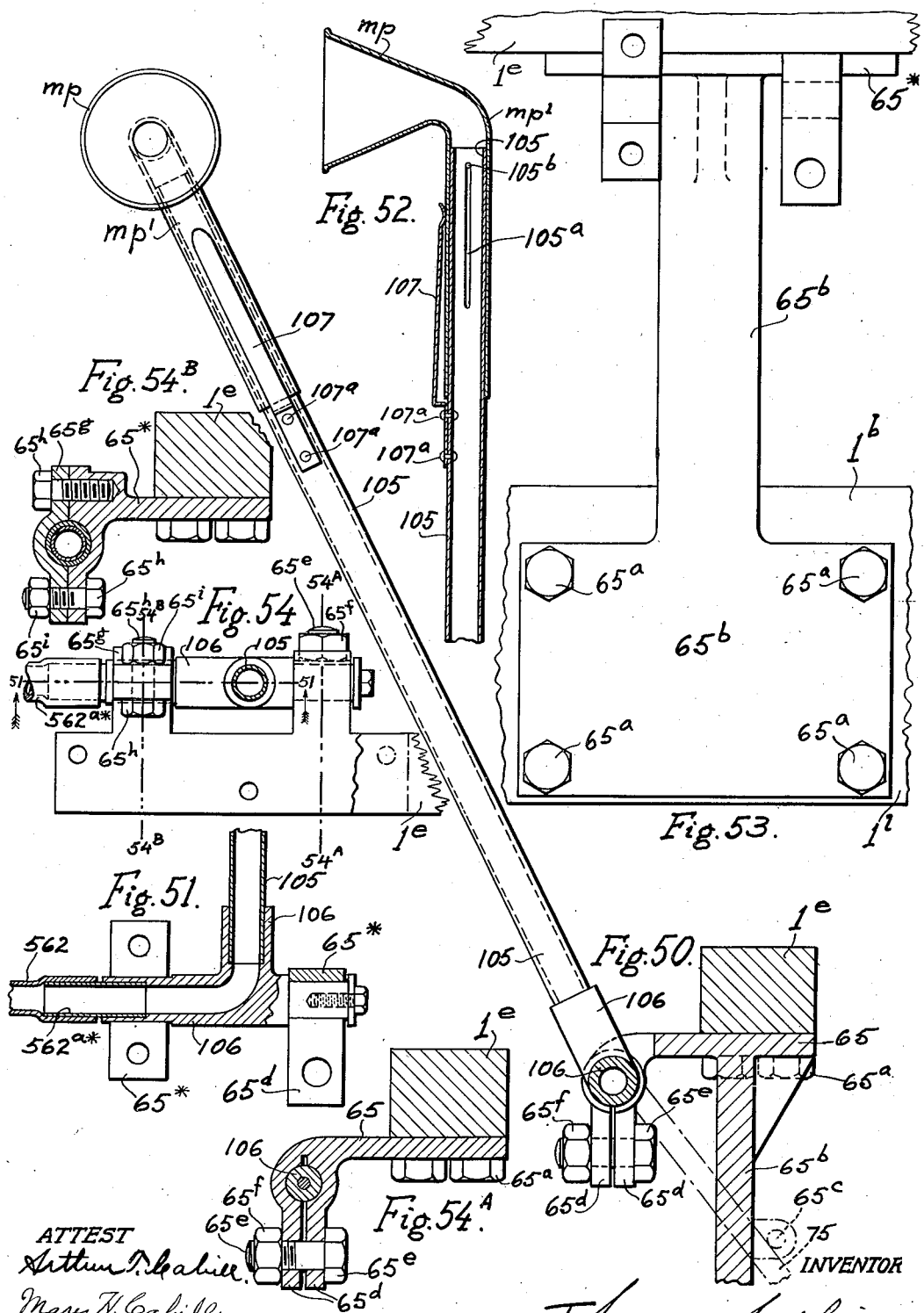

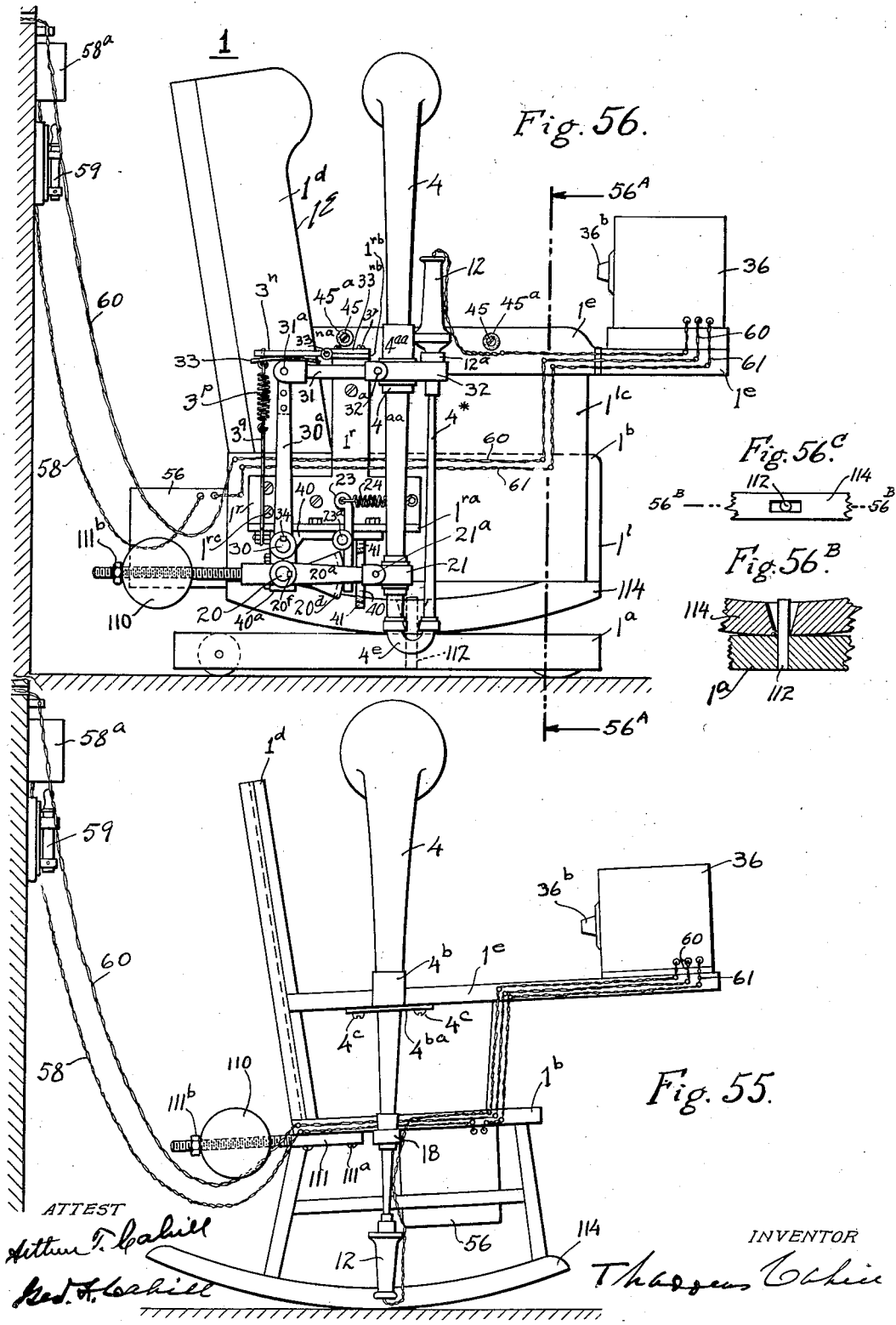

July 23, 1935. T. CAHILL 2,009,138
ELECTRICAL SPEAKERS AND OTHER SPEAKERS
Original Filed July 3, 1931  32 Sheets-Sheet 32
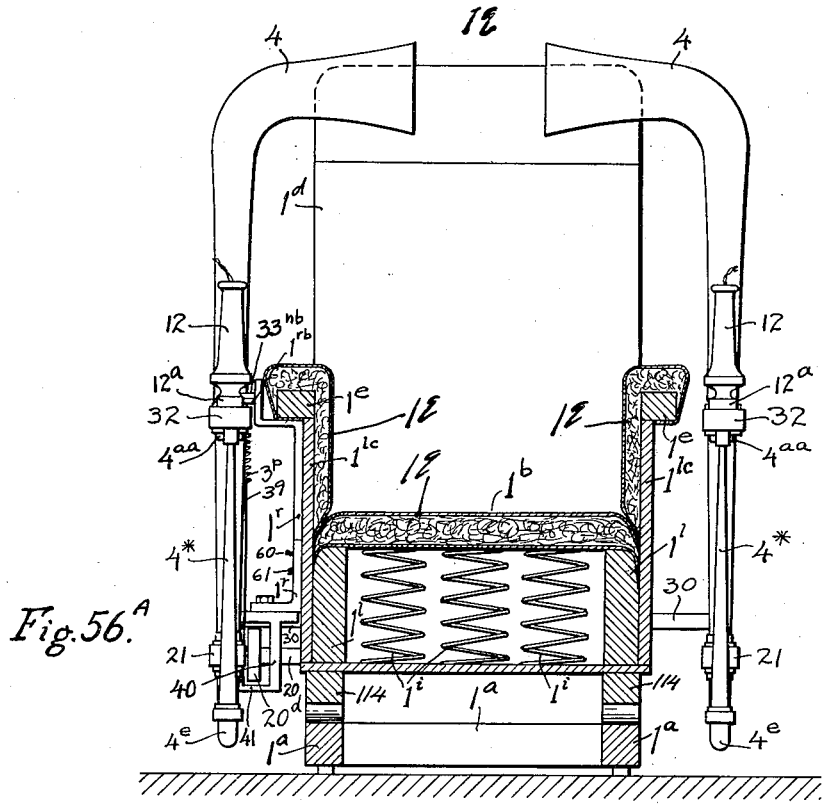
Fig. 56.ᴬ
ATTEST
INVENTOR Patented July 23, 1935

2,009,138

UNITED STATES PATENT OFFICE 2,009,138

ELECTRICAL SPEAKERS AND OTHER SPEAKERS

Thaddeus Cahill, New York, N. Y.; Arthur T. Cahill, Weehawken, N. J., Eleanor Cahill and George Frederick Cahill, both of New York, N. Y., executors of Thaddeus Cahill, deceased Continuation of application Serial No. 548,587, July 3, 1931. This application March 14, 1933, Serial No. 660,667

127 Claims. (Cl. 179—100.1)

Part one

Electrical vibrations, corresponding to speech or to music, or to both of these, are produced in various ways, as for example—

(a) By a microphone, taking up such vibrations from the air or from the lips of a person speaking or dictating.

(b) By a radio-receiving apparatus on the listener's premises, which is actuated by modulated radio waves, transmitted through space or over wires and taken up by a suitable antenna on the listener's premises, amplified and detected.

(c) By divers electrical processes and apparatuses, for example, the process and apparatus for producing music electrically, described in Letters Patent of the United States to me—No. 580,035, dated April 6, 1897; No. 1,107,261, dated August 18, 1914; No. 1,213,803, dated January 23, 1917; No. 1,213,804, dated January 23, 1917; No. 1,295,691, dated February 25, 1919.

(d) By a sound record, whether of the disk or the cylinder type, or of the photographically-recorded film type, or of any other suitable type.

By whatever means these electrical vibrations corresponding to speech or to music, or to both of these, may be produced, they serve, when converted or translated into audible aerial vibrations, to produce in the ear of the listener, the effect of speech or of music, or of both of these. Divers modes of translating these electrical vibrations, corresponding to speech or music into audible speech or music, have been contrived, of which I shall mention a few:

(a) An ordinary telephone receiver, held to one ear in the usual way, as in commercial telephony.

(b) Head-phones, in which a telephonic receiver is held to each ear.

(c) Loudspeakers of various kinds, as for example—

(i) The electrically-vibrated soundboard loudspeaker, shown and described in the Letters Patent to me aforesaid: No. 580,035, dated April 6, 1897; and (ii) The loudspeaker, having a diaphragm and a horn combined, shown in the Letters Patent to me: No. 1,213,803, dated January 23, 1917, and No. 1,213,804, dated January 23, 1917, which were continuations of my original application—No. 43,944, filed January 19, 1901.

(iii) Loudspeakers of the cone type, which are now well known in the art; and (iv) Dynamic loudspeakers, in which a coil of insulated wire, through which musical electrical currents are passed, vibrates in the field of an electrically-excited magnet.

Method (a) above, with the receiving telephone held to one ear, in the way that is common in commercial telephony, is not very satisfactory for music or speech, received for purposes of instruction or entertainment. Method (b), with head-phones, is better and more satisfactory, but has, notwithstanding, serious drawbacks, such as the pressure of the steel bow or frame of the head-phones on the user's head, the embarrassment to his free movements, which the head-phones, with their connecting wires, produce; the unpleasant effect of long-continued use of the head-phones on the user's ears; and so on; the net result of which is that the head-phones are very little used at present. The other method above mentioned, of hearing musical electrical vibrations or speech vibrations when translated into audible sound, namely, that with loudspeakers which, of course, are not fastened to the head and are easily heard all over the room in which they are located, is much more satisfactory to a listener, who wishes to hear those loudspeakers; but it has the disadvantage, particularly in city houses, of claiming the attention of other people in the same room, and at times, in neighboring rooms, who do not wish to hear the loudspeakers.

The object of my present invention is to make an apparatus for translating electrical vibrations, corresponding to speech or to music, whatever their source (whether a sound-record or the voices of musicians, or of a speaker or of musical instruments in action at the moment, and whether transmitted by radio through space, or transmitted over wires, either at radio frequency or at audio frequency) into audible aerial vibrations, in such a manner that these audible vibrations are easily and comfortably heard by one person, preferably seated in an easy chair, and without head-phones attached to his head, while they are heard but feebly, if at all, by other persons in the same room, or in an adjoining room. I use as a vibration translating device, what I call an electrical speaker, which may be in its nature very similar to a loudspeaker, save that it ordinarily (or perhaps always) speaks softly rather than loudly; and preferably I employ two of these (although in some cases, one alone may be used) and I mount these two speakers in proximity to the two ears of the listener respectively, so that he easily hears the sound produced by the electrical speakers, although this sound is not loud enough to be easily heard at a distance. Preferably, I attach my electrical speakers to a chair or other seat, in convenient proximity to the ears of a person seated in that chair; but although this is my perferred mode of working, I may, in some cases, support my electrical speakers from a wall, a stand, a table or the like, in proximity to the listener's ears, while he is seated in a chair or other seat, so that he hears easily and comfortably the voice of the music or the speaker, which is, however, so much reduced in volume that it is heard rather softly, or not at all, by other people in the same room, or in neighboring rooms.

Preferably, I provide a volume-control device (for example, a rheostat) the controlling knob, lever or handle of which is located in proximity to the listener, and within his reach, while seated in his chair, listening to my electrical speakers, so that he can, by this volume-control device, increase or decrease the loudness of the electrically-produced sound, to suit his sense of hearing, without leaving the chair in which he is seated.

Finally, in the case of music received by radio, I preferably mount the necessary controls for the same (both the tuning controls and the volume control) on the listener's chair, or otherwise in proximity to it, so that he can operate these controls—to bring on the music or to shut it off, or to change from one broadcasting station to another, or to vary the loudness of the music received, at will, while seated in his chair, listening to the electrical speakers.

In the case of a phonographic record or other sound record, as the source of the electrical vibrations corresponding to sound, I preferably mount the turntable and motor of the phonograph on an arm or other extension of the listener's chair, or otherwise in convenient proximity to said chair, and I also, preferably, provide sound records, contained in a record cabinet attached to my chair, so that the listener can change the records and can stop or start the phonograph as he may wish, while seated in my speaker-chair. But instead of mounting the phonograph on my speaker-chair, it may be mounted on a stand or table, or the like, or on the wall, and connected by electrical wires or by flexible rubber tubes with the speakers of my speaker-chair.

All this will be more clearly and easily understood from the accompanying drawings, which are to be taken and considered as a part of the description, and in which—

Fig. 1 is a top plan view of one form of easy chair, with my electrical speakers attached to the same, in such positions that when a person sits in said chair, an electrical speaker is on each side of his head in proximity to his two ears, respectively.

Figs. 1$^A$ to 1$^F$ are detail views, each on a larger scale than the scale of Fig. 1, showing more clearly various features of construction belonging to the apparatus of Fig. 1. Of these—

Fig. 1$^A$ is a sectional view, partly in elevation, through the dynamic electrical speaker shown in Fig. 1, in a plane parallel to the length of the field magnet 2$^e$ 2$^g$, belonging to said electrical speaker.

Fig. 1$^B$ is a detail view, showing the end-piece or yoke-piece 2$^h$, belonging to the magnetic system of my dynamic speaker, as viewed from the left, in Fig. 1$^A$.

Fig. 1$^C$ is a detail, a sectional view, partly in elevation on the line 1$^C$, 1$^C$, in Fig. 1$^A$.

Fig. 1$^D$ is a detail view, in elevation, showing the central core-piece 2$^e$ of the electro-magnet with the cylinder 2$^g$, which serves as the magnetic return, and lies outside the core-piece 2$^e$, forming an annular air-gap between them, in which the armature coil 2$^k$ (best seen in Fig. 1$^A$) attached to the paper cone 2$^a$ lies; and in this figure, the magnet 2$^e$ 2$^g$ is seen as viewed from the right, in Fig. 1$^A$.

Fig. 1$^E$ is a detail view, showing, in elevation, a part of the upper portion of one of the side-bars 3$^a$ of the speaker-supporting frame, with means for attaching the dynamic speaker to said side-bar 3$^a$.

Fig. 1$^{EA}$ is a detail view, showing the rod 2$^i$ connected with the yoke-piece 2$^h$, and carrying also the collar 2$^p$ (shown in section) attached fast to it.

Fig. 1$^F$ is a detail view in elevation, and partly in section, at a right angle to the plane of Fig. 1$^E$, showing the upper portion of one of the side-bars 3$^a$ and a part of the apparatus attached to it.

Fig. 1$^G$ is a detail view, showing a portion of the apparatus belonging to Fig. 1, and particularly the rod 3$^b$ of the speaker-carrying frame, with the casting 3$^c$ attached to the lower side of the horizontal bar 1$^i$, which serves to support the rod 3$^b$ aforesaid.

Fig. 2 is a side elevation of one form of my speaker-chair, with the electrical speakers and their accessories attached to it, which is shown in plan in Fig. 1.

Fig. 3 is a sectional view of my speaker-chair, partly in elevation, on the line 3, 3, in Fig. 2.

Figure 22:
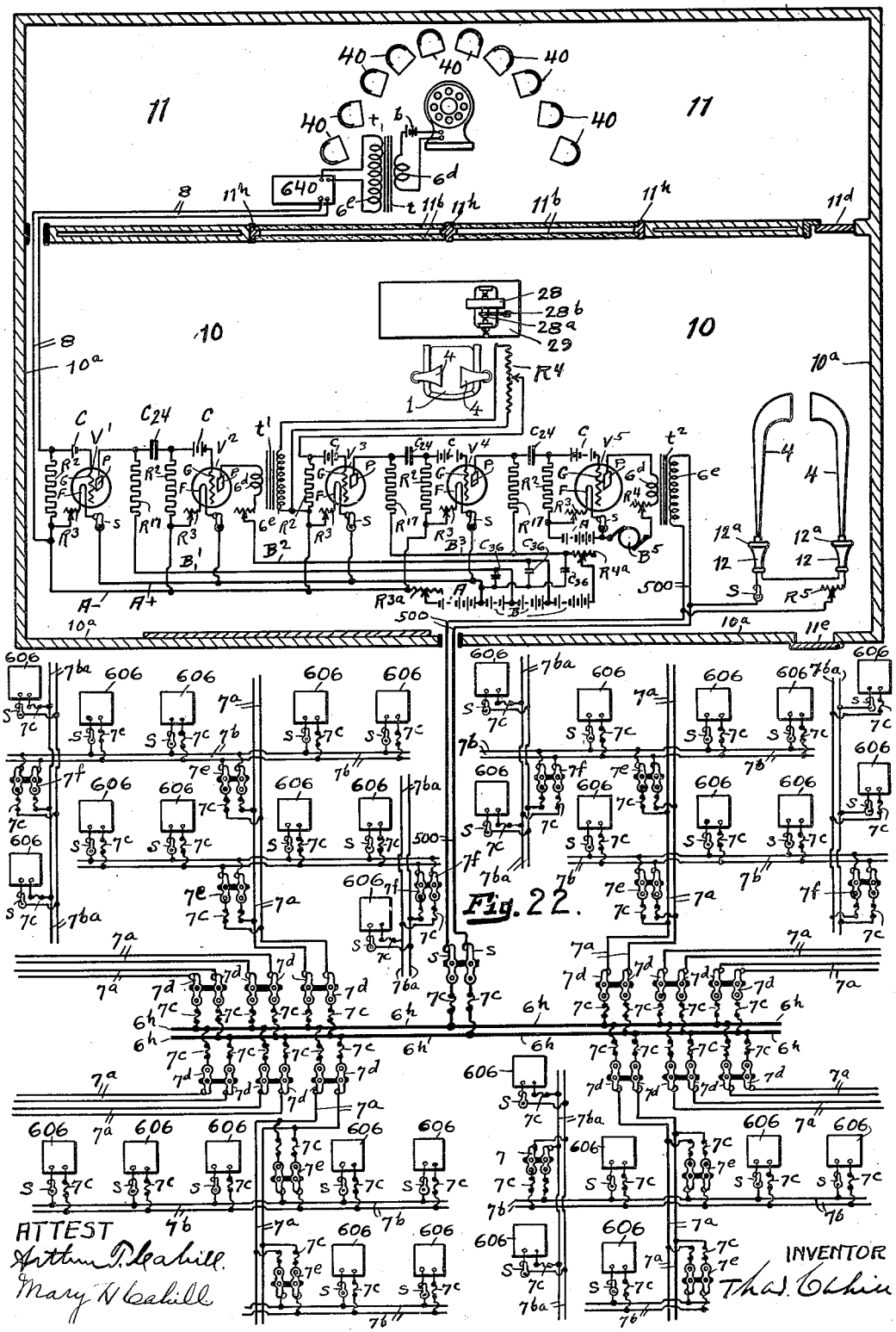

In Figs. 1 to 3, the electrical speakers are fixed in position, and are not adjustable by a person who is seated in the chair; but in Figs. 4, 5 and 6, which are, respectively, a plan view, in general like Fig. 1; a side elevation, in general like Fig. 2; and a sectional view, in elevation, on the line 6, 6, in Fig. 5, the electrical speakers 2, 2, are made to be easily adjustable both in respect of height and of in-and-out position, by a person who is seated in the chair and listening to the music.

Figs. 4$^A$ to 4$^H$ are detail views on a larger scale than that of Figs. 4, 5 and 6, to illustrate more clearly divers features of construction belonging to the apparatus of Figs. 4, 5 and 6. Of these figures—

Fig. 4$^A$ is a detail view, showing on a larger scale than Fig. 4, the rod 2$^i$, which carries the dynamic speaker 2, mounted in the arm 5$^a$, and adjustable therein, lengthwise of said rod 2$^i$.

Fig. 4$^B$, which is a detail view, in a plane at a right angle to the plane of the preceding figure, shows the arm 5$^a$, slotted, with a screw 5$^{ba}$, which has a head like a butterfly nut (adjustable by the fingers) to tighten its grip on the rod 2$^i$, by which one of my electrical speakers is mounted.

Fig. 4$^{BA}$ is a detail, a sectional view, partly in elevation, in a plane at a right angle to the plane of the preceding figure.

Fig. 4$^{BB}$ is a detail view, in elevation, showing the screw or bolt 5$^{ba}$, provided with a head like a butterfly nut, so that it is easily adjustable by the fingers.

Fig. 4$^C$, which is a detail, a front elevation, partly in section, shows the check lever 3$^n$ operating on the segment 3$^m$ (attached to the side-bar 3$^a$, Figs. 5 and 6) under the influence of the contractile spring 3$^p$.

Fig. 4$^D$ is a top plan view of the check lever 3$^n$, with its hanger 3$^{nb}$, and the segment 3$^m$, which latter is attached to the side-piece 3$^a$; and in this view, the arm 1$^e$ of the chair, to which the hanger 3$^{nb}$ is attached, is not shown. It is seen in Figs. 4, 5 and 6.

Fig. 4$^E$ is a side elevation, showing a part of the side-bar 3$^a$, with the segment 3$^m$ attached to it, the check lever $3^n$ with its hanger $3^{nb}$, and the chair arm $1^e$.

Figs. $4^F$, $4^G$ and $4^H$, illustrate the checking segment 6 and the means for exerting a frictional bite on the same. Of these—

Fig. $4^F$ is a view in elevation, and partly in dotted lines, showing the segment 6 attached to the rod $5^a$, and the friction rod 7 bearing against said segment 6.

Fig. $4^G$ is a sectional view in elevation, at a right angle to the plane of the preceding figure; and Fig. $4^H$ is a view, partly in section, partly in plan, on the line $4^h$, $4^h$, in Fig. $4^G$.

The electrical speakers shown in Figs. 1 to 6 inclusive, are dynamic electrical speakers, in each of which a coil $2^k$ of fine insulated electric wire (through which electric currents are circulated, corresponding to the sounds to be produced) connected with the paper cone or diaphragm $2^a$, vibrates in the air-gap of the electro-magnet $2^e$, $2^g$. But in Figs. 7 to 17 inclusive, my electric speaker is of the type having an electrically-vibrated diaphragm, in connection with a reinforcing horn, which is, preferably, of the exponential type. There are, preferably, two of these horns, and the longer portion of each of them is preferably disposed in a vertical or nearly vertical position, but with the larger or bell-end of the horn bent over, inwards, toward the head of the person seated in the chair 1, with the mouths or bells of the two horns on opposite sides of the head of the person who is seated in said chair, in proximity to the two ears respectively of such person, so that each horn speaks directly into one ear of the listener, seated in the chair 1. Of these figures—

Fig. 7 is a top plan view of my chair, with its horn speakers attached to it;

Fig. 8 is a side elevation of the same; and

Fig. 9 is a sectional view, partly in elevation, on the line 9, 9, in Fig. 8.

Fig. $9^A$ is a detail sectional view, partly in elevation and on a larger scale than Fig. 9, showing a portion of the horn 4, with the ring or cylinder or truncated cone $4^b$, surrounding it and attached fast to it, and the ring-plate $4^{ba}$, which is formed integral with or otherwise firmly attached to said ring $4^b$, and which is, in turn, attached by screws $4^c$ to the lower surface of the corresponding arm $1^e$ of my speaker chair. Instead of forming the ring-plate $4^{ba}$ integral with the ring or cylinder $4^b$, the ring-plate may be formed from plate metal by punching, and be attached by soldering or electric-welding to the cylinder $4^b$.

Fig. $9^B$ is a detail view, partly in section and partly in plan, on the line $9^B$, $9^B$ in Fig. $9^A$.

Fig. $9^C$ is a sectional view, partly in elevation, and on a scale much larger than the scale of Fig. 9 or even $9^A$, through my telephonic receiver, showing the construction of the same (which is a usual and well-known construction, extensively used in the telephone art) and the manner of attaching said telephonic receiver to the corresponding horn 4.

Fig. $9^D$ is a top plan view of my telephonic receiver, with the cap $12^a$ and the diaphragm 13 removed therefrom, so as to expose to view the parts below them.

In Figs. 7, 8 and 9, the horns 4, 4, are fixed in position with relation to the chair, and are not adjustable by a listener seated in said chair, but in Figs. 10 to $12^A$, the horns are easily adjusted by the listener, while seated in the chair 1, so as to bring the center of each horn near to the corresponding ear of the listener while seated in the chair 1. Of these figures—

Fig. 10 is a top plan view of my chair, with the horns 4, 4, attached to it, in convenient proximity to the listener's two ears respectively.

Fig. 11 is a side elevation of the same apparatus.

Fig. 12 is a sectional view, partly in elevation on the line 12, 12, in Fig. 11.

Figs. $11^A$ and $12^A$ are views on a larger scale than Figs. 10, 11 and 12, and Figs. $11^B$ to $11^L$ are detail views. Figs. $11^A$, $11^F$ to $11^L$ and $12^A$ are on a scale twice as large as that of Figs. 10, 11 and 12; Figs. $11^B$ and $11^E$ are on the same scale as Figs. 10, 11 and 12, and Figs. $11^C$ and $11^D$ are on a scale four times as large as that of Figs. 10, 11 and 12. Of these views—

Fig. $11^A$ is a view, in general similar to Fig. 11, but on a larger scale, and with the front portion of my speaker chair broken away, to save space. Said Fig. $11^A$, by reason of its larger scale, illustrates more clearly various features of construction, that are shown on a smaller scale in Fig. 11.

Fig. $11^B$ is a detail plan view, showing the shaft 20, with its arms $20^a$, $20^a$ and the connecting pieces 21, 21; and with the horns 4, 4, and ferrules $4^a$, in cross section. Also, this figure shows the arm $20^b$ and the counter-balancing weight 22, the stop-arm $20^c$ and the checking-segment $20^d$, attached to it.

Fig. $11^C$ is a detail view, in plan and partly (that is, as to the horns 4 and ferrule $4^a$) in cross section, showing the piece 21, the horn 4, and the arm $20^a$.

Fig. $11^D$ is a detail view, partly in section, partly in elevation, and in a plane at a right angle to the plane of Fig. $11^C$, illustrating certain details of construction.

Fig. $11^E$ is a rear elevation of the shaft 30, with its arms $30^a$, $30^a$, the segment 33 attached to one of those arms, and showing also the links 31, 31, in rear elevation.

Fig. $11^F$ is a detail view, partly in plan and partly in cross section, showing the segment 33, with the checking lever $3^n$ that bears on the same, the arm $30^a$, to which said segment 33 is connected, the link 31, the connecting piece 32, the ferrule $4^{aa}$ and the horn 4—the latter in section.

Fig. $11^G$ is a detail view, in elevation and partly in section, in a plane at a right angle to the plane of the preceding figure, illustrating various details of construction.

Fig. $11^H$ is a detail view, partly in section, partly in plan, showing the stop-arm $20^c$, which is attached fast to the shaft 20, and the checking segment $20^d$, which is attached by screws or rivets $20^e$ to the arm $20^c$.

Fig. $11^I$ is a side elevation of the casting 40, with its cap $40^a$, constituting a split bearing, by which one end of each of the shafts 20 and 30 is supported.

Fig. $11^K$ is a detail view, partly in section, partly in elevation, showing the stops 41, 41, which are formed integral with the piece 40, and the stop-arm $20^c$, viewed from in front.

Fig. $11^L$ is a perspective detail of the casting 40, with its cap $40^a$ and the stop-arms 41, 41, formed integral with the said casting 40.

Fig. $12^A$ is a view on a scale twice as large as the scale of Fig. 12, of the left-hand portion of said Fig. 12, to illustrate more clearly certain details of the construction.

Figs. 13 and 14 illustrate a form of my apparatus in which the speakers and also the radio-receiving apparatus, with its controls, are not attached to the chair or seat in which the listener sets, but, with the details shown in said figures (which, however, may be altered within wide limits, if desired) the speakers are attached to the wall 51, and the radio-receiving apparatus 36 rests upon the floor 57, but within easy reach of a listener seated in the bench, chair or seat 1*. Of these views—

Fig. 13 is a front elevation, and Fig. 14 is a side elevation, partly in section, showing a chair, bench or seat 1* resting on the floor 57, and showing also my electrical speakers, with horns 4, 4, attached to the wall 51 above the seat 1*, and with the bells of said horns 4, 4, curved inwards towards each other, in such positions that they are near to the ears of a listener seated in the seat 1*, while the radio-receiving apparatus 36 is also in proximity to the seat 1*, and in such a position that its tuning controls $36^a$, $36^a$, and its volume control $36^b$, are easily and comfortably reached at any time by one hand (say, the right hand) of a listener seated in the seat 1*. These views are in part diagrammatic.

Fig. $13^A$ is a plan view, showing, on a somewhat larger scale than Fig. 13, the means for clamping the ferrules $4^a$, $4^a$, and the small ends of the horns 4, 4, to a wooden supporting panel 50, which is attached to the wall 51, in any suitable manner.

Fig. $13^B$ is a front elevation of the clamping means on a larger scale than Fig. 13.

Fig. $14^A$ is a detail view, showing the support 55, by which the ferrule $4^{aa}$ and the horn 4 are attached to the panel 50.

In Figs. 7 to 14, the horns 4, 4, shown, have each a long vertical or nearly vertical portion and a bent-over horizontal portion, which contains the bell, bent inwards towards the listener's ear. But in Fig. 15, which is otherwise in general similar to Fig. $11^A$, and in Fig. 16, which is in general similar to Fig. 9, the small-diameter portion of the horn, which stands vertically or nearly vertically, is bent back on itself, so as to secure greater speaking length, while the larger or bell-end is bent over horizontally—is bent inward toward the corresponding one of the listener's ears, as mentioned above, and as shown in Figs. 10, 11, 12 and $12^A$.

Fig. $15^A$ is a detail view, on a larger scale than Fig. 15, showing the small end of the horn 4*, with the ferrule $4^a$ surrounding it, the telephonic receiver or unit (whose case is marked 12); also, the ferrule $4^{aa}$ surrounding the horn 4, where it is of larger diameter, and the piece 32 in which the ferrule $4^{aa}$ is mounted.

Fig. $15^B$ is a detail view, a cross section on the line $15^B$, $15^B$, in Fig. $15^A$.

Fig. $15^C$ is a view, partly in section, partly in elevation, on a larger scale than Fig. 15, showing the U-shaped connecting piece $4^e$, with the two sections of the horn 4 screwed into it.

Fig. $15^D$ is a detail view, a cross section in plan on the line $15^D$, $15^D$ in Fig. $15^C$.

Fig. 16 is a view in general similar to Fig. 9 before described, showing my speaker chair, with a horn at each side of the same, but with the modified horn structure before described consisting of the large-diameter part 4, the small-diameter part 4*, and the connecting piece $4^e$, as described more in detail below.

Fig. 17 is a side elevation of my horn (4, 4*, $4^e$) shown in Fig. 16.

Figs. $17^A$, $17^B$ and $17^{BA}$ (on the same sheet with Fig. 17) and Figs. $17^C$, $17^D$, $17^E$ and $17^F$ (on the same sheet with Fig. 9), are detail views on a larger scale than Figs. 16 and 17, illustrating certain of the details of the construction of the apparatus represented by Figs. 16 and 17. Of these views—

Fig. $17^A$ is a view partly in plan and partly in section, showing the ring or ferrule $4^b$ firmly attached (by pressing, soldering, electrical welding or otherwise) to the mounting plate $4^{ba}$, which latter is itself attached to the corresponding arm $1^e$ of my speaker chair, as shown in Figs. 16 and 17. This mounting plate $4^{ba}$, as the drawings show, is differently shaped in Figs. $17^A$, $17^B$ and $17^{BA}$ from what the corresponding part $4^{ba}$ is, in Figs. $9^A$ and $9^B$.

Fig. $17^B$ is a detail view, in sectional elevation, on the line $17^B$, $17^B$, in Fig. $17^A$.

Fig. $17^{BA}$ is also a detail view, in sectional elevation, on the line $17^{BA}$, $17^{BA}$, in Fig. $17^A$.

Fig. $17^C$ is a detail view, in plan, showing one end of the bar 18, with two sections of my horn 20 (the larger section, marked 4, and the smaller section, marked 4*) shown in section, passing through it.

Fig. $17^D$ is a view similar to the preceding, but with the retaining piece $18^c$ removed, so as to expose to view the slots $18^d$ and $18^e$, by which the horn sections 4 and 4* are admitted into place in said bar 18.

Fig. $17^E$ is a top plan view of the retaining piece $18^c$; and

Fig. $17^F$ is an end elevation of the bar 18, with the retaining piece $18^c$ and the horn sections 4 and 4*, the two latter being broken away.

Fig. 18 is a schematic view, showing symbolically a central station 353, with a broadcasting aerial 340, distributing music in the wireless way through space to receiving stations or subscribers' stations, 355, 355, located in different places, and having receiving antennas 341, 341.

Fig. 19 is a schematic view, showing a music studio with the musicians' room 11 the control room 10 and accessory apparatus, with a microphone or electrical pick-up $m$ in the musicians' room 11, feeding, through the audio-frequency amplifying vacuum tubes $v^1$, $v^2$, $v^3$, the circuit 354, which is the output circuit of the music studio, and the input circuit of the broadcasting apparatus, to which the vacuum tubes $v^{1a}$, $v^{2a}$, $v^{3a}$ and $v^{4a}$, with the oscillator 343, the broadcasting aerial 340 and associated and accessory parts, belong. In this figure, the horns 4, 4, are shown in two places, although there is put one pair of them; thus (c) these two horns are shown at the right of the control-room 10, connected with the radio-receiving apparatus 355, by which they are fed. They are here shown to illustrate the electrical connections; but they are also shown, at the left, attached to the chair 1, in which the control operator sits while operating his control device 28, and controlling rheostat $R^4$; and in this case, they are thus shown to illustrate their mechanical connection with the chair 1 and their relation to the control operator, who sits in that chair. Similarly, in Fig. 19, the rheostat $R^4$, which the control operator manipulates, is shown schematically, bridged across the secondary winding $6^e$, of the transformer $t'$; and also the controlling lever 28 is shown, which operates said rheostat $R^4$, as shown in Fig. 20; that is, the rheostat $R^4$, from the necessity of the case, is shown schematically in Fig. 19, and it is to be understood in that figure, from Fig. 20, that the rheostat $R^4$ is connected mechanically with the control lever 28, so that it is operated by it.

Fig. 20 is a view, partly schematic, showing one type of rheostat R⁴ which the control operator, in the control room 10, operates by means of the balanced lever or handle 28, so as to control the loudness of the sounds produced.

Fig. 21 is a diagrammatic view, illustrating one mode of connecting the receiving antenna 341 of a radio receiving device with my electrical speakers 12, 12, which preferably are mounted on my speaker chair, as illustrated in preceding figures, but which may be mounted in some other way, as illustrated, for example, in Figs. 13 to 14ᴬ.

In the preceding figures, I show my soft speakers, preferably combined with an easy chair, as in Figs. 1 to 12ᴬ, and in Figs. 15 to 17, or otherwise mounted, as illustrated, for example, in Figs. 13 to 14ᴬ; and these soft speakers may well be fed from a radio receiving apparatus; as shown in various preceding figures, and particularly in the diagrammatic view Fig. 21. Also, they may be fed from a wired system, which operates radiophonically, but is, by the wired-wireless or guided-radio method. This will be readily understood, since the wired-wireless system or guided-radio system is so nearly like the wireless system. Also, my soft speakers may be fed by electrical vibrations distributed from a central station, at audio frequency, over wires, and this is illustrated in Figs. 22, 23 and 24, which are diagrammatic views. Of these—

Fig. 22 is a diagrammatic view, which insofar as the musicians' room 11 and the control room 10 and the apparatus belonging to them, are concerned, is very much like Fig. 19 above described. But Fig. 22 differs from Fig. 19 in that, while in Fig. 19 the distributing of speech or music is effected by the radio method, and by means of the tubes v¹ᵃ, v²ᵃ, v³ᵃ, v⁴ᵃ, the oscillator 343, the broadcasting aerial 340, and the associated and accessory parts shown in the drawings, and which are usually used with them in the art, in Fig. 22, a series of principal mains, 6ʰ, 6ʰ, having district mains 7ᵃ, 7ᵃ, and local mains 7ᵇ, 7ᵇ, connected with them, are shown, which are fed with electrical vibrations from the music studio 11, 10, and which, in turn, feed the subscriber's receiving apparatuses 606, 606.

In Fig. 22, the subscriber's receiving apparatus is shown symbolically, by means of the case 606, but in Figs. 23 and 24, which are schematic views, the receiving devices are shown more in detail. In Fig. 23, the receiving device consists, essentially, of my soft speakers 12, 12, with horns 4, 4, which preferably are connected with the chair 1, as illustrated in preceding Figs. 1 to 17. And in Fig. 23, the energy to operate the sound-producing devices 12, 4, 12, 4 is supplied over the distributing wires 7ᵇ. But with the apparatus shown schematically in Fig. 24, an audio-frequency amplifying device is supplied on the premises of the subscriber, the grid G of which is fed from the distributing wires 7ᵇ, 7ᵇ, so that it is sufficient to distribute a very small amount of energy, which may be done over small wires, and at low voltages. And the amplifying device on the subscriber's premises increases the energy thus received to a sufficient amount to operate my soft speakers 12, 12, satisfactorily.

In preceding figures, my soft speakers have been shown in combination with means for distributing music from a central station, whether by the wireless method through the ether, or by wired-wireless or guided-radio over wires, or by alternating currents of audio-frequency over wires. But my system of soft speakers may also be used advantageously in connection with phonographic apparatus, so that the reproduced or phonographic voice is produced by my soft speakers, with comfortable loudness in the ears of a listener, without producing a loud sound in the room which such soft-speakers are located. This is shown in Figs. 25 to 25ᶠ. Of these figures—

Fig. 25 is a view, partly in section, partly in elevation, and largely diagrammatic, showing a portion of the tone-arm 538 of a phonograph with a diaphragm 535 connected with the same, which diaphragm is vibrated by the phonograph needle 540 (seen in Figs. 25ᴬ and 25ᴮ) as it works in the sound track of the corresponding sound-record 530 (Figs. 25ᴬ and 25ᴮ); and an armature 542 is connected with said diaphragm 535; and a magnet 545 is provided in proximity to which said armature vibrates, thereby producing alternating electric currents, corresponding to sound, in the armature coil 547, located at the end of said magnet, near said armature 542 and diaphragm 535; and with an electrical connection from said armature coil 547 to an audio-frequency vacuum-tube amplifier, which, in turn, is connected to feed my soft speakers (as 12, 12) and these, preferably, are connected with my speaker chair, as illustrated in preceding figures, or are otherwise suitably mounted, as illustrated, for example, in Figs. 13 to 14ᴬ.

Fig. 25ᴬ is a view partly in section, partly in elevation, and in part broken away. This figure is in a plane at a right angle to the plane of the preceding figure, showing the front portion or outer portion of the tone-arm 538 of the phonograph, with the diaphragm 535 carried by said tone-arm, the phonograph-disk or record-disk 530, the needle 540 for engaging it, the pivoted needle-holder 541, which carries the needle 540, and is vibrated by it, and the armature 542, which is attached to said needle-holder 541.

Fig. 25ᴮ is a detail view, very similar to Fig. 25ᴬ, but on a larger scale, and in part broken away.

Fig. 25ᶜ is a detail view, partly in section, partly in elevation, in general similar to the left-hand portion of Fig. 25, but on a larger scale, and showing more clearly certain of the essential parts of the apparatus.

Fig. 25ᴰ is a view somewhat similar to Fig. 25, but with this difference, that in Fig. 25, an audio-frequency amplifying device is provided, which amplifies the alternating currents, corresponding to sound, from the phonograph-affected coil 547 before they are applied to my soft speakers 12, 4, 12, 4; but in the apparatus of Fig. 25ᴰ, the phonograph-affected induction coil or armature 547 is connected with my telephonic receivers 12, 12, directly and without any amplification.

Fig. 25ᴱ is a view somewhat similar to Fig. 25, but with this difference, that in Fig. 25, the inductive armature coil 547 is provided, which feeds a vacuum-tube audio-frequency amplifying device, and through that feeds my soft-speakers 12, 12. But in the apparatus of Fig. 25ᴱ, a carbon microphone, such as is used in telephony, is provided instead of the inductive armature coil 547; the diaphragm 558 of this microphone is vibrated by the phonograph needle 540, through the needle-holder 541; and the secondary circuit of this microphone is connected to feed my soft-speakers 12, 12.

Fig. 25ᶠ is a view in general similar to Fig. 25ᴬ, but showing a carbon microphone m, attached to the tone-arm 548, and with its diaphragm 558 vibrated by the sound-record 530, through the needle 540 and needle-holder 541.

Another useful variation of my system, with soft-speakers, is to combine these with dictating apparatus, preferably, a microphone attached to an easy chair, into which the dictator speaks while a typewriter operator, who is receiving his dictation, sits in one of my speaker chairs, with the soft-speakers, fed from the microphone aforesaid, in proximity to her ears. Apparatus of this sort is illustrated in Figs. 26 to 28$^M$, taken in connection with preceding figures.

Fig. 26 (on the same sheet with Fig. 20) is a schematic view, showing a microphone m, into which the person dictating speaks, while the secondary circuit of said microphone is connected with my soft-speakers 12, 12, the horns 4, 4, connected with which, are arranged in proximity to the ears of the typewriter operator, who is taking the dictation, to the machine, but seated in my speaker chair, which is shown in preceding figures; and see also Fig. 26$^A$.

Fig. 26$^A$ is a perspective view, showing a person sitting in my dictating chair, talking into a microphone which, preferably, is adjustably mounted on said chair in a convenient position of proximity to his mouth; said microphone is connected with the telephone receivers 12, 12, belonging to my speaker chair, in which the stenographer is seated, listening to the dictation as it comes to her from the microphone, and from my soft-speakers, attached to her chair, and writing from this dictation on her typewriter. This figure is supplemental to other figures, which, taken together, illustrate the same thing.

Fig. 26$^B$ (on the same sheet with Fig. 23) is a schematic view, in general similar to Fig. 26, but it differs from Fig. 26 in this, that while Fig. 26 is provided with a single pair of soft speakers 12, 4, 12, 4, which are to be understood as attached to the speaker chair in which the typewriter operator sits, the apparatus of Fig. 26$^B$ is provided with two pairs of soft speakers 12, 4, 12, 4, one of which is attached to the speaker chair in which the typewriter operator sits, listening to dictation, which is spoken softly into the microphone m attached to my dictation chair, and the other pair of these soft-speakers 12, 4, 12, 4, is to be understood as attached to my dictation chair, to which also the microphone m is attached. The mode of attaching my soft-speakers (whether these are of the dynamic type, or of the diaphragm-and-horn type) to my chair, has been fully illustrated in Figs. 1 to 12$^A$, and 15 to 17$^F$, so nothing further need be said of it here.

Fig. 27 (on the same sheet with Fig. 20) is a schematic view, somewhat similar to the preceding figure, but showing a vacuum-tube audio-frequency amplifier, whose grid is fed by the secondary circuit of the microphone system, and with its plate circuit connected to feed the soft speakers 12, 12, whose horns 4, 4, are preferably connected with an easy chair, as before described, in which the typewriter operator sits.

Figs. 28 to 28$^M$ illustrate one convenient means for mounting the microphone m, into which the person dictating speaks. Preferably, this microphone is attached to the chair in which the person dictating sits, but it may be mounted in any other suitable manner, as for example, on a desk or table, in front of which the person dictating sits. But when said microphone is connected with an easy chair, it may be attached to one of the arms 1$^e$ of said chair, and also to one of the side-bars 1$^1$ of said chair. In Fig. 28, the arm 1$^e$ of my speaker chair is seen in cross section, and the mounting apparatus for the microphone m is seen partly in section, and partly in elevation—the lower part in section, but the upper part in elevation; and the downward extension 65$^b$ of the casting 65 is broken away, in part.

Fig. 28$^A$ is a side elevation, showing the lower portion of the mounting and adjusting means for the microphone m, but with the upper portion of said mounting means and the microphone m, itself, broken away.

Fig. 28$^B$ is also a side elevation of the same mounting means, but seen from the other side— from the left-hand side of a person seated in my chair, in a position to dictate to the microphone m aforesaid.

Fig. 28$^C$ is a detail view, a front elevation, somewhat similar to Fig. 28$^A$, but broken away above, and with the spring plate 71 removed, and the bolt 70 seen in section.

Fig. 28$^D$ is a front elevation of the spring plate 71.

Fig. 28$^E$ is a cross section on the line 28$^E$, 28$^E$, in Fig. 28.

Fig. 28$^F$ is a detail view, an end elevation, of the casting 65, by which the shaft 66 and the arms 68 and 67 are supported.

Fig. 28$^G$ is a plan view of the said casting 65.

Fig. 28$^H$ is a side elevation showing the microphone m and its pivoted connection with the arm 67, by which facility is afforded for raising or lowering the mouth-piece m', of the microphone, more or less, as required, as is commonly done in the telephone art.

Fig. 28$^K$ is a detail view, in side elevation, showing the casting 65, which serves to mount the microphone-carrying arm 67, and which is itself attached by screws or bolts 65$^a$, 65$^a$, to one of the arms 1$^e$ and to one of the side-bars 1$^1$ of the seat of my easy chair. And in this figure, the central portion of the downward-extending arm 65$^b$ of the casting 65, is broken away.

Fig. 28$^L$ is a detail view, an end elevation, showing the casting 65 and the shaft 66, attached fast to it by the bolt 66$^a$, and in this view said casting 65 is in great part broken away. This view is supplemental to Fig. 28$^F$.

Fig. 28$^M$ (on the same sheet with Fig. 25$^E$) is a detail, a top plan view, showing the microphone m with its mouth-piece m' pivotally connected with the supporting arm 67 in substantially the same way in which microphones are ordinarily pivotally connected with the case to which they are attached.

Fig. 28$^N$ (on the same sheet with Fig. 21) is a schematic view, illustrating an electrical tone pick-up of the inductive type, which is suitable for use with my dictation chair, connected, preferably, through an audio-frequency tone-amplifier of the vacuum-tube type, to feed the soft-speakers 12, 4, 12, 4, to which the person taking the dictation, listens. In this figure, the inductive electrical pick-up is shown partly in section, and partly in elevation, but the remainder of the figure is entirely diagrammatic.

Fig. 29 is a diagrammatic view, somewhat similar to Fig. 20, but illustrating the radio-receiving set arranged to feed either my soft-speakers 12, 4, 12, 4, belonging to my radio chair 1, as before described, or to feed my loudspeakers, 12, 4*, 12, 4*.

Fig. 30, like the preceding figure, shows radio-receiving apparatus, which is adapted to feed either my soft-speakers or my loudspeakers, but the mode of connecting the vacuum-tube amplifiers with the soft-speakers and the loudspeakers is different in the two figures, as the drawings show, and as is described more in detail below.

Fig. 31 is a diagrammatic view, somewhat similar to Fig. 24 before described, but whereas Fig. 24 shows an audio-frequency vibration-amplifying apparatus (whose grid G is fed from wires over which speech and music are distributed at audio frequency) connected to feed a pair of my soft-speakers 12, 4, 12, 4. Fig. 31 shows a somewhat similar receiving apparatus, arranged to feed either my soft-speakers 12, 4, 12, 4, or my loudspeakers 12, 4*, 12, 4*. Fig. 31 is to be taken in connection with and in the light of Figs. 22 and 24, which show portions of the apparatus that are omitted, for lack of space, in Fig. 31.

Fig. 32 is a view somewhat similar to Fig. 25, and which is to be taken in connection with and in the light of Figs. 25 to 25$^C$, but showing means for feeding, from a phonograph, either my soft-speakers 12, 3, 12, 4, or my loudspeakers 12, 4, 12, 4.

Fig. 33 is a view somewhat similar to Fig. 25$^E$, and which is to be taken in connection with and in the light of Figs. 25$^E$ and 25$^F$, but showing means for feeding either my soft-speakers 12, 4, 12, 4, or my loudspeakers 12, 4, 12, 4.

Figure 34:
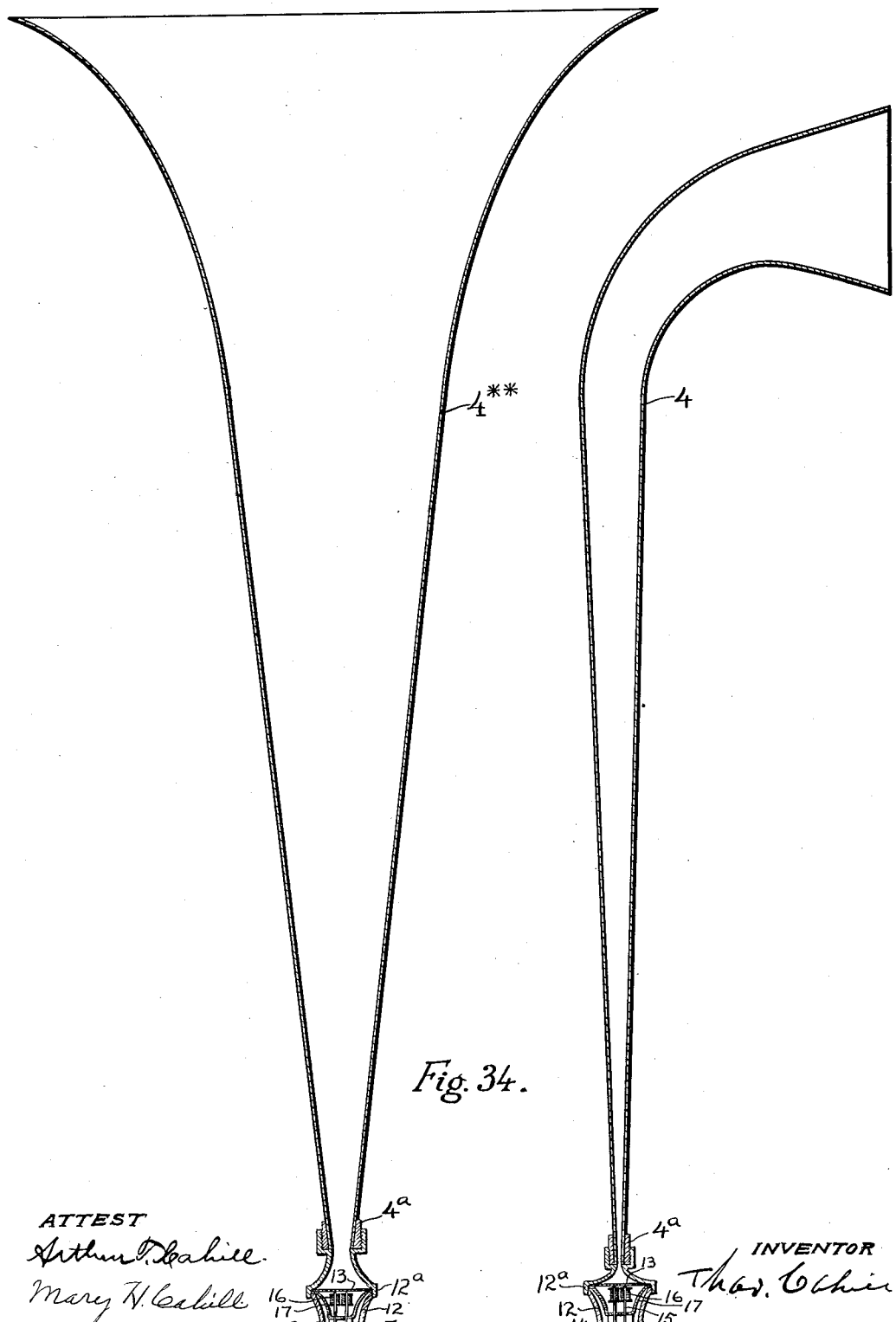

Fig. 34 is a view, partly in section, partly in elevation, showing at the right, one of my soft speakers, with its horn, and showing at the left, a corresponding one of my loudspeakers, with its horn.

Fig. 35 (on the same sheet with Fig. 20) is a view partly in section, partly in elevation, showing a different type of telephonic receiver, in which the diaphragm 13 is clamped tightly in retaining rings 13$^a$, 13$^a$, and in which one pole of the electro-magnet is on one side, and the other pole on the other side of the diaphragm 13, as described below.

Fig. 35$^A$ (on the same sheet as Fig. 32) is a plan view of the supporting rings, 13$^a$, and diaphragm 13, which are seen in cross section in Figs. 35 and 35$^B$.

Fig. 35$^B$ is a detail view, partly in section, partly in elevation, on the line 35$^B$, 35$^B$, in Fig. 35$^A$.

Fig. 36 is a detail view, in cross section, on the line 36, 36, in Fig. 35, showing the passages by which the air in the receiver-cap 13$^h$ (or 12$^a$) below the supporting piece 13$^p$ and ribs 13$^q$, communicates with the horn 4 above said parts 13$^p$ and 13$^q$.

In Figs. 1, 2, 4, 5, 7, 8, 10 and 11, I show a radio-receiving set 36, mounted on one arm of my speaker chair, and provided with a volume-control device 36$^b$, which may be of any approved type, by which the loudness of the sounds given off by my soft-speakers is governed at will. But in other forms of my apparatus in which no radio-receiving set is present, as, for example, in the apparatus of Figs. 22, 23 and 24 or that of Figs. 25 to 25$^F$, or of Figs. 26 to 28$^M$, or in Figs. 31, 32, 33, et cetera, I prefer to provide a rheostat, also attached to one arm of my speaker chair, and in a position in which it is easily operated by a listener, seated in said chair, so as to control, at will, the loudness of the sounds given off by my soft-speakers. Apparatus of this sort is shown in Figs. 37 to 41, which are views illustrating one form of rheostat, controllable by the knob 36$^b$, which preferably is attached, as before said, to one of the arms 1$^e$ of my speaker chair, and serves to govern the loudness of the sounds produced by my soft-speakers. Of these figures—

Fig. 37 is a sectional view, partly in elevation in a vertical plane, parallel to the length of the shaft 87, showing a rheostat, which, in its essentials, is of a well-known type.

Fig. 38 is a view, with the shaft 87 in cross section, and viewed from the left in Fig. 37, with the clamping plate 90$^a$ removed, so as to show more clearly the ring 85 on which the resistance wire 86 is wound.

Fig. 39 is a detail view, with the shaft 87 in section, showing the part 90, as viewed from the left in Fig. 37.

Fig. 40 is a detail view, showing one of the supporting-pieces or bearing-pieces 88; seen in end elevation.

Fig. 41 is a detail view, an end elevation, as viewed from the left in Fig. 37, showing the small end of the rheostat shaft 87, with the conducting ring or slip ring 96 attached to it firmly and conductively, and with the brush 92 bearing against said conducting ring 96.

Fig. 42 is a top plan view, showing a portion of the seat 1$^b$ of my speaker chair, a portion of one of the arms 1$^e$ of said chair, and a rheostat (having a plate 97, a controlling knob 36$^b$, and a contact finger 101) mounted on said arm 1$^e$.

Figure 43:
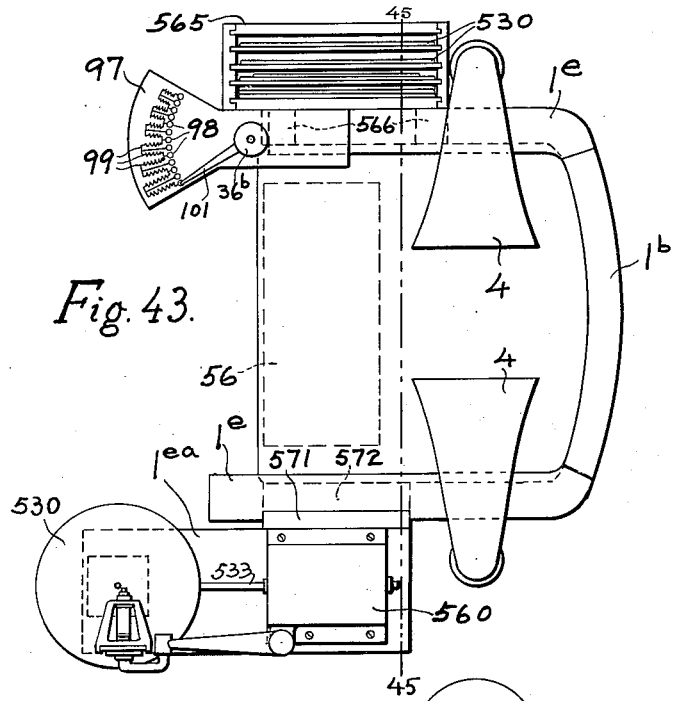
Figure 44:
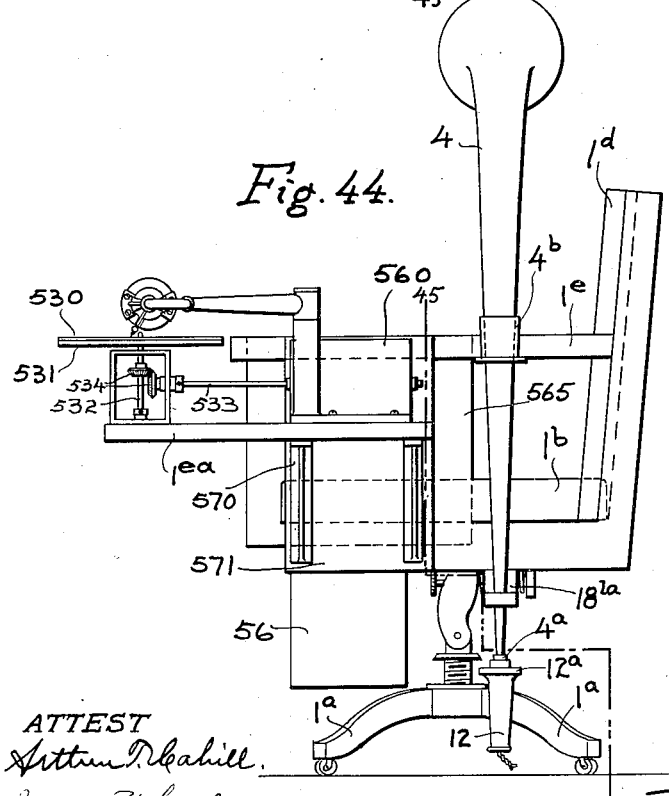

Figs. 43 to 45 show my easy chair 1, before described, with my soft-speakers 4, 4, connected with it, as before described, so as to speak each into one ear of a listener seated in said chair, and with a phonograph for feeding said soft-speakers, as illustrated and before described in connection with Figs. 25 to 25$^F$, but connected, in Figs. 43 to 45, with my speaker chair, and preferably mounted on a shelf 1$^{ea}$, which is supported by brackets or angle-pieces 570, 570, which are attached to the vertical member 571, which, in turn, is attached to one of the side-bars 1$^l$, and to one of the arms 1$^e$, of my speaker chair, say, at the left of the same. In these views, the record disk 530, the turn-table 531, the motor 560 for driving said turn-table and record disk, the sound-box 561, and the tone-arm 538, 538*, are shown— also, a case or rack 565, attached to one side of my speaker chair, to hold the disks, or records 530, 530, is shown. Of these figures—

Fig. 43 is a top plan view;

Fig. 44 is a side view; and

Fig. 45 (on the same sheet with Fig. 42) is a sectional view, partly in elevation, on the line 45, 45, in Fig. 44.

Fig. 46 is a schematic view, which shows the tone-arm 538* of the phonograph connected by flexible rubber tubes, 562, 563 and 563*, with the small ends of my soft-speaker horns 4, 4, which are preferably attached to my speaker chair, as before described; and in this view, the tone-arm 538*, with the shelf 1$^{ea}$ on which it is mounted, is shown apart from my speaker chair, with which it belongs, and in connection with which it is shown in Figs. 53 to 45; and the soft-speaker horns 4, 4, are also shown apart from (or removed from) my speaker chair; and the tone-arm 533*, with the shelf 1$^{ea}$, are turned around in Fig. 46, ninety degrees, as compared with their proper positions on the chair, and with relation to the soft-speaker horns 4, 4, so as to illustrate the construction more easily and clearly.

Fig. 46$^A$ is a view in side elevation perspective, showing my speaker chair, with the phonograph at one side of the same, and the flexible rubber tube 562 connected with the tone-arm 538* of the phonograph, and which connects, in turn (as shown in Fig. 46) by the branching tubes 563 and 563*, with the small ends of my soft-speaker horns 4, 4.

Fig. 47 is a view which shows schematically a sound-record film 511, with a lamp 514, lenses C$^{41}$, photo-electric cell 516 and associated devices by which the photographic sound-record on said film 511 is made to act on my soft-speakers 12, 4, 12, 4, which, preferably, are attached to my speaker chair, as before described in connection with Figs. 1 to 12^A, and 15 to 17^F; or they may be otherwise suitably mounted with convenient relation to the listener's ears, and with relation to the seat on which the listener sits, as shown for example in Figs. 13 to 14, and before described.

Fig. 47^A is a detail view, partly in section, partly in elevation, showing, on a larger scale than Fig. 47, the central part of the front-piece 515^b, and a portion of the sound-film 511, to illustrate more clearly the light-slot 515^c in the front piece 515^b and the sound-film 511 covering said light-slot and illuminated through it.

Fig. 48 is a schematic view, in general similar to Fig. 47, but it differs from that figure in that where the apparatus of Fig. 47 is provided only with my soft-speakers 12, 4, 12, 4, the apparatus of Fig. 48 is provided with my soft-speakers 12, 4, 12, 4, and also with a loud-speaker, 12, 4*, which preferably has a diaphragm 13 (Fig. 34) of the same material, diameter and thickness, or at least with the same resonance pitch, as the two diaphragms 13, 13, of my soft-speakers and a horn 4* of about the same length and with the same fundamental resonance pitch as have the horns 4, 4, of my soft-speakers, but with a much larger bell, and preferably, a much larger cross section, all through, as the drawings show.

Figs. 49 to 54^B illustrate a modification of the apparatus belonging to my dictation chair, and my speaker chair for the stenographer, connected therewith, by which the electrical connections between the dictation chair, and the speaker chair for the stenographer who takes the dictation, shown in Figs. 26 to 28^N, are eliminated, and acoustic connections are substituted for them, as described more at length below. Of these figures—

Fig. 49 is a schematic view, somewhat similar to Fig. 46 before described, but instead of the tone-arm 538* of the phonograph, connected by the connecting-piece 562^a and the soft-rubber tubes 562, 563 and 563* with the soft-speaker horns 4, 4, belonging to my speaker chair—the speaking tube mp, 105, 106, is shown connected by the hollow connecting-piece 562^a*, and the flexible tubes 562, 563 and 563*, with the soft-speaker horns 4, 4, belonging to my speaker chair; and in this view, a portion of the part mp' and a large portion of the part 105, are broken away, to save space; also, in this view, as in many other diagrammatic views, various parts are shown on different scales, or on no scale at all.

Fig. 50 is a view, partly in section, partly in elevation, corresponding to Fig. 28 before described, but showing my dictation chair (represented by the right-hand arm l^e of the same, seen in section in Fig. 50) and the speaking tube mp, 105, 106, pivotally connected with the casting 65*, and the chair arm l^e, very much as the microphone m and the arms 67 and 68 are connected, in Figs. 28, 28^A, et cetera, before described.

Fig. 51 is a detail view, partly in section, partly in elevation, in a plane at a right angle to the plane of Fig. 50, showing the lower part of my speaking tube 105, 106, mounted in the casting 65*, which is attached to my speaker chair, and with its hollow interior connecting acoustically with the connecting-piece 562^a*, to which the rubber tube 562 is connected, which, as shown in Fig. 49 connects with the soft-speaker horns belonging to my speaker chair, in which the stenographer sits.

Fig. 52 is a detail view, in sectional elevation showing the mouth-piece mp, with its vertical part mp', and the upper part of the section 105 of my speaking tube.

Fig. 53 is a side elevation, showing the casting 65*, by which the speaking tube mp, 105, 106, is mounted, connected to the arm l^e of my speaker chair, and also to the seat l^b and the side-bar l^l of the same. This figure is similar to Fig. 28^K, but it is not quite the same as that figure.

Fig. 54 is a top plan view of the casting 65*, which is attached to my speaker chair, and serves to mount the speaking tube belonging to the same.

Fig. 54^A is a sectional view, partly in elevation, on the line 54^A, 54^A in Fig. 54; and Fig. 54^B is a sectional view, partly in elevation, on the line 54^B, 54^B in Fig. 54.

Similar reference letters or reference numerals refer to similar parts in all the figures.

The following list of reference letters arranged alphabetically, and of reference numerals, arranged numerically, has two purposes; first, for convenient reference; thus, in examining the drawings if a reference letter or reference numeral is seen, the meaning of which it is desired to know, it can, in most cases, be found in an instant in this list, where otherwise much time might be lost in finding it in the body of the specification. And, secondly, details of various sorts are inserted in this list in connection with the several things listed, thereby making it practical to draft the specification in some cases in more general terms, unhindered by small details. On a first reading of this specification, this list may be passed by and used only, when needed, as a convenient key to the drawings.

l is the listener's chair, considered as a whole. But in the drawings, it is the several parts of the chair that are oftenest marked.

l^a is the base of my easy chair, shown in Figs. 1 to 3, and other figures.

l^b is the seat-part or upper part of the chair l.

l^c is the rod by which the seat-part or upper part l^b is revolubly attached to the base l^a of the listener's chair.

l^d is the back of the listener's chair.

l^e, l^e, are the arms of the listener's chair.

l^f is the pivot by which the seat-part l^b of my listener's chair is connected with the base part l^a in such a manner that the listener, seated in such chair, can lean backwards in the chair when he so wishes; this pivot permits the tilting of the seat-part of the chair with relation to the base of the same.

l^g is a spring which resists leaning back in the chair l—which opposes the tipping backward of the seat-part l^b, with relation to the base l^a of the chair.

l^h is a wheel or handle on the screw-threaded rod l^m, by which the strength of the spring l^g aforesaid is adjusted.

l^i, l^i, are springs in the seat of the chair, which support the upholstery.

l^k, l^k, are supports for the arms l^e, l^e of the chair, seen in Fig. 2, et cetera.

l^l, l^l, are horizontal side-bars of the seat-part l^b of my easy chair; seen in Figs. 3, 6, 9, 12, et cetera.

l^la, l^la, are downward extensions of the side-bars l^l, l^l, to which the bar 18 is screwed; seen in Figs. 8, 9, 16 and 17.

l^m is a screw-threaded rod (operated by means of the wheel $1^h$ serving as a handle) which serves to adjust the tension of the spring $1^g$ that serves to oppose the leaning-back of the chair.

$1^n$ is a wheel or handle, by which the height of the seat-part of the chair, with relation to its base $1^a$, is adjusted at will.

2 is an electro-dynamic speaker, considered as a whole.

$2^a$ is the vibrating cone of said electro-dynamic speaker. This cone may be of specially treated paper, or of aluminum, or any other suitable material.

$2^b$ is a supporting ring, to which said paper cone $2^a$ is attached. This ring $2^b$ is attached by screwing or otherwise to the metal cone $2^d$ described below.

$2^c$ is a soft leather washer, to which the paper cone $2^a$ is attached, and by which said paper cone is attached to the supporting ring $2^b$ aforesaid.

$2^d$ is a conically-shaped metal piece, provided with slots $2^m$, $2^m$, which prevent the formation of a resonant body of air between the paper cone $2^a$ and the metal cone $2^d$. This conically-shaped piece $2^d$ serves to support the ring $2^b$ (which is screwed to it) and to connect said ring $2^b$ with the outer cylinder $2^g$ of the electro-magnet.

$2^e$ is the soft iron core of the field-magnet, on which the exciting winding $2^f$ is wound.

$2^f$ is an exciting winding for the field-magnet $2^e$, $2^g$, of my electro-dynamic speaker.

$2^g$ is a cylinder of soft iron or steel, serving, with the core-piece $2^e$ and the yoke-piece $2^h$, to constitute the field-magnet-system of the dynamic speaker, seen in Figs. $1^A$, $1^B$, $1^D$, $1^E$ and $1^{EA}$.

$2^h$ is the end-piece or yoke-piece by which the core $2^e$ is connected, mechanically and magnetically, with the cylinder $2^g$ aforesaid.

$2^i$ is a rod of steel, or other suitable material, which serves to mount the dynamic speaker. One end of said rod $2^i$ is set fast in the end-piece $2^h$ of the field-magnet of the electro-dynamic speaker, and the other end ($2^{ia}$) of said rod $2^i$ is mounted in the corresponding arm $3^a$ of the electrical-speaker-supporting frame.

$2^{ia}$ is a flattened portion (flattened by milling or otherwise) of the rod $2^i$, which fits in the groove $3^g$ formed in the side-bar $3^a$ aforesaid; it permits longitudinal movement of the rod $2^i$ and the speaker 2, in the slot $3^g$ aforesaid, but prevents the speaker 2 from turning around when so moved.

$2^{ib}$ is the screw-threaded end of the rod $2^i$, with which the butterfly nut $2^q$ engages.

$2^k$ is the armature coil of the electro-dynamic speaker, which lies in the annular air-gap which is formed by the core-piece $2^e$ and the proximate surface of the cylinder $2^g$.

$2^m$, $2^m$, are narrow slots or openings in the metal cone $2^d$, whose function is to permit enough communication between the space which is bounded by the vibrating-cone $2^a$ and the fixed cone $2^d$ to prevent the formation of a resonance air chamber in said space; best seen in Figs. $1^A$ and $1^C$.

$2^n$ is a collar formed on the rod $2^i$, and which is, preferably, integral with it.

$2^p$ is an enlarged collar, which is attached to the rod $2^i$, and abuts against the collar $2^n$ and bears against the side-bar $3^a$, when the butterfly nut $2^q$ is tightened; best seen in Figs. $2^E$ and $2^{EA}$.

$2^q$ is a butterfly nut for tightening the rod $2^i$, with its collar $2^p$, in any vertical position desired, in the slot $3^g$ formed in the bar $3^a$ aforesaid.

$2^r$ is a washer, which is interposed between the butterfly nut $2^q$ and the side-bar $3^a$ of the speaker-supporting frame 3.

3 is a frame for supporting my electrical speakers 2, 2, in a convenient position on each side of the listener, when he is seated in the chair 1, with the openings or mouths of the electrical speakers 2, 2, close to the head of the listener, so as to speak directly into his two ears, respectively.

$3^a$, $3^a$, are the side-bars or arms of the frame 3.

$3^b$ is the horizontal connecting bar of the frame 3, which serves to connect the side-bars $3^a$, $3^a$ firmly together.

$3^c$, $3^c$, are little castings by which the bar $3^b$ is connected to the horizontal side-bars $1^b$, $1^b$ of the chair 1.

$3^e$, $3^e$, are bent pieces of sheet metal or other suitable material, by which the side-bars $3^a$, $3^a$, of the electric-speaker-supporting frame 3 are attached to the arms $1^e$, $1^e$, of the chair 1; seen in Figs. 2 and 3.

$3^f$, $3^f$, are screws by which the pieces $3^e$, $3^e$, are attached to the arms $3^a$, $3^a$, of the speaker-supporting frame 3, and also the arms $1^e$, $1^e$, of the listener's chair.

$3^g$ is a slot in the upper portion of the side-bar $3^a$ of the speaker-supporting-frame 3, which serves to permit the speaker-supporting rod $2^i$ moving vertically in the side-bar $3^a$, so as to adjust the level of the speakers to the ears of a person seated in the chair 1; best seen in Figs. $1^F$ and 2.

$3^k$ is a counter-weight, attached by the arm $3^l$ to the bar $3^b$, and serving to counter-balance the weight of the arms $3^a$, $3^a$, the rod 5, the arms $5^a$, $5^a$, and the speakers 2, 2, et cetera.

$3^l$ is an arm which is attached fast to the bar $3^b$, and serves to carry the counter-weight $3^k$.

$3^m$ is a segment of a circle whose center is the center of the bar $3^b$; this segment $3^m$ is firmly attached to one of the arms $3^a$, and a frictional check $3^n$ bears upon it, so as to hold said arms $3^a$, $3^a$ in whatever position they may be thrown into.

$3^{ma}$ are screws for attaching the segment $3^m$ to the arm $1^e$.

$3^n$ is a lever serving as a brake-piece or frictional check on the segment $3^m$ and side-bars $3^a$.

$3^{na}$ is the center or pivot of the brake-piece $3^n$.

$3^{nb}$ is a hanger, to mount the lever $3^n$; said hanger $3^{nb}$ is attached by screws $3^r$, $3^r$, to the lower surface of one of the arms $1^e$ of my chair.

$3^p$ is a contractile spring, one end of which is attached fast to the frictional check-piece $3^n$, while the other end is attached to the piece $3^q$, which is itself attached to one of the said side-bars $1^l$ of my speaker chair.

$3^q$ is a spring-holding piece, which is attached to one of the side-bars $1^l$ of the seat-part $1^b$ of the chair 1, and to which one end of the contractile spring $3^p$ is attached that serves to hold the lever $3^n$ in frictional engagement with the segment $3^m$.

$3^r$, $3^r$, are screws which serve to fasten the hanger $3^{nb}$ to the side-bar $1^l$.

$3^s$ is a cross bar which is firmly attached to the side-bars $3^a$, $3^a$, and which serves to stiffen the frame, consisting of the center rod $3^b$, the side-bars $3^a$, $3^a$, and the stiffening bar $3^s$.

4 is a horn which serves to reinforce the vibrations of an electrically-vibrated diaphragm, which is connected with it. The bell of this horn lies in close proximity to one of the ears of a person seated in the chair 1, to which said horn 4 is attached.

$4^*$ is the small-diameter portion of my curved, bent or jointed horn, seen in Figs. 15 to 17.

$4^{**}$ is my loud speaker horn; seen in Figs. 29 to 34, and 48.

$4^a$ is a ferrule, which is firmly attached to the small end of the horn 4; said ferrule has a screw thread formed on its outer surface to engage a female thread that is formed on the inner surface of the cap $12^a$ of the corresponding telephonic receiver; best seen in Fig. $9^c$.

$4^{a*}$ is a ferrule, attached to the small end of the small-diameter section $4^*$ of my curved, bent or jointed horn; seen in Figs. 15 to 17.

$4^{aa}$ is another ferrule, seen in Figs. 11, $11^A$, $11^F$ and $11^G$, which serves to reinforce the horn 4, where it is connected with the mounting-piece 32.

$4^{ab}$ is a ferrule which is attached to the smaller end of the larger section 4 of my curved, bent or jointed horn, and which serves to attach said larger section to the curved or U-shaped connecting-piece $4^e$ of the horn; seen in Figs. 15 to 17.

$4^{ac}$ is a ferrule which is attached to the larger end of the small-diameter section $4^*$ of my bent horn, where said small-diameter section screws into the U-shaped connecting-piece $4^e$; seen in Figs. 15 to 17.

$4^b$ is a metal ring which encircles the horn 4 and is firmly attached to the same; best seen in Figs. 8, 9, $9^A$ and $9^B$; also in Figs. 17, $17^A$ and $17^B$.

$4^{ba}$ is a plate, which is formed integral with or otherwise firmly attached to the ring $4^b$ aforesaid, and serves to attach said ring $4^b$ and horn 4 to the lower surface of the corresponding chair arm $1^e$. The plate $4^{ba}$ is differently shaped in the constructions shown in Figs. $9^B$ and $17^A$ respectively.

$4^c$, $4^c$, are screws by which the plate $4^{ba}$ is attached to the chair arm $1^e$.

$4^e$ is a U-shaped connecting piece for the two sections of the horn 4; shown in Figs. 15, $15^C$ and $15^D$; also in Figs. 16 and 17.

5 is the center rod of the speaker-supporting frame, seen in Figs. 4, $4^G$, 5, et cetera.

$5^a$, $5^a$, are forward extending arms, that are attached fast to the center rod 5, and serve each to support one of the rods $2^1$ by which my electrical speakers 2, 2, are carried; seen in Figs. 4, $4^B$ and 5.

$5^b$ is a slot in the front of the arm $5^a$; seen in Fig. $4^B$.

$5^{ba}$ is a screw or bolt, having a head like a butterfly nut, for tightening the grip of the slotted arm $5^a$ on the speaker-carrying rod $2^1$; seen in Fig. $4^B$.

$5^c$ is an arm having a weight $5^d$ at the end thereof, which is firmly attached to the rod 5; it serves to counter-balance the arms $5^a$, $5^a$, and the speakers carried by them.

$5^d$ is a counter-balancing weight, attached by the arm $5^c$ to the rod 5.

6 is a segment, which is attached fast to the shaft 5 and to one of the arms $5^a$.

7 is a rod for pressing against the segment 6, to produce friction thereon.

8 is an expansive spring for pressing the rod 7 against the segment 6.

$8^a$ is an adjustable seat, on which the lower end of the expansive spring 8 rests.

$8^b$ is a screw for adjusting the position of the seat $8^a$ and the tension of the spring 8.

$8^c$ is a lock-nut for locking the screw $8^b$ in the position required.

9 is a casting that serves as a housing for the rod 7 and the spring 8; best seen in Figs. $4^G$ and $4^F$.

$9^a$, $9^a$, are screws by which the housing 9 is attached to the side-bar $3^a$.

12 is the outer case of my telephonic receiver; also, symbolically it is used for the telephone receiver or unit, itself.

$12^*$ is my inductive sound pick-up; shown in Fig. $28^N$.

$12^a$ is the cap or head of my receiver, which screws on over the case 12 in a well-known manner, and serves to hold the diaphragm 13 in place; seen in Fig. $9^c$.

$12^b$ is the chamber between the diaphragm 13 and the cap $12^a$, with which the small end of the horn 4 connects acoustically.

$12^c$ is the cap or mouth-piece of the inductive sound pick-up, shown in Fig. $28^N$.

13 is the soft-iron or soft-steel diaphragm of my telephonic receiver.

$13^a$, $13^a$, are strong retaining or supporting rings, preferably of steel, for holding the diaphragm 13 firmly; seen in Figs. 35, $35^A$ and $35^B$.

$13^{aa}$, $13^{aa}$, are bolts, screws or rivets for holding the diaphragm 13 tightly clamped between the retaining rings $13^a$, $13^a$.

$13^b$ is the field magnet of a telephonic receiver—a permanent magnet, which may be of cobalt-tungsten steel, or of any other suitable material; seen in Fig. 35. There is one of the magnets $13^b$ on each side of the diaphragm 13, in Fig. 35.

$13^c$, $13^c$, are soft iron pole-pieces, attached to the proximate ends of the magnets $13^b$, $13^b$, in Fig. 35.

$13^d$, $13^d$, are working coils of fine insulated copper wire, wound upon the pole-pieces $13^c$, $13^c$, in Fig. 35, in proximity to the diaphragm 13; these coils are wound in such a manner and connected in such a manner with the source (whatever it may be) of alternating currents, corresponding to sound, that when the pole piece $13^c$ above the diaphragm 13 increases in strength, the corresponding pole-piece $13^c$, below said diaphragm, decreases in strength, and contrariwise; stated otherwise, the working coils $13^d$, $13^d$, on the pole-pieces $13^c$, $13^c$, act together (and not in opposition to each other) to vibrate the diaphragm 13.

$13^f$ is a cylindrical case for the field magnet, diaphragm, et ctera, of a telephonic receiver; seen in Fig. 35.

$13^g$ is an annular shelf or plate, formed on the inside of the cylindrical case $13^f$, to support the diaphragm rings $13^a$, and the diaphragm 13.

$13^h$ is the cap or cover for the telephonic receiver, that is shown in Fig. 35.

$13^m$ is a boss or annulus connected to the bottom of the case $13^f$, and into which the threaded part of the lower magnet core $13^b$, in Fig. 35, is screwed.

$13^n$, $13^n$, are lock-nuts for locking the magnetic cores $13^b$, $13^b$, in Fig. 35, in place.

$13^p$ is a boss or annulus, connected by the ribs $13^q$ with the outer wall of the cap $13^h$ (Fig. 35) and serving to support the upper magnet $13^b$.

$13^q$, $13^q$, are ribs, by which the collar $13^p$ is attached to and supported from the inner wall of the cap $13^h$; seen in Fig. 35.

$13^t$, $13^t$, are bolts (seen in Fig. 35) which serve to fasten the receiver-cap $13^h$ (or $12^a$) and the diaphragm-rings $13^a$, $13^a$, to the annular shelf $13^g$ of the case $13^f$.

14 is a permanent magnet (a horse-shoe magnet or U-shaped magnet) which may be of tungsten steel, cobalt-tungsten steel, or of any other suitable material; seen in Fig. $9^c$.

$14^a$ is a yoke-piece of magnetic material, which is secured by electric welding, or in any other suitable manner, to the two arms or limbs of the magnet 14.

15, 15, are soft-iron pole-pieces, which are attached by electric welding or otherwise, to the poles of the magnet 14.

16, 16 are coils of insulated wire, wound on the pole-pieces 15, 15, at the end near the diaphragm 13.

17 is a cup-shaped or basin-shaped piece of brass or other non-magnetic metal to which the magnet 14, with its pole-pieces 15, is attached; the lower surface of the outer margin of the cup-shaped piece 17 rests down on the telephone case 12 and the diaphragm 13 rests on the upper surface of the cup-shaped piece 17.

18 is a piece of hard wood or other suitable material, which is attached by screws 18$^a$ to the downward extensions 1$^{1a}$, 1$^{1a}$, of the side-bars 1$^1$, 1$^1$, of the seat of my chair. Holes are made in the piece 18, through which the horn 4 passes, and after said horn has been passed through the corresponding hole in the piece 18, and has been secured by the piece 4$^b$ and 4$^{ba}$ to the arm 1$^e$ of the chair, the telephone receiver is screwed on, by its cap 12$^a$, outside the ferrule 4$^a$ of the horn 4; see Figs. 7, 8 and 9.

18$^c$ is a retaining piece, serving to hold my bent horn in place in the bar 18; shown in Figs. 17$^C$, 17$^E$ and 17$^F$.

18$^d$ and 18$^e$ are slots in the bar 18, which serve to admit the two parallel sections of my horn, marked 4 and 4* respectively; seen in Fig. 17$^D$.

20 is a shaft, to which the rock-arms 20$^a$, 20$^a$ and 20$^c$ are firmly attached by keys, as 20$^f$, or in any other suitable manner. This shaft serves, with the other parts, to mount the horns 4, 4, for vertical movement.

20$^a$, 20$^a$, are rock-arms, firmly attached to the shaft 20 by keys 20$^f$, and also they are attached to the horns 4, 4, as illustrated in Figs. 11 to 11$^D$.

20$^b$ is a rock-arm, attached firmly to the rock-shaft 20, and to which the counter-balancing weight 22 is attached; seen in Figs. 11, 11$^A$, 11$^B$ and 11$^E$.

20$^c$ is a stop-arm, which is firmly attached by the key 20$^f$ or in any other suitable manner, to the rock-shaft 20.

20$^d$ is a segment serving as a frictional check, which is firmly attached to the rock-shaft 20, as by screws or rivets, 20$^e$, 20$^e$, passing into the stop-arm 20$^c$ aforesaid, or in any other suitable manner. The curved surface of the segment 20$^d$ is curved on the center of the shaft 20 as a center.

20$^e$, 20$^e$ are screws or rivets by which the segment 20$^d$ is firmly attached to the stop-arm 20$^c$, and rock-shaft 20.

20$^f$, 20$^f$, are keys for securing the arms 20$^a$, 20$^a$ and 20$^b$ to the rock-shaft 20.

21 is a metal piece, which is attached fast to the ferrule 4$^a$ at the small end of the horn 4, and is connected by the pivot or center pin 21$^a$, with the rock-arm 20$^a$, which serves, with other parts, to mount one of the horns 4 for vertical movement.

21$^a$ is a nicely-fitting pin, by which the metal piece 21, with the ferrule 4$^a$ and the horn 4 attached to it, is connected with the rock-arm 20$^a$ for vertical movement.

22 is a weight, which is attached by the rod 22$^a$ to the arm 20$^b$ of the rock-shaft 20; it serves to counter-balance the weight of the rock-arms 20$^a$, 20$^a$ with the horns 4, 4, and the telephonic receivers, 12, 12$^a$, that are connected with them.

22$^a$ is a rod which screws into the weight 22, and serves to connect said weight with the arm 20$^b$ of the rock-shaft 20.

23 is a checking lever, centered at 23$^a$, which is pressed by the contractile spring 24 against the curved surface of the checking segment 20$^d$, so as to exert a frictional resistance thereon sufficient to hold said segment and the horns 4, 4, in whatever position they may be set.

23$^a$ is a center pin or pivot pin for the checking lever 23; said pin is set in the casting 40.

24 is a contractile spring, one end of which is attached to one end of the checking lever 23, but the other end is attached to the piece 25 at the side of my speaker chair; best seen in Fig. 11$^A$.

25 is a metal piece, which is attached by screws or otherwise to the side of the speaker chair, to hold one end of the contractile spring 24; seen in Fig. 11$^A$.

30 is a rock-shaft, which, with its arm 30$^a$ and other parts, serves to mount the horns 4, 4, both for vertical movement and for front-to-rear-of-the-chair movement; best seen in Figs. 10, 12, 11$^A$, 11$^E$ and 12$^A$, et cetera.

30$^a$, 30$^a$, are arms which are firmly attached, each by the key 34, or in any other suitable manner, to the rock-shaft 30 aforesaid.

31, 31, are links, each of which is attached by the nicely-fitting pin 31$^a$ to the corresponding rock-arm 30$^a$; and also by the nicely-fitting pin 32$^a$ to the part 32, to which the ferrule 4$^{aa}$ and the corresponding horn 4, are attached. Seen in Figs. 10, 12, 11, 11$^A$, 12$^A$, 11$^E$ and 11$^F$.

31$^a$, 31$^a$, are nicely-fitting pins, by which the links 31 are pivotally attached to the corresponding rock-shaft arms 30$^a$, 30$^a$.

32 is a metal piece, to which the ferrule 4$^{aa}$ and the horn 4 are firmly attached, and which is itself attached by the nicely-fitting pin 32$^a$ to the corresponding link 31, and so to the rock-arm 30$^a$. Best seen in Figs. 10, 11, 11$^A$, 11$^F$ and 11$^G$.

32$^a$ is a nicely-fitting pin, by which the metal piece 32 (to which the ferrule 4$^{aa}$ and horn 4 are connected) is connected with the link 31; and so with the rock-arm 30$^a$ of the rock-shaft 30.

33 is a metal piece, shaped as a segment, which is attached by rivets 33$^a$ to one of the rock-arms 30$^a$. The curved surface of this segment is curved on the center of the shaft 30 as a center, and a frictional lever 3$^n$ is pressed by a contractile spring 3$^p$ against the curved surface of the segment 33, so as to exert a frictional resistance thereon. Best seen in Figs. 11$^A$, 12$^A$, 11$^E$, 11$^F$, 11$^G$ and 15.

33$^a$ are rivets, by which the piece 33 is firmly attached to the corresponding rock-arm 30$^a$.

34, 34 are keys, by which the rock-arms 30$^a$, 30$^a$, are firmly attached to the rock shaft 30; best seen in Figs. 11$^A$, 12$^A$ and 15.

36 is a radio receiving apparatus. This apparatus may be attached to one arm of my speaker chair, as shown in Figs. 1, 2, 4, 5, 7, 8, 10, 11, et cetera; or it may rest on the floor, as in Figs. 13 and 14; or on some other support.

36$^a$, 36$^a$, are the tuning-control knobs of the radio receiving apparatus 36.

36$^b$ is the volume-control knob for the radio receiving apparatus 36.

40, 40, are two castings, each of which serves to support one end of the rock-shafts 20 and 30; best seen in Figs. 12, 11$^A$, 12$^A$, 11$^I$, 11$^K$ and 11$^L$; also in Fig. 15.

40$^a$ is the cap, which, with the part 40, forms a split bearing to support the rock-shafts 20 and 30.

40$^b$, 40$^b$, are bolts by which the cap 40$^a$ is firmly attached to the casting 40. The castings 40, 40, are firmly attached by screws not shown, or in any other suitable manner, to the side-bars of the seat of my speaker chair, best seen in Figs. 11A, 12A and 15.

41, 41, are stops or projections serving as stops, which are formed integral with the casting 40; they are preferably covered with felt and serve to limit the movement of the stop-arm 20c and so of the rock-shaft 20, with its arms 20a, 20a, the metal pieces 21, 21, the ferrules 4a and horns 4, 4; best seen in Figs. 11I, 11K and 11L.

45, 45 are stops, attached to the side-bar 1e of the seat of my speaker chair. The stops are, preferably, covered with felt; they serve to limit the front-to-rear movement of the horns 4, 4; best seen in Figs. 11 and 11A.

50 is a panel, attached to the wall 51, and serving to support the horns 4, 4; seen in Figs. 13, 14, et cetera.

51 is the wall to which the panel 50 is attached in any suitable manner.

52 is a bracket, which is attached by screws or otherwise, to the panel 50, and serves to support the ferrule 4a and the horn 4.

52a, 52a, are screws, by which the bracket 52 is attached to the panel 50.

53 is a cap for the front of the bracket 52, so shaped as to engage and hold the ferrule 4a which surrounds the small end of the horn 4.

53a, 53a, are screws or bolts by which the cap 53 is screwed to the bracket 52, firmly clamping the ferrule 4a between them.

55 is a bracket or supporting piece, which is attached to the ferrule 4aa near the large end of the horn 4, and is in turn attached by screws 55a, 55a, to the panel 50.

55a, 55a, are screws for attaching the bracket or mounting piece 55 to the wooden panel 50.

56 is a box or case for the battery or battery-eliminator, which may be attached to the seat of my speaker chair, as shown in Figs. 4, 5, et cetera; or it may be enclosed in the stand or case of the radio apparatus shown in Figs. 13 and 14.

57 is the floor, shown sometimes by a line only; seen in divers figures.

58 are electric-light wires for feeding the battery eliminator or rectifying device 56.

58a is a fuse box, attached to the wall 51, containing safety fuses to protect the wires 58 and the parts connected with them.

59 is a switch for opening the circuit of the wires 58; that is, for separating said wires from the feed wires in the wall or elsewhere, by which the wires 58 are fed.

60 is a wire for connecting the radio receiving apparatus 36 with the outdoor receiving antenna 341; but a coil antenna may be used instead of this outdoor antenna, as is often done.

60a is a porcelain insulator by which the wire 60 is held in place.

61 is a wire or wires leading from the battery or battery eliminator 56 to the radio receiving set, to connect the tubes contained in the case 36 with the battery or battery eliminator 56.

65 is a casting, which serves to mount the shaft 66 on which the microphone-carrying arm 67 and microphone m are mounted; seen in Figs. 28 to 28L.

65\* is a casting, which serves to mount the speaking tube mp, 105, 106, seen in Figs. 49 to 52; the casting 65\* is similar to but not the same as the casting 65.

65a are bolts or nuts by which the casting 65 or 65\* is attached to the arm 1e of my easy chair, and by which also the downward extension 65b of said casting 65 is attached to the side-bar 1l of the seat of my easy chair.

65b is a downward extension of the casting 65 or 65\*, by which the same is attached to the side-bar 1l of my easy chair.

65c is a pin, in the extension 65b, which serves to stop the arms 75 and 67, with the microphone m in a central position, in front of the mouth of a person seated in my dictation chair; seen in Figs. 28, 28F and 50.

65d, 65d, are arms of the casting 65\*; seen in Figs. 50, 51 and 54A; these arms serve, when tightened by the bolt 65e, to create a frictional bite on the shaft-part (at the right in Fig. 51) of the casting 106; this bite is sufficient to hold the speaking tube in whatever angular position it may be set, either in front of the mouth of the person dictating, or at the side of the chair, out of the way.

65e is a bolt for tightening the arms 65d, 65d, on the shaft-part of the casting 106; seen in Figs. 50, 54A, et cetera.

65f is a lock-nut for the bolt 65e to hold the same in whatever position it may be set.

65g is a cap, forming a part of a split bearing, for the shaft-part at the left of the casting 106; best seen in Figs. 54 and 54B.

65h, 65h, are bolts for fastening the cap 65g to the casting 65\*.

65i is a lock nut for one of the bolts 65h.

66 is a shaft, on which the arm 68, carrying the longer arm 67 and microphone m, are mounted; seen in Figs. 28, 28A, 28B and 28L.

66a is a bolt by which the shaft 66 is attached fast to the casting 65.

67 is an arm which swings on the shaft 66 as a center, and which carries the microphone m.

67a is a cover plate, attached to the arm 67, and serves to close in the microphone wires $m^2$; best seen in Fig. 28E; also seen in Fig. 28.

67b are screws by which the plate 67a is attached to the arm 67.

67c is a slot in the arm 67, through which the bolt 70 passes. This slot permits a movement of the arm 67 with relation to the arm 68 and so permits a movement of the arm 67, carrying the microphone m, by which said microphone may be moved nearer to, or further from, the mouth of a person dictating, who is seated in my dictation chair, with the said microphone m in front of his mouth.

68 is an arm which is centered on the fixed rod or shaft 66, and serves to carry the arm 67 and the microphone m. The arm 68 is split or slotted on one side of the shaft 66.

68a is a bolt, and 68b is a nut, which serve to tighten the split arms of the piece 68 on the rod 66 more or less as required, so as to produce a checking friction, which holds the arm 67 and microphone m in whatever positions they may be set.

69 is a shoulder screw, by which the arm 67 and spring plate 71 are pivotally attached to the arm 68; said shoulder screw passes reasonably loosely (that is, with perhaps .005" clearance) through the spring plate 71 and the arm 67, and is screwed tightly into the arm 68, so that it serves as a pivot on which the arm 67 and the spring plate 71 can swing.

70 is a bolt which passes through the slot 67c in the arm 67 (see particularly, Figs. 28, 28A and 28C) and through a similar slot 71a in the spring plate 71 (see Figs. 28, 28A and 28D). The thread on said bolt 70 engages with the corresponding thread in the arm 68, and locknuts 70a, 70a, serve to hold said bolt 70 firmly in any position in which it may be set, so as to give different amounts of tension to the spring plate 71, as required.

70ᵃ, 70ᵃ, are lock-nuts, by which the bolt 70 is locked in whatever position required, so as to give more or less compression to the spring plate 71.

71 is a spring plate, which is firmly attached by the bolts or screws 69 and 72, to the microphone-carrying arm 67; and also it is pivotally connected by the shoulder screw 69, with the arm 68. This spring plate serves to afford a checking resistance to the movement of the arm 67, with relation to the arm 68.

71ᵃ is a slot in the spring plate 71, corresponding to the slot 67ᶜ in the arm 67. The bolt 70 passes through the slot 71ᵃ in the spring plate 71. See Figs. 28, 28ᴬ and 28ᴰ.

72 is a bolt by which the spring plate 71 is fastened firmly to the microphone-carrying arm 67.

73 is a washer, which is interposed between the spring plate 71 and the head of the bolt 70; seen in Figs 28 and 28ᴬ.

75 is a counter-weight, which is attached to the shaft 66, and serves to counter-balance the weight of the microphone m, its supporting arm 67 and accessory parts, as 68, 71 et cetera. This counterweight may be attached to the shaft 66 (the same shaft to which the arms 68 and 67 are attached) in any suitable manner. For example, it may be split on one side of the center, just as the arm 68 is, and the split sections are tightened as much as is required by the bolt 75ᵃ; seen in Fig. 28. But said counter-weight 75 may be secured to the shaft 66, or to the arm 67, in any other manner whatever that is suitable for the purpose.

75ᵃ is a bolt, which serves to secure the counter-weight 75 to the shaft 66, as by tightening the split arms of said counter-weight on said shaft, or in any other suitable manner.

77 and 77* are lugs formed on or connected with the case of the microphone m; they serve to mount it.

78 is a lug, which is firmly attached by brazing, electric welding, or in any other suitable manner, to the arm 67. This lug 78 lies between the lugs 77 and 77*.

79 is a screw which serves as a pivot on which the lugs 77 and 77* can move angularly with relation to the fixed lug 78.

80 is a washer, under the head of the screw 79, on one side of the lug 77*.

81 is a spring washer on the other side of the lug 77.

82, 82, are lock-nuts by which the pivot screw 79 is tightened in any position desired.

The reference numerals 84 to 96 refer to various parts of my rheostat, which is attached to one of the arms 1ᵉ of my speaker chair, as shown in Figs. 37 to 41. Of these—

84 is a piece of well-seasoned rock maple or other suitable material, which is attached to one of the arms 1ᵉ of my speaker chair, and which serves to support the standards 88, 88, and the brushes 92 and 93, belonging to my rheostat; seen in Figs. 37 to 41.

85 is a ring of bakelite, hard rubber or other suitable material, on which the resistance wire 86 of a rheostat is wound, which serves to control the loudness of the sounds produced by my soft-speakers; best seen in Figs. 37 and 38.

87 is a shaft, by means of which the insulating ring 85 and the resistance wire 86 wound thereon, are mounted; seen in Figs. 37, 38, 39 and 41.

87ᵃ is a collar formed on the shaft 87, and against which the part 90 abuts; seen in Fig. 37.

87ᵇ is a key by which the parts 90 and 90ᵃ (see Fig. 37) are revolubly attached to the shaft 87.

88, 88, are standards or castings, by which the shaft 87 is supported.

88ᵃ is the base or foot of the standard, 88.

88ᵇ is the vertical member of the standard 88.

88ᶜ, 88ᶜ, are members of said standard, which serve to stiffen the vertical member 88ᵇ.

88ᵈ is the top of the standard 88, which serves as a bearing for the shaft 87.

88ᵉ, 88ᵉ, are screws by which the standards 88 are firmly attached to the part 84, which, in turn, is attached to one of the arms 1ᵉ of my speaker chair.

90 and 90ᵃ are holders or supporting-pieces between which the insulating ring 85, with the resistance wire 86 wound thereon, is clamped and firmly held; best shown in Figs. 37 and 39.

90ᵇ, 90ᵇ, are ring-shaped pieces of bakelite or other suitable insulating material, which are interposed between the resistance wire 86, wound on the ring 85, and the supporting-pieces 90 and 90ᵃ.

91 and 91ᵃ are lock-nuts, mounted on the screw-threaded portion of the shaft 87; they serve to press the holder 90ᵃ and insulating piece 90ᵇ connected with it, against the other insulating piece 90ᵇ, and holder 90, so as to hold the ring 85, with its resistance wire 86, firmly in place.

92 is a brush which bears against the conducting ring 96 on the shaft 87, with which shaft one end of the resistance wire 86, wound on the insulating ring 85, is connected through the part 90.

93 is another brush, best seen in Fig. 38, which bears against the outside of the resistance wire 86, wound on the ring 85, and makes contact with the resistance wire at different points, either near to the end of said wire, or far from it, which is connected, as before stated, with the part 90, shaft 87 and brush 92.

94 (or 36ᵇ) is a knob of insulating material, which is firmly attached by a set-screw, or by a key, or by both of these, or in any other suitable manner, to the shaft 87. On this knob, the person seated in my speaker chair and listening to my soft-speakers, acts to turn the shaft 87, parts 90 and 90ᵃ, and the ring 85 with its resistance wire 86, against the brush 93, thereby varying the resistance of the rheostat more or less, as required.

94ᵃ is a set-screw, and 94ᵇ is a key, by which the knob 94 (or 36ᵇ) is revolubly attached to the shaft 87; but any other retaining device may well be used instead of this set-screw and key.

96 is a ring of silver, copper or other suitable conducting material, which is conductively and revolubly attached to the shaft 87 and against which the brush 92 bears, in order to connect my rheostat into circuit with other portions of the apparatus. Shown in Figs. 37 and 41.

The reference numerals 97 to 103 apply to various parts of the rheostat shown in Fig. 42. Of these—

97 is the plate of the rheostat.

98, 98 are contact-buttons attached to said plate, but insulated therefrom.

98* is the short-circuit button at the extreme right in Fig. 42.

99, 99, are resistance sections of any suitable material. Resistance wire may be used for a rheostat whose total resistance is not great; but for higher resistances, other resistance materials may be used.

100 is a center pin or rod which is firmly attached to the plate 97, but insulated electrically from it. On this pin, the knob 36b and the contact-finger 101 are mounted, but insulated from the plate 97.

101 is the contact-finger or handle (operated by the knob 36b) which sweeps over the contact-buttons 98, 98, so as to change the amount of resistance in series.

102 and 103 are wires by which the rheostat is connected into the circuit in which it serves. These wires are seen in Figs. 37, 38 and 42.

105 is the vertical section or joint of the speaking tube; seen in Figs. 50, 51 and 52. It carries, at its top, the mouth-piece $mp$, and below, it is connected tightly with the horizontal section 106 of said speaking tube; seen in Figs. 49, 50 and 51.

105$^a$ is a slot in the upper portion of the speaking tube 105. In this slot, a forced pin 105$^b$, which is firmly set in the part $mp'$ of the mouth-piece $mp$, moves when the mouth-piece $mp$ is moved up and down on the speaking tube 105. The pin 105$^b$, set in the mouth-piece $mp'$, working in the slot 105$^a$, formed in the speaking tube 105, serves to permit a movement of the mouth-piece $mp$ up and down with relation to the tube 105, but at the same time serves to prevent said mouth-piece $mp$ from turning around on said tube 105.

106 is a section of the speaking tube, partly horizontal and partly vertical, with which the vertical section 105 connects; best shown in Figs. 49, 50 and 51.

107 is a flat spring of steel or other suitable elastic material, which is connected by the screws or rivets 107$^a$, with the speaking tube 105. It bears against the vertical part $mp'$, of the mouth-piece $mp$ and exerts a frictional pressure thereon, sufficient in amount so that said mouth-piece $mp$ will remain in any position vertically in which it is set, with relation to the speaking tube 105.

107$^a$, 107$^a$, are screws or rivets by which the flat spring 107 is attached fast to the vertical section 105 of my speaking tube $mp$, 105, 106.

150 is a typewriting machine; seen in Fig. 26$^A$.

151 is a twisted pair of insulated copper wires, connecting the microphones on my dictation chair with the soft-speakers 4, 4, that are connected with the chair for the typewriter operator; seen in Fig. 26$^A$; also in Figs. 26, 26$^B$ and 27.

The following supplemental list of reference letters and reference numerals refer chiefly to reference letters and reference numerals that are found in Figs. 18 to 33.

A is a source of direct current for heating one or more filaments F; for example, a primary battery, or a storage battery, or a direct-current dynamo or a rectifying-device with accessories, constituting a so-called battery eliminator.

A+ is a wire or lead from the positive pole of the A-battery.

A— is a wire or lead from the negative pole of the A-battery.

B is a direct-current source for feeding the plate circuit of one or more vacuum tubes; for example, a primary battery, a storage battery, a direct-current dynamo, or a rectifying device with accessories, constituting a battery eliminator; or any other suitable source of direct current.

B', B$^2$, and B$^3$ respectively, are wires, leads or taps from different portions or sections of the B-battery, for feeding the plates of different vacuum tubes, respectively, of which B' is positive with relation to the filament F, B$^2$ is more positive, and B$^3$ is yet more positive.

B$^5$ is a high-voltage direct-current source, for example, a direct-current dynamo or a rectifying device with accessories, of high voltage, for furnishing space current to the plate circuit of one or more power tubes.

$b$ is a battery or other direct-current source for the primary circuit of a telephonic transmitter or of a group of such transmitters; or it may be a local battery or other direct-current source for operating an electro-magnet, or for some other purpose.

C is the grid-biasing battery or C-battery of Lowenstein, or other direct-current source for keeping the grid of a vacuum tube (or the grids of a plurality of vacuum tubes) at a negative potential with relation to the corresponding filament F.

$C^{20}$ is an adjustable tuning condenser, connected in series with an oscillator, as 343.

$C^{21}$ is a tuning condenser, connected in series with a broadcasting aerial, as 340, and with the secondary winding 395$^a$ of the output transformer, marked $t^3$; seen in Fig. 19.

$C^{22}$ is a tuning condenser, connected with a receiving antenna, as 341, and the ground 351; seen in Fig. 21.

$C^{23}$ is a tuning condenser, connected between the grid and the filament of a vacuum tube.

$C^{24}$ is a blocking condenser, which is connected with the grid of the detector tube, in connection with the grid-leak resistance 398; also $C^{24}$ is a condenser used with the resistance $R^{17}$, as a coupling between the plate circuit of one vacuum tube and the grid of the next succeeding vacuum tube; seen in Fig. 19 and in other figures.

$C^{25}$ is a small condenser, one plate of which is connected with the secondary winding of a coupling transformer (as $t'$, $2^2$, et cetera), while the other plate is connected with the grid of the tube whose plate circuit feeds the primary winding of the transformer aforesaid. Stated otherwise, $C^{25}$ is the neutralizing condenser of Professor Hazeltine's well-known neutrodyne apparatus.

$C^{35}$, $C^{35}$, are by-pass condensers, connected between the plate and the filament and serving to pass the radio-frequency currents, while passing a very small quantity only of audio-frequency current.

$C^{36}$, $C^{36}$, are by-pass condensers, connected between the B-battery leads (as B', B$^2$, B$^3$) and the A-battery.

F is the filament or hot cathode of a vacuum tube.

G is the grid or controlling electrode of a vacuum tube, for controlling the flow of electrons from the hot cathode to the relatively cold anode or plate.

$m$ is a microphone.

P is the anode or plate of a vacuum tube.

R is the ohmic resistance.

$R^2$ is a high resistance, bridged across between the grid and the filament, or it may be between the grid and the plate of a vacuum tube. It serves to quiet the operation of the tube.

$R^3$ is a rheostat in series with the filament F, which affords facility for regulating the heat of said filament, and its emission of electrons.

$R^{3a}$ is a resistance, inserted in the circuit of the

A-battery, so as to govern the flow of current to a plurality of filaments, belonging to a plurality of vacuum tubes—it serves, in effect, to govern the temperatures of a set or group of filaments, where the resistance $R^3$ serves to govern the temperature of a single filament or of a single tube.

$R^4$ is a rheostat, for governing the plate circuit of a vacuum tube; also, $R^4$ is an expression rheostat for governing in some way the loudness of the sound from a vacuum tube amplifier. Such rheostat may be inserted, for example, in the plate circuit of a vacuum tube, as in Fig. 19, and the resistance which regulates the plate circuit of a vacuum tube is commonly marked $R^4$, all through the drawings. But said resistance $R^4$, serving to regulate the expression, may well be inserted in some other circuit than the plate circuit, as for example, in shunt to the secondary winding $6^e$ of the transformer $t'$ (Fig. 19) in which case it serves, in effect, as a potentiometer.

$R^{4a}$ is a rheostat for governing the plate-circuits of a plurality of vacuum tubes; seen in Fig. 21.

$R^5$ is a rheostat for regulating the flow of current through a telephonic receiver, or through a group of telephonic receivers.

$s$ is a switch or key for closing and opening a circuit or a branch of a circuit, as required. But some of the switches, for there are many of them, are otherwise marked, for distinction's sake, as $s'$, $s^2$, $s^3$, et cetera.

$t$ (or in some cases T) is a transformer, considered as a whole.

$t'$, $t^2$, $t^3$, $t^4$, et cetera, are transformers, and usually (but perhaps not always) the first transformer of a series is marked $t'$; the second $t^2$; the third $t^3$, et cetera.

$v$ is a vacuum tube; also $v'$, $v^2$, $v^3$, et cetera, are vacuum tubes, and in this case (as with the transformers) the first of a series of tubes is usually marked $v'$; the second of the same series, $v^2$; the third, $v^3$, et cetera.

$6^d$ is the primary winding or one of the primary windings of a transformer.

$6^e$ is the secondary winding, or one of the secondary windings, of a transformer.

$6^{e1}$ is also one of the secondary windings of a transformer.

$6^h$, $6^h$, are lines or mains, fed with electrical vibrations from the telephonic transmitters or pick-ups, $l$, $l$, or fed in any other suitable manner with electrical vibrations corresponding to speech or to music or sometimes to both speech and music, preferably, through vibration-amplifying devices; the mains $6^h$, $6^h$ serves, in turn, through branch mains, to feed musical electrical currents or speech currents, or both, to the receivers $12,4$, $12,4$, on the subscriber's premises; seen in Figs. 22, 23 and 24.

$7^a$, $7^a$, are district lines or mains, fed from the principal mains $6^h$, $6^h$, and used in distributing electrical vibrations corresponding to music, song or speech, from a central station to the subscriber's premises, or to sub-stations, from which vibrations corresponding to music or speech are distributed to the subscriber's premises.

$7^b$, $7^b$, are sub-mains or branch lines which are fed from the district mains, $7^a$, $7^a$.

$7^{ba}$, $7^{ba}$, are other branch mains, fed from the mains $7^b$, $7^b$.

$7^c$, $7^c$ are fuses which act to protect the circuits or branches in which they are inserted (see Figs. 22, 23, 24, et cetera) by melting fusible metal, and so speedily rupturing a circuit, when it is subjected to an over-load.

$7^d$, $7^d$ are switches for connecting the district mains $7^a$, $7^a$ with the principal mains $6^h$, $6^h$, or disconnecting them therefrom, as required.

$7^e$, $7^e$ are switches for connecting the branch lines $7^b$, $7^b$, with the district mains $7^a$, $7^a$, or disconnecting them therefrom, when required.

$7^f$, $7^f$ are switches for connecting the cross mains $7^{ba}$, $7^{ba}$, with the local mains $7^b$, $7^b$; seen in Fig. 22.

10 is the control room in which the control operator sits in my speaker chair, with the soft speakers $12,4$, $12,4$ in proximity to his ears, listening to the electrical voice of the music, in order to control it, and listening preferably to telephonic receivers, which are acoustically and electrically as nearly as practicable the same as those to which the subscribers listen in their homes.

$10^a$, $10^a$, are the walls of the room 10.

40, 40, are chairs in the musicians' room 11, which, preferably, are disposed at different distances from the electrical pick-up or microphone $m$, and, some of them near to said pick-up and others further away from it—some much further away. A violinist, for instance, would sit in one of the chairs near to the microphone, but a trombone player in one of the chairs more remote from it.

340 is a broadcasting aerial for broadcasting speech or music, or both of these.

341, 341 are receiving antennas, located in different places, and serving for different subscribers or listeners-in.

343 is an oscillator, for producing the high-frequency carrier-wave which, when modulated by electrical currents of audio frequency, serves to transmit the words or music that are broadcast from a central station.

350 is the ground connection for the broadcasting aerial 340.

351 is the ground connection for the receiving antenna 341.

353 is a broadcasting station.

354 is a circuit which is the output circuit of the music studio and the input circuit of the broadcasting apparatus; said circuit 354 feeds the grid G of the vacuum tube $v^{1a}$, in Fig. 19, or of the power amplifier $v^5$ in Fig. 22.

355 is an electrical wave-receiving device, or a subscriber's station, serving to receive from the broadcasting station 353.

395 is the primary winding, and $395^a$ is the secondary winding of the output transformer, by which a power tube (as $v^{4a}$ in Fig. 19) acts on the corresponding aerial 340.

398 is the grid-leak, used with the detector tube $v^3$, seen in Fig. 21.

500, 500 are wires, which connect the output transformer of the power tube $v^5$, with the principal mains $6^h$, $6^h$; seen in Figs. 22, 23 and 24.

501, 501 are wires connected with the output circuit of the power tube, and which feed one or more soft-speakers at the music studio; seen in Fig. 22.

507 is a wire which connects the plate P of the tube $v^{3a}$ with the filament F of the tube $v^{4a}$; seen in Fig. 19.

The reference numerals 511 to $517^a$ refer chiefly to the light-operated sound-film, with associated parts, such as the photo-electric cell, amplifiers and electrical speakers, whereby the photographic record of sound on the film 511 is made to produce audible aerial vibrations; seen in Figs. 47 and 48. Of these reference numerals—

511 is the sound-film, that is, a strip or ribbon of transparent celluloid or other suitable material, on which a record of the sounds corresponding to speech or to music, or to both of these, has been made photographically, by any suitable process; seen in Figs. 47 to 48.

512, 512 are rolls or cylinders on which the sound-film 511 is wound.

512$^a$, 512$^a$, are the shafts or centers of the rolls 512, 512.

513 is an opaque box or case; seen in Figs. 47 and 48.

514 is a lamp, preferably, a small incandescent lamp, for illuminating a very narrow space on the sound-film 511, so as to bring the photo-electric cell 516 into activity; seen in Figs. 47 and 48.

514$^a$ is a reflector, placed behind the lamp 514.

515 is a cylindrical case which serves for mounting the condenser-lenses $C^{41}$, $C'^1$; also the end-piece or front-piece 515$^b$ is attached to the end of said case 515.

515$^a$ is a circular flange, formed on the case 515, and serving to attach the same to the larger case 513.

515$^b$ is the front-piece of the cylindrical case 515.

515$^c$ is a narrow slot, formed in the front-piece 515$^b$, through which light passes from the lamp 514 and through the sound-film 511, and the sound-record thereon, to the photo-electric cell 516.

516 is a photo-electric cell, having an anode A$n$ and a cathode C$a$.

517 is an amplifier, preferably an audio-frequency vacuum-tube amplifier, for amplifying the currents which are fed to said amplifier from the photo-electric cell 516.

517$^a$ is a circuit by which the first-stage amplifier 517 is connected with the grid of the second-stage amplifier, which, as shown in the figure, has three audio-frequency amplifying vacuum tubes, $v^1$, $v^2$ and $v^3$; but a single tube, or two tubes, or a greater number of tubes than three may be used, according to the circumstances of the case. But with modern screen-grid tubes, a large number of tubes are not required. Instead of the first-stage amplifier 517, and the second-stage amplifier having the tubes $v^1$, $v^2$, et cetera, a single amplifier, with a plurality of tubes, may be used.

518, 518 are rollers, over which the film 511 passes and which serve to hold said film against the curved outer surface of the end-piece 515$^b$, so that it covers closely the light-slot 515$^c$ aforesaid.

518$^a$, 518$^a$, are the shafts or centers for the rollers 518.

The reference numerals 530 to 548, inclusive, refer to portions of my sound-record electrical pick-up device, which is shown in Figs. 25 to 25$^F$ and 45 to 46$^A$. A few of these reference numerals will be briefly explained here, namely—

530 is a disk phonograph record, and 531 is the turntable supporting said record. 532 is the shaft for the turntable 531. 533 is the driving shaft for the turn-table 531, which is impelled by a motor of any suitable kind. 534, 534 are miter gears, for connecting the driving shaft 533 with the turn-table shaft 532.

535 is the diaphragm, and 538 is the tone-arm of the phonograph.

536 and 536$^a$ are rings for clamping the diaphragm 535.

537 is a ring of hard rubber, bakelite or other suitable material, by which the tone-arm 538 is connected with the diaphragm-holding rings 536 and 536$^a$.

538, 538* is the tone-arm of my phonograph. The part marked 538 is the tube which immediately connects with the sound-box and diaphragm. This part 538 is connected by a hollow joint, 538$^b$, in the usual manner with the longer tube 538*, which is centered at 538$^a$.

538$^a$ is the pivot or center on which the tone-arm 538* is mounted; seen in Fig. 46.

538$^b$ is a hollow joint by which the tube 538 is connected mechanically and acoustically in the usual manner, with the tube or tone-arm 538*; seen in Figs. 43 and 44.

538$^c$ is a casting in which the shaft or center rod 538$^a$ of the tone-arm 538* is mounted; this casting may be attached to the shelf 1$^{ea}$, or to the motor 560; seen in Fig. 46.

538$^d$ is a vertical arm or upward extension of the tone-arm 538*, near to the center-shaft or pivot-rod 538$^a$ of the same; it serves to support the center screw 538$^e$, by which the upper end of the shaft 562$^b$ of the casting 562$^a$, is mounted, concentrically with the center rod 538$^a$ of the tone-arm 538*; seen in Fig. 46.

538$^e$ is a center screw for the shaft 562$^b$, by which the upper end of said shaft is mounted.

538$^f$ is a lock-nut for the center screw 538$^e$.

540 is the phonograph needle.

541 is the needle-holder.

542 is an armature of soft iron, attached to said needle-holder and to the diaphragm 535.

545 is a permanent magnet, having a soft iron pole-piece 545$^b$, in proximity to which the armature 542 vibrates.

547 is an armature-winding on the pole-piece 545$^b$, which is connected to the input circuit 354 of the broadcasting apparatus.

548 is a spool or tube of bakelite, German silver, or other suitable material, on which the armature coil 547 is wound.

550 is a microphone, actuated by a phonograph record; seen in Fig. 25$^E$.

551 is the granular carbon or other sound-sensitive material which constitutes the active part of the microphone 550.

552 is the front wall of the microphone 550.

553 is the back or rear wall and case of the microphone 550.

554 is the front or movable electrode of the carbon cell, of the microphone 550.

555 is the fixed electrode of said carbon cell.

556 is the wall of the carbon cell.

557 is a bolt or screw, and 557$^a$ are nuts for connecting the needle-holder 541 and diaphragm 558, with the movable electrode 554.

558 is the diaphragm of the microphone 550, which is connected to the needle-holder 541 and to the movable electrode 554 of the carbon cell.

560 is a motor for driving the phonograph, which is attached to my speaker chair; seen in Figs. 43, 44 and 45. This motor gives movement to the shaft 533, which, through the mitre gears 534, 534, gives movement to the vertical shaft 532 and to the turn-table 531, and to the record-disk 530, mounted on said turn-table.

560$^a$, 560$^a$, are screws, by which the motor 560 is attached firmly to the shelf or extension 1$^{ea}$ belonging to my speaker chair; seen in Figs. 43 to 45.

562 is a soft or flexible rubber tube, which is connected by the brass-connecting piece 562$^a$ with the interior of the tone-arm 538*, near to the pivot or center of said tone-arm; seen in Figs. 46 and 46$^A$.

562$^a$ is a connecting piece of brass or other suitable material, which fits closely into the interior of the tone-arm 538*, near to its pivot or center 538ª, and preferably concentrically with said pivot 538ª; seen in Figs. 46 and 46ᴀ. This connecting piece is so fitted into the tone-arm 538* that it does not interfere with the angular movement of said tone-arm on the center rod 538ª, but connects well acoustically with it, so as to convey the vibrations from the air in said tone-arm 538* to the flexible tube 562, and from this to the other flexible tubes 563 and 563*, by which the tone-arm 538*, and the tube 562 are connected with the small ends of my soft-speaker horns 4, 4, which are preferably attached to my speaker chair, as elsewhere illustrated and described herein.

562ª* is a somewhat similar connecting-piece; seen in Figs. 49 and 51.

562ᵇ is a shaft or center rod for the casting 562ª; seen in Fig. 46. Preferably, this center rod is set concentrically with the center rod 538ª of the tone-arm 538*. The lower end of the shaft 562ᵇ is mounted in a center hole, drilled for it in the upper end of the shaft 538ª, belonging to the tone-arm 538*; but said shaft 562ᵇ may be otherwise mounted in the casting 562ª. Its upper end is mounted in a center screw 538ᵉ, which is adjustable by the lock-nut 538ᶠ.

563 and 563* are branch tubes, preferably of soft rubber, which are each connected with the tube 562 aforesaid, and also each is connected with the small end of one of my soft-speaker horns 4, 4, which, preferably, are mounted on my speaker chair, as before described; seen in Figs. 46, 46ᴀ and 49.

565 is a disk-holder or rack which is attached to one side of my speaker chair, and is provided with pockets or compartments 565ª, each of which serves to hold a plurality of disk-records 530, 530; shown in Figs. 43 to 45. This disk-holder 565, with its record-disks 530, 530, enables a listener, seated in my speaker chair, to change the records 530 in his phonograph, without leaving his chair.

565ª is a pocket or compartment in the disk-holder 565 which is adapted to hold a plurality of record-disks 530, 530, within easy reach of the listener, seated in my speaker chair, and having a phonograph mounted on the arm or extension 1ᵉᵃ of said chair, as shown in Figs. 43 to 45.

566 is a block or piece of hard wood, which is interposed between the disk-holder or case 565 and the side-bar 1¹ of my chair. It serves to connect the rack 565 with said side-bar 1¹; said record case is connected also as the drawing shows (see particularly Fig. 45) with the arm 1ᵉ of my chair.

570, 570 are brackets, by which the shelf 1ᵉᵃ, that serves to support the phonograph, is connected with the vertical member 571, which, in turn, is attached to one of the arms 1ᵉ and to one of the side-bars 1¹ of my speaker chair, seen in Figs. 43 to 45.

571 is a vertical member, which may be a piece of good, well-seasoned rock maple or other hard wood; or it may be a plate of metal as shown in Fig. 45, it is a piece of hard wood. It serves to connect the arm 1ᵉ and the side-bar 1¹ of my speaker chair, and to support, by the brackets 570, 570, the plate 1ᵉᵃ on which the phonograph is mounted.

572 is a piece of hard wood or other suitable material, which is interposed between the vertical member 571 and the side-bar 1¹ of my speaker chair. It is attached fast to said side-member 1¹, and the vertical member 571 is attached fast to it, and to the corresponding arm 1ᵉ of my speaker chair, by screws and glue or in any other suitable manner.

606 is a speech and music receiving device for the subscriber's premises, shown symbolically by its case; seen in Fig. 22.

640 is a high pass wave-filter, seen in Figs. 19 and 22, which serves to exclude vibrations lower than a particular desired frequency. This frequency is understood to be about 400 cycles per second, in common practice, but it may be somewhat lower than this, indeed, with the apparatus of Fig. 22, it may be much lower.

My electrical speakers are adapted to produce sounds of smaller moderate volume only, that is, sounds sufficient to produce an effect of comfortable loudness, in the listener's ears, when my speakers are close to his ears, and speaking directly into them. By reason of the relatively soft sounds which they produce in the room, they may be called soft-speakers, which speak softly and directly into the ears of a listener, in distinction from the loudspeakers now in general use, which produce a loud sound all over the room in which they are located, and sometimes are heard more or less loudly in one or more adjacent rooms, or even in neighboring houses. My electrical speakers may be made to speak softly, by inserting a sufficient amount of impedance in circuit with them; also, the vibrating body in the case of a cone-speaker or a dynamic speaker, may be made much smaller than in the usual loudspeakers. And with the diaphragm-and-horn speaker, as shown in my Figs. 7 to 17 and 34, the horn, and particularly the bell-end or mouth of the same, is made, preferably, of very much smaller area than is customary with good loudspeakers of the horn type, and of equal length. Also, the poles of the electro-magnet, which act on the diaphragm, may be made of much smaller cross section, or adjusted less close to the diaphragm. Also, a single pole may be used, to act on the diaphragm, instead of the two poles commonly used. Thus, in various ways, and indeed in any suitable way, the volume of the sound produced by my electrical speakers, while sufficiently loud for the ears into which they directly speak, may be reduced to such a point that it is not at all disturbing, or at least, is very much less disturbing to a person in the same room, or in an adjacent room, who does not wish to listen to the music, than is the case with the loudspeakers now in common use in the art.

As I have explained above, I prefer to attach my electrical speakers to a chair in which the listener sits, with the two speakers on opposite sides of his head, close to his two ears respectively, and speaking directly into them. But while I, preferably, locate my electrical speakers close to the ears of the listener while seated in the chair (which we may call the speaker chair) I preferably do not press these speakers against the ears, but leave the ears free, with my speakers, however, in close proximity to them.

I prefer to provide two of my soft-speakers, one for each ear and located, each speaker, in close proximity to the ear for which it serves; but a single soft-speaker may be used, located close to the ear for which it serves.

I shall first describe my invention in connection with the form of my apparatus which is shown in Figs. 1 to 3, after which I shall describe some other forms of my apparatus.

The chair (referred to as a whole by the reference numeral 1) to which, preferably, my electrical speakers are attached, may be a plain chair, an easy chair, (as a rocking chair) or a chair of any other suitable sort. In Figs. 1 to 3, as well as in subsequent figures, I show my electrical speakers attached to an easy chair 1 of a kind that is very commonly used in offices, and to some extent, also, in homes, which has a base 1a to rest upon the floor, and a seat-part 1b. The seat-part 1b of my chair may be attached to the base in any suitable manner; for instance, it may be arranged to rock on said base (see Fig. 56). Or the seat-part may be attached by a rod or pivot, as 1c, to the base 1a, so that the seat-part can revolve with relation to the base; and that is what I show in the drawings, Figs. 2, 3, 5, 6, 8, 9, et cetera; but any other mode of attaching the seat-part to the base, which is known and approved, may be used. Preferably, my listener's chair or speaker-chair, has a back 1d and arms, as 1e, 1e. Preferably, the seat-part 1b of my chair is pivoted by a rod, as 1f, to the base-part 1a, so that the listener can lean back in the chair, the seat-part 1b inclining or tilting with relation to the base-part 1a. But other modes of connecting the seat-part with the base-part may be used, as stated above.

2, 2, are electrical speakers of the dynamic or moving coil type, shown in Figs. 1 to 6. The reference numeral 2 refers to the dynamic or moving coil speaker as a whole. This speaker is best shown in Fig. 1A, but see also Figs. 1B to 1D. With the details shown in the drawings (which, however, may be modified within wide limits, if desired), it comprises chiefly the following parts, namely—

(a) A vibrating-cone 2a, which may be of specially prepared paper or of an aluminum alloy or of any other suitable material.

(b) A supporting ring 2b.

(c) A soft leather washer 2c, for attaching the vibrating-cone 2a to the supporting-ring 2b.

(d) An enclosing and supporting cone 2d, which may be of metal or other suitable material; the supporting-ring 2b aforesaid is attached to the larger end of said cone 2d, and the outer magnet cylinder 2g is attached to the smaller end of said cone 2d. Slots or openings, as 2m, 2m (Fig. 1C) are formed in the wall of the cone 2d so as to prevent the formation of a resonant body of air inside said cone.

(e) An inner magnet core 2e on which the exciting winding 2f, fed by a direct current source (for example, a storage battery or a battery-eliminator) is wound.

(f) An outer magnet core or cylinder 2g, which may be shaped substantially as shown in Fig. 1A, and which serves to house the magnet-core 2e and the exciting winding 2f. Also, it serves to create, with the core-piece 2e, an annular magnetic field, in which the driving core or armature 2k lies.

(g) A disk-shaped end-piece or yoke-piece 2h, which is clearly shown in Figs. 1A, 1B, 1D, 1E and 1EA, and which serve to connect both mechanically and magnetically, the core-piece 2e and the cylindrical piece 2g, which, with the exciting winding 2f, constitute the magnetic system.

(h) A mounting-rod 2i of steel or other suitable material. One end of this mounting rod is set fast in the yoke-piece 2h of the magnetic system belonging to the dynamic speaker. The other end of said rod 2i (marked 2ia) is mounted adjustably in one of the arms 3a of the speaker-supporting frame 3, which is attached to the seat-part 1a of my easy chair, and serves to support my electrical speakers 2, 2; see Figs. 1E and 1F. A slot 3g is formed in the upper part of the side-bar 3a belonging to the speaker-supporting frame 3 (Figs. 1, 2, 1F and 1E) and in this slot, the part 2ia of the rod 2i lies, which is flattened by milling or otherwise, so as to fit into the slot 3g, and be susceptible of moving up and down therein, but preferably without turning around. A collar 2n is formed on the rod 2i, and a much larger collar-piece 2p is firmly attached to the rod 2i, abutting against the collar 2n, and facing one side of the side-bar 3a; best seen in Figs. 1E, 1EA and 1F; and said supporting-piece 2i is locked into the side-bar 3a in whatever position vertically is desired, by tightening the butterfly nut 2q. This nut is mounted on the screw-threaded end 2ib of the rod 2i aforesaid. The construction described above, is clearly shown in the drawings, Figs. 1A to 1F, but any other suitable mounting means may be substituted for those shown.

The speaker-supporting frame 3 may be of any suitable form or kind. As shown in the drawings, Figs. 1 to 3, and see particularly Figs. 1E to 1G, 2 and 3, it consists of side-bars 3a, 3a, one at the right and the other at the left of the chair, with a connecting rod 3b, which may be located just below the seat of the chair, and may be attached to the chair in any suitable fashion. As shown in Figs. 2, 3, and 1G, the bar 3b is mounted in the castings 3c, 3c, which, in turn, are attached by the screws 3d, 3d, to the horizontal side-bars 1i, 1i, of the seat of the chair 1. Also, the side-bars 3a, 3a, of the frame 3 are firmly attached by the metal pieces 3e, 3e, to the arms 1e, 1e, of the chair 1, preferably in such positions that the centers of the electrical speakers 2, 2, are forward of the inside back line of the back 1d of the chair 1, extended upward to the level of the centers of the speakers 2, 2, (the line 1d*, 1d* in Fig. 2) by say, about nine inches. But by shifting the connecting-pieces 3e, 3e on the arms 1e, 1e, of the chair, the distance of the centers of the electrical speakers forward of the inside back line of the chair 1, extended upwards, may be made to be either greater or less than nine inches, as the owner of the chair may wish. The pieces 3e, 3e, may be attached to the side-bars 3a, 3a of the frame 3, and to the arms 1e, 1e, of the chair 1, by screws 3f, 3f, or in any other suitable manner.

The form of my apparatus, illustrated in Figs. 4, 5 and 6, differs from that shown in Figs. 1 to 3, in that means are provided by which the listener, while seated in my speaker chair, can adjust the height, and also the in-and-out position with relation to the back of the chair, of my electrical speakers 2, 2, so that the centers of the two speakers will be opposite the centers of his two ears, respectively, or nearly so. Also, means are provided by which the distance apart of my speakers, or their in-and-out adjustment with relation to the ears of the listener, can be adjusted so as to leave more or less room for the head of the listener.

First, the in-and-out adjustment of the speakers, with relation to the ears of the listener, is effected by mounting the rod 2i which may be of the form shown in detail in Fig. 4A (and see also, Fig. 4B) in a hole in the front part of the arm 5a, and this arm is slotted, as shown in Fig. 4B, and provided with a tightening screw 5ba. This screw is loosened to move the rod 2i and the dynamic speaker carried by it, in or out toward the listener's ear, and it is then locked in the position desired by the screw 5ba.

Second, the in-and-out adjustment of the speakers 2, 2, with relation to the back of the chair, or it may be called, the front-to-rear adjustment of the speakers, is effected by mounting the bar $3^b$, to which the side-bars $3^a$ are firmly attached, in such a manner that it can rock in its bearings, $3^c$, $3^c$, with a frictional check hereinafter described, to hold it in whatever position it may be set, and preferably with a counterweight $3^k$, which is supported by an arm $3^l$, which is attached to the bar $3^b$ aforesaid, so that it counter-balances the weight of the arms $3^a$ and of the speakers 2, 2.

The frictional check, which operates to hold the arms $3^a$, $3^a$, and speakers 2, 2, in whatever positions they may be set, with respect to front-and-rear position, may be of any suitable kind. That shown in the drawings (Figs. $4^C$, $4^D$ $4^E$ and 5) comprises a segment $3^m$, firmly attached to one of the side-bars $3^a$, a break-piece or frictional check $3^n$, centered at $3^{na}$, and drawn down upon the segment $3^m$ by a contractile spring $3^p$, one end of which is attached to the frictional lever $3^n$ and the other to a piece $3^q$ which is attached to one of the horizontal side-bars $l^1$, of the seat-part of my chair. Thus, by pressing one of the arms (either of the arms) $3^a$, $3^a$, forward or backward, it moves, carrying the speakers 2, 2, with it, and remains in the position in which it is left.

Lastly, to provide an up-and-down movement of the speakers with relation to the ears of a person seated in my speaker-chair, I provide a frame which consists of a center rod 5, with arms $5^a$, $5^a$, firmly attached to the same. In the front end of each of these arms $5^a$, is a hole to receive the rod $2^i$, a slot $5^b$, and a screw $5^{ba}$, for tightening the split arm $5^a$ on the rod $2^i$, in any position required, in and out with relation to the head of the listener.

The rod 5, belonging to the speaker-supporting frame, is supported in the arms $3^a$, $3^a$, aforesaid, which are connected by the bar $3^b$ aforesaid; also by a tie-bar $3^s$. Another arm $5^c$, having a sufficient weight $5^d$ at its end, is used to counterbalance the arms $5^a$, $5^a$, and the electro-dynamic speakers carried by them. A segment 6, curved on the center of the shaft 5 as a center, is firmly attached by keying, brazing, electric welding, or in any other suitable manner, to the shaft 5, and a friction rod 7, set in the housing 9, is pressed by the expansive spring 8 against the segment 6, so as to create enough friction on said segment to hold the rod 5, the arms $5^a$, and the dynamic speakers 2, 2, in whatever positions they may be moved into. The housing 9 is attached by screws $9^a$, $9^a$, to one of the side-bars $3^a$; see Figs. $4^G$, 5 and $4^F$. The housing 9 contains, in addition to the friction rod 7, an expansive spring 8, an adjustable seat $8^a$ for the same, and a screw $8^b$ for acting on the seat $8^a$ to adjust the pressure of the spring 8 against the rod 7.

The result of this construction is that the dynamic speakers 2, 2, are easily adjusted in and out with relation to the ears of a listener, seated in my speaker chair, by loosening, by means of the screw $5^{ba}$, the grip of the split arms $5^a$ on the rod $2^i$, and then moving the dynamic speaker in towards the ear or away from it, as desired.

Adjustment of the height, vertically, of the dynamic speakers 2, 2, with relation to the ears of a person seated in the chair, is made by pulling upon the speakers 2, 2, or their rods $2^i$, $2^i$, or upon the arms $5^a$, so as to pull the speakers 2, 2, into the position vertically desired, the segment 6 moving under the frictional resistance of the rod 7. And adjustment of the speakers in and out with relation to the head of the listener, seated in my speaker chair, or with relation to the back of said chair, is made by pulling or pushing one of the arms or side-bars $3^a$ into the position desired. Thus, the speakers 2, 2, are easily adjusted into any position required, with relation to the head and ears of the listener, seated in my speaker chair, and as they are counterbalanced and subjected to frictional checks, as before described, they remain in any position into which they are set, until reset.

In the apparatus illustrated in Figs. 1 to 6, electro-dynamic speakers are provided; but speakers with diaphragms and horns are also suitable for use with my speaker chair, and apparatus of this sort is shown in Figs. 7 to 17 and in some other figures. In Figs. 7 to $9^B$, and also in Figs. 16 and 17, apparatus is shown, in which the horns 4, 4, are fixed in position with relation to the chair; but in Figs. 10 to $12^A$ and 15 to $15^D$, the horns 4, 4, are adjustable, at the will of the listener seated in the chair. Considering, first, the apparatus illustrated in Figs. 7 to $9^D$, 4, 4, are the horns which may be attached to the chair, in any suitable manner; but with the details shown in the drawings, the attachment is made by screwing the ring-plate $4^{ba}$ (which, with the cylinder $4^b$, is firmly attached to the horn 4) to the lower surface of the corresponding arm $l^e$ of the chair. The lower end of each of the horns 4, 4, passes through a hole, formed for it, in the bar 18; and this bar is attached to the lower surface of the sidebars $l^1$, $l^1$, of the seat of the chair. The long, slender part of the horn 4 in Figs. 8 and 9, stands vertically, but the larger or bell-shaped portion of said horn is bent or curved inwards, so as to lie in proximity to one of the ears of the listener, when he is seated in the speaker chair, so that it speaks directly into his ear. The horn 4, may be of any suitable shape, but preferably, is of the exponential type. It is made small at the small end, for example, three-sixteenths ($\frac{3}{16}$) of an inch in diameter internally, but it may be more or less than this; and it is made much larger, of course, at the bell end, say six inches or seven inches; but it may be either more or less than this. The horns 4, 4, may be of any suitable material. Each of the horns 4, 4, in Figs. 8 to $9^B$, is firmly attached to the cylinder or truncated cone $4^b$, which in turn, is firmly attached to the plate $4^{ba}$, and this, preferably, is attached by screws $4^c$, $4^c$, to the under-surface of the corresponding chair arm $l^e$.

Any sort of telephonic unit that is suitable for the purpose may be attached to the small end of the horn 4. That which I have shown in most of the figures of the drawings is a type which is extensively used in the telephonic art, but preferably I make my diaphragms somewhat thicker and with a higher resonance point than those ordinarily used in telephony. This telephonic receiver is best seen in Figs. $9^C$ and $9^D$.

Another type of telephonic receiver or speaker-unit, in which there is one pole of the magnet on each side of the diaphragms is shown in Figs. 35 and 36 (on the same sheet with Fig. 20) and in Figs. $35^A$ and $35^B$, on the same sheet with Fig. 32.

12 is the outer shell of my telephone receiver, and $12^a$ is the cap of the same, which screws down outside the outer shell 12. A ferrule $4^a$ is firmly attached to the small end of the horn 4, and is screwed into the top of the cap $12^a$, so that said horn 4 is connected air-tight with the chamber $12^b$ that is formed in the cap $12^a$ between the diaphragm 13 and the lower end of the horn 4.

13 is the telephone diaphragm, which is made of any suitable substance, preferably, of soft iron or soft steel, or of silicon steel.

14 is the permanent magnet, the two arms of which are connected by a yoke-piece 14$^a$ of magnetic material.

15, 15, are soft-iron pole-pieces, which are attached by electrical welding or in any other suitable manner, to the permanent magnet 14.

16, 16 are the coils which are wound on the pole-pieces 15, 15, to act on the diaphragm.

17 is a cup-shaped or basin-shaped metal piece, which is shaped as shown and to which the magnet 14, with its pole-pieces 15, is attached.

The cup-shaped piece 17 rests down on the turned surface of the case 12, and the diaphragm 13 rests down on the turned surface of the cup-shaped piece 17. And the cap 12$^a$ screws down on top of the diaphragm 13. All this is old and well known in the art. The wires from the coils 16, 16, are led out of the case 12 at any suitable point (for instance, at the bottom).

Instead of the telephonic receiver shown in Figs. 9$^C$ and 9$^D$, that shown in Figs. 35 and 36 may be used; or any other suitable type of receiver or unit, as it is often called, may be used with the horn 4.

The result of the construction shown in Figs. 7 to 9$^D$, is that the listener, when seated in my easy chair 1, has on each side of his head, in proximity to his two ears respectively, the bells of the horns 4, 4, which speak directly into his ears, so that, with a small movement of the diaphragms 13, 13, and but little disturbance of the air in the room, the sound is brought into his ears with a comfortable degree of loudness, and he regulates that degree of loudness at will by the volume-control rheostat 37$^b$, belonging to the radio apparatus shown in Fig. 7, or if an apparatus be used that does not operate by radio, but by audio frequency vibrations, distributed over wires, then by another volume-control rheostat, as illustrated, for example, in Figs. 37 to 42.

Generally speaking, with the apparatus illustrated in Figs. 7 to 9 (and see particularly Fig. 9) the height vertically of the horns 4, 4, is adjusted, so that the center of the horn is opposite the ear of a person of about average height, when seated in my chair; that is, the center of the bell of said horn may well be located about 26½ inches above the top of the seat of the chair. But the size of the horn is such that an ear two inches or even more, higher or lower than this, is still within the bell of the horn. Adjustment of the horn forward and backward, with relation to the back of the chair, may be made by adjusting the plate 4$^{ba}$ on the corresponding arm 1$^e$, and also adjusting the bar 18, correspondingly on the sidebars 1$^1$, 1$^1$ of the seat-part of my chair.

*The form of my speaker chair illustrated in Figs. 10 to 12$^A$*

In Figs. 10 to 12$^A$, a form of my speaker chair is shown in which the horns 4, 4, are easily adjusted by the listener, while seated in the chair, so as to be either higher or lower, or further forward or backward, with relation to the listener's head, so as to bring the center of each bell near to the center or opening of the corresponding ear. This construction is more complicated and expensive than that shown in Figs. 7 to 9, but it makes it practicable to use horns with smaller bells and which give a sound of comfortable loudness in the ears of the listener, while seated in the speaker chair, with even less sound elsewhere in the room than is made by the horns with larger bells, that are shown in Figs. 7 to 9; and further, it makes it practicable to use small bells for the horns 4, 4, and yet suit them equally well to a child or to a tall man, seated in my speaker chair.

In Figs. 10 to 12$^A$, 4, 4, are the horns, as in earlier figures. 4$^a$ is a ferrule, surrounding the lower or small-end portion of the horn 4, and to this the cap 12$^a$ of the telephone receiver is screwed, as before described. Also, said ferrule 4$^a$ is attached fast to the metal piece 21, which may be shaped as shown in Figs. 11$^A$, 11$^C$ and 11$^D$; and this piece 21 is connected by the pin 21$^a$ with a corresponding arm 20$^a$ of the shaft 20. Also, said horn 4 is provided with another ferrule 4$^{aa}$, attached to the horn 4 further up, where is of substantially larger diameter. This higher and larger ferrule 4$^{aa}$ is firmly attached to the metal piece 32, which may be shaped as shown in Figs. 11$^A$, 11$^F$ and 11$^G$. This piece 32 is attached by the nicely-fitting pin 32$^a$, to the link 31; and by the pin 31$^a$, the link 31 is jointed to the arm 30$^a$, which, in turn, is firmly attached to the shaft 30, by the key 34 (Fig. 11$^A$) or by brazing, or in any other suitable manner. Thus, by means of the shaft 20 with its arm 20$^a$, 20$^a$, and the links 31, 31, (attached to the arms 30$^a$, 30$^a$, of the shaft 30) the horns 4, 4 are made to be movable vertically, more or less, as required.

The shaft 20, has, in addition to the arms 20$^a$, 20$^a$, that connect with the horns 4, 4, respectively, another arm 20$^b$, to which a weight 22 is attached that serves to counter-balance the weight of the arms 20$^a$, 20$^a$, the horns 4, 4, the links 31, et cetera. Also a fourth arm or stop-arm 20$^c$ (seen in Fig. 11$^B$) is firmly attached by pressing, keying, brazing, or in any other suitable manner, to the shaft 20; and this arm 20$^c$ serves also to carry a segment 20$^d$ against which the frictional lever 23 hereinafter described presses, so as to hold the arm 20$^c$ and the shaft 20 with its arms 20$^a$, 20$^a$, and the horns 4, 4, in whatever positions these may be set. Also, said arm 20$^c$ serves to engage the stops 41, 41, hereinafter described, by which the vertical movement of the horns 4, 4, is limited.

Firmly attached to the arm 20$^c$ of the shaft 20, by screws or rivets 20$^e$, or in any other suitable manner, is the segment 20$^d$ before mentioned; this segment is curved on the center of shaft 20, as a center. This segment is seen in Figs. 11, 11$^A$, 11$^H$ and 11$^I$. Instead of making the arm 20$^c$ and the segment 20$^d$ separate and distinct, they may be made in one piece, by casting, by drop-forging, or in any other suitable manner.

A lever 23 (Figs. 11, 11$^A$, 11$^H$ and 11$^I$) centered at 23$^a$, is pressed tightly by the contractile spring 24 against the curved surface of the segment 20$^d$ aforesaid, so as to exert a frictional check or pressure thereon, sufficient to hold said segment 20$^d$ with the arms 20$^c$, 20$^a$, 20$^a$, the shaft 20, and the horns 4, 4, in whatever positions vertically they may be set. One end of the spring 24 is attached to the lever 23, and the other end of said spring is attached by the casting 25 (best seen in Fig. 11$^A$) or in any other suitable manner, to the chair 1.

Firmly attached by rivets 33$^a$, screws, or otherwise to one of the arms 30$^a$, belonging to the shaft 30, is another segment or segmental piece 33, whose upper curved surface is curved on the center of the shaft 30 as a center; seen in Figs. 12$^A$, 11$^A$, 11$^F$, 11$^G$. A lever 3$^n$, centered at 3$^{na}$, in a hanger 3$^{nb}$, is held by the contractile springs 3$^p$ firmly against the top of the segment 33, so as to exert a frictional checking pressure thereon. One end of the spring 3p is attached to the lever 3n, and the other end of said spring 3p is attached by a pin 3q, or otherwise, to my speaker chair; as before described for the similarly marked parts in connection with Figs. 5 and 6.

The casting 40 (best seen in Figs. 11A, 11I, 11K, 11L and 12A) serves to mount one end of the shafts 20 and 30; also it serves to mount the center pin 23a of the checking lever 23; also it carries the stops 41, 41, that limit the play of the stop-arm 20c and of the two arms 20a, 20a, and of the shaft 20, and of the horns 4, 4, that are connected to the arms 20a, 20a, respectively. To facilitate the taking-in and out of the shafts 20 and 30, the casting 40 aforesaid is provided with a split bearing, that is, a bearing which is formed in part by said piece 40, and in part by a cap 40a, which is secured by screws 40b, 40b, to the piece 40 in a way that is indicated in the drawings, Figs. 11I and 12A, and which is well known in the mechanical arts.

45, 45 are stops that are attached to one of the arms 1e of my speaker chair; these stops serve to limit the front-to-rear movement of the horns 4, 4. The stops 45, are covered with felt 45a to cushion any shock that might arise from the striking of said stops by the horns 4, 4.

It will be seen that the shaft 20 (best seen in Figs. 11A, 11B and 12A) with its arms 20a, 20a, which are firmly attached to it by pressing, keying or in any other suitable manner, constitutes a frame, which, through the pins 21a and the pieces 20, 20 and 4a, 4a, supports the lower ends of the horns 4, 4, and serves to lift them or to lower them to any position required within certain reasonable limits, that depend upon the placing of the stops 41, 41 aforesaid. But the shaft 30 with its arms 30a, 30a, which are firmly attached to it, constitutes another frame; and to the arms 30a, 30a of this frame, the central portion of each of the horns 4, 4, is attached by the corresponding pin 31a, link 31, pin 32a, metal piece 32, and ferrule 4aa, as shown in Fig. 11A; and see also Figs. 11E, 11F, 11G and 12A.

By the frame, formed by the shaft 20 and its arms 20a, 20a, up-and-down movement may be imparted to the horns 4, 4; but if the horns themselves be taken hold of, as they may well be, to move them higher or lower, this frame 20, 20a, 20a, with the links 31, 31, connected to the arms 30a of the other frame, conditions the up-and-down movements of the horns 4, 4. On the other hand, the other frame (formed by the rock shaft 30, with its arms 30a, 30a) connected by the links 31 and pins 32a and pieces 32, with the ferrules 4aa and the horns 4, permits of in-and-out movement of the horns 4, 4, with relation to the back of my speaker chair, and so with relation to the two ears of the listener. And the checking-lever 23 before mentioned, bearing on the segment 20d aforesaid, holds the horns 4, 4, in whatever position vertically they may be set; while the other checking lever 3n, bearing on the segment 33, holds the horns 4, 4, in whatever in-and-out positions they may be set. Thus, it is easy for the listener, seated in my speaker chair (Figs. 10 to 12A) by taking hold either of one or of both of the horns 4, 4, to set the bells of said horns in whatever position he may wish upwardly and downwardly, or inwardly and outwardly, with relation to his ears; and he can thus satisfy himself; and a subsequent occupant of the speaker chair can change the horns in a movement in any position that he may desire.

*The form of my apparatus, shown in Figs. 13 to 14A*

For many purposes, it is convenient to attach my electrical speakers to the chair in which the listener sits, and it is this construction that is shown in Figs. 1 to 12A. But, as before said, it is not necessary in all cases to attach the speakers to the listener's chair, but they may be supported in some other manner, as for instance, by the wall or ceiling, by a table or other stand or support. One illustration of this is given in Figs. 13 to 14A, in which my electrical speakers are attached to the wall 51. For this purpose, a panel 50 of wood, neatly finished, may be attached to the wall, or such panel may be omitted, and the attachment be made directly to the wall. In Figs. 13 and 14, the panel 50 is shown. Brackets 52 are attached to the wall 51, either directly or by attaching them to the panel 50. This attachment may be made by screws 52a or in any other suitable manner. The bracket 52 has a cap 53, which may be shaped as shown in Figs. 14 and 13A, which is attached by bolts 53a, 53a, to the bracket 52, so as to clamp the ferrule 4a, thereby to support the horn 4. The lower and larger part of the horn 4 has a ferrule 4aa surrounding it, and attached to this ferrule is a support 55, which, in turn, is attached by screws 55a to the panel 50, and so to the wall 51. The horns 4, 4, are mounted in positions convenient for a listener seated in the chair or bench 1*. For this purpose, the centers of the bells of the horns 4, 4, may be, say, 26½ inches higher, each, than the top surface of the seat of the chair or bench 1*, and the two bells may be spaced about 8 inches apart, or more or less, according to the desires of the owner. The result of this construction is that when a person of average height or of height considerably more or less than average height, is seated in the chair or bench 1*, with his head between the bells of the horns 4, 4, each of the two electrical speakers speaks directly into the corresponding ear, so that, with a relatively small disturbance of the air in the bell of the horn, a sound of comfortable loudness is prdouced in the ear of the listener seated on the seat 1*, and the volume of that sound is instantly adjustable at will, by means of the volume-control device 36b. Also, in case of receiving speech or music by radio, the tuning controls 36a, 36a, are within easy reach of the occupant of the chair or bench 1*, so that he can tune in one station or another, as he may wish.

*The modified form of my apparatus, illustrated by Figs. 15 to 17F*

In the forms of my apparatus illustrated in Figs. 7 to 14, the horns 4, 4, shown, have each (a) a fairly long part of small but gradually increasing diameter, and the smaller end of this part is connected with the telephonic receiver or unit; and (b) a part of larger diameter, joining the bell, which is bent inward towards the corresponding ear of the listener. But to obtain a greater speaking length for the horn 4, as, for example, six feet, or seven feet, or even more, I have found it advisable to bend the horn in its small-diameter part as well as in the large-diameter part, near the bell, so that the sound first travels, say, downward from the diaphragm 13 of the telephonic receiver or unit, through the small-diameter section of the horn, marked 4* in Figs. 15 to 17, then curves in the curved section or neck marked 4e, and comes up through the larger-diameter part of the horn 4 to its bell. This form of horn is well shown in Fig. 15, taken in connection with preceding views, such as Fig. 11, 11A and 12; or Figs. 13 and 14. A convenient arrangement of the modified or bent horn and its mounting devices is shown in Figs. 15 to 15D, which are to be taken in connection with preceding figures. The largest part of the horn 4, that which runs from the bell downward, is mounted in the ferrules 4aa and 4a, and in the insulating-pieces 32 and 21, respectively, as before described in connection with Figs. 10 to 12A. But instead of connecting the telephonic receiver or unit 12, 12a with the ferrules 4a, at the lower end of the horn 4, as in Figs. 10 to 12A, with the apparatus of Figs. 15 to 17, a U-shaped piece or curved piece 4e is connected to the horn 4 below the ferrule 4a; and the horn 4 is continued upward, by another section 4*, whose larger end connects with the neck-piece 4e, and whose upper and smaller end is surrounded by the ferrule 4a*. The cap 12a of the telephonic receiver or unit screws closely over the ferrule 4a*; and the small-diameter portion of the telephone cap 12a sets into a hole in the metal mounting-piece 32, which is, say, of three or four one-thousandths of an inch (.003″ or .004″) greater diameter internally than the neck of the part 12a is externally.

In assembling this apparatus, the ferrules 4aa and 4a are suitably attached to the main part of the horn marked 4, and these are mounted in the metal mounting-pieces 32 and 21 respectively, as before described in connection with Figs. 10 to 12A. The lower part of the horn 4, preferably provided with another ferrule 4ab, screws into the U-shaped piece 4e and the small-diameter part of the horn, marked 4*, is slipped down through the hole at the right in the metal piece 32 (Figs. 15 and 15A) and, with its lower ferrule 4ac, is also screwed into place in the U-shaped piece 4e aforesaid; then the cap 12b is screwed on over the ferrule 4a*, at the top of the horn-section 4*, and the whole is complete. The path of the sound is then downward from the diaphragm 13, through the small-diameter portion 4* of the horn; then across the U-shaped piece 4e, and up through the large-diameter portion 4 to the bell of said horn.

Otherwise, the apparatus shown in Figs. 15 to 15D is substantially the same as that shown in Figs. 10 to 12A.

With the form of apparatus shown in Figs. 15 to 15D, each of the horns (4, 4e, 4*) is adjustable in respect of its up-and-down position, and also of its in-and-out position with relation to the back of my speaker chair, as before described in connection with Figs. 10 to 12A. But a cheaper form of my apparatus, with fixed or non-adjustable horns, is shown in Fig. 16, which is a view in general similar to Fig. 9, save that for the arrangement of the horn 4 and the telephonic unit 12, 12a, shown in Fig. 9, the horn having a larger section 4, with the curved piece 4e, and the small-diameter part 4*, as shown and already fully described in connection with Figs. 15 to 15D, is provided. All this will be sufficiently clear from the drawings.

Fig. 16, as before said, is a view in general similar to Fig. 9 before described, but with a modified horn structure 4, 4e, 4*; and Fig. 17 is a side elevation of the horn 4, 4e, 4*, shown in Fig. 16.

In case of music transmitted over wires, instead of by radio through the air, the switches, plugs, rheostats or other controls of whatever kind, are mounted in proximity to the chair 1*, the same as is shown for the radio-receiving device in Figs. 13 and 14.

My soft speakers and my speaker chair, as illustrated in Figs. 1 to 17F and before described, may well be used in connection with radio-receiving apparatus for receiving speech and music; and this has been indicated more or less heretofore. But it is shown more clearly in Figs. 18 to 21. Also, connections from a music-distributing system, operating over wires at audio frequency, to my soft speakers and my speaker-chair, are shown in Figs. 22 to 24. And connections from a phonograph record to my soft speakers and my speaker chair, are shown in Figs. 25 to 25E. And connections from an electrical dictating apparatus to my speaker chair are shown in Figs. 26 to 28M.

Considering, first, the radio music-distributing and music-receiving apparatus, connected with my soft speakers, and with my speaker chair—

Fig. 18 illustrated symbolically a radio broadcasting station, marked 353, having a broadcasting aerial 340 and a ground connection 350, and radio receiving stations or subscribers' stations 355, 355, each having a receiving antenna 341, and a ground connection 351. Various forms of radio broadcasting apparatus are known, and any form that is suitable for the purpose may be used. One form of broadcasting apparatus, particularly suited to my purpose, in that things are arranged by me in such a manner that the control-operator in the control room 10, belonging to the music studio, listens, while seated in my speaker chair 1, to my soft speakers, is shown in Fig. 19; and these soft speakers, to which the control operator at the central station listens, are made to be similar, as nearly as practicable, acoustically and electrically, to the soft speakers to which the subscriber listens, while seated in the speaker chair 1 on his own premises.

In Fig. 19, 11 is the room in which the musicians sing and play their instruments, and in which also a person who is talking to the microphone $m$, would talk, for a speech or a lecture or the like, to be broadcast. In this room is located the microphone or electrical pick-up $m$, whose primary circuit $6^d$ is fed by the battery $b$, and whose secondary circuit $6^e$ feeds, through the high-pass electrical wave filter 640, the grid G of the audio-frequency amplifying tube $v^1$. And here I may say that each of my triode vacuum tubes, conformably to approved practice in the art, has a filament or hot cathode F, a plate or anode P, and a grid or controlling electrode G, to govern the flow of electrons from the filament F to the plate P, in a way that is now well known in the art. These three elements are enclosed in a highly-evacuated tube, which is marked $v^1$, $v^2$, et cetera. A battery or other direct-current source A, is supplied for heating the filament F, and a rheostat $R^3$ serves to regulate the intensity of this heating. Another direct-current source B, feeds the plate P in a well known manner; and a third battery marked C is the grid-negatizing battery of Lowenstein, which also operates in a manner that is now well known in the art. The details of construction and the manner of connecting triode vacuum tubes is so well known that little need be said on the subject. It is common practice to connect tubes by a transformer coupling, the primary winding $6^d$ of the transformer being supplied with the required electrical vibrations in some suitable manner, and the secondary winding $6^e$, of the transformer being connected with the grid of the next following tube in the series. Another mode of coupling vacuum tubes, which has some marked advantages, is the resistance method of coupling, which is well known in the art. In this case, a resistance, marked $R^{17}$ in my drawings, with a small condenser $C^{24}$, is interposed between the plate P of one vacuum tube, and the grid G of the next following tube.

Both these forms of coupling are well known and widely used in the art. Each of them is used more or less in my work and in my drawings. Other means of coupling also are known, and any means of coupling that is suitable for the purpose may be used.

In Fig. 19, the musicians who sing or play, are located in the room 11, with the microphone or electrical pick-up $m$, as before stated, and the control operator is located in the control room 10. 1 is my speaker chair in which the control operator sits, and 4, 4, are the horns belonging to my said speaker chair, as before described in connection with Figs. 7 to 17; the bells of these horns are located on opposite sides of the head of the control operator, in proximity to his two ears respectively, when he sits in my speaker chair 1, as has been before illustrated and described, in connection with Figs. 1 to 17F. The telephonic receivers or units 12, 12, connected with my soft-speaker horns 4, 4, (to which the control operator, in the room 10, listens) are fed with electrical vibrations corresponding to the music that is being broadcast by a radio receiving station 355 (shown symbolically in Fig. 19) whose receiving apparatus is, preferably, as nearly as practicable, exactly the same as those to which the subscribers listen on their several premises. Also, the soft-speakers 12, 4, 12, 4, seen at the right in the control room 10, but which preferably are, in fact attached to the control-operator's chair, as shown, also, in Fig. 19, and in preceding figures, are made to be as nearly as practicable exactly the same, electrically and acoustically, as the soft speakers on the subscriber's premises; and they are fed, preferably, in the same way, with the requisite electrical vibrations. But instead of feeding the soft speakers 12, 4, 12, 4, in the control room 10, and to which the control operator listens, with the necessary electrical vibrations (corresponding to the music or speech that is being broadcast) by means of a radio receiving device 355, as shown symbolically in Fig. 19, said soft speakers (to which the control operator listens) may be fed with the necessary electrical vibrations from the high-power amplifier, a mode of working which is often used in the radio art, and which is shown in my Fig. 22, in connection with the distributing of music over wires.

28 is the controlling lever (see, also, Fig. 20) by which the control-operator operates the rheostat $R^4$, which is shown schematically in Fig. 19, bridged in potentiometer fashion across the terminals of the transformer $t'$. By this rheostat, the control-operator varies, at will, the loudness of the sounds given off by the broadcasting apparatus. The alternating electric currents of audio-frequency from the secondary circuit $6^e$ of the microphone $m$, in Fig. 19, pass, preferably, through a high-pass wave-filter 640, to the grid G of the audio-frequency amplifying vacuum tube $v'$. The plate of this tube $v'$ is connected by a resistance coupling $R^{17}$, $C^{24}$, with the grid G of the tube $v^2$; and the plate circuit of this tube $v^2$ is connected by a transformer coupling (having the primary winding $6^d$ and the secondary winding $6^e$) with the grid G of the tube $v^3$; and the rheostat $R^4$, which the control operator manipulates by the lever 28, or otherwise, (seen in Figs. 19 and 20) is bridged across the secondary winding $6^e$ of the transformer $t'$, as shown in the drawings.

The vacuum tube $v^3$, in Fig. 19, is connected by a transformer coupling $6^d$, $6^e$, or other suitable coupling, with the grid G of the audio-frequency amplifying tube $v^{1a}$, which belongs to the broadcasting apparatus. The plate P of said tube $v^{1a}$ is connected with the grid G of the audio-frequency amplifying tube $v^{2a}$ by the resistance coupling $R^{17}$, $C^{24}$; and the plate circuit of the tube $v^{2a}$ is connected in like manner (by a resistance coupling $R^{17}$, $C^{24}$) with the grid G of the vacuum tube $v^{3a}$, belonging to the modulator. This tube $v^{3a}$, in turn, is connected in series with the vacuum tube $v^{4a}$, the plate or anode P of the tube $v^{3a}$ being connected by the wire 507 with the filament F of the tube $v^{4a}$; and the plate of this tube, $v^{4a}$, is connected through the transformer primary 395, and the high-voltage direct-current source $B^5$ with the filament F of the tube $v^{3a}$. Usual accessories, such as the tuning condensers, couplings to connect the vacuum tubes, and the A, B and C direct-current sources are provided, for all the vacuum tubes shown in my drawings ($v'$ to $v^{4a}$) in Fig. 19, according to approved practice in the art, and as indicated schematically in my drawings.

The vacuum tubes $v^{3a}$ and $v^{4a}$, with their accessory and associated parts, constitute a modulator; for these two tubes are connected in series, as indicated in the drawings, and before described; and electrical vibrations from the microphone $m$ in the musicians' room 11, amplified by the action of the audio-frequency amplifying tubes $v'$, $v^2$, $v^3$, $v^{1a}$, and $v^{2a}$, are applied to the grid G of the tube $v^{3a}$; and electrical vibrations of carrier frequency, (that is, of the frequency or wave-length on which the broadcasting station operates) are applied by the oscillator 343, through the transformer $t$ or otherwise, to the grid G of the vacuum tube $v^{4a}$. The result of all this is that the high-frequency vibrations, or carrier-frequency vibrations, from the oscillator 343, are modulated by the audio-frequency vibrations, coming from the microphone $m$ in the room 11 to the grid G of the tube $v^{3a}$. And it is these modulated vibrations that are thrown off into space by the broadcasting aerial 340. The modulator above described, is the series-connected modulator of Mr. Heising, described in the Letters Patent of the United States to him, No. 1,137,315, dated April 27, 1915. But any other modulator that is suitable for the purpose may be used instead of it.

In those cases, if any there be, in which it is commercially practicable to distribute music by radio, solely for soft-speakers, I consider it preferable that the soft-speakers 12, 4, 12, 4, to which the control-operator listens at the central station, and the soft-speakers to which the subscriber listens, each in his own house, be made to be, as nearly as practicable, alike, both electrically and acoustically. But in most cases, if not in all, the same broadcasting station will doubtless serve loud-speakers as well as soft-speakers, and so cannot well be adapted solely to the soft-speakers. The subject matter of electrical speakers and of adapting central station speakers to the local speakers on the subscribers' premises, making them similar, and otherwise adapting them to work together advantageously, is not claimed by me in this application, for it is disclosed more at length and in much greater detail in my prior applications, D/129 and D/125, in which it is claimed.

The controlling rheostat $R^4$, shown in Fig. 19, may be of any sort or kind whatever that is suitable for the purpose. One convenient arrangement (but only one) is to bridge the rheostat $R^4$ in potentiometer fashion, across the secondary $6^e$ of the transformer $t'$, as before described; and one convenient means for controlling this rheostat $R^4$ is shown, as before said, in Fig. 20; in which 28 is a lever mounted on the shaft $28^a$, near the center of said lever 28, by means of the mounting piece $28^d$, which is attached by screws $28^e$ to the balanced lever 28. This mounting-piece $28^d$ is split on one side of the shaft $28^a$, and a screw $28^f$ serves to tighten said mounting-piece on the shaft $28^a$ in any position desired.

$28^b$ is an arm attached fast by brazing or otherwise, to the shaft $28^a$; and $28^c$ is a link which connects the arm $28^b$ with the rheostat lever 85, which is centered at $85^a$, and has a covering of silver or other non-oxidizing material, $85^b$. This cover serves to make contact with one or more of the rheostat springs 84, 84, which are mounted on different levels, so that the contact lever 85, when its left-hand end is pressed down by the link $28^c$, rises on the right-hand side of the center, and makes connection, first with one and then with another of the contact springs 84, thereby short-circuiting in succession the various resistance sections R, R.

As shown in Fig. 18D, these resistance sections are connected in parallel, but they may, according to well-known practice, be connected in series.

The rheostat shown in Fig. 20 is one form of rheostat that may be used, but other forms of rheostat are well known and widely used, so that I need not describe them; and any form of rheostat that is suitable for the purpose may be used.

Turning now to Fig. 21, this shows schematically one form of radio receiving device, connected with my soft speakers 12, 4, 12, 4, which, preferably, are mounted as before described, on my easy chair 1. Radio receiving devices, as is well known, are of many kinds, and may be very simple or very complex, according to circumstances. Any radio receiving device that is suitable for the purpose may be used. That shown in Fig. 21 has a receiving antenna 341, which may be of any suitable type. It may be of the outdoor type, with the ground connection 351, or it may be of the loop type, which is also well known and widely used in the radio art. In addition to the receiving antenna 341, there are, also preferably, in the radio receiving apparatus of Fig. 21, the following, namely:

(a) One or more radio-frequency-amplifying vacuum tubes; two are shown in the drawing, marked $v'$, $v^2$, but a greater or less number may be used.

(b) A detector tube, marked $v^3$ in the drawings, and preferably provided with the usual blocking condenser $C^{24}$, the grid-leak 398, and the by-pass condenser $C^{35}$.

(c) One or more audio-frequency amplifying tubes; three such tubes marked $v^4$, $v^5$ and $v^6$ are shown in Fig. 21, but a greater or less number may be used, as is well known. In Fig. 21, I connect the tube $v'$ with the tube $v^2$, and the tube $v^2$ with the detector tube $v^3$ by transformer couplings; and I connect the detector tube $v^3$ with the tube $v^4$ and the tube $v^4$ with the tube $v^5$, and the tube $v^5$ with the out-put tube or power-tube $v^6$, by resistance couplings, that is, by the resistance $R^{17}$ in shunt, and the blocking condenser $C^{24}$ in series with the conductor that connects the plate P of one tube with the grid G of the next-following tube.

In many cases, one of the audio-frequency amplifying tubes may be omitted, and in some cases, perhaps more than one. But all these are questions of judgment and skill in the art, which are well understood now by persons versed in the science and art of radio.

Usual accessories and associated parts for the various tubes (as $v'$ to $v^6$) are furnished, as shown in the drawings, Fig. 21, and according to approved practice, such as the tuning-condenser $C^{22}$ in the antenna circuit; the tuning-condensers $C^{23}$, $C^{23}$ connected between the grid and the filament, in connection with the tubes $v'$, $v^2$ and $v^3$; the blocking-condenser $C^{24}$, the grid-leak 398 and the by-pass condenser $C^{35}$ for the detector tube $v^3$; the coupling resistance $R^{17}$, and the blocking-condenser $C^{24}$, for connecting the plate of one tube with the grid of the next following tube; the high-resistance leak $R^2$, connecting the grid G of a tube with its filament F; the filament-controlling rheostats $R^3$, $R^3$; the rheostat $R^{3a}$, which governs the action of the A battery on all the filaments; the rheostat $R^{4a}$ which governs the action of the space-current source B on all the plates, P, P; the switch $s$, by which the circuit of the A-battery is opened, when required; and so on. When the circuit of the A-battery is open, the ohmic resistance of the vacuum tubes is enormously high, so that the circuit of the B-source is practically open, also.

In the drawings, I show schematically, in various places, the direct-current source A, for heating the filaments; the direct-current source B for supplying the necessary voltage to the plates; the grid-negatizing batteries, C, C, et cetera. Now, any suitable direct-current source may be used for any of these. Primary batteries or storage-batteries may be used for the A, B and C sources; or direct-current dynamos may be used; or those rectifying devices, combined with wave-filters, which are well known in the art and widely used, under the name of battery eliminators. All these things are matters of common knowledge in the art, so that a reference to them will be sufficient, without any further detailed description of them. Also, suitable heater-tubes may be used, according to approved practice, thereby eliminating the A-battery. Screen-grid tubes may well be used, and are, indeed, now largely used in the art.

With the radio-receiving apparatus of Fig. 21, the radio waves, which are picked up by the receiving antenna 341, are passed on by the radio-frequency amplifying tubes $v'$, $v^2$, in a more or less amplified form to the detector tube $v^3$, and by this the currents of audio-frequency are separated from the carrier-current, and are passed on to the audio-frequency amplifying tubes $v^4$, $v^5$, et cetera, by which the alternating currents, corresponding to sound, are sufficiently amplified and are passed to my soft speakers 12, 4, 12, 4, by which the electrical currents corresponding to sound are translated into audible aerial vibrations.

Instead of transmitting music by radio through space, it may be transmitted by radio over wires. This process, in its essentials, is so much like that of radio through space that a detailed description of it here is thought to be unnecessary for our present purpose.

Also, instead of distributing music by radio through space or over wires, music may be distributed over wires, at audio frequency. One apparatus for this purpose is shown in Figs. 22, 23 and 24 which have been briefly described above.

Referring first to Fig. 22, in this, the musicians' room 11, and the control room 10, with the devices belonging to them, are very much the same as before described, in connection with Fig. 19, but four of the audio-frequency vibration-amplifying tubes ($v^1$, $v^2$, $v^3$ and $v^4$) are provided, in Fig. 22, and the last of these feeds the power tube $v^5$, and this power tube, by the wires 500, 500, feeds the principal mains $6^h$, $6^h$, to which the district mains $7^a$, $7^a$, are connected by the switches $7^d$ and the fuses $7^c$. With the district mains $7^a$, local mains or branch mains $7^b$, $7^b$, are connected through the switches $7^e$ and fuses $7^c$. And other branch mains $7^{ba}$, $7^{ba}$, are preferably, connected in many cases, transverse to the local mains $7^b$, $7^b$, as indicated schematically in Fig. 22. And with these local mains $7^b$, or with the lines $7^{ba}$, $7^{ba}$ or $7^a$, the subscribers' instruments 606, 606, preferably, are connected. Thus a territory of considerable size may easily be supplied from one central station.

In Fig. 22, the subscribers' instruments are shown schematically or symbolically by the parts marked 606.

Fig. 23 is a schematic view, which shows more in detail the electrical connections from the distributing wires $6^h$, $6^h$, to the subscribers' soft speakers 12, 4, 12, 4, which preferably are attached to an easy chair $1^e$, as before described in connection with Figs. 1 to 17; but my soft speakers may be otherwise suitably supported, as shown, for example, in Figs. 13 to 14A.

With the apparatus of Fig. 23, as before stated, the energy to operate the sound-producing devices or soft speakers 12, 4, 12, 4, is supplied over the distributing wires $6^h$, $7^a$, $7^b$, et cetera; but with the apparatus shown schematically in Fig. 24, an audio-frequency amplifying device, preferably, one of the vacuum tube variety, is supplied on the premises of the subscriber; and the grid G of this device is fed from the distributing wire $7^a$ or $7^b$ or $7^{ba}$, Fig. 22. With the apparatus of Fig. 24, it is sufficient to distribute a very small amount of energy, which may be done over small wires and at low voltages; and the amplifying device on the subscriber's premises increases, as before said, the energy thus received to a sufficient amount to operate my soft speakers 12, 4, 12, 4, satisfactorily.

In Fig. 24, the amplifying device consists of a single vacuum tube, $v$, whose grid G is fed from the receiving wires $7^b$, $7^b$, when the switch s is closed, while the plate circuit of the said tube feeds my soft speakers 12, 4, 12, 4, as shown in the drawings. But a greater number of vacuum tubes than one may be used, if desired; that is, more than one stage of amplification may be used, if desired.

*My soft speakers and my speaker chair combined with a phonograph, so as to receive speech or music electrically from the same*

The brief description of Figs. 25 to 25F before given, may well be re-read at this point. In these figures—

530 is a disk phonograph record for speech or music, or in a proper case, for both speech and music. Such records are well known and widely used in the art, so that I need not explain them here.

531 is a turntable on which the disk 530 is mounted.

532 is the shaft (usually standing vertically) by which the turntable 531 is supported.

533 is a horizontal shaft for driving the vertical shaft 532, with the turntable 531 and the record 530. Said shaft 533 may be driven by a spring motor, which is a common practice in the art, or by a small electric motor, which is also common practice; or it may be driven in any other suitable manner. The driving mechanism (which forms no part of my invention) is not shown in the drawings, but suitable driving mechanisms, as before said, are well known and widely used in the art, and any driving mechanism that is suitable for the purpose may, as before said, be used.

534, 534 are mitre gears, for connecting the driving shaft 533 with the vertical shaft 532, which supports the turn-table 531.

538 is the tone-arm which, as commonly constructed, is pivoted at one end (which is broken away in some of the figures) and at the other or free end, has a diaphram 535, connected with it. This diaphram is firmly clamped between two rings, 536 and 536$^a$, which are held together by screws, 536$^b$. A ring, 537, of bakelite or other suitable material, is attached by screws 537$^a$ to a metal ring 536$^a$ aforesaid; and the bakelite ring 537 serves to connect the diaphram-holding rings (536 and 536$^a$) with the tone-arm 538.

540 is the needle which engages with the spiral groove or sound-track of the phonograph record 530.

541 is the needle-holder.

541$^a$ is the pivot or center of said needle-holder.

541$^b$, 541$^b$, are pointed screws, by which the center shaft 541$^a$ of the needle-holder 541 is mounted; best seen in Figs. 25A and 25B. The screws 541$^b$ are set in bosses or projections 536$^c$, formed on the diaphram supporting ring 536. But the needle-holder may be mounted in any other manner that is suitable for the purpose.

541$^c$, 541$^c$ are lock-nuts by which the center screws 541$^b$, 541$^b$ are locked each in the position required.

541$^d$ is a screw for clamping the needle 540 in its place in the needle-holder 541.

542 is an armature of soft iron, or other suitable material, which is attached to the free end of the needle-holder 541, and so is vibrated by the needle 540, under the influence of the record 530.

Attached to the armature 542 in a suitable manner, is a small screw 543, which passes through the needle-holder 541, and the diaphragm 535, and is held tightly against these by the nut 543$^a$; best seen in Fig. 25C.

The result of the construction above described, is that the vibrations of the phonograph needle 540, received from the sound-track or groove of the record 530, are transmitted by the needle-holder 541 to the armature 542, and to the diaphragm 535. A support or standard 544, which may be shaped as shown in Figs. 25, 25A and 25C, or in any other suitable manner, is attached by screws 544$^a$ to the diaphragm-supporting ring 536.

A permanent magnet 545, of cobalt-tungsten steel, or of any other suitable magnetic material, is supported by the standard 544, as shown in Figs. 25, 25C and 25D. Preferably, said magnet 545 is made of a little larger diameter at its outer end, and is screw-threaded there; and this screw-threaded part passes into the support 544, and engages with the corresponding female thread, formed in the same. Thus, by turning the magnet 545 around in its support 544, its position with relation to the diaphragm 535 and the armature 542 (attached to the needle-holder 541 and diaphragm 535) is regulated at will. And the locknut 546 serves to hold the magnet 545 in whatever position may be desired, with relation to its armature 542. In order to more conveniently turn said magnet 545 for the purpose of adjusting it in its support 544, the outer end of said magnet 545 (marked 545a) is made to be square, or is otherwise suitably shaped for engagement with a key, wrench or tool, by which it is engaged, when it is desired to adjust it.

At its other end, near to the armature 542, a soft iron pole-piece 545b is attached to the permanent magnet 545. Surrounding this pole-piece 545b is a coil 547 of fine, insulated copper wire, which feeds the grid G of the audio-frequency vacuum-tube amplifier, belonging to my apparatus, seen in Fig. 25.

In order to facilitate adjustment of the magnet 545, with its soft iron pole-piece 545b, without disturbing the coil 547 and its leading-out wires, said coil or armature winding 547 may be wound on a tube or spool 548 of bakelite or other suitable insulating material (or of German silver, slotted lengthwise) and this spool 548 is attached by screws 548a to the inner face of the supporting-piece 544; best seen in Fig. 25c.

By the apparatus above described, the vibrations of the phonograph needle 540, received from the record 530, are communicated to the needle-holder 541, and armature 542; and the vibrations of said armature, in proximity to the soft iron pole-piece 545b of the magnet 545, produce electrical currents in the coil 547 and in the input circuit 354 of the audio-frequency amplifying device, which correspond to the sounds, whether of speech or of music, or of both of these, that are recorded in the phonograph record 530.

The soft-speakers 12, 4, 12, 4, shown in Figs. 25, 25D and 25E, are preferably attached to my speaker chair 1, as before described, and illustrated in Figs 1 to 17, and in Figs. 43 to 46A; but my soft-speakers, when used with the phonograph, may be mounted in some other way, as shown, for example, in Figs. 13 to 14A. In either case, my soft-speakers speak directly into the two ears respectively of the listener, so that he hears with comfortable loudness, the sound of the phonograph, while very little sound is made in the room to disturb any other person.

The brief descriptions of Figs. 25D and 25E before given, may well be re-read at this point.

In the apparatus of Fig. 25D, the coil of fine insulated copper wire 547, which is wound around the soft iron pole-piece 545b, of the magnet 545, and is located in proximity to the soft iron armature 542, which is vibrated by the phonograph needle 540 through the needle-holder 541—this coil, in the apparatus of Fig. 25D, is connected directly with my soft speakers 12, 4, 12, 4, instead of being connected with them through a vacuum-tube audio-frequency amplifying device, as shown in Fig. 25 and before described.

Another modification of my phonographic apparatus, combined with my soft-speakers, is shown in Fig. 25E, which is adapted to give a louder sound than the apparatus of Fig. 25D, but not so loud as that of Fig. 25, and without the expense of a vacuum-tube amplifying device. In Fig. 25E, a microphone 550 or m, of the type that operates with carbon or other suitable sound-sensitive material 551, is carried by the tone-arm 538 of the phonograph; the diaphragm 558 of this microphone (or the other means for acting on its carbon cell) is actuated by the phonograph needle 540, through the needle-holder 541; and the secondary circuit 6e of the microphone 550 is connected with my soft speakers 12, 4, 12, 4, which, preferably, are attached to my speaker chair, as illustrated in Figs. 1 to 12A, and 15 to 17F, and 43 to 46A, and before described; but they may be otherwise suitably mounted, as illustrated, for example, in Figs. 13 to 14A.

Considering, first, Figs. 25E and 25F, in these, 552 is the front wall of the microphone, and 553 is the back of the same, which is attached to the tone-arm 538 by the ring 537 and the screws 537b, or in any other suitable manner. This microphone is, preferably, of the solid-back type, invented by Mr. A. C. White, and described in Letters Patent of the United States to him, No. 485,311, dated November 1, 1892; this microphone with slight modifications, is well known and widely used in the art. The essential matter in my apparatus, is that the sound-track in the record 530 and the needle 540 of the phonograph, through the needleholder 541, by their vibrations, affect the carbon or other material sensitive to sound, marked 551, in the primary circuit of the microphone 550; and the secondary windings 6e of said microphone is connected with my soft-speakers 12, 4, 12, 4.

554 is one electrode (the front or movable electrode) of the carbon cell; and 555 is the other electrode—the fixed electrode—of said cell. Between these electrodes, granular carbon, 551, suitable for the purpose, is filled in, in the usual manner, ond is held in place by the front and back electrodes, 554 and 555, and by the cell wall, 556. A battery b has its opposite poles connected respectively with the electrodes 554 and 555 of the carbon cell. The primary winding 6d of an induction coil or transformer t is inserted in series with the battery b, and the electrodes 554 and 555, between which the sound-sensitive carbon 551, lies. The secondary winding 6e of this transformer is connected with my soft-speakers 12, 4, 12, 4, which, in this case, as in others, are preferably mounted on my speaker chair, as before described in connection with Figs. 1 to 12A and 15 to 17F and 43 to 46A. But said soft-speakers may be otherwise suitably mounted, as shown, for example, in Figs. 13 to 14A The needle-holder 541 (which is vibrated by the action of the sound-record 530 on the needle 540) is connected by the bolt or screw 557, and the nuts 557a, with the aluminum diaphragm 558, and with the front electrode 554 of the carbon cell. The result of this is that the vibrations, corresponding to sound, which the sound track in the record disk 530 imparts to the phonograph needle 540, and needle-holder 541, are communicated to the movable electrode 554 and to the sound-sensitive carbon 551, which lies between it and the fixed electrode 555; the resistance of the carbon 551, in circuit with the battery b and primary winding 6d of the transformer t is altered, by the sound vibrations, in the phonograph record 530; and corresponding electrical vibrations of greater voltage are produced in the secondary winding 6e of the transformer t; and from this secondary winding, they are passed to my soft-speakers 12, 4, 12, 4, and so to the ears of the listener, whose head is situated between the two soft-speakers last mentioned, as before described in connection with Figs. 1 to 17$^F$.

*The phonograph for feeding my soft-speakers may be mounted in any suitable position, but preferably it is mounted on my speaker-chair*

My phonograph, connected electrically with my soft-speakers 12, 4, 12, 4, as shown in Figs. 25 to 25$^F$, and also in Figs. 32 and 33, may be mounted in any suitable location. It may be mounted on a table, shelf or other support, but for some purposes, it is convenient and preferable to mount it on my speaker chair. It may be mounted on the speaker chair in any suitable fashion, but preferably it is connected with the upper part or seat-part 1$^b$. One convenient arrangement for this purpose is to connect with the seat and with one of the arms 1$^e$ of my speaker chair, a shelf or extension, 1$^{ea}$, which, preferably, is supported by the brackets 570, 570, which are attached to the vertical member 571; and this, in turn, is attached to the arm 1$^e$ and (by the part 572) to the corresponding side-bar 1$^1$ of my speaker chair. The vertical member 571 may be of hard wood or of metal, and is attached, as before said, to one of the arms 1$^e$, say to the left arm, of my speaker chair, and also it is attached by the block or filler 572 of hard wood, to the side bar 1$^1$. On the shelf 1$^{ea}$, which is supported by the brackets 570, 570, as before described (or in any other suitable manner) the phonograph, with its record-disk 530, and turn-table 531, its motor 560 for driving said turn-table and record-disk, and the tone-arm 538*, are mounted. This construction is illustrated in Figs. 43 to 45. The diaphragm of the phonograph (marked 535 in the form of apparatus shown in Figs. 25 to 25$^D$, and also in Fig. 32, but marked 558 in the form of apparatus shown in Figs. 25$^E$, 25$^F$ and 33) is connected electrically with my soft-speakers in the manner before fully described, and shown in Figs. 25 to 25$^F$, 32 and 33; and therefore needs no further description at this place. The motor 560, for driving the turn-table and record-disk, which motor is shown schematically only, in the drawings, may be of any suitable type, either of the spring-motor type, or of the electric-motor type, or of any other type that is suitable for the purpose. Spring motors and electric motors for the phonograph are well known and widely used in the art, so it is unnecessary to describe the motor in detail. Any usual and approved details of construction may be used in the phonograph, attached to my speaker chair, as shown in Figs. 43 to 45. These figures are not intended to illustrate a novel type of phonograph, beyond what is shown in my Figs. 25 to 25$^F$, 32 and 33, but only to illustrate the fact that the phonograph that feeds my soft-speakers electrically, is, preferably attached to my speaker chair.

In the apparatus of Figs. 43 to 45, the phonograph that feeds my soft-speakers 12, 4, 12, 4, is attached to my speaker-chair, say to the shelf 1$^{ea}$ thereof, on one side; preferably, a rheostat for controlling the loudness of the sounds produced by the phonograph, in my soft-speakers, is attached to the other side of my speaker chair, as shown in Figs. 37 to 42 (and also in Figs. 43 and 45) and before described.

There are advantages in the electrical phonograph which are well known, and which I need not detail here. It is possible, however, to omit the electrical features of the phonograph (such as the magnet 545, 545$^b$ and 547, in the apparatus of Figs. 25 to 25$^D$ and 32, or the carbon cell, battery b and transformer t, et cetera, in the apparatus of Figs. 25$^E$, 25$^F$ and 33) and to connect the tone-arm 538* by flexible rubber tubes, or by any other suitable means, acoustically, with the small ends of my horns 4, 4, which, preferably, are mounted on my speaker chair, and located with their bells in proximity to the two ears of the listener, as before described. This is shown schematically in Figs. 46 and 46$^A$, in which the tone-arm 538* is shown, connected with my soft-speakers 12, 4, 12, 4, by the soft-rubber tubes 562, 563 and 563*, and the rest of the apparatus—the rest of the phonograph and of the speaker chair, which have been fully illustrated and described hereinbefore, are omitted from the schematic drawing, Fig. 46; they are to be understood from the earlier figures, in which they have been shown; and also from Fig. 46$^A$.

To facilitate the acoustic connection between the tone-arm 538* and the rubber tube 562 (which, by its branches 563 and 563*, connects with the soft-speakers 12, 4, 12, 4, belonging to my speaker chair) I preferably provide a connecting piece of brass or other suitable material, marked 562$^a$, which is mounted concentrically with the tone-arm 538*; seen in Figs. 46 and 46$^A$. This result is effected with the details of construction shown in Fig. 46 (which, however, may be altered within wide limits, if desired) by providing a steel shaft 562$^b$, which is set fast in the connecting piece 562$^a$, and which has sharpened ends, which are hardened or case-hardened; and the lower one of these is set in a center hole drilled for it in the upper end of the shaft 538$^a$, which forms the pivot or center of the tone-arm 538*. The upper end of the center shaft 562$^b$ is mounted in a brass or bronze adjusting screw 538$^e$, and the lock-nut 538$^f$ is furnished to lock this screw in whatever position it may be set. Thus, when the tone-arm 538* swings more or less, as the needle 540 follows the sound-groove in the record 530 (see Figs. 25 to 25$^F$), the pivot-rod 562$^b$ for the connecting piece 562$^a$ permits this movement of the tone-arm, while the connecting piece 562$^a$ stands still. The rear end or pivot-end of the tone-arm 538* connects acoustically with the interior of the connecting piece 562$^a$, and this connects acoustically with the interior of the soft-rubber tube 562, which, in turn, connects acoustically with the branching tubes 563 and 563*, and these connect acoustically respectively with the small ends of the two soft-speaker horns 4, 4, as shown clearly in Fig. 46.

For greater convenience of the listener, I preferably attach to my speaker-chair, when this is used with a phonograph, as shown in Figs. 43 to 56, a record-holder or record-case 565, provided with pockets or compartments, 565$^a$, in each of which a plurality of phonograph records, 530, 530, may be placed, so that a listener, seated in my speaker-chair, can change from time to time, when desired, the phonograph record to which he is listening, without leaving the chair.

*My dictation chair for the person who dictates, combined with a speaker chair for the typewriter operator, who hears the dictation from my soft-speakers and writes it directly upon the typewriter*

It is often desirable to dictate directly to a typewriter operator, who writes on the machine, instead of in his note-book; but the noise of the machine makes the dictation more difficult, and in those very frequent cases in which a number of persons work in the same room, the dictating by a plurality of them, each to a typewriter, is almost or quite impracticable, on account of the noise of the several machines, and the conflicting voices of the several dictators. But with the apparatus which I have contrived, and which is illustrated in Figs. 26 to 28$^N$, each dictator can dictate in a low voice into a microphone which I mount in proximity to his mouth, and preferably on the chair in which he sits, and this is connected electrically with my soft-speakers on another chair, in which the typewriter operator sits, in a position to operate her typewriter. This will be more readily understood from the drawings, of which—

Fig. 26 shows a microphone $m$ into which the dictator dictates, connected through the transformer $t$ and the circuit $6^e$ to feed a pair of my soft-speakers 12, 4, 12, 4, which preferably are mounted on the speaker chair before described, in which the typewriter operator sits to take the dictation, and to operate her typewriter at the same time.

In the perspective view, Fig. 26$^A$, the person dictating is seen seated in my dictation chair, dictating to the microphone $m$, and the typewriter operator is seen, seated in her speaker chair, listening to the dictation conveyed electrically from the microphone $m$ to her soft-speakers 12, 4, 12, 4, and writing the matter thus dictated simultaneously on her typewriter.

My dictating chair may be provided with soft-speakers 12, 4, 12, 4, of any of the types illustrated in Figs. 1 to 12$^A$ or 15 to 17$^F$, or of any other suitable type; or these soft-speakers may be omitted from the dictating chair. They are illustrated in the schematic drawings, Fig. 26$^B$, which differs from Fig. 26 in that it shows two pairs of my soft-speakers 12, 4, 12, 4, one of which is to be understood as mounted on the dictation chair, in which the person dictating sits, and the other on the soft-speaker chair, in which the typewriter operator sits; in each case, they are so mounted in one of the ways before described in connection with Figs. 1 to 12$^A$, and 15 to 17$^F$.

It is an advantage of the apparatus illustrated in Fig. 26$^B$, in which soft-speakers are provided on the dictation chair, as well as on the typewriter operator's speaker chair, that the person dictating hears his own electrical voice just as the typewriter operator hears it, and knows just how loud his electrical voice is, and can make it more or less loud, as he may wish. On the other hand, the apparatus of Fig. 26$^B$ is somewhat more expensive than that of Fig. 26.

Fig. 27 illustrates an arrangement, similar to that of Fig. 26 save that an audio-frequency amplifying vacuum-tube $v$, with the usual accessories, is provided, by which a very soft voice is made sufficient to produce as loud an effect as may be desired, in the soft-speakers 12, 4, 12, 4, which are fed from the plate circuit or output circuit of said vacuum-tube $v$.

Figs. 28 to 28$^M$ illustrate one convenient means for mounting the microphone $m$, into which the dictator, seated in his easy chair, dictates, and for adjusting the same practically instantly to any position which he may desire, with relation to his mouth, while seated in my dictating chair, and also for moving said microphone out of the way, when he wishes to enter or leave the chair, or when he has no use for said microphone. The brief description of Figs. 28 to 28$^M$ before given may well be re-read at this place. In Figs. 28 and 28$^B$, one of the arms $1^e$ of my chair, before described, with reference to Figs. 1, 2 and 3, is also shown, and in Fig. 28$^K$, a part of one of said arms $1^e$ is shown and also a part of the seat of my chair is shown, and the rest of said chair is broken away, for lack of space on the sheet; but the whole chair, as before illustrated and described (for example, in Figs. 1, 2 and 3) is to be understood from the parts thus shown.

In Figs. 28 to 28$^M$, 65 is a casting which is fastened by screws 65$^a$ to one of the arms $1^e$ of my easy chair, before described in connection with Figs. 1 to 3, and other figures; and this casting 65, preferably, is provided with an arm or downward extension 65$^b$, which (although broken off in Figs. 28 and 28$^F$) extends down to and is screwed fast to, one of the side-bars $1^1$ of the seat of my chair; best seen in Fig. 28$^K$.

A shaft 66 is attached fast to the casting 65. This attachment may be made by means of the bolt 66$^a$, which passes through the shaft 66 into the casting 65, and is set tight, so as hold said shaft 66 firmly in engagement with said casting 65; see Figs. 28, 28$^F$ and 28$^L$.

The microphone $m$ is mounted (adjustably, as described below) at the end of the arm 67. This arm may be made of a steel bar, as shown in cross section in Fig. 28$^E$, but it may be made in any other suitable manner. The arm 67 serves both to mount the microphone mechanically, and also as a support or housing for the wires that feed it; that is, the wires, $m^2$, by which the battery $b$ is connected with the loose-joint carbon or sensitive carbon of the microphone. The long arm 67 is attached to a shorter arm 68 by means of a shoulder screw 69, which passes through a hole in the bar 67, and is set tight in the bar 68. Also, another bolt, 70, passes through the slot 67$^c$, in the mounting piece 67, and is set fast in the shorter mounting piece 68, and held in place therein by the lock-nuts 70$^a$, 70$^a$.

A spring plate 71, which is seen in Figs. 28, 28$^A$ and 28$^D$, is attached to the parts 67 and 68, by the bolts 69 and 72. The front end of this spring plate is just under the washer 73, which itself is just under the head of the bolt 70. The mounting pieces 67 and 68, with their connections before described, and particularly the spring plate 71, adjustable by means of the bolt 70 and its lock nuts 70$^a$, 70$^a$, serve to mount the microphone in such a manner that it readily swings into a central position, in front of the mouth of a person seated in my chair before described, and yet is easily swung out of this position, turning on the rod 66 before described; and also the microphone $m$ at the end of the arm 67 is easily moved a few inches forward or backward, so as to bring it close to the mouth of the dictator, or further off from his mouth, as he may wish. The spring plate 71, it will be observed, is attached fast by the screws or bolts 72 and 69 to the arm 67; and said arm 67, and the spring plate 71, are pivotally connected by the shoulder screw 69 with the arm 68; and the spring plate 71 is compressed more or less by the bolt 70, so that a checking friction is created between the spring plate 71 and the washer 73 on the one hand, and between the arm 67 and the arm 68 on the other hand. And the spring plate 71, arranged in the manner shown in the drawings, so that it moves with the arm 67, in swinging into position, centrally, in front of the mouth of the person dictating, when seated in my chair, permits also a backward and forward movement of the bar 67 and microphone $m$, with relation to the mouth of the person dictating, and also said spring-plate 71 holds the bar 67 in whatever position it may be thrown into.

It does this by reason of the friction before mentioned between the spring plate 71 on the one hand, and the washer 73 on the other, and by reason also of the friction between the bar 67 and the bar 68. And this friction, by suitably adjusting the bolt 70, is made to be sufficient to hold the parts in any position into which they may be thrown by the person seated in the dictating chair.

The shaft 66 is held fast to the casting 65 by the bolt 66$^a$, as shown in Figs. 28$^B$ and 28$^L$; the weight of the microphone $m$, the arm 67, the arm 68 and their accessory parts, is balanced by the counter-weight 75, which is seen in Figs. 28 and 28$^A$, but with the lower part of it broken away, for want of space on the sheet; and a frictional check tending to hold the microphone $m$ and arm 67 in whatever positions from right to left, they may be placed, is created by the friction of the part 68, split below the shaft 66, on said shaft 66; and this friction is made to be greater or less, as required, by adjusting the bolt 68$^a$ which, when properly regulated, is locked in place by the lock-nut 68$^b$; best seen in Fig. 28.

The microphone $m$ is pivotally connected with its supporting arm 67, substantially in the same manner in which microphones in telephone sets are connected with their supporting cases, so that, by tilting the microphone $m$ on its pivot 79, the mouth-piece $m'$ can be raised or lowered somewhat as required. This construction, which is well known and widely used in the art, is shown in Figs. 28$^H$ and 28$^M$, in which—

77 and 77* are lugs, formed on or connected with the case of the microphone $m$.

78 is a central lug or piece, which is attached fast to the arm 67 by brazing, electric welding, or in any other suitable manner. This lug 78, on the arm 67, lies between the lugs 77 and 77*, belonging to the microphone $m$.

79 is a screw, serving as a pivot, which passes through the parts 77, 77* and 78.

80 is a washer on one side of the lug 77*.

81 is a spring washer on the other side of the other lug 77; and 82, 82 are lock-nuts, by which the screw 79 is tightened in any position desired. The screw 79 serves to regulate the bite or frictional pressure of the lugs 77 and 77*, on the central lug 78, and this bite is made sufficient to hold the microphone $m$, in any position up-and-down in which it may be set.

By the various adjustments before described, namely:

(a) The arms 67 and 68 swinging on the shaft 66 as a center;

(b) The spring plate 71 and arm 67, pivotally connected by the shoulder screws 69 with the arm 68; and (c) The lugs 77 and 77* attached to the case of the microphone $m$, and pivoted with a frictional bite, to the lug 78 on the mounting arm 67.

Facility is afforded to a person seated in my dictation chair—

(a) To regulate the position of the microphone with relation to his mouth, in a right and left direction, the arm 67 swinging on the shaft 66 as a center;

(b) To regulate the position of the microphone $m$ from front to back with relation to the mouth of the person dictating, the microphone $m$, arm 67 and spring plate 71 swinging on the shoulder screw 69 as a center; and (c) To regulate the position of the mouth-piece $m'$ of the microphone $m$ up and down with relation to the lips of the person dictating, by tilting the microphone on its pivot 79.

The insulated wires $m^2$ for the primary circuit of the microphone $m$ may be led in any suitable manner. One convenient detail is to form a slot in the arm 67 (see Fig. 28$^E$) sufficiently large to hold the wires $m^2$, and to cover this over with a cover-piece 67$^a$, held in place by screws 67$^b$, as seen in Figs. 28 and 28$^E$.

The microphone that I have shown in connection with my dictation chair in Figs. 28 to 28$^M$, is of the usual carbon type in which the sound is picked up electrically, by reason of the varying resistance, with sound-waves, of a circuit in which there is a loose contact between carbon electrodes or other suitable electrodes, which are subjected thru a diaphragm, connected with one of them, to the action of the sound-waves. Carbon is usually used for this purpose and microphones of this type are widely used in the telephonic art, and are usually considered satisfactory. But other forms of sound pick-up may be used instead of a carbon microphone, or indeed, instead of any loose-contact microphone, whether carbon or some other sound-sensitive substance than carbon be employed.

One device of this sort, which is suitable for the purpose, is illustrated schematically in Fig. 28$^N$, and this, except for the mouth-piece 12$^c$ in front of the diaphragm 13, is very similar to the receiving telephone, shown in Figs. 9$^C$ and 9$^D$ and before described; but the mouth-piece 12$^c$ is, preferably, differently shaped as the drawings show, so as to leave the diaphragm 13, more subject to the impingement of aerial vibrations in the space around it, and particularly in the space in front of it. In this figure, the sound pick-up, which is marked as a whole, 12*, is of the inductive variety, in which a diaphragm 13 of soft iron or other ferruginous material, vibrates in proximity to the coils 16, 16, wound on the pole-pieces 15, 15, of an electro-magnet 14. It is, in effect, a reversed telephonic receiver, and is, in substance, the same as the perfected telephone transmitter and receiver, acting inductively, of Alexander Graham Bell. This, when connected directly with an electrical speaker, gives a rather faint sound, but when connected with the speaker through a vacuum-tube amplifier, as shown in my Fig. 28$^N$, it gives a sound of sufficient loudness for my soft-speakers, 12, 4, 12, 4. In this figure, the terminals of the coils 16, 16, (in which electric currents, corresponding to sound, are produced inductively, by the vibrations of the diaphragm 13, in proximity to the pole-pieces 15, 15) are connected, either directly or through a step-up transformer $t$, to the grid G, and to the filament F of the tube $v$ of the audio-frequency vacuum-tube amplifier, and the plate-circuit of this amplifier is connected, through the transformer $t$ or through any other suitable coupling, with my soft-speakers 12, 4, 12, 4, which, as before said, are preferably attached to my speaker chair, as shown in Figs. 1 to 12$^A$, and 15 to 17$^F$, but which may be otherwise mounted, as before described in connection with Figs. 13 to 14.

The electrical sound pick-up shown in Fig. 28$^N$, is a known means of picking up sound electrically, and may be considered in a certain sense as the equivalent of the microphone $m$, shown in other figures. By the term "electrical sound pick-up", I refer to a sound pick-up operating by means of a loose contact, as the carbon microphone does, or operating inductively, as the device of Fig. 28ᴺ does, or operating in any other suitable manner; as, for example, the electrostatic sound pickup, which is well known in the art, originally invented by Professor Dolbear, since perfected by Mr. Wente, and manufactured by the Western Electric Company; this type of electrical sound pick-up is now well known in the electrical art, and particularly in the broadcasting art.

In connection with my dictation chair, combined with a chair having soft-speakers connected with it, for the use of the stenographer who takes the dictation, if arms 1ᵉ, 1ᵉ, are provided on my speaker-chair for the stenographer, they should be placed low enough so that they will not be in the way of the stenographer in working; or they may be spaced widely apart, so that they do not interfere with the action of her hands on the typewriter, or said arms 1ᵉ, 1ᵉ may be omitted from the stenographer's chair entirely, and the soft-speakers be supported from the seat of said chair, independently of any chair arms; or said soft-speakers may be supported in any other suitable manner.

A main use of my dictation chair illustrated in Figs. 28 to 28ᴺ, when it is connected with my speaker chair, is to enable the dictator to dictate softly and quietly to an operator, who writes at the same time upon the typewriter; but the dictation chair for the dictator and the speaker chair for the stenographer, may be used in the case, also, in which the stenographer takes down the dictation in short-hand in a note-book. It has this advantage over dictating directly with the mouth to the stenographer, that a very soft voice may be used by the dictator, and indeed, by each of a plurality of dictators, who are dictating in the same room. While, then, my dictation chair for the dictator and my speaker chair for the stenographer are particularly useful in those cases in which the stenographer writes directly on the typewriter, it will be understood that they are useful also in other cases.

In Figs. 25 to 25ᶠ, and also in Figs. 43, 44 and 45, I have shown my phonograph, electrically connected with the soft-speakers, but in Figs. 46 and 46ᴬ, I show the phonograph connected acoustically, and without the aid of any electrical contrivance, with the soft-speakers. And so with my dictation chair, this is conveniently connected electrically with the soft-speakers, which speak into the ears of the stenographer or typewriter operator, who takes the dictation, as illustrated in Figs. 26 to 28ᴺ, but it is practicable also to substitute acoustical connections for the electrical connections before described. This will be understood from Figs. 49 to 54ᴮ.

In this case, instead of the microphone m, mounted on the arm 67, which is pivotally attached to the arm 1ᵉ, of the dictation chair, a mouth-piece mp is mounted on a pneumatic tube 105. This tube is mounted by means of a hollow shaft 106, which is supported by the casting 65*, shown in Figs. 50 to 52, which is quite similar to the casting 65 shown in Figs. 28, 28ᴷ, 28ᶠ and 28ᴸ and before described. And the hollow shaft 106 connects by a brass connecting piece 562ᵃ* with a soft-rubber tube 562; and this tube, in turn, connects by the branching tubes 563 and 563* of soft rubber, with the small ends of my soft-speaker horns 4, 4, on the dictation chair, substantially as illustrated in Figs. 46 and 46ᴬ, in connection with the phonograph, and before described; see Fig. 49. The dictator speaks into the mouth-piece mp of the pneumatic tube, and this mouth-piece, through the vertical tube 105, the section 106 (which is partly vertical and partly horizontal) the connecting piece 562ᵃ*, the tube 562, and the branching tubes 563 and 563ᵃ, connects with the small ends of the soft-speakers 4, 4, whose bells lie in proximity to the ears of the person seated in the stenographer's chair.

A frictional check is applied to the part 106 (Figs. 50, 51, 54 and 54ᴬ) sufficient to hold the pneumatic tube mp, 105, 106, either in a position central to the dictation chair, in front of the mouth of the person seated in said chair, or (when not in use) in a position out of the way, at the side of the chair. This frictional check arises from the pressure or bite exerted on the horizontal shaft-portion (at the right) of the pneumatic tube section 106, by the arms 65ᵈ, 65ᵈ (Figs. 50, 51, 54 and 54ᴬ) when these are tightened on the shaft-part 106, by the bolt 65ᵉ. A male thread on said bolt 65ᵉ engages with a female thread in one of the arms 65ᵈ (the one remote from the head of the bolt 65ᵉ) and by this means the bolt 65ᵉ is made to tighten the arms 65ᵈ on the shaft-part of the casting 106, and the lock-nut 65ᶠ serves to lock said bolt in place.

The casting 106, when properly machined, is mounted in the casting 65*, as shown in Figs. 50 to 54ᴮ; and a frictional check is applied to it, as before described.

The mouth-piece mp (Figs. 49, 50 and 52) has a vertical section or part, mp' (best seen in Figs. 49, 50 and 52) and this fits nicely outside of the tube 105, and moves up and down thereon, so as to adjust the level of the mouth-piece mp to the level of the mouth of the person dictating. And said part mp, with its vertical extension mp', is held in whatever position vertically it may be set, by the friction of the flat spring 107, which is attached to the tube 105 in such a manner that it bears on the mouth-piece, mp, mp'.

A brass connecting-piece 562ᵃ*, fits into the hollow interior of the casting 106 nicely but loosely, and serves to connect the interior of the speaking tube mp, 105, 106, with the interior of the flexible rubber tube 562, which, in turn, by the branching tubes 563 and 563*, of flexible rubber, connects with the small ends of my soft-speaker horns 4, 4, on the stenographer's chair, as before described in connection with Fig. 49.

It will be observed that the pneumatic tube mp, 105, 106, is mounted to move from right to left, in front of the face of a person seated in my dictation chair, by means of the shaft-portion of the casting 106, best seen in Figs. 50, 51 and 54; that its mouth-piece mp is movable vertically, to adjust the height of said mouth-piece to the convenience of the person dictating, by the structure shown in Figs. 50 and 52; that said mouth-piece is attached to one arm and to one side of my speaker chair, as shown in Figs. 50, 53 and 54; and that its interior is connected with the soft-speakers 4, 4, mounted as before illustrated and described, on the chair in which the stenographer taking the dictation sits, as shown schematically in Fig. 49.

*My soft-speakers and loudspeakers, combined with the same receiving apparatus*

One important use of my soft-speakers is to permit one person in a room, house or family, to hear electrical music that is distributed by radio through space or over wires, at radio-frequency or at audio-frequency, with comfortable loudness, without disturbing other persons in the same room or in the same house, or in other houses, Stated otherwise, my soft-speakers and my speaker chair make it practicable for a person to hear music, with comfortable loudness while seated, and without any head-phones or other devices pressed to his ears, or attached to them in any way, and without troubling his neighbors. But while it is often desirable for one person to hear music in a room, it is also desirable, at times, for two or more persons to hear the same music. And it is important to reduce the expense of the apparatus. For this purpose, I have contrived apparatus, such as is illustrated in Figs. 29 to 34.

Considering, first, Fig. 29, this illustrates a radio-receiving apparatus, such as has been already shown in Fig 21. But it differs from that figure (a) in that both soft-speakers 12, 4, 12, 4, and loudspeakers, 12, 4, 12, 4, are provided; and (b) in that means are provided for feeding either the soft-speakers 12, 4, 12, 4, or the loudspeakers 12, 4, 12, 4, as may be desired; and preferably, a relatively large amount of sound-producing energy is applied to my loudspeakers 12, 4, 12, 4, and a relatively small amount of energy is applied to my soft-speakers 12, 4, 12, 4. Stated otherwise, the receiving apparatus shown in Fig. 29, is, up to the power tube $v^6$, an ordinary form of radio-receiving apparatus, having an antenna 341 of any suitable sort, one or more radio-frequency amplifying tubes, as $v'$, $v^2$; a detector tube $v^3$; and one or more audio-frequency amplifying tubes, as $v^4$, $v^5$, $v^6$; but a greater or less number of these tubes may be used, according to the circumstances of the case. And both soft-speakers, 12, 4, 12, 4, and loudspeakers, 12, 4, 12, 4, are provided; and the last tube—the power tube or out-put tube, $v^6$, in Fig. 29—is arranged to feed either the soft-speakers 12, 4, 12, 4, with a small voltage, or the loudspeakers, 12, 4, 12, 4, with very much higher voltage. The soft-speakers 12, 4, 12, 4, are preferably mounted on my speaker chair in a suitable manner, as before described in connection with Figs. 1 to 12ᴬ and 15 to 17; but they may be mounted in some other suitable manner, as illustrated, for example, in Figs. 13 and 14. With the exact details shown in Fig. 29, which however, may be altered within wide limits, if desired, the soft-speakers and the loudspeakers are both fed from the same radio receiving set, by connecting the plate-circuit of the output tube $v^6$ with the soft-speakers 12, 4, 12, 4, and with the loudspeakers 12, 4, 12, 4, by a transformer coupling, which, preferably, is provided with two secondary windings, namely (a) a secondary winding 6ᵉ, having a relatively large number of turns, which is connected to feed the loudspeakers 12, 4, 12, 4; and (b) another secondary winding 6ᵉ¹, which has a relatively small number of turns and which is connected to feed the soft-speakers 12, 4, 12, 4. Switches, s, s, are furnished, by which either circuit, that is, the circuit of the soft-speakers 12, 4, 12, 4, or the circuit of the loudspeakers 12, 4, 12, 4, may be opened or closed, as desired. When the circuit 6ᵉ, that feeds the loudspeakers, 12, 4, 12, 4 is open, and the circuit 6ᵉ¹ that feeds the soft-speakers 12, 4, 12, 4, is closed, the soft-speakers will be active, but with a relatively low voltage applied to them by the winding 6ᵉ¹. But when, on the other hand, the circuit 6ᵉ¹, which feeds the soft-speakers 12, 4, 12, 4, is open and the circuit 6ᵉ that feeds the loudspeakers 12, 4, 12, 4 is closed, the loudspeakers will be active and the soft-speakers inactive; and a much higher voltage will be applied by the winding 6ᵉ to the loudspeakers than is applied by the winding 6ᵉ¹ to the soft-speakers.

Fig. 29 shows one means—one convenient means—of giving a relatively large amount of energy to the loudspeakers 12, 4, 12, 4, and a relatively small amount of energy to the soft-speakers, 12, 4, 12, 4. But Fig. 30, which is, in general, similar to Fig. 29, shows a different mode of giving a small amount of energy to the soft-speakers 12, 4, 12, 4, and a large amount of energy to the loudspeakers 12, 4, 12, 4. With the apparatus of Fig. 30, the plate P of the tube $v^5$ is connected with the grid G of the power tube $v^6$ through the resistance coupling $R^{17}$, and the choke coil $C^{24}$, which is a usual mode of connecting the plate of one tube with the grid of the next-following tube. But the plate of the tube $v^5$ is connected also with the soft-speakers 12, 4, 12, 4, and feeds the magnet coils, as 2ᶠ, in Figs. 1ᴬ, 1ᴱ, 4ᴬ, etcetera, or the coils 16, 16, in Figs. 9ᶜ, 11ᴰ, 15ᴬ and 34. At the same time, the plate P of the power-tube $v^6$ is connected with the loudspeakers 12, 4, 12, 4. Thus, there is one more stage of amplification (and in consequence, much more energy) in the current applied to the loudspeakers, 12, 4, 12, 4, than in that applied to the soft-speakers 12, 4, 12, 4. Other modes of working, so as to give a small amount of energy to the soft-speakers and a much larger amount of energy to the loudspeakers, are practicable, of which I shall mention one only—that the same output apparatus, whether this be the plate circuit direct of the output tube, or be the secondary circuit of a transformer, on whose primary the winding of a transformer acts, may be arranged to apply equal plate circuit voltages to the soft-speakers and to the loudspeakers, but with a very much higher resistance or impedance included in the circuit of the soft-speakers 12, 4, 12, 4, than in that of the loudspeakers 12, 4, 12, 4. Other modes of applying a large amount of energy to the loudspeakers and a smaller amount to the soft-speakers, are possible in the electrical art, without departing from the essential features of my invention in this regard. It will be noticed that, in my preferred mode of working, shown in Fig. 29 and in Fig. 30, I both (a) provide a larger horn or other resonant body for the loudspeakers, and a smaller one for the soft-speakers; this is very clearly illustrated, also, in Fig. 34; and (b) I apply a much larger amount of energy to operating the loudspeakers 12, 4, 12, 4, than I apply to operating the soft-speakers, 12, 4, 12, 4.

In Figs. 29 and 30, I show radio-receiving apparatus, which is adapted to operate either my soft-speakers or my loudspeakers, at the will of the subscriber or listener-in. But in Fig. 31, I show a wire system very similar to that before described in connection with Figs. 22, 23 and 24; particularly Fig. 24. In this, the musical currents or speech currents, received from the central station, at audio-frequency, by the distributing wires 6ʰ, 7ᵃ, 7ᵇ, etcetera, are applied to the grid of an audio-frequency amplifying vacuum tube $v$, this tube acts through an output transformer $t$, which has a secondary circuit 6ᵉ, with relatively numerous turns connected to feed my loudspeakers, 12, 4, 12, 4; and another secondary winding, 6ᵉ¹, of much less numerous turns and less voltage, which is connected to feed my soft-speakers 12, 4, 12, 4; and switches s, s, are supplied in each of these circuits, so that either one may be closed, as required, that is, the subscriber or listener-in may receive the music by my soft-speakers, which are, preferably, attached to my speaker chair, as before described with comfortable loudness in his ears and with but little loudness in the room otherwise; or, on the other hand, by opening the circuit $6^{e1}$ that feeds the soft-speakers, and closing, by the switch $s$, the circuit $6^e$ that feeds the loudspeakers, music of comfortable loudness is produced all through the room.

*My electrical phonograph, connected to feed either my soft-speakers attached to my speaker-chair, or my loudspeakers*

My electrical phonograph may be used, as before described in connection with Figs. 25 to 25E, to produce, by means of its connection with my soft-speakers 12, 4, 12, 4, a sound of comfortable loudness in the ears of a person seated in my speaker chair, and with but little loudness in the room otherwise. But, for some purposes, it is desirable to produce, with a phonograph record, sounds for the whole family, or for all persons in a room, and to reduce the cost of the apparatus as much as is practicable. For this purpose, I have contrived apparatus, which is illustrated by Fig. 32. This is a view in general similar to Fig. 25, but it differs from that figure in that—

(a) Both soft-speakers, 12, 4, 12, 4, and loudspeakers, 12, 4, 12, 4, are provided; and (b) Means are provided for applying a relatively small amount of sound-producing electrical energy to the soft-speakers 12, 4, 12, 4, and a relatively large amount of such energy to the loudspeakers, 12, 4, 12, 4. These means are of the type already shown and described in Figs. 29 and 30, namely, an output transformer $t$, is provided with two secondary windings, $6^e$ and $6^{e1}$; the winding $6^e$ having a relatively large number of turns, and being connected to feed the loudspeakers, 12, 4, 12, 4, and the winding $6^{e1}$ having a relatively small number of turns and being connected to feed the soft-speakers 12, 4, 12, 4.

But other means of acting, as before described in connection with Figs. 29, 30 and 31, may be used, to give a relatively large amount of sound-energy to the loudspeakers 12, 4, 12, 4, and a relatively small amount of such energy to the soft-speakers 12, 4, 12, 4.

(c) Switches $s$, $s$, are provided, by which either the soft-speakers or the loudspeakers are brought into action as required.

Another form of my apparatus, whereby my electrical phonograph may be heard with comfortable loudness by a person seated in my speaker chair, listening to my soft-speaker 12, 4, 12, 4, and with but little sound produced by it in the rest of the room, or else may be heard with comfortable loudness all over the room, is shown in Fig. 33. This is a view in general similar to Fig. 25E before described, but with electrical connections from the secondary circuit of the microphone $m$, both to my soft-speakers 12, 4, 12, 4, and to my loudspeakers 12, 4, 12, 4. One convenient means for this purpose, and that which is shown in Fig. 33, is to provide two windings, $6^e$ and $6^{e1}$, respectively, for the microphone-operated transformer $t$. The first of these windings (marked $6^e$) has a relatively large number of turns, and is connected to feed my loudspeakers 12, 4, 12, 4. But the secondary winding, $6^{e1}$, has a relatively small number of turns, and is connected to feed my soft-speakers 12, 4, 12, 4; and in each case, a switch $s$, is inserted in the circuit, so that either circuit may be opened or closed, as required. Thus, a person listening to a phonograph record, and seated in my speaker chair, may listen to my soft-speakers 12, 4, 12, 4 (Fig. 33) and hear the music with comfortable loudness, while very little sound is produced in the room about him; or he may open the switch in the circuit $6^{e1}$, thereby cutting the soft-speakers out of action, and close the switch $s$ in the circuit $6^e$, thereby bringing the loudspeakers into action, so as to produce sounds of comfortable loudness all over the room.

In Figs. 31, 32 and 33, I have shown that mode of applying a relatively large amount of energy to my loudspeakers, 12, 4, 12, 4, and a relatively small amount to my soft-speakers 12, 4, 12, 4, which is shown also in Fig. 29, and has been before explained. But, instead of this mode of working, other modes of working for applying a small amount of energy to the soft-speakers 12, 4, 12, 4, and a relatively large amount to the loudspeakers, 12, 4, 12, 4, may be used, with the apparatus of the general type shown in Figs. 31, 32 and 33, as I have already explained in connection with Figs. 29 and 30. Thus, for example, two vacuum tubes in series may be employed, and the plate circuit of the first one used not only to feed the grid of the second one, but also to feed the soft-speakers, while the loudspeakers are fed from the second tube; as illustrated in Fig. 30 and before explained; or unequal amounts of resistance or of impedance may be given to the circuits of the soft-speakers and the loudspeakers, with a relatively large resistance or impedance in the circuits of the soft-speakers 12, 4, 12, 4, and a relatively small resistance or impedance in the circuit of the loudspeakers 12, 4, 12, 4; as before explained in connection with Figs. 29, 30 and 31; or the effect of a relatively large amount of sound-producing energy being applied to my loudspeakers, 12, 4, 12, 4, and of a relatively small amount of such energy applied to my soft-speakers 12, 4, 12, 4, may be produced in any other way that is known in the electrical art, and suitable for the purpose.

Considering, now, Fig. 34, which shows schematically, at the left, one of my loudspeakers, and at the right, one of my soft-speakers, it will be observed that the diaphragms are of the same diameter; they are meant, also, to be of the same thickness, and to have the very same resonance points, that is, they are, preferably, resonant to substantially the same pitch. Also, the two horns, 4 and 4, belonging respectively to my soft-speaker and to my loudspeaker, while differing widely in area or cross section, are of the same or nearly the same length; they are intended to have the same fundamental resonance, which is easily attained by making one of these horns, say, the smaller one, somewhat longer than is necessary, and then cutting it off with a length which gives it the same fundamental resonance point as the corresponding loudspeaker. Thus, by my preferred mode of working, my soft-speakers 12, 4, 12, 4, and my loudspeakers 12, 4, 12, 4 (in Figs. 29 to 34) have similar diaphragms 13, 13, with substantially the same resonance points, and horns 4 and 4, which have the same fundamental resonance points, although the loudspeaker horn 4** is much larger in cross section than is the corresponding soft-speaker horn 4.

In Figs. 8, 9, 9C, 9D, 11D, 15A, 34 and many other figures, I show a telephonic receiver or unit of an approved type, which is largely used in the telephonic art, but preferably with a somewhat thicker diaphragm and a somewhat higher resonance point than is used in commercial telephony. But any other telephonic receiver or unit that is suitable for the purpose may be used. This, indeed, appears from the drawings, in some of which (Figs. 1 to 6) I have shown dynamic speakers. A form of telephonic receiver, which is much more expensive, and also somewhat better than the more usual and cheaper type shown in Figs. 8, 9, 9$^C$, 9$^D$, 11$^D$, 15$^A$, 34, etcetera, is illustrated in Fig. 35. This differs from the ordinary telephonic receiver or loudspeaker "unit" chiefly in two particulars, namely:—

(a) The diaphragm 13 is clamped tightly in strong retaining rings of steel, 13$^a$, 13$^a$. These retaining rings have the advantage that the resonance point of the diaphragm is unaffected by the screwing-on of the receiver cap; and the diaphragm is always held firmly in place, like a built-in beam. Also, these diaphragms can be made, and preferably are made to be, exactly alike, so far as having the same fundamental resonance pitch is concerned, and when so made, will, apart from rusting, remain unchanged for many years.

(b) Instead of disposing the two poles of the magnet that actuates the diaphragm 13 on one side of said diaphragm, conformably to common practice, I have mounted one pole of the magnet on one side of the diaphragm and the other pole of the same magnet on the other side of the same diaphragm, which has this advantage—that there are two air-gaps, which are complementary to each other. When one of these lengthens, the other shortens by exactly the same amount, and the total length of the air-gap remains unaltered. This tends to avoid the distortion, which, with large vibrations of the diaphragm, is liable to arise. My telephonic receiver or unit of Fig. 35 is a better, but unfortunately, a more expensive receiver than that shown in Figs 9$^C$ and 9$^D$, and it is more needed in a loudspeaker than in my soft-speaker, or in my soft-speaker, no very large vibrations of the diaphragm are required at any time, but in a loudspeaker, rather large vibrations of the diaphragm are necessary, at times, in order to produce loud sounds.

A telephonic receiver or unit of the kind shown in Fig. 35 may be provided with my loudspeakers 12, 4, 12, 4, while a unit of the cheaper kind shown in Figs. 9$^C$, 11$^D$ and 15$^A$ is provided for my soft-speakers 12, 4, 12, 4, in Figs. 29 to 34. But in such case, I consider it preferable and important to make the diaphragms 13, 13 of the loud-speaker and of the soft-speaker with the same fundamental resonance points, as, for example, by making them of the same material, of the same diameter, and of the same thickness. Or, if the diameter and thickness vary, to so compensate these that they have the same fundamental resonance point. And, also, I prefer to make the horns 4 and 4** with the same fundamental resonance point, as I have before described; thus, they are of about the same length, but differ much in cross section, as I have before explained.

In Figs. 29 to 33, I have shown two loudspeakers, as well as two soft-speakers. Two soft-speakers are preferable, corresponding to the two ears of the person to whom they speak; but two loud-speakers are not always necessary, indeed, perhaps not usually necessary. A single one of the loudspeakers shown may be used, or both of them, but two are preferable.

I have shown, as electrical speakers, in Figs. 19 to 24, 25, and 25$^D$ to 25$^F$, 26 and 27, 29 to 34, and also in Figs. 43 and 44, 46 and 46$^A$ and 47 and 48, a diaphragm-and-horn apparatus; but in any of these cases, a dynamic speaker may be used, of the kind that is shown in my Figs. 1 to 6, instead of the speaker with diaphragm and horn, shown in my Figs. 19 to 48; or any other loudspeaker that is suitable for the purpose may be used. But the above statement is subject to this qualification, that when a dynamic speaker is substituted for one of my loudspeakers, with a diaphragm and horn, such dynamic speaker should, in general, be provided with a suitable baffle plate, according to approved practice. My dynamic speakers, shown in Figs. 1 to 6, are soft-speakers in which a loud sound is not desired, and a baffle plate is not necessary to the same extent as in a loudspeaker, if it be useful at all. But there is this advantage in using a diaphragm and a horn as a loudspeaker, in combination with (or in the same receiving set with) my soft-speakers, when these latter are also of the diaphragm-and-horn variety, that the fundamental resonance point or resonance pitch of the diaphragm can easily be made to be the very same in the diaphragm 13, 13, belonging respectively to my soft-speakers and to my loudspeakers. Also, the horns 4 and 4**, belonging respectively to my soft-speakers and to my loudspeakers, can easily be made to have, and preferably are made to have, exactly the same (or at least substantially the same) fundamental resonance pitches, so that undue resonances, or the production of a particular note with undue loudness, in a soft-speaker or in a loudspeaker, when the control operator at the central station is listening to apparatus of the other sort, is avoided or minimized.

*The rheostat or volume-control device, mounted on my speaker chair, or within easy reach of a person seated in said chair, and serving to control the loudness of the sounds produced by my soft-speakers*

As I have hereinbefore stated, I prefer to provide a rheostat, mounted within easy reach of a person seated in my speaker chair, and connected into circuit in such a manner that he can, by means of such rheostat, instantly change the loudness of the sounds produced by my soft-speakers, to suit his feelings. In Figs. 1, 2, 4, 5, 7, 8, 10 and 11, the rheostat or volume-control device 36$^b$ is shown as a part of the radio-receiving apparatus 36, mounted on one arm of my speaker chair; and in Figs. 13 and 14, said volume-control rheostat 36$^b$, although not mounted on my speaker chair, is mounted in such a position that it is easily operated by a person who is seated in the seat 1*, listening to my soft-speakers 12, 4, 12, 4; and in the diagrammatic circuit drawing, Fig. 21, I show several rheostats, any one of which may be used to vary the loudness of the sounds produced by my soft-speakers, as for example—

(a) The rheostat R$^5$, in circuit with my soft-speakers 12, 4, 12, 4.

(b) The plate-circuit rheostat R$^4$ of the output tube $v^6$, or the rheostat R$^{4a}$, that varies the voltage applied to the plates P, P, of all the vacuum tubes.

(c) One of the filament-controlling rheostats R$^3$, say, that which controls the temperature of the filament F of the output tube $v^6$. Or (d) The rheostat R$^{3a}$ that controls the current through all of the filaments, F, F.

Any one of these rheostats, or two or more of them, together, may be operated by the volume-control knob 36$^b$. Otherwise stated, this volume-control device 36$^b$ may be connected to operate any rheostat or any other current-regulating device that is suitable for the purpose. In practical radio, it is often connected to govern the voltage applied to the anode or plate of the output tube, or of a plurality of tubes.

In the case, however, of a speaker chair which is not fed from a radio-receiving apparatus, as in the case of a speaker chair with soft-speakers which are fed from wired lines, operating at audio-frequency, (as in Figs. 22, 23, 24 and 31); or in which the speaker chair is fed from a phonograph, as in Figs. 25 to 25$^F$, 32 and 33; or in which the soft-speakers attached to the speaker chair are fed from a microphone $m$, into which someone dictates, as in Figs. 26 to 28$^M$, I still consider it important, as I have pointed out above, to provide a rheostat within easy reach of a person seated in the speaker chair, and for greater convenience, I preferably mount this rheostat on one arm of the speaker chair. Any rheostat or current-regulating device that is suitable for the purpose may be provided; and such rheostat may be inserted in any circuit that is suitable for the purpose, as for example, in the circuit of a microphone primary, or a microphone secondary, or (which is often the same as the last) in circuit with the receiving telephones; or in circuit with the filament-circuit or with the plate-circuit of a vacuum-tube amplifier, through which my soft-speakers are fed. Rheostats are shown, in these circuits, in divers figures of the drawings.

In Figs. 37 to 41, I show a rheostat mounted on the arm $1^e$ of my speaker chair. This rheostat may be mounted on my speaker chair in any suitable manner, and no special importance is attached to the details shown in the drawings; either of the rheostat itself or of the mounting means therefor, shown in these figures. But the particular type of rheostat, shown in Figs. 37 to 41, has a ring 85, of bakelite or any other suitable insulating material; seen in section in Fig. 36. This ring is wound with a high-resistance wire 86. The ring 85 is suitably mounted on the shaft 87, and this shaft is supported in standards or bearings 88, 88, which are attached to the supporting-bar 84, and this, in turn, is attached by screws, or in any other suitable manner, to one of the arms $1^e$ of my speaker chair. One mode of mounting the ring 85, on which the high-resistance wire 86 is wound, is to clamp it between two holders, 90 and 90$^a$, which may be shaped as shown in the drawings. These holders are keyed to the shaft 87; and the holder 90 abuts against the collar 87$^a$, which is formed integral with the shaft 87; and the other holder or clamping-piece 90$^a$ is pressed by a nut, 91, and a lock-nut 91$^a$, against the ring 85 and the holder 90. The holders 90 and 90$^a$ may be of iron or other metal, in which case ring-shaped pieces 90$^b$, 90$^b$, of bakelite or other suitable insulating material, are interposed between the wound-ring 85 and the holder 90 and clamping-piece 90$^a$. But the holders 90 and 90$^a$ may be of bakelite or other suitable insulating material, in which case, the insulating rings 90$^b$, 90$^b$, may, of course, be omitted. One end of the wire, 86, which is wound continuously around the insulating-ring 85, is attached to the piece 90, and so is in conductive connection with the brush 92, which bears on the conducting ring or slip ring 96, mounted on the shaft 87. Another brush, 93, bears on the periphery of the wire-wound ring 85; that is, it bears against the resistance wire 86. By the knob or handle 94 (or 36$^b$) which, preferably, is made of bakelite or other suitable insulating material, the ring 85, with its resistance wire 86, is turned around. A brush 93 bears, as before said, against the periphery of the ring 85, 86, and when the point on the ring 85, at which the wire 86 is connected with the part 90, is right over this brush, the resistance of the rheostat is very small. But when it is remote from it, the resistance of the circuit is much greater. And so by turning the knob 94 (or 36$^b$), shaft 87, and resistance-wire-wound-ring 85, the resistance of the rheostat is varied greatly, from a relatively small amount to a relatively large amount.

The type of rheostat in which a ring of insulating material is wound about with resistance wire is well known, and widely used in the art, and any rheostat of this type that is suitable for the purpose, may be used, instead of that shown in Figs. 36 to 41. Also, other rheostats of widely-differing construction are well known in the electrical art, and any of these that is suitable for the purpose may be used, instead of that shown in Figs. 37 to 41.

Thus, to give a single example, and referring to Fig. 42, a rheostat, having a plate or frame 97, on which contact-buttons 98, 98, are mounted, but insulated from said frame 97, and connected with each other through resistance sections or impedance elements 99, 99, may be provided; and the rheostat plate 97 may be mounted in any convenient position, so that it is easily operated by the listener seated in my speaker chair, but preferably, I attach it to one of the arms $1^e$ of said chair (Fig. 42). 36$^b$ is the controlling knob of the rheostat, preferably made of insulating material and mounted on a metal center pin or rod 100, which is insulated from the plate 97. Mounted on the pin 100, attached to the knob 36$^b$, and insulated from the plate 97, is the arm or finger 101, which sweeps over the contact-buttons 98, 98, of the rheostat, so as to bring a greater or less number of the resistance sections 99, 99, into circuit. When this handle or finger 101 is at the extreme left in Fig. 42, the whole resistance of all the resistance sections 99, 99, is in the circuit of the rheostat; but as the handle 101 moves toward the right in Fig. 42, one resistance section, 99, after another is cut out, until, when the finger 101 reaches the contact-button 98*, at the extreme right, all the sections of resistance, 99, 99, have been cut out. The wires 102 and 103 in Fig. 42 (as in Figs. 37 and 38) serve to connect the rheostat into the circuit for which it serves.

For convenience, in the schematic drawing, Fig. 42, the resistance sections 99, 99, are shown, as if they were wire; and they may, indeed, be resistance wire, when no very high resistance is required; but for the resistance (thousands of ohms) belonging to the plate circuit of a vacuum-tube, other resistance materials than wire are convenient, and pencils, rods or blocks of carbon or other suitable resistance material may well be used. The type of rheostat shown in Fig. 42, and also in Fig. 43, is a usual type, save that it is adapted, as the drawings show, to use with my speaker chair.

I have shown in the drawings, connected with my soft-speakers and with my speaker chair, a phonograph of the usual type, having a record-disk, 530, with a sound-groove therein, in which a needle 540 works, to vibrate the diaphragm 535 or 558 or the armature 542. But other types of phonograph or of sound-record are well known in the art, which may be used instead, as for example, the cylinder phonograph, in which a cylinder is used, with a tone-groove formed in the periphery thereof, instead of in the disk 530, shown in my drawings. Another well known type of phonographic apparatus is that in which there is a film or strip of celluloid on which speech or music, or both of these, are photographically recorded, and which is made effective in producing sounds by means of a ray of light, directed through a very narrow slit or window upon the record-film, and through that against a photo-electric cell, which is connected, through an amplifier, with an electrical sound-producing apparatus. This type of sound-recording and sound-reproducing apparatus is now well known in the art and is widely used, especially in the movies.

One process and apparatus for recording sound by means of light and reproducing it, is the Ries process, which is disclosed in United States Letters Patent, No. 1,473,976, dated November 13, 1923; and another way of working is by Hoxie's process, disclosed in Letters Patent, No. 1,598,577, dated August 31, 1926. But other processes and apparatus are known in the photo-electric sound-recording and sound-reproducing art, and any other process or apparatus that is suitable for the purpose may be used, with my soft-speakers and my speaker chair. One form of apparatus for this purpose is shown, more or less schematically, in my Figs. 47 to 48, which have been briefly described above. In these figures—

511 is a strip or ribbon of celluloid or other suitable material on which the photographic sound-record has been made, by any suitable process.

512, 512, are rolls or spools or cylinders on which the sound-record 511 is wound, and from one of which, say the upper one, it is wound onto the other at a suitable and uniform speed which may be as low as one foot per second, but is more frequently about 1½ ft. a second, or from 80 to 90 ft. a minute.

512ª, 512ª, are the shafts or centers of the film-carrying rolls 512, 512.

513 is a closed box or case having opaque walls. In this case is a small incandescent lamp 514, whose filament is fed by the battery b. The current through said filament, the temperature of said filament, and the intensity of the light given off by it, are controlled by the rheostat $R^3$. Behind the lamp 514 is a reflector, 514ª, and in front of it are condensing lenses, $C^{41}$, $C^{41}$, which are suitably mounted in the opaque cylindrical case 515, which is furnished with a circular flange 515ª, by which it is attached to the case 513 aforesaid by screws, not shown in the figure. The lens-carrying case 515 has a front-piece 515ᵇ and at the center of this is a light-slot 515ᶜ whose dimensions, measured vertically, are very small, say, about 1/1000 of an inch at the front side where the film 511 touches it, but whose dimensions horizontally are much greater, for example, 5/64 of an inch; but it may be either more or less than this. The light from the lamp 514 is concentrated by the lenses $C^{41}$, $C^{41}$, on the light-slot 515ᶜ. The sound film 511, with its record of speech or music or both, passes immediately in front of the light-slot 515ᶜ, and all the parts are so arranged and shaped (as the drawings show) that said sound film 511, with its sound record, lies closely against the curved front surface of the front-piece 515ᵇ, and the light-slot 515ᶜ therein, covering said slot closely.

The central portion of the front-piece 515ᵇ with its light-slot 515ᶜ, is shown on a larger scale in the detail view Fig. 47ᴬ. The principle of all this, with some details of construction, is well explained in the patent to Ries aforesaid, No. 1,473,976, and it is well understood in the art, so that I need not dwell further upon it here.

In front or to the right of the photo-phonic film 511 is a photo-electric cell 516, having an anode An and a cathode Ca to which the opposite poles of the battery B are connected; also, said circuit which contains the battery B, anode An, and cathode Ca, is connected with the amplifier 517. This connection may be made in any suitable manner, for example, by connecting the primary winding of a transformer in series with the battery B, anode An, and cathode Ca, and then connecting the secondary winding of this transformer, one terminal to the grid of the first-stage vacuum tube of the audio-frequency amplifier 517, and the other terminal to the filament of said first-stage tube; or the connection between the photo-electric cell 516 and the amplifier 517 may be made in any other suitable manner. The amplifier 517, indeed, is a first-stage amplifier, and the audio-frequency amplifying vacuum-tubes, $v^1$, $v^2$ and $v^3$, shown below it, in Figs. 47 and 48, constitute a second-stage amplifier; for the output circuit 517ª of the first-stage amplifier 517, is connected to feed the grid G of the second-stage amplifier. This latter, as shown in the drawings, has three stages of amplification; but either a greater or a lesser number of stages than this may be used; and instead of making the amplifier in two sections, each of which preferably is suitably shielded (although no shields are shown in the drawings, for they are well known in the art) a single amplifier of several stages, may, when each stage is well shielded, be used. There is, however, in some cases, an advantage in separating the sections of an amplifier, where the current to be amplified is exceedingly weak, as in the case of some photo-electric cells.

My soft speakers

An electrical speaker is a device for producing, by means of a suitable alternating electrical current, corresponding to speech or music, audible vibrations of the air corresponding to such speech or music. Three devices of this sort are now in general use, namely:

(a) The commercial receiving telephone, which, in ordinary use, is held against the ear;

(b) Head-telephones, which are worn on the head, so that they are pressed against the two ears respectively of the wearer; and (c) Loud-speakers which produce a sound of sufficient loudness so that it is easily heard all over the room.

The speakers which I have described hereinbefore and illustrated in the accompanying drawings, located in proximity to a chair or other seat, or mounted thereon, preferably, on different sides of the ears of a listener seated in said seat, may properly be termed, and I sometimes term them in this specification and the statement of claim at the end hereof, soft speakers. They differ from a loud speaker in that they are so built, adjusted and supplied with electrical current that they produce a tone of sufficient loudness when placed in proximity to the ears of a listener, and without being pressed against those ears, but do not produce a loud sound throughout the room in which they are located. This softness rather than loudness of the sound produced, I effect in one or both of the following ways—preferably in both—namely:

*First.*—By making my soft speaker smaller than a good loud speaker of otherwise similar type; and

*Second.*—By applying less electrical energy to the soft speaker than is supplied to a loud speaker of otherwise similar type.

As to the first, if my soft speaker be of the electro-dynamic type, as shown in my Figs. 1 to 5A (and see particularly, Figs. 1A to 1E) I preferably make the paper cone 2a or other vibrating body and the supporting plate or member 2b for the same, of substantially less size than a good loud speaker of the same general type, which is adapted to fill a large room with sound. But if my loud speaker be of the diaphragm and horn type, as illustrated, for example, in Figs. 6 to 17, and also Figs. 29 to 34, (and see particularly Figs. 9C, 15, 15A and 34), I preferably, make the horn of much smaller diameter than the horn of a well-designed loud speaker, at the small end of the horn and also at the bell. One illustration—one only—of a suitable difference between a soft speaker horn and a loud speaker horn, is given in Figs. 29, 30, 31 and 34, in which 4 is the soft speaker horn and 4** the loud speaker horn. And my soft-speaker horns, as illustrated in my drawings, differ, preferably, from small loud-speaker horns in this, that the loud-speaker horn, when small in diameter at the bell, is usually short; indeed, so far as I know, is always short. But with my soft-speaker horns, I preferably reduce the diameter rather than the length, or at least, reduce the diameter in a much greater ratio than the length. Thus, with a horn bent only at the large end, near the bell, as in Figs. 9, 12, 12A, 13, 29, 34 and other figures, this horn, measured on its center line, may well be forty-five inches (45") or more in length, from the diaphragm end to the bell; and a horn made with two bends, one in the narrow portion and the other near the bell, as shown in my Figs. 15 to 17, may well be six feet or seven feet or even more in length—the horn shown in my Figs. 15 to 17 is six feet two inches in length from the diaphragm end to the bell. But, preferably, the diameter of this horn, at the diaphragm end, is a small fraction of an inch, and the bell is very small. Thus, it will be seen, my soft-speaker, in its preferred form, is substantially different from loud-speakers or other electrical speakers heretofore used. But other shapes and proportions for my soft-speakers than those illustrated in the drawings may, of course, be used; indeed, any shapes or proportions whatever that are suitable for the purpose, may be used.

As to the second point above mentioned, I preferably apply a much smaller amount of electrical energy to my soft-speakers than would be applied to a loud-speaker of otherwise similar design which is intended to fill a large room with sound. This reduction in the amount of electrical energy applied may be made in any suitable manner. One mode is to cut down the voltage with a rheostat; another is to use a smaller voltage to begin with. In Figs. 29 and 31, both of these modes of acting are shown. Soft-speakers 4, 4, and loud-speakers 4, 4, are fed from the same output transformer $t^4$, but with a relatively-high-voltage secondary winding $6^e$ for the loud-speakers 4**, and a relatively-low-voltage secondary winding $6^{e1}$, for the soft-speakers 4, 4, and further, rheostats $R^5$, $R^5$, are provided by which the voltage of each of the secondary circuits $6^e$ and $6^{e1}$, is regulatable at will.

Another mode of applying a low voltage to a soft-speaker is to use a smaller amount of amplification for it than for a loud-speaker. Thus, in the apparatus of my Fig. 30, more stages of audio-frequency amplification are provided for the loud-speakers 4**, and fewer stages for the soft-speakers 4, 4, as the drawings clearly show. But any other mode of reducing sufficiently the voltage applied to my soft-speakers that is suitable for the purpose, may be used.

It is, indeed, possible to apply the same, or nearly the same, amount of energy to a soft-speaker and to a loud-speaker and by the design of the soft-speaker with a horn of small diameter or with a very small opening from the diaphragm-chamber into the horn, (see Figs. 11D, 15A and 34), to greatly reduce the volume of the sound even though the same voltage is applied to the soft-speaker as to the loud-speaker. Also, it is possible with a so-called loud-speaker, particularly if it be one of small size, to apply such a small amount of energy to the same as to make it, in fact, a soft-speaker, but I consider the preferable mode is that which I have used and which is illustrated in Figs. 29, 31 and 34 and other figures before referred to, in which the soft-speaker is of a much smaller size than a good loud-speaker of a similar type and also has much less electrical energy applied to it.

I prefer to provide two soft-speakers, suitably supported on opposite sides of the listener's head, in proximity to his two ears respectively, as before explained and illustrated in the drawings; but it is not necessary, in all cases, to provide two soft-speakers, for in many cases, at least, of persons with good hearing, one of my soft-speakers may be omitted and the other retained. This will be readily understood. But I consider that the effect is, in general, more satisfactory with two soft-speakers, serving for the two ears respectively, than with a single soft-speaker.

*Part Two*

As I have pointed out above, a rocking chair may be used, in combination with my soft-speakers and accessory apparatus; and this rocking chair may be a plain rocking chair, in which the rockers rock on the floor, or it may be of some other type, for instance that in which the chair has a base resting upon the floor and a super-structure, with rockers, which rock on that base. Apparatus of this sort, before verbally described, is illustrated in Figs. 55 to 56C. Of these—

Fig. 55 is a view in elevation, showing a plain rocking chair (whose rockers 114 rock on the floor) with my soft-speakers attached to said chair, preferably, one at each side; and also with a radio receiving set 36, attached to one arm of the same, both after the fashion shown in Figs. 7, 8 and 9, for another type of chair.

Fig. 56 is a view in elevation, showing a rocking chair of another type, with a fixed base, resting on the floor, and an upper part provided with rockers 114 to rock on the base, and with my soft-speakers and radio receiving set 36 attached to the same, after the fashion, illustrated for another type of chair, in Figs. 15 to 15D and 11 to 12A.

Fig. 56A is a detail view, partly in section and partly in elevation on the line 56A, 56A in Fig. 56; but in this view, some of the things which would be seen in elevation in the background, and which have been shown and described in earlier figures (as 15 to 15D and 11 to 12A) are not shown, in order to simplify the drawings and to avoid confusing lines.

Fig. 56B is a detail, a sectional view, partly in elevation, showing one of the pegs 112, that connects the base of the rocker with the upper structure of the same, so that the upper structure can rock on the base, without moving off of it.

Fig. 56ᶜ is a detail view, in plan, illustrating the peg 112 aforesaid, and the hole for the same in the corresponding rocker.

These figures are so nearly like preceding figures that they require very little description. The plain rocker shown in Fig. 55 has attached to it, preferably, on each side, a soft-speaker 12, 4, 12, 4, of the kind already described and shown, particularly in Figs. 7, 8 and 9, but the soft-speakers attached to this chair may be of any of the other types before described, or indeed, of any other type that is suitable for the purpose. Also, a radio receiving set 36 is mounted on one of the arms 1ᵉ of the chair, after the fashion shown and already described in connection with Figs. 1, 2, 4, 5, 7, 8 and other figures. A counter-balancing weight 110 is attached by a screw-threaded bar 111, fastened by screws 111ᵃ to the end or seat of the chair. The counter-balancing weight is threaded on the interior and is adjustable on the bar 111 and may be locked in any position desired thereon by the lock-nut 111ᵇ. The means for connecting the soft-speakers and the electrical apparatus to the rocking chair 1, in Fig. 55, are the same as have already been described in connection with Figs. 5, 8, 11, 11ᴬ and other preceding figures.

The chair shown in Fig. 56 is a rocking chair, comfortably upholstered for the seat, arms and back, and having my soft-speakers suitably attached to the same. These soft-speakers, as shown in Figs. 56 and 56ᴬ, are of the type having two bends in the horn, as before shown in Figs. 15 to 17, and fully described, but any other of my soft-speakers, or indeed, any soft-speaker that is suitable for the purpose, may be provided in connection with this chair, instead of the form illustrated in Figs. 56 and 56ᴬ. Also, the mountings for the soft-speakers and the accessories to them are of the general type shown in Figs. 11 to 12ᴬ and before described, in which the soft-speakers are mounted, both to move vertically and to move in a front-and-rear direction, and this preferably by a push or a pull, with a counter-balancing weight 22 mounted on the screw-threaded arm 20ᵇ, of the rock-shaft 20, and adjustable thereon by the lock-nut 111ᵇ; and with a segment 20ᵃ on the shaft 20, and a spring-pressed lever 23, bearing on the curved surface of said segment, to exert a frictional check on the movement of the shaft 20 and on the vertical movement of the soft-speakers 12, 4, 12, 4; and having another segment 33 attached to the arm 30ᵃ of the shaft 30, with a lever 3ⁿ, which is pressed by the contractile spring 3ᵖ down on to the segment 33, thereby exerting a frictional resistance to the movement of the soft-speakers 12, 4, 12, 4, in a front-and-rear direction.

All these and other accessory parts and devices for the soft-speakers and for the radio receiving set, are the same in the apparatus of Fig. 56 that have already been described in connection with Figs. 11 and 17, and no further description of them here is necessary.

The rockers 114, 114, Figs. 56 and 56ᴬ, are attached to the body of the chair 1. This chair has strong side-pieces 1¹, 1¹, as already described in connection with my rotating, inclining, easy chair, shown in my Figs. 1, 2, 3, 4, 5, 6, 7, 8, 9 and other figures. And in addition, in order to give support to the upholstery and to the arms 1ᵉ, 1ᵉ, my rocking chair, shown in Figs. 56 and 56ᴬ, has other side-pieces 1¹ᶜ, 1¹ᶜ, of less thickness, but of great height vertically. The upholstery is marked 1ᵠ. At each side of the chair, a casting or other metal-piece, 1ʳ, is attached by screws to the side-pieces 1¹ and 1¹ᶜ. These metal pieces 1ʳ, 1ʳ, which may be of ornamental bronze, or of any other suitable material, may be applied outside the leather or cloth covering of the chair, the screws 1ʳᶜ passing through the metal part 1ʳ into the side-pieces 1¹ᶜ, 1¹ᶜ. The metal part 1ʳ has a shelf 1ʳᵃ, to which the piece 40 before described is attached, that serves to support the rock-shaft 20, 30, and the check-lever 23; also said part 1ʳ has another shelf or projection 1ʳᵇ, to which the hanger 3ⁿᵇ is attached (by screws 3ʳ) that supports the check-piece 3ⁿ, that is pressed by the contractile spring 3ᵖ down on the segment 33. This latter is attached to the arm 30ᵃ of the rock-shaft 30, and serves, with the friction lever 3ⁿ and the spring 3ᵖ, to oppose a frictional resistance to the movement of the soft-speakers from front to rear, so that they are adjustable by a push or a pull and remain in any position in which they are set, as before described in connection with Figs. 11 to 12ᴬ.

I use the word "phonograph" in this specification, and in the statement of claim at the end hereof, broadly as meaning a device (any suitable device) for reproducing sound from a sound-record. Such devices are well known in the sound-recording and sound-reproducing art, and they operate on divers principles, as, for example—

(a) The sound-record acts upon a stylus, giving movement mechanically to the same, and this movement of the stylus is communicated to a diaphram and produces sound directly; or (b) The stylus aforesaid acts upon an electrical pick-up device, so as to produce electrical vibrations corresponding to sound, which are then converted by a suitable apparatus into audible vibrations of the air; or (c) The sound-record is of a magnetic type, as in the telegraphone, and the magnetic changes made by the sound-recording apparatus in the wire or plate of steel which forms the sound-record, are reproduced electro-magnetically; or (d) The sound-record is of a photo-chemical type, as in the talking motion pictures; and this sound-record is first made to produce electrical vibrations, corresponding to sound, by means of a lamp, one or more lenses, a photo-electric cell and an amplifier; and these electric vibrations are then converted into sound by suitable apparatus.

Now, I use the word "phonograph" herein to refer broadly to a sound-reproducing device operating in any of the ways above described, or in any other way that is suitable for the purpose.

*Adjustments for my soft-speakers*

I have shown in the accompanying drawings, various adjustments for my soft-speakers. And here I may say that two advantages result from suitable adjustments of the soft-speakers; one is that, by suitable adjustments, the chair and soft-speakers are made serviceable for persons of greatly differing size and height, as, for example, for a child on the one hand, and for a tall man on the other. And apart from this, by making the speakers adjustable, a much smaller bell for speakers of the diaphragm-and-horn type and a much smaller cone, 2ᵇ, (Figs. 1 to 3, and particularly Figs. 1ᴬ to 1ᴱ) for soft-speakers of the electro-dynamic type, is made to serve; and in consequence, less sound is produced in the room in which the speaker-chair is located. And, by making the speakers instantly and easily adjustable by a mere push or pull, the speakers are the more easily made to follow changing positions of the listener's head, as he lies back or sits up in the speaker-chair. All this is favorable to producing a sound of comfortable loudness, for the listener, seated in the speaker-chair, but with little sound made throughout the room in which such chair is located.

Referring, for a moment, to the matter of adjustments of my speakers, and considering first Figs. 1 to 3, the speakers are adjustable vertically, as clearly shown in Figs. 2, 3, 1$^E$ and 1$^F$.

Referring now to the apparatus of Figs. 4 to 6, the speakers are adjustable in and out, with relation to the ears of the listener, by shifting the mounting rod 2$^i$ (which carries the magnet 2$^e$, 2$^g$, and the speaker with its cone 2$^b$) in the arms 5$^a$, and locking the same in the position desired, by the nut 5$^{ba}$. Also, the speakers are adjustable vertically by a push or a pull, by means of the frame, consisting of the rod or shaft 5, the arms 5$^a$, 5$^a$, and the counter-weight 5$^d$; and the speakers are held in whatever position vertically they may be set, by the action of the friction-device 7, on the segment 6, which is keyed to the rock-shaft 5; best seen in Figs. 4$^F$, 4$^G$ and 5. Also, said speakers are adjustable from front to rear by a push or a pull on the speakers, or by a push or a pull on the arms 3$^a$, 3$^a$, of the rock-shaft 3$^b$; and the speakers will remain in any position in which they are set, by reason of the action of the friction-piece 3$^n$ (under the influence of its contractile spring 3$^p$) on the curved segment 3$^m$, which is attached fast to one of the arms 3$^a$ of the rock-shaft 3, as shown in Figs. 5, 4$^C$, 4$^D$, and as before described.

Turning now to Figs. 7, 8 and 9, the bells of the horns 4, 4, are adjustable in an in-and-out direction, by shifting the pieces 4$^{ba}$ in and out on the arms 1$^e$, 1$^e$, of my speaker-chair; but this adjustment cannot be made by a push or a pull, but only by means of the screws 4$^c$, 4$^c$.

Turning now to Figs. 10 to 12$^A$, the bell of the horn 4 is adjustable vertically by reason of the connection of said horn with the arms 20$^a$, 20$^a$, of the rock-shaft 20; and the horns are adjustable vertically by a mere push or a pull, and will be held in whatever position they may be set, by the action of the friction-piece 23 (Fig. 11$^A$) on the segment 20$^d$, which is attached to the arm 20$^a$ of the rock-shaft. Also, the bells of the horns 4, 4, are adjustable in an in-and-out or front-to-rear direction, by a mere push or a pull, by means of connections through the links 31 and arms 30$^a$, to the rock-shaft 30; and, further, the speakers (and particularly the bells of the same) will remain in whatever position they may be set, by reason of the action of the friction-piece 3$^n$ (pulled downward by the contractile spring 3$^p$) on the segment 33 (Figs. 12$^A$, 11$^A$, 11 etcetera) which is attached fast to one of the arms 30$^a$ of the rock-shaft 30. And similarly with the apparatus shown in Figs. 15 to 15$^D$.

As to my diaphragm-and-horn speakers, these, preferably, are made to be adjustable in the front-to-rear direction and also in a vertical direction, as a reference to Figs. 12 to 12$^A$ and 15 to 15$^D$ will show, and as above briefly stated. Of these two adjustments, I consider the former to be the more important, at least in most cases; for with the horns 4, 4 correctly adjusted vertically, say with the center of the bell in each case about twenty-six and a half inches (26½") above the top of the seat of the chair (and in the case of an upholstered chair, about twenty-six and a half inches (26½") above the level of the top of said seat, as it stands, when compressed by the weight of the person sitting on it) and with a horn, whose bell is say six inches in diameter, a majority—a large majority—of grown people will find the centers or openings of their ears opposite the bell of the horn. Nevertheless, the vertical adjustment of the speaker-horn has some advantages, as before mentioned, namely—

(a) It makes the same speaker-chair useful for children and for grown people; and (b) It makes it practicable to use a smaller bell on the horn, thereby producing less sound in other parts of the room in which the speaker-chair is located.

But in many cases, it should be quite practicable to use the front-and-back adjustment of the speaker, while dispensing with the vertical adjustment of the same. Thus, referring to Figs. 10 to 12$^A$, and 15 to 15$^D$ (and see particularly, Figs. 11$^A$, 12$^A$ and 15) instead of mounting the pin 21$^a$ on the arm 20$^a$ of the rock-shaft 20, for vertical adjustment, said pin 21$^a$ may be mounted in any suitable fixed support, and the rock-shaft 20, with its arms 20$^a$, 20$^a$ and 20$^b$, with the segment 20$^d$, with the check-lever 23, and the counter-weight 22, may be omitted, and some reduction in cost effected thereby. But in those cases in which the additional cost can be afforded, the adjustment both vertically and from front-to-rear, I think quite preferable, by reason of the advantages above explained. Also, the front-to-rear adjustment may be omitted and the vertical adjustment retained; but this I consider to be a less useful variation than the other one, described above.

The adjustment of the speakers vertically has the advantage of adapting my soft-speakers and my speaker-chair to persons of different heights, as above explained; and the adjustment of the speakers from front to rear, particularly when things are so arranged that it is easily made by a mere push or pull, as before described, has the advantage of adapting my electrical speakers to varying positions of the head of the person who is seated in the speaker-chair, leaving him free to lie back or to sit up as he may wish, and, by an easy push or pull, to bring the electrical speakers opposite to his ears, whenever he changes his position in the chair.

*My soft-speakers and my loud-speakers, further considered*

In divers figures of the drawings (as 29, 30 and 31) I show my soft-speakers 12, 4, 12, 4, and my loud-speakers 12, 4, 12, 4, with switches s, s, by which either the soft-speaker or the loud-speaker may be brought into action, as required; and indeed, if desired, both the soft-speakers and the loud-speakers may be used simultaneously. And if these drawings are closely examined, it will be seen that the unit or telephonic device, which is connected with the small end of the horn, is the same for the soft-speaker and the corresponding loud-speaker, while the horn and the diaphragm-chamber between the diaphragm and the horn, are widely different in size; see particularly Fig. 34, which is in section and on a larger scale than Figs. 29, 30 and 31. While the horns 4 and 4** and the diaphragm-chamber in the cap 12$^a$, between the diaphragm 13 and the lower end of the horn, are widely different for the soft-speaker and the loud-speaker, as the drawings (Fig. 34) clearly show; yet the diaphragms are of the same diameter, and preferably of the same thickness, the same material, and with the same fundamental resonance pitch for the soft-speaker diaphragm and for the corresponding loud-speaker diaphragm. And, while the loud-speaker horn 4** is, preferably, of much larger diameter and very much larger in cross section, both at the small end (near the diaphragm) and at the bell end, than is the corresponding soft-speaker horn 4, 4; yet the length of the two horns is preferably, substantially the same, as the drawings (Fig. 34) show, so that they have, preferably, the same fundamental resonance pitch. By making the diaphragms 13, 13, of my soft-speaker 12, 4, and of my loud-speaker 12, 4**, preferably of the same material, the same diameter and the same thickness, so that they have, preferably, the same or substantially the same, resonance pitch, and by making my soft-speaker horns 4, and my loud-speaker horns 4** of the same or nearly the same length, so that they have substantially the same fundamental resonance pitches, the results musically are better than if the diaphragms 13, 13, of the loud-speaker horn and of the soft-speaker horn were widely different in size and in fundamental resonance pitch; and better also than if the soft-speaker horn 4 and the loud-speaker horn 4** were of widely different lengths or fundamental pitches.

I have referred above to the fact that, preferably, I make the diaphragms for the soft-speaker horn and for the loud-speaker horn, the same in material, in diameter and in thickness, so that they have the same fundamental resonance pitch. Now the latter is the more important matter; and while it is most convenient and easy to make the diaphragms of the corresponding soft and loud-speakers of the same material, the same diameter and the same thickness, yet the diameter and thickness may be changed, and perhaps the material also, with little or no loss, if the changes are compensatory, so that the fundamental resonance pitches are still substantially the same. Thus, to give a single illustration, we may reduce the diameter quite susbtantially, without changing the fundamental resonance pitch, if we reduce the thickness also in such measure that the fundamental pitch remains the same. Also, small variations in the fundamental resonance pitch, as between the soft-speaker diaphragm and the corresponding loud-speaker diaphragm phragm may be used, without loss, but if the variations are large, then the diaphragms are liable to respond differently to the same exciting cause, and the music produced by the soft-speaker and that produced by the loud-speaker may be quite different.

In Figs. 29, 30, 31, 32, 33 and 34, I have shown my soft-speakers and my loud-speakers (the first connected with my speaker chair and serving to produce sound for a single person, and the latter serving to produce sound throughout the room) of the diaphragm-and-horn type. But they may be of the electro-dynamic type or of any other type that is suitable for the purpose. This will be understood from the previous drawings and description in which both types of speakers have been shown; and also it may be understood from the nature of the case.

This application is a continuation of my prior pending application, No. 548,587, filed July 3, 1931; all the figures of the drawings, from Figs. 1 to 54B, inclusive, are drawings that were filed in the original case; and the other Figs. 55 to 56C herein, are illustrations by drawings of subject matter that was disclosed in words in the original specification; and all that part of this specification included in Part one hereof (pages 1 to 36 has been copied from the specification of the original case, but with amendments and corrections in various places to improve the same; most of the claims submitted herewith are copies of claims that were submitted in the original application, and the other claims herein are for subject matter that was clearly disclosed in the original application; they are claims which might, consistently with the law and practice of the office, have been inserted in said original application.

Part three

In various places in this specification, and particularly in the statement of claims at the end hereof, I speak, in effect, of a seat for the person who listens to the speech or music, or of a seat for supporting the listener in a position in which his head is situated between the two speakers aforesaid, or use other expressions of more or less similar import, relating to a seat which serves for a person listening to one or more of my electrical speakers. By the word "seat" as thus used, I refer to an object that serves as a support for the human body, in a sitting posture—to an object that is suitable to be sat upon. A chair is usually used exclusively for this purpose; a bench is used largely for it; a sofa or lounge is also used largely as a support for the body in a sitting posture; and a bed is often so used. All these, then, are seats, in the sense in which I use that word in this specification and in the statement of claims at the end hereof.

In this specification, and particularly in the statement of claims at the end hereof, I sometimes speak of a piece of furniture, for supporting the body of the listener or constituting a support for the body, or serving as a support for the listener, or use other expressions of similar general import. By such language, I refer to any suitable article of furniture by which the body of a listener may be supported, as for example, a bench, a chair or other seat, a bed, a couch, a lounge, a sofa or the like, on which a person may sit or recline while listening to the speech or music from my electrical speakers. My electrical speakers, then, may be attached to, or mounted on, any of these pieces of furniture, or on any other piece of furniture that is suitable for the purpose; or in some cases, the speakers may be attached to a wall or other support, in convenient proximity to the head of a person whose body is supported by a chair, bench, seat, bed, couch, sofa, lounge, or the like, as shown (as one example only) in Figs. 13, 13A, 14 and 14A.

Many alterations and variations of the apparatus for carrying out my invention may be made by persons skilled in the art, without departing from the essentials, or at least, from certain of the essentials of my invention, herein disclosed. I wish to secure just and adequate protection for my invention herein disclosed, and for every novel and patentable part of the same; and I have no intention to dedicate or abandon any part of my invention to the public. With a view to securing just and adequate protection for my invention, I claim the following namely:—

1. Apparatus for producing electrically for one person, sound corresponding to speech or music, with comfortable loudness for such person, and with but little sound produced by such apparatus elsewhere in the same room, said apparatus comprising (a) two electrical speakers, corresponding respectively to the two ears of the listener and serving each to speak into the appropriate ear of the listener, while not attached to such ear; (b) a piece of furniture for supporting the body of the listener in a position in which his head is situated between the two speakers aforesaid, with his ears in proximity to said speakers respectively; (c) means whereby said speakers are supported in a convenient position with relation to the piece of furniture aforesaid, and with relation to the two ears of the listener, whose body is supported by such piece of furniture; and (d) a volume-control device for regulating the loudness of the sounds produced by the electrical speakers aforesaid; said volume-control device being located in such proximity to the listener, that it is operable by him while he is supported by the piece of furniture aforesaid, and without his leaving the same.

2. Apparatus for producing electrically, for one person, sound corresponding to speech or music, with comfortable loudness for such person and with but little sound produced by such apparatus elsewhere in the same room, said apparatus comprising (a) two electrical speakers corresponding respectively to the two ears of the listener, and serving each to speak into the appropriate ear of the listener, while not attached to said ear; (b) a chair for supporting the listener in a position in which his head is normally situated between the two speakers aforesaid, the speakers aforesaid being mounted on the chair aforesaid in a correct position with relation to the head of the listener seated in said chair, and in such a manner as to leave his head free to move with relation to the speakers aforesaid while these are fixed to the chair; and (c) a volume-controlling device, connected electrically with the speakers mounted on the chair aforesaid and serving to regulate the loudness of the sounds produced by the electrical speakers aforesaid; said volume-controlling device being located in such a position that it can be manipulated by the listener while seated in the chair aforesaid and without leaving such chair.

3. Apparatus for producing electrically, for one person, sound corresponding to speech or music, with comfortable loudness for such person and with but little sound produced by such apparatus elsewhere in the same room, said apparatus comprising (a) two electrical speakers, corresponding respectively to the two ears of the listener, and serving each to speak into the appropriate ear of the listener, while not attached to said ear; (b) a chair for supporting the listener in a position in which his head is normally situated between the two speakers aforesaid, the speakers aforesaid being mounted on the chair aforesaid in a correct position with relation to the head of the listener seated in said chair, and in such a manner as to leave his head free to move with relation to the speakers aforesaid while these are fixed to the chair; and (c) a volume-controlling device mounted on the chair aforesaid and serving to afford facility to the listener to regulate the loudness of the sound produced by the electrical speakers aforesaid, while seated in said chair.

4. The apparatus before described for enabling one person to hear, with comfortable loudness, speech or music that is electrically produced, independently of apparatus attached to his head, and with but little sound produced by the apparatus elsewhere in the same room, said apparatus comprising (a) a piece of furniture for supporting the body of the person who listens to the speech or music; (b) two electrical speakers, corresponding respectively to the two ears of the listener, said speakers being suitably mounted in proximity to the head of the person who is supported by the piece of furniture aforesaid, with one speaker on each side of the listener's head, in proximity to one of his ears, but not attached to it; and (c) a radio-receiving apparatus electrically connected with the electrical speakers aforesaid and serving to feed the same; said radio-receiving apparatus having a tuning device located in such proximity to the listener that it is operable by him while he is supported by the piece of furniture aforesaid, and without his leaving the same.

5. Apparatus for enabling one person to hear, with comfortable loudness, speech or music that is electrically produced, independently of apparatus attached to his head, and with but little sound produced elsewhere in the same room, said apparatus comprising (a) a piece of furniture for supporting the body of the person who listens to the speech or music; (b) two electrical speakers, corresponding respectively to the two ears of the listener, said speakers being suitably mounted in proximity to the head of the person who is supported by the piece of furniture aforesaid, with one speaker on each side of the listener's head, in proximity to one of his ears, but not attached to it; and (c) a radio-receiving apparatus, electrically connected with the electrical speakers aforesaid and serving to feed the same; (d) a tuning device for the radio-receiving apparatus aforesaid; and (e) a volume-controlling device for regulating the loudness of the sounds produced by the electrical speakers aforesaid; said tuning device and said volume-controlling device being both located in such proximity to the listener, while he is supported by the piece of furniture aforesaid, that they are operable by him, without his leaving said piece of furniture.

6. The apparatus before described for enabling one person to hear, with comfortable loudness, speech or music that is electrically produced, independently of apparatus attached to his head, and with but little sound produced by his apparatus elsewhere in the same room, said apparatus comprising (a) a chair for the person who listens to the speech or music; (b) two electrical speakers, corresponding respectively to the two ears of the listener; said speakers being mounted on the chair aforesaid, so that they move with said chair; said speakers being so arranged on said chair that one lies on each side of the listener's head, in proximity to one of his ears, but not attached to it; and (c) a radio receiving apparatus connected electrically with the speakers aforesaid and serving to feed the same; said radio receiving apparatus having a tuning device located in such proximity to the chair aforesaid that the tuning control is easily operated by the listener while seated in the chair aforesaid.

7. The apparatus before described for enabling one person to hear, with comfortable loudness, speech or music that is electrically produced, independently of apparatus attached to his head, and with but little sound produced by his apparatus elsewhere in the same room, said apparatus comprising (a) a chair for the person who listens to the speech or music; (b) two electrical speakers, corresponding respectively to the two ears of the listener; said speakers being mounted on the chair aforesaid, so that they move with said chair; said speakers being so arranged on said chair that one lies on each side of the listener's head, in proximity to one of his ears, but not attached to it; (c) a radio receiving apparatus for feeding the speakers aforesaid, said radio receiving apparatus having one or more tuning controls mounted on the chair aforesaid; and (d) a volume-controlling device for the speakers aforesaid, also mounted on the chair aforesaid, whereby facility is afforded to a listener, seated in the chair aforesaid, to change either the tuning or the volume of the sound produced, without leaving the chair in which he is seated.

8. Apparatus for enabling one person to hear, with comfortable loudness, speech or music that is electrically produced, independently of apparatus attached to his head, and with but little sound produced by such apparatus elsewhere in the same room, said apparatus including (a) a piece of furniture for supporting the person who listens to the speech or music aforesaid; (b) an electrical speaker of such limited power that it is a soft-speaker rather than a loud-speaker, as before explained, suitably mounted in proximity to the head of the person who is supported by the piece of furniture aforesaid and in proximity also to one of the listener's ears, but not attached to such ear nor pressed against it; said soft-speaker serving to speak into said ear with sufficient loudness while producing but little sound throughout the room in which the same is located; (c) a circuit serving as the seat of the electrical vibrations corresponding to speech or music; and (d) a vacuum-tube amplifier, interposed between said circuit and the soft-speaker aforesaid.

9. Apparatus for enabling one person to hear, with comfortable loudness, speech or music that is electrically produced, independently of apparatus atttached to his head, said apparatus including (a) a piece of furniture for supporting the person who listens to the speech or music aforesaid; (b) an electrical speaker of such limited power that it is a soft-speaker rather than a loud-speaker, as before explained, suitably mounted in proximity to the head of the person who is supported by the piece of furniture aforesaid and in proximity also to one of the listener's ears, but not attached to such ear nor pressed against it, said soft-speaker serving to speak into said ear with sufficient loudness while producing but little sound throughout the room in which the same is located; (c) a circuit serving as the seat of electrical vibrations corresponding to speech or music; (d) a vacuum-tube amplifier, interposed between said circuit and the soft-speaker aforesaid; and (e) a volume-controlling device, connected with the speaker aforesaid; said volume-controlling device being located in such a position of proximity to the listener that it can be manipulated by him while he is supported by the piece of furniture aforesaid and without his leaving the same, thereby to increase or decrease the loudness of the sounds produced by the soft-speaker aforesaid, as desired.

10. The apparatus before described for enabling one person to hear, with comfortable loudness, speech or music that is electrically produced, independently of apparatus attached to his head, said apparatus including (a) a chair for the person who listens to the speech or music aforesaid; (b) an electrical speaker of such limited power that it is a soft-speaker rather than a loud speaker, as before explained, suitably mounted on the chair aforesaid in proximity to the listener's head, but not attached to his head, nor pressed against it, said soft-speaker serving to speak to the listener with sufficient loudness while producing but little sound throughout the room in which said speaker is located; (c) a circuit serving as the seat of electrical vibrations corresponding to speech or music; and (d) a vacuum-tube amplifier interposed between said circuit and the soft-speaker aforesaid.

11. The apparatus before described for enabling one person to hear, with comfortable loudness, speech or music that is electrically produced, independently of apparatus attached to his head, said apparatus including (a) a chair for the person who listens to the speech or music aforesaid; (b) an electrical speaker of such limited power that it is a soft-speaker rather than a loud-speaker, as before explained, suitably mounted on the chair aforesaid in proximity to the listener's head, but not attached to his head nor pressed against it, said soft-speaker serving to speak to the listener with sufficient loudness while producing but little sound throughout the room in which said speaker is located; (c) a circuit serving as the seat of electrical vibrations corresponding to speech or music; (d) a vacuum-tube amplifier, interposed between said circuit and the soft-speaker aforesaid; and (e) a volume-controlling device for regulating the loudness of the sounds produced by the electrical speaker aforesaid; said volume-controlling device being mounted on the chair aforesaid in such a position that it can be manipulated by the listener while seated in said chair, to increase or decrease the loudness of the sound produced by the soft-speaker aforesaid, as he may desire.

12. The apparatus before described for enabling one person to hear, with comfortable loudness, speech or music that is electrically produced, independently of apparatus attached to his head, and with but little sound produced by his apparatus throughout the room in which the same is located; said apparatus including (a) a piece of furniture for supporting the person who listens to the speech or music aforesaid; (b) two soft-speakers, corresponding respectively to the two ears of the listener, said speakers being suitably mounted in proximity to the head of the person who is supported by the piece of furniture aforesaid, with one soft-speaker on each side of the listener's head, in proximity to one of his ears, but not attached to said ear; (c) a circuit serving as the seat of the electrical vibrations corresponding to speech or music; and (d) a vacuum-tube amplifier, interposed between said circuit and the soft-speaker aforesaid.

13. Apparatus for enabling one person to hear, with comfortable loudness, speech or music that is electrically produced, independently of apparatus attached to his head, and with but little sound produced by his apparatus throughout the room in which the same is located; said apparatus including (a) a piece of furniture for supporting the person who listens to the speech or music aforesaid; (b) two soft-speakers, as before explained, corresponding respectively to the two ears of the listener, said speakers being suitably mounted in proximity to the head of the person who is supported by the piece of furniture aforesaid, with one soft-speaker on each side of the listener's head, in proximity to one of his ears, but not attached to said ear; (c) a circuit serving as the seat of the electrical vibrations corresponding to speech or music; (d) a vacuum-tube amplifier, interposed between said circuit and the soft-speakers aforesaid; and (e) a volume-controlling device connected with the soft-speakers aforesaid; said volume-controlling device being located in such a position that it can be manipulated by the listener while he is supported by the piece of furniture aforesaid and without his leaving the same; thereby to increase or decrease the loudness of the sound produced by the soft-speakers aforesaid, from time to time, as required.

14. Apparatus for enabling one person to hear, with comfortable loudness, speech or music that is electrically produced, independently of apparatus attached to his head, and with but little sound produced by his apparatus throughout the room in which the same is located; said apparatus including (a) a piece of furniture for supporting the person who listens to the speech or music aforesaid; (b) two soft-speakers, corresponding respectively to the two ears of the listener, said speakers being suitably mounted in proximity to the head of the person who is supported by the piece of furniture aforesaid, with one soft-speaker on each side of the listener's head, in proximity to one of his ears, but not attached to such ear; (c) a circuit serving as the seat of the electrical vibrations corresponding to speech or music; (d) an amplifier, interposed between said circuit and the soft-speaker aforesaid; and (e) a volume-controlling device, mounted on the piece of furniture aforesaid and serving to regulate the loudness of the sounds produced by the electrical speakers aforesaid, so that the listener, while supported by the piece of furniture aforesaid and without leaving the same, is enabled to increase or decrease the loudness of the sounds produced in his ears by the soft-speakers aforesaid, as required.

15. Apparatus for producing for one person, sound corresponding to speech or music, with comfortable loudness for such person, and with but little sound produced by such apparatus throughout the room in which the same is located, said apparatus comprising (a) two electrical speakers, corresponding respectively to the two ears of the listener, said speakers being located respectively on opposite sides of the listener's head and serving each to speak into the corresponding ear of the listener, while not attached to his head, nor pressed against it; (b) a piece of furniture for supporting the person who listens to the speech or music, in a position in which his head is situated between the two speakers aforesaid, with his ears in proximity to said speakers respectively; and (c) an adjusting frame, to which the two speakers aforesaid are attached, so that they move together for adjustment with relation to the ears of the listener, who is supported by the piece of furniture aforesaid.

16. Apparatus for producing for one person, sound corresponding to speech or music, with comfortable loudness for such person, and with but little sound produced by such apparatus throughout the room in which the same is located, said apparatus comprising (a) a chair for the listener; (b) two electrical speakers corresponding to the two ears of the listener, and located on opposite sides of his head, and serving each to speak into the corresponding ear of the listener while not attached to his head nor pressed against it; and (c) an adjusting frame to which the two speakers aforesaid are attached, said frame being mounted on the chair aforesaid, whereby the two speakers aforesaid are simultaneously adjusted with relation to the ears of the listener, seated in the chair aforesaid.

17. Apparatus for producing for one person, sound corresponding to speech or music, with comfortable loudness for such person, and with but little sound produced by such apparatus throughout the room in which the same is located, said apparatus comprising (a) two electrical speakers, corresponding respectively to the two ears of the listener, said speakers being located respectively on opposite sides of the listener's head and serving each to speak into the corresponding ear of the listener while not attached to his head; (b) a piece of furniture for supporting the person who listens to the speech or music, in a position in which his head is situated between the two speakers aforesaid, with his ears in proximity to said speakers respectively; (c) an adjusting frame to which the two speakers aforesaid are attached, so that they move together for adjustment with relation to the ears of the listener, who is supported by the piece of furniture aforesaid; and (d) means for counter-balancing the weight of the speakers and frame aforesaid, so that they are more readily moved into any position desired.

18. Apparatus for producing for one person, sound corresponding to speech or music, with comfortable loudness for such person, and with but little sound produced by such apparatus throughout the room in which the same is located, said apparatus comprising (a) two electrical speakers, corresponding respectively to the two ears of the listener, said speakers being located respectively on opposite sides of the listener's head and serving each to speak into the corresponding ear of the listener while not attached to his head; (b) a piece of furniture for supporting the person who listens to the speech or music, in a position in which his head is situated between the two speakers aforesaid, with his ears in proximity to said speakers respectively; (c) an adjusting frame to which the two speakers aforesaid are attached, so that they move together for adjustment with relation to the ears of the listener, who is supported by the piece of furniture aforesaid; (d) means for counter-balancing the weight of the speakers and frame aforesaid, so that they are more readily moved into any position desired; and (e) means for applying a suitable resistance to oppose the movement of the frame and speakers aforesaid and to hold them in whatever positions they may be moved into.

19. Apparatus for producing for one person, sound corresponding to speech or music, with comfortable loudness for such person, and with but little sound produced by such apparatus throughout the room in which the same is located, said apparatus comprising (a) two electrical speakers, corresponding respectively to the two ears of the listener, said speakers being located respectively on opposite sides of the listener's head and serving each to speak into the corresponding ear of the listener while not attached to his head; (b) a piece of furniture for supporting the listener in a position in which his head is situated between the two speakers aforesaid, with his ears in proximity to said speakers respectively; (c) an adjusting frame to which the two speakers aforesaid are attached so that they move together for adjustment with relation to the ears of the listener, seated in the seat aforesaid; (d) means for counter-balancing the weight of the speakers and frame aforesaid, so that they are the more readily moved into any position desired; and (e) means for applying a suitable resistance, to oppose the movement of the frame and speakers aforesaid and to hold them in whatever positions they may be moved into.

20. Apparatus for producing for one person, sound corresponding to speech or music, with comfortable loudness for such person, and with but little sound produced by such apparatus throughout the room in which the same is located; said apparatus comprising (a) two electrical speakers corresponding respectively to the two ears of the listener, said speakers being located respectively on opposite sides of the listener's head and serving each to speak into the corresponding ear of the listener while not attached to his head; (b) a chair for supporting the listener in a position in which his head is situated between the two speakers aforesaid, with his ears in proximity to said speakers respectively; (c) an adjusting frame to which the two speakers aforesaid are attached, said frame being mounted on the chair aforesaid, whereby the two speakers aforesaid are simultaneously adjusted with relation to the ears of a listener seated in the chair aforesaid; and (d) means for counter-balancing the weight of the speakers and frame aforesaid, so that they are the more readily moved into any position desired.

21. Apparatus for producing for one person, sound corresponding to speech or music, with comfortable loudness for such person, and with but little sound produced by such apparatus throughout the room in which the same is located; said apparatus comprising (a) two electrical speakers corresponding respectively to the two ears of the listener, said speakers being located respectively on opposite sides of the listener's head and serving each to speak into the corresponding ear of the listener, while not attached to his head; (b) a chair for supporting the listener in a position in which his head is situated between the two speakers aforesaid, with his ears in proximity to said speakers respectively; (c) an adjusting frame to which the two speakers aforesaid are attached, said frame being mounted on the chair aforesaid, whereby the two speakers aforesaid are simultaneously adjusted with relation to the ears of a listener seated in the chair aforesaid; and (d) means for applying a frictional resistance to oppose the movement of the frame and speakers aforesaid and to hold them in whatever position they may be moved into.

22. Apparatus for producing for one person, sound corresponding to speech or music, with comfortable loudness for such person, and with but little sound produced by such apparatus throughout the room in which the same is located; said apparatus comprising (a) two electrical speakers corresponding respectively to the two ears of the listener, said speakers being located respectively on opposite sides of the listener's head and serving each to speak into the corresponding ear of the listener, while not attached to his head; (b) a chair for supporting the listener in a position in which his head is situated between the two speakers aforesaid, with his ears in proximity to said speakers respectively; (c) an adjusting frame to which the two speakers aforesaid are attached, said frame being mounted on the chair aforesaid, whereby the two speakers aforesaid are simultaneously adjusted with relation to the ears of a listener seated in the chair aforesaid; (d) means for counter-balancing the weight of the speakers and frame aforesaid, so that they are the more readily moved into any position desired; and (e) means for applying suitable resistance to oppose the movement of the frame and speakers aforesaid and to hold them in whatever positions they may be moved into.

23. Apparatus for producing for one person, sound corresponding to speech or music, with comfortable loudness for such person, and with but little sound produced by such apparatus throughout the room in which the same is located, said apparatus comprising (a) two electrical speakers, corresponding respectively to the two ears of the listener, said speakers being located respectively on opposite sides of the listener's head and serving each to speak into the corresponding ear of the listener, while not attached to his head, nor pressed against it; (b) a piece of furniture for supporting the listener in a position in which his head is situated between the two speakers aforesaid, with his ears in proximity to said speakers respectively; (c) an adjusting frame, to which the two speakers aforesaid are attached so that they move together for adjustment with relation to the ears of the listener, seated in the seat aforesaid; and (d) a volume-controlling device, connected with the electrical speakers aforesaid, and serving to regulate the loudness of the sounds produced by them; said volume-controlling device being located in such a position that it can be manipulated by the listener while he is supported in the piece of furniture aforesaid and without his leaving the same.

24. Apparatus for producing for one person, sound corresponding to speech or music, with comfortable loudness for such person, and with but little sound produced by such apparatus throughout the room in which the same is located; said apparatus comprising (a) a chair for the listener; (b) two electrical speakers corresponding to the two ears of the listener, and located on opposite sides of his head, and serving each to speak into the corresponding ear of the listener while not attached to his head nor pressed against it; (c) an adjusting frame to which the two speakers aforesaid are attached, said frame being mounted on the chair aforesaid, whereby the two speakers aforesaid are simultaneously adjusted with relation to the ears of the listener, seated in the chair aforesaid; and (d) a volume-controlling device, connected with the electrical speakers aforesaid, and serving to regulate the loudness of the sounds produced by them; said volume-controlling device being located in such a position that it can be manipulated by the listener while seated in the chair aforesaid and without leaving said chair.

25. Apparatus for producing for one person, sound corresponding to speech or music, with comfortable loudness for such person, and with but little sound produced by such apparatus throughout the room in which the same is located, said apparatus comprising (a) two electrical speakers, corresponding respectively to the two ears of the listener, said speakers being located respectively on opposite sides of the listener's head and serving each to speak into the corresponding ear of the listener while not attached to his head; (b) a piece of furniture for supporting the listener in a position in which his head is situated between the two speakers aforesaid, with his ears in proximity to said speakers respectively; (c) an adjusting frame to which the two speakers aforesaid are attached so that they move together for adjustment with relation to the ears of the listener, seated in the seat aforesaid; (d) means for applying a suitable resistance to oppose the movement of the frame and speakers aforesaid, and to hold them in whatever position they may be moved into; and (e) a volume-controlling device, connected with the electrical speakers aforesaid, and serving to regulate the loudness of the sounds produced by them; said volume-controlling device being located in such a position that it can be manipulated by the listener while he is supported by the piece of furniture aforesaid and without his leaving the same.

26. Apparatus for producing for one person, sound corresponding to speech or music, with comfortable loudness for such person, and with but little sound produced by such apparatus throughout the room in which the same is located; said apparatus comprising (a) two electrical speakers corresponding respectively to the two ears of the listener, said speakers being located respectively on opposite sides of the listener's head and serving each to speak into the corresponding ear of the listener, while not attached to his head; (b) a chair for supporting the listener in a position in which his head is situated between the two speakers aforesaid, with his ears in proximity to said speakers respectively; (c) an adjusting frame to which the two speakers aforesaid are attached, said frame being mounted on the chair aforesaid, whereby the two speakers aforesaid are simultaneously adjusted with relation to the ears of a listener seated in the chair aforesaid; and (d) a volume-controlling device, connected with the electrical speakers aforesaid, and serving to regulate the loudness of the sounds produced by the electrical speakers aforesaid; said volume-controlling device being located in such a position that it can be manipulated by the listener while seated in the chair aforesaid and without leaving said chair.

27. Apparatus for producing for one person, sound corresponding to speech or music, with comfortable loudness for such person, and with but little sound produced by such apparatus throughout the room in which the same is located; said apparatus comprising (a) two electrical speakers corresponding respectively to the two ears of the listener, said speakers being located respectively on opposite sides of the listener's head and serving each to speak into the corresponding ear of the listener, while not attached to his head; (b) a chair for supporting the listener in a position in which his head is situated between the two speakers aforesaid, with his ears in proximity to said speakers respectively; (c) an adjusting frame to which the two speakers aforesaid are attached, said frame being mounted on the chair aforesaid, whereby the two speakers aforesaid are simultaneously adjusted with relation to the ears of a listener seated in the chair aforesaid; (d) means for applying a frictional resistance to oppose the movement of the frame and speakers aforesaid and to hold them in whatever position they may be moved into; and (e) a volume-controlling device, connected with the electrical speakers aforesaid, and serving to regulate the loudness of the sounds produced by the electrical speakers aforesaid; said volume-controlling device being located in such a position that it can be manipulated by the listener while seated in the chair aforesaid and without leaving said chair.

28. Apparatus for producing for one person, sound corresponding to speech or music, with comfortable loudness for such person, and with but little sound produced by such apparatus throughout the room in which the same is located; said apparatus comprising (a) two electrical speakers corresponding respectively to the two ears of the listener, said speakers being located respectively on opposite sides of the listener's head and serving each to speak into the corresponding ear of the listener, while not attached to his head; (b) a chair for supporting the listener in a position in which his head is situated between the two speakers aforesaid, with his ears in proximity to said speakers respectively; (c) an adjusting frame to which the two speakers aforesaid are attached, said frame being mounted on the chair aforesaid, whereby the two speakers aforesaid are simultaneously adjusted with relation to the ears of a listener seated in the chair aforesaid; (d) means for counter-balancing the weight of the speakers and frame aforesaid, so that they are the more readily moved into any position desired; (e) means for applying a suitable resistance to oppose the movement of the frame and speakers aforesaid and to hold them in whatever positions they may be moved into; and (f) a volume-controlling device, connected with the electrical speakers aforesaid, and serving to regulate the loudness of the sounds produced by the electrical speakers aforesaid; said volume-controlling device being located in such a position that it can be manipulated by the listener while seated in the chair aforesaid and without leaving said chair.

29. In an apparatus for enabling one person to hear with comfortable loudness speech or music, and with but little sound produced by such apparatus throughout the room in which the same is located, the combination of (a) a chair; (b) an electrical speaker mounted on said chair in proximity to one ear of a listener seated in said chair; the mounting of said speaker being effected in such a manner, as before described, that it is adjustable with relation to the head of a listener, seated in said chair, by a push or a pull on said speaker, whereby such speaker is made to be easily adjustable by a listener seated in the chair aforesaid and without leaving such chair.

30. In an apparatus for enabling one person to hear with comfortable loudness speech or music, and with but little sound produced by such apparatus throughout the room in which the same is located, the combination of (a) a chair; (b) an electrical speaker mounted on said chair in proximity to one ear of a listener seated in said chair; the mounting of said speaker being effected in such a manner, as before described, that it is adjustable with relation to the head of a listener, seated in said chair, by a push or a pull on said speaker; and (c) a frictional check, whereby the adjustment of the speaker aforesaid is moderately resisted, and said speaker held in whatever position it may be adjusted into.

31. In an apparatus for enabling one person to hear, with comfortable loudness, speech or music, and with but little sound produced by such apparatus throughout the room in which the same is located, the combination of (a) a chair; (b) a speaker for speaking into one ear of a listener, seated in said chair; (c) a pivoted arm on which the speaker aforesaid is mounted, the axel of said arm being mounted on the chair aforesaid; and (d) a counter-weight connected to said arm, to counter-balance the weight of the speaker aforesaid.

32. In an apparatus for enabling one person to hear, with comfortable loudness, speech or music, and with but little sound produced by such apparatus throughout the room in which the same is located, the combination of (a) a chair; (b) a speaker for speaking into one ear of a listener, seated in said chair; (c) a pivoted arm on which the speaker aforesaid is mounted, the axel of said arm being mounted on the chair aforesaid; and (d) means for exerting a suitable resistance to the movement of the speaker and arm aforesaid, so that they are held in whatever position they may be adjusted into.

33. In an apparatus for enabling one person to hear, with comfortable loudness, speech or music, and with but little sound produced by such apparatus throughout the room in which the same is located, the combination of (a) a chair; (b) a speaker for speaking into one ear of a listener, seated in said chair; (c) a pivoted arm on which the speaker aforesaid is mounted, the axel of said arm being mounted on the chair aforesaid; and (d) a frictional check for resisting the movement of the speaker and arm aforesaid, without preventing such movement; said check serving to hold the speaker and arm aforesaid in whatever position they may be adjusted into.

34. In an apparatus for enabling one person to hear, with comfortable loudness, speech or music, and with but little sound produced by such apparatus throughout the room in which the same is located, the combination of (a) a chair; (b) a speaker for speaking into one ear of a listener, seated in said chair; (c) a pivoted arm on which the speaker aforesaid is mounted, the axel of said arm being mounted on the chair aforesaid; (d) a counter-weight connected to said arm, to counter-balance the weight of the speaker aforesaid; and (e) a frictional check for resisting the movement of the speaker and arm aforesaid, without preventing such movement; said check serving to hold the speaker and arm aforesaid in whatever position they may be adjusted into.

35. In an apparatus for enabling one person to hear with comfortable loudness speech or music, and with but little sound produced by such apparatus throughout the room in which the same is located, the combination of (a) a chair; (b) an electrical speaker mounted on said chair in proximity to one ear of a listener seated in said chair; the mounting of said speaker being effected in such a manner, as before described, that it is adjustable with relation to the head of a listener, seated in said chair, by a push or a pull on said speaker, whereby such speaker is made to be easily adjustable by a listener seated in the chair aforesaid and without leaving such chair; and (c) a volume-controlling device, connected with the electrical speaker aforesaid, and serving to regulate the loudness of the sounds produced by said speaker; said volume-controlling device being located in such proximity to the chair aforesaid that it can be manipulated by the listener, while seated in said chair and without leaving the same.

36. In an apparatus for enabling one person to hear, with comfortable loudness, speech or music, and with but little sound produced by such apparatus throughout the room in which the same is located, the combination of (a) a chair; (b) a speaker for speaking into one ear of a listener, seated in said chair; (c) a pivoted arm on which the speaker aforesaid is mounted, the axel of said arm being mounted on the chair aforesaid; (d) means for exerting a suitable resistance to the movement of the speaker and arm aforesaid, so that they are held in whatever position they may be adjusted into; and (e) a volume-controlling device, connected with the electrical speaker aforesaid, and serving to regulate the loudness of the sounds produced by said speaker.

37. In an apparatus for enabling one person to hear, with comfortable loudness, speech or music, and with but little sound produced by such apparatus throughout the room in which the same is located, the combination of (a) a chair; (b) a speaker for speaking into one ear of a listener, seated in said chair; (c) a pivoted arm on which the speaker aforesaid is mounted, the axel of said arm being mounted on the chair aforesaid; (d) means for exerting a suitable resistance to the movement of the speaker and arm aforesaid, so that they are held in whatever position they may be adjusted into; and (e) a volume-controlling device for regulating the loudness of the sounds produced by the electrical speaker aforesaid; said volume-controlling device being mounted on the chair aforesaid in such a position that it can be manipulated by the listener, while seated in said chair.

38. Apparatus for producing electrically for one person, sound corresponding to speech or music, with comfortable loudness for such person, and with but little sound produced by such apparatus elsewhere in the same room, said apparatus comprising (a) two electro-dynamic speakers, corresponding respectively to the two ears of the listener, and serving each to speak into the appropriate ear of the listener, while not attached to said ear; (b) a seat for supporting the listener in a position in which his head is situated between the two speakers aforesaid, with his ears in proximity to said speakers respectively; (c) means whereby said speakers are supported in a convenient position with relation to the seat aforesaid, and with relation to the two ears of the listener seated therein; and (d) a volume-control device for regulating the loudness of the sounds produced by the electrical speakers aforesaid; said volume-control device being located in such proximity to the seat aforesaid that it is controlled by the listener, while seated in the seat aforesaid.

39. Apparatus for producing electrically for one person, sound corresponding to speech or music, with comfortable loudness for such person, and with but little sound produced by such apparatus elsewhere in the same room, said apparatus comprising (a) two electrical speakers, said electrical speakers each having (i) a diaphragm; (ii) an electro-magnet to vibrate said diaphragm; and (iii) a reinforcing horn, which is small at one end but has a bell at the other end; the small end of said horn being near to the diaphragm aforesaid, while the bell of said horn is located in proximity to one ear of the listener, so as to speak directly into said ear; (b) a seat for supporting the listener in a position in which his head is situated between the two speakers aforesaid, with his ears in proximity to said speakers respectively; (c) means whereby said speakers are supported in a convenient position with relation to the seat aforesaid, and with relation to the two ears of the listener seated therein; and (d) a volume-control device for regulating the loudness of the sounds produced by the electrical speakers aforesaid; said volume-control device being located in such proximity to the seat aforesaid that it is controlled by the listener, while seated in the seat aforesaid.

40. Apparatus for producing electrically for one person, sound corresponding to speech or music, with comfortable loudness for such person, and with but little sound produced by such apparatus elsewhere in the same room, said apparatus comprising (a) two electrical speakers, said electrical speakers each having (i) a diaphragm; (ii) an electromagnet to vibrate said diaphragm; and (iii) a reinforcing horn, which is small at one end but has a bell at the other end; the small end of said horn being near to the diaphragm aforesaid, while the bell of said horn is located in proximity to one ear of the listener, so as to speak directly into said ear; (b) a seat for supporting the listener in a position in which his head is situated between the two speakers aforesaid, with his ears in proximity to said speakers respectively; (c) means whereby said speakers are supported in a convenient position with relation to the seat aforesaid, and in proximity respectively to the two ears of the listener seated in said seat.

41. Apparatus for producing electrically, for one person, sound corresponding to speech or music, with comfortable loudness for such person and with but little sound produced by such apparatus elsewhere in the same room, said apparatus including (a) a chair for the listener; (b) an electrical speaker of the diaphragm-and-horn type, having the speaker unit connected with the small end of the horn and having the horn bent at the large end in such a manner that the bell of said horn is transverse to the length of the horn; and (c) means for mounting this horn on the chair aforesaid in such a position that the bell of the horn lies in proximity to one ear of the listener, seated in the chair aforesaid, said bell being turned inwards, towards said ear, so as to speak directly into the same.

42. Apparatus for producing electrically for one person, sound corresponding to speech or music, with comfortable loudness for such person, and with but little sound produced by such apparatus elsewhere in the same room, said apparatus comprising (a) two electrical speakers, said electrical speakers each having (i) a diaphragm; (ii) an electro-magnet to vibrate said diaphragm; and (iii) a reinforcing horn, which is small at one end but has a bell at the other end; the small end of said horn being near to the diaphragm aforesaid, while the bell of said horn is located in proximity to one ear of the listener, so as to speak directly into said ear; the horns aforesaid being each bent near the bell end; (b) a seat for supporting the listener in a position in which his head is situated between the two speakers aforesaid, with his ears in proximity to said speakers respectively; and (c) means whereby said speakers are supported in a convenient position with relation to the seat aforesaid, with the bells of the two horns aforesaid facing each other on opposite sides of the head of a listener who is seated in the seat aforesaid, and with said bells in proximity to his two ears respectively, so that each horn speaks directly into one ear of said listener.

43. In combination (a) a chair; (b) a radio-receiving apparatus, having a chassis with tubes and tuning controls attached to the upper part of said chair, with the tuning controls in convenient reach of a person seated in said chair, and with a case containing the electrical sources to feed the tubes of the chassis, attached to said chair but located below the seat of the same.

44. The apparatus before described for enabling one person to hear, with comfortable loudness, speech or music that is electrically produced, independent of apparatus attached to his head, and with but little sound produced by his apparatus elsewhere in the same room, said apparatus comprising (a) a chair for the person who listens to the speech or music; (b) two soft-speakers, corresponding respectively to the two ears of the listener; said speakers being mounted on the chair aforesaid, so that they move with said chair; said speakers being so arranged on said chair that one lies on each side of the listener's head, in proximity to one of his ears, but not attached to it; and (c) a radio-receiving apparatus having a chassis with tubes and tuning controls attached to the upper part of the chair aforesaid, with the tuning controls in convenient reach of the person seated in said chair, and with a case containing the electrical sources to feed the tubes of the chassis, attached to said chair, but located below the seat of the same.

45. In combination (a) a seat for a listener; (b) a phonograph to produce sounds for said listener; (c) two soft-speakers mounted on opposite sides of the listener's head, each in proximity to one of his ears but leaving the head free to move, without moving said soft-speakers; and (d) connections from the phonograph to said soft-speakers as before described, so that the sound of the phonograph is produced in said soft-speakers respectively, whereby a listener in the seat aforesaid is enabled to hear the sound of the phonograph aforesaid with comfortable loudness, while but little sound is produced by said phonograph elsewhere in the room, in which the same is located.

46. In combination (a) a seat for a listener; (b) a phonograph to produce sounds for said listener; (c) two soft-speakers mounted on opposite sides of the listener's head, each in proximity to one of his ears but leaving the head free to move, without moving said soft-speakers; (d) connections from the phonograph to said soft-speakers as before described, so that the sound of the phonograph is produced in said soft-speakers respectively, whereby a listener in the seat aforesaid is enabled to hear the sound of the phonograph aforesaid with comfortable loudness, while but little sound is produced by said phonograph elsewhere in the room, in which the same is located; and (e) a volume-control device for the phonograph aforesaid, mounted in such a position that it is easily operated by a listener who is seated in the seat aforesaid.

47. In combination (a) a chair for a listener; (b) a phonograph mounted on said chair, and serving to produce sound for a listener, seated in said chair; (c) two soft-speakers mounted on opposite sides of the listener's head, each in proximity to one of his ears but leaving the head free to move, without moving said soft-speakers; and (d) connections from the phonograph to said soft-speakers as before described, so that the sound of the phonograph is produced in said soft-speakers respectively, whereby a listener in the seat aforesaid is enabled to hear the sound of the phonograph aforesaid with comfortable loudness, while but little sound is produced by said phonograph elsewhere in the room, in which the same is located.

48. In combination (a) a chair for a listener; (b) a phonograph mounted on said chair, and serving to produce sound for a listener, seated in said chair; (c) two soft-speakers mounted on opposite sides of the listener's head, each in proximity to one of his ears but leaving the head free to move, without moving said soft-speakers; (d) connections from the phonograph to said soft-speakers as before described, so that the sound of the phonograph is produced in said soft-speakers respectively, whereby a listener in the seat aforesaid is enabled to hear the sound of the phonograph aforesaid with comfortable loudness, while but little sound is produced by said phonograph elsewhere in the room, in which the same is located; and (e) a volume-control device, also mounted on the chair aforesaid, and in such a position that it is easily operated by a listener while seated in said chair.

49. In combination, (a) a chair for a listener; (b) a phonograph mounted on said chair and serving to produce sound for the listener who is seated in said chair; (c) a soft-speaker, mounted on said chair and located at one side of the listener's head, in proximity to one of his ears, so as to speak directly into said ear; and (d) connections from the phonograph to said soft-speaker, so that the sound of the phonograph is produced in said soft-speaker, whereby a listener, seated in the chair aforesaid, is enabled to hear the sound of the phonograph with comfortable loudness, while but little sound is produced elsewhere in the room in which said chair and phonograph are located.

50. In combination, (a) a chair for a listener, (b) a phonograph mounted on said chair and serving to produce sound for the listener who is seated in said chair; (c) a soft-speaker mounted on said chair and located at one side of the listener's head, in proximity to one of his ears, so as to speak directly into said ear; (d) connections from the phonograph to said soft-speaker, so that the sound of the phonograph is produced in said soft-speaker, whereby a listener, seated in the chair aforesaid, is enabled to hear the sound of the phonograph with comfortable loudness, while but little sound is produced elsewhere in the room in which said chair and phonograph are located; and (e) a volume-control device, also mounted on the chair aforesaid, and in such position that it is easily operated by the listener while seated in said chair.

51. In combination, (a) a chair for a listener; (b) a phonograph mounted on said chair and serving to produce sound for the listener who is seated in said chair; (c) a soft-speaker, mounted on said chair and located at one side of the listener's head, in proximity to one of his ears, so as to speak directly into said ear; (d) connections from the phonograph to said soft-speaker, so that the sound of the phonograph is produced in said soft-speaker, whereby a listener, seated in the chair aforesaid, is enabled to hear the sound of the phonograph with comfortable loudness, while but little sound is produced elsewhere in the room in which said chair and phonograph are located; and (e) a record holder, attached to said chair, and serving to hold sound records suitable for the phonograph aforesaid, so that a listener seated in said chair, can change the record in the phonograph without leaving said chair.

52. In combination, (a) a chair for a listener; (b) a phonograph mounted on said chair and serving to produce sound for the listener who is seated in said chair; (c) a soft-speaker, mounted on said chair and located at one side of the listener's head, in proximity to one of his ears, so as to speak directly into said ear; (d) connections from the phonograph to said soft-speaker, so that the sound of the phonograph is produced in said soft-speaker, whereby a listener, seated in the chair aforesaid, is enabled to hear the sound of the phonograph with comfortable loudness, while but little sound is produced elsewhere in the room in which said chair and phonograph are located; (e) a record holder, attached to said chair, and serving to hold sound records suitable for the phonograph aforesaid, so that a listener seated in said chair, can change the record in the phonograph without leaving said chair; and (f) a volume-control device for the soft-speakers aforesaid, located in such position that it is operable by a person who is seated in the chair aforesaid.

53. In combination, (a) a chair for a listener; (b) a phonograph mounted on said chair; (c) an electrical pick-up, connected with said phonograph and serving to produce electrical vibrations corresponding to the sound recorded on the record that is used with said phonograph; and (d) one or more electrical soft-speakers, mounted in the chair aforesaid, in proximity to the ears of a listener seated therein; said speakers being fed with electrical vibrations from the electrical pick-up aforesaid, and serving to speak directly into the ears of the listener seated in the chair aforesaid.

54. In combination (a) a dictation chair, having a seat for the person dictating, and a sound-receiving device connected with said chair, and preferably, mounted in a position in front of the dictator's face, and in convenient proximity to his mouth, so that he can dictate into it in a soft voice; (b) a chair for the person who is taking the dictation, and two soft-speakers mounted on opposite sides respectively of the head of the person taking the dictation, seated in the chair aforesaid; and (c) connections from the sound-receiving device aforesaid to the soft-speakers, connected with the chair of the person who is taking the dictation, whereby the voice of the person dictating is transmitted with comfortable loudness to the person taking the dictation, while producing but little sound elsewhere in the same room in which they are located.

55. In combination (a) a dictation chair, having a seat for the person dictating, and a sound-receiving device connected with said chair, and, preferably, mounted in a position in front of the dictator's face and in convenient proximity to his mouth, so that he can dictate into it in a soft voice; (b) a chair for the person who is taking the dictation, and two soft-speakers mounted on opposite sides respectively of the head of the person taking the dictation, seated in the chair aforesaid; (c) connections from the sound-receiving device aforesaid to the soft-speakers, connected with the chair of the person who is taking the dictation, whereby the voice of the person dictating is transmitted with comfortable loudness to the person taking the dictation, while but little sound is produced elsewhere in the room in which they are located; and (d) a volume-control device for regulating the loudness of the sounds produced by the soft-speakers aforesaid.

56. In combination (a) a dictation chair, having a seat for the person dictating, and sound-receiving device connected with said chair, and, preferably, mounted in a position in front of the dictator's face and in convenient proximity to his mouth, so that he can dictate into it in a soft voice; (b) a chair for the person who is taking the dictation, and two soft-speakers mounted on opposite sides respectively of the head of the person taking the dictation, seated in the chair aforesaid; (c) connections from the sound-receiving device aforesaid to the soft-speakers, connected with the chair of the person who is taking the dictation, whereby the voice of the person dictating is transmitted with comfortable loudness to the person taking the dictation, while but little sound is produced elsewhere in the room in which they are located; and (d) a volume-control device located in such a position that it is easily operated by the person who sits in the listening chair aforesaid, taking the dictation before mentioned.

57. In combination, a dictation chair, having (a) a seat for the person dictating; (b) a sound-receiving device, connected with said chair and preferably mounted in front of the dictator's face, and in convenient proximity to h's mouth, so that he can dictate into it in a soft voice; and (c) means for mounting the sound-receiving device aforesaid in such a manner that it is adjustable into position in front of the dictator's mouth and is capable also of being moved out of the way, by a push or a pull.

58. In combination, a dictation chair, having (a) a seat for the person dictating; (b) a sound-receiving device, connected with said chair and preferably mounted in front of the dictator's face, and in convenient proximity to his mouth, so that he can dictate into it in a soft voice; (c) means for mounting the sound-receiving device aforesaid in such a manner that it is adjustable into position in front of the dictator's mouth and is capable also of being moved out of the way, by a push or a pull; and (d) means by which the sound-receiving device aforesaid is connected with a speaker-device, to which the person receiving the dictation listens.

59. In combination, (a) a dictation chair, having a seat for the person dictating; (b) a sound-receiving device, connected with said chair and preferably mounted in front of the dictator's face, in convenient proximity to his mouth, so that he can dictate into it in a soft voice; (c) a mounting, to which the sound-receiving device aforesaid is attached, and whereby facility is afforded for moving said sound-receiving device readily into position in front of the dictator's face or for moving it out of the way, as desired; and (d) means for opposing a resistance to the free movement of said mounting, sufficient in amount so that the sound receiving device aforesaid remains in position either in front of the dictator's mouth, or out of the way, as required.

60. In combination, (a) a dictation chair, having a seat for the person dictating; (b) a sound-receiving device, connected with said chair and preferably mounted in front of the dictator's face, in convenient proximity to his mouth, so that he can dictate into it in a soft voice; (c) a mounting, to which the sound-receiving device aforesaid is attached, and whereby facility is afforded for moving said sound-receiving device readily into position in front of the dictator's face or for moving it out of the way, as desired; and (d) a frictional check, serving to oppose a resistance to the free movement of the sound-receiving device aforesaid, sufficient in amount so that the sound receiving device aforesaid remains in position either in front of the dictator's mouth or out of the way of the same, as required.

61. In combination, (a) a dictation chair, having a seat for the person dictating; (b) a sound-receiving device, connected with said chair, and preferably mounted in front of the dictator's face, in convenient proximity to his mouth, so that he can dictate into it in a soft voice; (c) a pivoted arm, to which the sound-receiving device aforesaid is attached, and whereby facility is afforded for moving said sound-receiving device readily into position in front of the dictator's face or for moving it out of the way, as desired; and (d) a frictional check, serving to oppose a frictional resistance to the free movement of the arm aforesaid, so that said arm remains in position in front of the dictator's mouth or in position out of his way, as desired.

62. In combination, (a) a dictation chair, having a seat for the person dictating; (b) a sound-receiving device, connected with said chair, and preferably mounted in front of the dictator's face, in convenient proximity to his mouth, so that he can dictate into it in a soft voice; (c) a pivoted arm, to which the sound-receiving device aforesaid is attached, and whereby facility is afforded for moving said sound-receiving device readily into position in front of the dictator's face or for moving it out of the way, as desired; (d) means for counter-balancing the weight of the arm and sound-receiving device aforesaid; and (e) means for opposing a frictional resistance to the movement of said arm, so that it is adjustable by a push or a pull, into position, in front of the dictator's mouth, or into position at the side, out of his way, as desired.

63. In combination (a) a dictation chair, having a seat for the person dictating, and an electrical sound pick-up connected with said chair, and, preferably, mounted in a position in front of the dictator's face and in convenient proximity to his mouth, so that he can dictate into it in a soft voice; (b) a chair for the person who is taking the dictation, and two soft-speakers mounted on opposite sides respectively of the head of the person taking the dictation, seated in the chair aforesaid; and (c) electrical connections from the sound pick-up aforesaid to the soft-speakers, connected with the chair of the person who is taking the dictation, whereby the voice of the person dictating is transmitted with comfortable loudness to the person taking the dictation, while but little sound is produced elsewhere in the room in which they are located.

64. A radio-receiving set, including (a) means for picking up modulated electrical vibrations of radio-frequency, electrically; (b) means for amplifying these vibrations; (c) means for detecting and separating the audio-frequency vibrations, by which the radio-frequency vibrations are modulated, from said radio-frequency vibrations; (d) one or more loudspeakers to which a relatively large amount of sound-energy in an electrical form is supplied; (e) one or more soft-speakers to which a relatively small amount of electrical energy is supplied; and (f) means by which either the soft-speakers or the loudspeakers are brought into action, as required.

65. A radio-receiving set, including (a) means for picking up modulated electrical vibrations of radio-frequency, electrically; (b) means for amplifying these vibrations; (c) means for detecting and separating the audio-frequency vibrations, by which the radio-frequency vibrations are modulated, from said radio-frequency vibrations; (d) one or more loudspeakers to which a relatively large amount of sound-energy in an electrical form is supplied; (e) one or more soft-speakers to which a relatively small amount of electrical energy is supplied; the loudspeakers aforesaid being relatively large, and the soft-speakers relatively small, as before described; and (f) means by which either the soft-speakers or the loudspeakers are brought into action, as required.

66. Apparatus for producing electrically for one person, sound corresponding to speech or music, with comfortable loudness for such person and with but little sound produced by such apparatus elsewhere in the same room, said apparatus comprising (a) two electrical speakers, corresponding respectively to the two ears of a listener and serving each to speak into the corresponding ear of such listener, without being attached to his ears; (b) a chair for supporting the listener aforesaid in a position in which his head is normally situated between the two speakers aforesaid; said speakers being mounted on the chair aforesaid and made to be adjustable in-and-out with relation to the two ears of the listener, so that said speakers can be adjusted close to his ears or more remote from the same, as desired.

67. Apparatus for producing electrically for one person, sound corresponding to speech or music, with comfortable loudness for such person and with but little sound produced by such apparatus elsewhere in the same room, said apparatus comprising (a) two electrical speakers, corresponding respectively to the two ears of a listener, and serving each to speak into the corresponding ear of such listener, without being attached to his ears; (b) a chair for supporting the listener aforesaid in a position in which his head is normally situated between the two speakers aforesaid, with his ears in proximity to said speakers respectively; (c) a frame, mounted on the chair aforesaid, and to which frame the speakers aforesaid are attached, so that they are adjustable together in a front-to-rear direction, in order to suit the head of a person seated in said chair.

68. Apparatus for producing electrically for one person, sound corresponding to speech or music, with comfortable loudness for such person and with but little sound produced by such apparatus elsewhere in the same room, said apparatus comprising (a) two electrical speakers, corresponding respectively to the two ears of a listener and serving each to speak into the corresponding ear of such listener, without being attached to his ears; (b) a seat for supporting the listener aforesaid in a position in which his head is normally situated between the two speakers aforesaid; said speakers being adjustable in a front-to-rear direction, by a push or a pull, so as to follow the head of a listener seated on the seat aforesaid in its movement in and out, with relation to the back of the seat aforesaid.

69. Apparatus for producing electrically for one person, sound corresponding to speech or music, with comfortable loudness for such person and with but little sound produced by such apparatus elsewhere in the same room, said apparatus comprising (a) two electrical speakers, corresponding respectively to the two ears of a listener and serving each to speak into the corresponding ear of such listener, without being attached to his ears; (b) a seat for supporting the listener aforesaid in a position in which his head is normally situated between the two speakers aforesaid; said speakers being adjustable in a front-to-rear direction, so as to suit the head of a person seated on the seat aforesaid; and (c) means acting to oppose a frictional resistance to the movement of the speakers aforesaid and to hold them in whatever position they may be moved into, so that said speakers are adjustable by a push or a pull.

70. Apparatus for producing electrically for one person, sound corresponding to speech or music, with comfortable loudness for such person and with but little sound produced by such apparatus elsewhere in the same room, said apparatus comprising (a) two electrical speakers, corresponding respectively to the two ears of a listener and serving each to speak into the corresponding ear of such listener, without being attached to his ears; (b) a seat for supporting the listener aforesaid in a position in which his head is normally situated between the two speakers aforesaid; (c) a frame attached to the seat aforesaid, the two speakers aforesaid being attached to said frame and located in proximity to the two ears of the listener respectively, and being movable together, in a front-to-rear direction, so as to suit the head of a listener seated on the seat aforesaid; and (d) means acting to oppose a frictional resistance to the movement of the speakers aforesaid and to hold them in whatever position they may be moved into, so that said speakers are adjustable by a push or a pull.

71. Apparatus for producing electrically for one person, sound corresponding to speech or music, with comfortable loudness for such person and with but little sound produced by such apparatus elsewhere in the same room, said apparatus comprising (a) a chair for a listener; (b) an electrical speaker mounted on said chair in proximity to one of the ears of a listener, who is seated in said chair; said speaker being adjustable in a direction from front to rear, to permit it to follow the head of the listener when such head moves forward or backward, with relation to the back of the chair aforesaid; and (c) a volume-control device, for regulating the loudness of the sounds produced by the electric speaker aforesaid; said volume-control device being located in such proximity to the speaker aforesaid that it is controlled by the listener, while seated in the chair aforesaid.

72. Apparatus for producing electrically for one person, sound corresponding to speech or music, with comfortable loudness for such person and with but little sound produced by such apparatus elsewhere in the same room, said apparatus comprising (a) a seat for a listener; and (b) an electrical speaker attached to said seat and located in proximity to one of the ears of a listener, who is seated on such seat; said speaker being adjustable by a push or a pull, in a direction from front to rear, so as to permit it to follow the head of the listener, when such head moves forward or backward, with relation to the back of the seat aforesaid.

73. Apparatus for producing electrically for one person, sound corresponding to speech or music, with comfortable loudness for such person and with but little sound produced by such apparatus elsewhere in the same room, said apparatus comprising (a) a seat for a listener; (b) an electrical speaker attached to said seat and located in proximity to one of the ears of a listener, who is seated on such seat; said speaker being adjustable in a direction from front to rear, so as to permit it to accommodate itself to the head of the listener, seated on the seat aforesaid; and (c) means acting to oppose a frictional resistance to the movement of said speaker and to hold it in whatever position it may be moved into; whereby said speaker is made to be adjustable from front to rear, by a mere push or pull.

74. Apparatus for producing electrically for one person, sound corresponding to speech or music, with comfortable loudness for such person and with but little sound produced by such apparatus elsewhere in the same room, said apparatus having (a) a seat for supporting the listener; (b) an electro-dynamic speaker, lying close to one ear of the listener, when seated on the seat aforesaid; said electro-dynamic speaker being connected with the seat aforesaid and made to be movable from front to rear, to accommodate itself to the head of the listener, seated on the seat aforesaid; and (c) a volume-control device for regulating the loudness of the sounds produced by the electro-dynamic speaker aforesaid; said volume-controlling device being located in such proximity to the electric speaker aforesaid that it is controlled by the listener, while seated on the seat aforesaid.

75. Apparatus for producing electrically for one person, sound corresponding to speech or music, with comfortable loudness for such person and with but little sound produced by such apparatus elsewhere in the same room, said apparatus having (a) a chair for supporting the listener; (b) an electro-dynamic speaker; and (c) a pivoted arm, on which said electro-dynamic speaker is mounted, so that it lies close to one ear of the listener, seated in the chair aforesaid, and is movable from front to rear, by a push or a pull, to accommodate itself to the head of the listener, seated in the chair aforesaid.

76. Apparatus for producing electrically for one person, sound corresponding to speech or music, with comfortable loudness for such person and with but little sound produced by such apparatus elsewhere in the same room, said apparatus having (a) a seat for supporting the listener; (b) an electro-dynamic speaker; (c) a pivoted arm, on which said electro-dynamic speaker is mounted, so that it lies close to one ear of the listener, seated on the seat aforesaid, and is movable from front to rear, to accommodate itself to the head of the listener, seated on the seat aforesaid; and (d) means for opposing a frictional resistance to the movement of the speaker and arm aforesaid and for holding them in whatever positions they may be moved into; whereby said speaker is made to be adjustable from front to rear, by a mere push or pull.

77. Apparatus for producing electrically for one person, sound corresponding to speech or music, with comfortable loudness for such person and with but little sound produced by such apparatus elsewhere in the same room, said apparatus comprising (a) a seat for the listener; (b) an electrical speaker having (i) a diaphragm; (ii) an electro-magnet for vibrating said diaphragm; and (iii) a reinforcing horn, acted on by said diaphragm; said horn being attached to the seat aforesaid, with the bell of said horn lying opposite to one ear of a listener seated on the seat aforesaid, so as to speak directly into said ear; said horn being mounted in such a manner also that its bell is adjustable in a front-and-rear direction, so as to accommodate itself to the head of a listener seated on the seat aforesaid.

78. Apparatus for producing electrically for one person, sound corresponding to speech or music, with comfortable loudness for such person and with but little sound produced by such apparatus elsewhere in the same room, said apparatus comprising (a) a chair for the listener; (b) an electrical speaker having (i) a diaphragm; (ii) an electro-magnet for vibrating said diaphragm; and (iii) a reinforcing horn, acted on by said diaphragm; said horn being mounted on the chair aforesaid, with the bell of said horn lying opposite to one ear of a listener seated in the chair aforesaid, so as to speak directly into said ear; said horn being mounted in such a manner also that its bell is adjustable by a push or a pull, in a front-to-rear direction, so as to follow the head of a listener seated in said chair.

79. Apparatus for producing electrically for one person, sound corresponding to speech or music, with comfortable loudness for such person and with but little sound produced by such apparatus elsewhere in the same room, said apparatus comprising (a) a seat for the listener; (b) an electrical speaker having (i) a diaphragm; (ii) an electro-magnet for vibrating said diaphragm; and (iii) a reinforcing horn, acted on by said diaphragm; said horn being attached to the seat aforesaid, with the bell of said horn lying opposite to one ear of a listener seated on the seat aforesaid, so as to speak directly into said ear; said horn being mounted in such a manner that its bell is adjustable in a front-to-rear direction; and (c) means for opposing a frictional resistance to the movement of said bell and for holding it in whatever position it may be adjusted into; whereby said bell is made to be adjustable by a mere push or pull, as required.

80. Apparatus for producing electrically for one person, sound corresponding to speech or music, with comfortable loudness for such person and with but little sound produced by such apparatus elsewhere in the same room, said apparatus comprising (a) two electrical speakers, corresponding respectively to the two ears of a listener, and serving each to speak into the corresponding ear of such listener, without being attached to his ears; (b) a chair for supporting the listener aforesaid in a position in which his head is normally situated between the two speakers aforesaid, with his ears in proximity to said speakers respectively; (c) a frame mounted on the chair aforesaid, to which frame the speakers aforesaid are attached, so that they are adjustable together vertically, in order to suit the height of a person seated in said chair.

81. Apparatus for producing electrically for one person, sound corresponding to speech or music, with comfortable loudness for such person and with but little sound produced by such apparatus elsewhere in the same room, said apparatus comprising (a) two electrical speakers, corresponding respectively to the two ears of a listener and serving each to speak into the corresponding ear of such listener, without being attached to his ears; (b) a seat for supporting the listener aforesaid in a position in which his head is normally situated between the two speakers aforesaid; said speakers being adjustable vertically, by a push or a pull, so as to suit the height of a listener, seated on the seat aforesaid.

82. Apparatus for producing electrically for one person, sound corresponding to speech or music, with comfortable loudness for such person and with but little sound produced by such apparatus elsewhere in the same room, said apparatus comprising (a) two electrical speakers, corresponding respectively to the two ears of a listener and serving each to speak into the corresponding ear of such listener, without being attached to his ears; (b) a seat for supporting the listener aforesaid in a position in which his head is normally situated between the two speakers aforesaid; said speakers being adjustable vertically so as to suit the height of a person seated on the seat aforesaid; and (c) means acting to oppose a frictional resistance to the movement of the speakers aforesaid and to hold them in whatever position vertically they may be moved into, so that said speakers are adjustable vertically, by a push or a pull.

83. Apparatus for producing electrically for one person, sound corresponding to speech or music, with comfortable loudness for such person and with but little sound produced by such apparatus elsewhere in the same room, said apparatus comprising (a) two electrical speakers, corresponding respectively to the two ears of a listener and serving each to speak into the corresponding ear of such listener, without being attached to his ears; (b) a seat for supporting the listener aforesaid in a position in which his head is normally situated between the two speakers aforesaid; (c) a frame attached to the seat aforesaid, the two speakers aforesaid being attached to said frame and located in proximity to the two ears respectively of the listener seated in the seat aforesaid; said speakers being movable together vertically, so as to suit the height of a listener seated on the seat aforesaid; and (d) means acting to oppose a frictional resistance to the movement of the speakers aforesaid and to hold them in whatever position vertically they may be moved into, so that said speakers are adjustable vertically, by a push or a pull.

84. Apparatus for producing electrically for one person, sound corresponding to speech or music, with comfortable loudness for such person and with but little sound produced by such apparatus elsewhere in the same room, said apparatus comprising (a) a seat for a listener; and (b) an electrical speaker attached to said seat and located in proximity to one of the ears of a listener, who is seated on such seat; said speaker being adjustable vertically, by a push or a pull, so as to suit the height of a person, seated in the seat aforesaid.

85. Apparatus for producing electrically for one person, sound corresponding to speech or music, with comfortable loudness for such person and with but little sound produced by such apparatus elsewhere in the same room, said apparatus comprising (a) a seat for a listener; (b) an electrical speaker attached to said seat and located in proximity to one of the ears of a listener, who is seated on such seat; said speaker being adjustable vertically, so as to permit it to accommodate itself to the height of the listener, seated on the seat aforesaid; and (c) means acting to oppose a frictional resistance to the movement of said speaker and to hold it in whatever position vertically it may be moved into; whereby said speaker is made to be adjustable vertically, by a mere push or pull.

86. Apparatus for producing electrically for one person, sound corresponding to speech or music, with comfortable loudness for such person and with but little sound produced by such apparatus elsewhere in the same room, said apparatus comprising (a) a seat for the listener; (b) an electrical speaker having (i) a diaphragm; (ii) an electro-magnet for vibrating said diaphragm; and (iii) a reinforcing horn, acted on by said diaphragm; said horn being attached to the seat aforesaid, with the bell of said horn lying opposite to one ear of a listener seated on the seat aforesaid, so as to speak directly into said ear; said horn being mounted in such a manner also that its bell is adjustable vertically, so as to accommodate itself to the height of a listener, seated on the seat aforesaid.

87. Apparatus for producing electrically for one person, sound corresponding to speech or music, with comfortable loudness for such person and with but little sound produced by such apparatus elsewhere in the same room, said apparatus comprising (a) a chair for the listener; (b) an electrical speaker having (i) a diaphragm; (ii) an electro-magnet for vibrating said diaphragm; and (iii) a reinforcing horn, acted on by said diaphragm; said horn being mounted on the chair aforesaid, with the bell of said horn lying opposite to one ear of a listener seated in the chair aforesaid, so as to speak directly into said ear; said horn being mounted in such a manner also that its bell is adjustable vertically, by a push or a pull, so as to permit it to accommodate itself to the height of a listener, seated in said chair.

88. Apparatus for producing electrically for one person, sound corresponding to speech or music, with comfortable loudness for such person and with but little sound produced by such apparatus elsewhere in the same room, said apparatus comprising (a) a seat for the listener; (b) an electrical speaker having (i) a diaphragm; (ii) an electro-magnet for vibrating said diaphragm; and (iii) a reinforcing horn, acted on by said diaphragm; said horn being attached to the seat aforesaid, with the bell of said horn lying opposite to one ear of a listener seated on the seat aforesaid, so as to speak directly into said ear; said horn being mounted in such a manner that its bell is adjustable vertically; and (c) means for opposing a frictional resistance to the movement of said bell and for holding it in whatever position vertically it may be adjusted into; whereby said bell is made to be adjustable vertically, by a mere push or pull, as required.

89. Apparatus for producing electrically for one person, sound corresponding to speech or music, with comfortable loudness for such person and with but little sound produced by such apparatus elsewhere in the same room, said apparatus comprising (a) two electrical speakers, corresponding respectively to the two ears of a listener, and serving each to speak into the corresponding ear of such listener, without being attached to his ears; (b) a chair for supporting the listener aforesaid in a position in which his head is normally situated between the two speakers aforesaid, with his ears in proximity to said speakers respectively; (c) a frame, mounted on the chair aforesaid, and to which frame the speakers aforesaid are attached, in such a manner that they are adjustable together in a front-to-rear direction and also vertically, in order to suit the head of a person seated in said chair.

90. Apparatus for producing electrically for one person, sound corresponding to speech or music, with comfortable loudness for such person and with but little sound produced by such apparatus elsewhere in the same room, said apparatus comprising (a) two electrical speakers, corresponding respectively to the two ears of a listener and serving each to speak into the corresponding ear of such listener, without being attached to his ears; (b) a seat for supporting the listener aforesaid in a position in which his head is normally situated between the two speakers aforesaid; said speakers being adjustable in a front-to-rear direction and also vertically, by a push or a pull, so as to accommodate themselves to the head of a listener, seated on the seat aforesaid.

91. Apparatus for producing electrically for one person, sound corresponding to speech or music, with comfortable loudness for such person and with but little sound produced by such apparatus elsewhere in the same room, said apparatus comprising (a) two electrical speakers, corresponding respectively to the two ears of a listener and serving each to speak into the corresponding ear of such listener, without being attached to his ears; (b) a seat for supporting the listener aforesaid in a position in which his head is normally situated between the two speakers aforesaid; said speakers being adjustable in a front-to-rear direction and also vertically, so as to suit the head of a person seated on the seat aforesaid; and (c) means acting to oppose a frictional resistance to the movement of the speakers aforesaid and to hold them in whatever position they may be moved into, so that said speakers are adjustable by a push or a pull.

92. Apparatus for producing electrically for one person, sound corresponding to speech or music, with comfortable loudness for such person and with but little sound produced by such apparatus elsewhere in the same room, said apparatus comprising (a) two electrical speakers, corresponding respectively to the two ears of a listener and serving each to speak into the corresponding ear of such listener, without being attached to his ears; (b) a seat for supporting the listener aforesaid, in a position in which his head is normally situated between the two speakers aforesaid; (c) a frame attached to the seat aforesaid, the two speakers aforesaid being attached to said frame and located in proximity to the two ears of the listener respectively, and being movable together, in a front-to-rear direction and also vertically, so as to accommodate themselves to the head of the listener seated on the seat aforesaid; and (d) means acting to oppose a frictional resistance to the movement of the speakers aforesaid and to hold them in whatever position they may be moved into, so that said speakers are adjustable by a push or a pull.

93. Apparatus for producing electrically for one person, sound corresponding to speech or music, with comfortable loudness for such person and with but little sound produced by such apparatus elsewhere in the same room, said apparatus comprising (a) a chair for a listener; (b) an electrical speaker mounted on said chair in proximity to one of the ears of a listener, who is seated in said chair; said speaker being adjustable in a direction from front to rear and also vertically, to permit it to accommodate itself to the head of the listener, seated in the chair aforesaid; and (c) a volume-control device, for regulating the loudness of the sounds produced by the electric speaker aforesaid; said volume control device being located in such proximity to the speaker aforesaid that it is controlled by the listener, while seated in the chair aforesaid.

94. Apparatus for producing electrically for one person, sound corresponding to speech or music, with comfortable loudness for such person and with but little sound produced by such apparatus elsewhere in the same room, said apparatus comprising (a) a seat for a listener; and (b) an electrical speaker attached to said seat and located in proximity to one of the ears of a listener, who is seated on such seat; said speaker being adjustable by a push or a pull, in a direction from front to rear and also vertically, so as to permit it to accommodate itself to the head of a listener, seated in the seat aforesaid.

95. Apparatus for producing electrically for one person, sound corresponding to speech or music, with comfortable loudness for such person and with but little sound produced by such apparatus elsewhere in the same room, said apparatus comprising (a) a seat for a listener; (b) an electrical speaker attached to said seat and located in proximity to one of the ears of a listener, who is seated on such seat; said speaker being adjustable in a direction from front to rear and also vertically, so as to permit it to accommodate itself to the head of the listener, seated on the seat aforesaid; and (c) means acting to oppose a frictional resistance to the movement of said speaker and to hold it in whatever position it may be moved into; whereby said speaker is made to be adjustable by a push or a pull.

96. Apparatus for producing electrically for one person, sound corresponding to speech or music, with comfortable loudness for such person and with but little sound produced by such apparatus elsewhere in the same room, said apparatus comprising (a) a seat for the listener; (b) an electrical speaker having (i) a diaphragm; (ii) an electro-magnet for vibrating said diaphragm; and (iii) a reinforcing horn, acted on by said diaphragm; said horn being attached to the seat aforesaid, with the bell of said horn lying opposite to one ear of a listener seated on the seat aforesaid, so as to speak directly into said ear; said horn being mounted in such a manner also that its bell is adjustable in a front-and-rear direction and also vertically, so as to accommodate itself to the head of a listener, seated on the seat aforesaid.

97. Apparatus for producing electrically for one person, sound corresponding to speech or music, with comfortable loudness for such person and with but little sound produced by such apparatus elsewhere in the same room, said apparatus comprising (a) a chair for the listener; (b) an electrical speaker having (i) a diaphragm; (ii) an electro-magnet for vibrating said diaphragm; and (iii) a reinforcing horn, acted on by said diaphragm; said horn being mounted on the chair aforesaid, with the bell of said horn lying opposite to one ear of a listener seated in the chair aforesaid, so as to speak directly into said ear; said horn being mounted in such a manner also that its bell is adjustable by a push or a pull, in a front-to-rear direction and also vertically, so as to accommodate itself to the head of a listener, seated in the chair aforesaid.

98. Apparatus for producing electrically for one person, sound corresponding to speech or music, with comfortable loudness for such person and with but little sound produced by such apparatus elsewhere in the same room, said apparatus comprising (a) a seat for the listener; (b) an electrical speaker having (i) a diaphragm; (ii) an electro-magnet for vibrating said diaphragm; and (iii) a reinforcing horn, acted on by said diaphragm; said horn being attached to the seat aforesaid, with the bell of said horn lying opposite to one ear of a listener seated on the seat aforesaid, so as to speak directly into said ear; said horn being mounted in such a manner that its bell is adjustable in a front-to-rear direction and also vertically; and (c) means for opposing a frictional resistance to the movement of said bell and for holding it in whatever position it may be adjusted into; whereby said bell is made to be adjustable by a mere push or a pull, as required.

99. An apparatus for producing electrically for one person, sound corresponding to speech or music, with comfortable loudness for such person and with but little sound produced by such apparatus elsewhere in the same room, said apparatus comprising (a) an easy chair, upholstered on the seat and back; (b) a soft-speaker attached to said chair, in proximity to one ear of a listener seated therein and adapted to speak directly into such ear, without being attached to the same; and (c) a volume-control device for regulating the loudness of the sound produced by the soft-speaker aforesaid; said volume-control device being located in such proximity to the soft-speaker aforesaid that it is operable by the listener, seated in the chair aforesaid, and without leaving said chair.

100. An apparatus for producng electrically for one person, sound corresponding to speech or music, with comfortable loudness for such person and with but little sound produced by such apparatus elsewhere in the same room, said apparatus comprising (a) an easy chair, having an upholstered seat; (b) two soft-speakers, attached to said chair and located on opposite sides of the head of a listener, seated in said chair, and adapted to speak into his two ears respectively; and (c) a volume-control device for regulating the loudness of the sound produced by the soft-speaker aforesaid; said volume-control device being located in such proximity to the soft-speaker aforesaid that it is operable by the listener, seated in the chair aforesaid, and without leaving said chair.

101. An apparatus for producing electrically for one person, sound corresponding to speech or music, with comfortable loudness for such person and with but little sound produced by such apparatus elsewhere in the same room, said apparatus comprising (a) an easy chair, having an upholstered seat; and (b) two soft-speakers, attached to said chair and each having (i) a diaphragm; (ii) an electro-magnet for vibrating said diaphragm; and (iii) a reinforcing horn, acted on by said diaphragm and having its bell located in proximity to one ear of the listener, seated in the chair aforesaid, so as to speak directly into such ear.

102. An apparatus for producing electrically for one person, sound corresponding to speech or music, with comfortable loudness for such person, and with but little sound produced by such apparatus elsewhere in the same room, said apparatus comprising (a) an easy chair, having a base to rest upon the floor, and an upper part, with a seat and back, mounted on said base, but adapted to oscillate with relation to the same by an impulse of the person seated in said chair; and (b) a soft-speaker, attached to the upper part of the chair aforesaid, so that it oscillates with the same; said soft-speaker being located in proximity to one ear of a listener seated in said chair and being adapted to speak directly into such ear.

103. An apparatus for producing electrically for one person, sound corresponding to speech or music, with comfortable loudness for such person, and with but little sound produced by such apparatus elsewhere in the same room, said apparatus comprising (a) an easy chair, having a base to rest upon the floor, and an upper part, with a seat and back, mounted on said base, but adapted to oscillate with relation to the same by an impulse of the person seated in said chair; and (b) two soft-speakers, attached to said chair and located on opposite sides of the head of a listener seated in said chair, and adapted to speak into his two ears respectively.

104. An apparatus for producing electrically for one person, sound corresponding to speech or music, with comfortable loudness for such person, and with but little sound produced by such apparatus elsewhere in the same room, said apparatus comprising (a) an easy chair, having a base to rest upon the floor, and an upper part, with a seat and back, mounted on said base, but adapted to oscillate with relation to the same by an impulse of the person seated in said chair; and (b) two soft-speakers, attached to the upper part of the chair aforesaid, so as to oscillate with the same, said speakers each having (i) a diaphragm, (ii) an electro-magnet for vibrating said diaphragm, and (iii) a reinforcing horn, acted on by said diaphragm and having its bell located in proximity to one ear of the listener seated in the chair aforesaid, so as to speak directly into such ear.

105. An apparatus for producing speech or music electrically, with comfortable loudness for one person, and with but little sound produced elsewhere in the same room, said apparatus comprising (a) a rocking-chair; (b) a soft-speaker, attached to said rocking-chair, in proximity to one ear of a listener seated therein and adapted to speak directly into such ear, without being attached to the same, said speaker being adapted also to follow the listener's head, as the chair rocks; and (c) a volume-control device for regulating the loudness of the sound produced by the soft-speaker aforesaid; said volume-control device being located in such proximity to the soft-speaker aforesaid that it is operable by the listener, seated in the chair aforesaid, and without leaving said chair.

106. An apparatus for producing speech or music electrically, with comfortable loudness for one person, and with but little sound produced elsewhere in the same room, said apparatus comprising (a) a rocking-chair; (b) two soft-speakers, attached to said rocking-chair and located on opposite sides of the head of a listener, seated in said chair and adapted to speak into his two ears respectively, and to follow the movements of his head as the chair rocks.

107. An apparatus for producing speech or music electrically, with comfortable loudness for one person, and with but little sound produced elsewhere in the same room, said apparatus comprising (a) a rocking chair; (b) two soft-speakers, attached to said rocking-chair and located on opposite sides of the head of a listener seated in such chair, and adapted to speak into his two ears respectively and to follow the movements of his head as the chair rocks, said speakers each having (i) a diaphragm; (ii) an electro-magnet for vibrating said diaphragm; and (iii) a reinforcing horn, acted on by said diaphragm and having its bell located in proximity to one ear of the listener, seated in the chair aforesaid, so as to speak directly into such ear.

108. An apparatus for producing, for one person, sound corresponding to speech or music, with comfortable loudness for such person, and with but little sound produced by such apparatus elsewhere in the same room, said apparatus comprising (a) a rocking-chair, having a base to rest upon the floor, and an upper part, with a seat and back, mounted on said base, but adapted to oscillate or rock with relation to the same; and (b) a soft-speaker, attached to the upper part of the rocking-chair aforesaid, so that it oscillates with the same; said soft-speaker being located in proximity to one ear of a listener seated in said chair and being adapted to speak directly into such ear and to follow the movements of his head, as the chair rocks.

109. An apparatus for producing, for one person, sound corresponding to speech or music, with comfortable loudness for such person, and with but little sound produced by such apparatus elsewhere in the same room, said apparatus comprising (a) a rocking-chair, having a base to rest upon the floor, and an upper part, with a seat and back, mounted on said base, but adapted to oscillate or rock with relation to the same; and (b) two soft-speakers, attached to said rocking-chair and located on opposite sides of the head of a listener seated in said chair, and adapted to speak into his two ears respectively and to follow the movements of his head, as the chair rocks.

110. Apparatus for producing, for one person, sound corresponding to speech or music, with comfortable loudness for such person, and with but little sound produced by such apparatus elsewhere in the same room, said apparatus comprising (a) a rocking-chair, having a base to rest upon the floor, and an upper part, with a seat and back, mounted on said base, but adapted to oscillate or rock with relation to the same; and (b) two soft-speakers attached to the upper part of said rocking-chair, located on opposite sides of the head of a listener seated in such chair, and adapted to speak into his two ears respectively and to follow the movements of his head as the chair rocks; said speakers each having (i) a diaphragm; (ii) an electro-magnet for vibrating said diaphragm; and (iii) a reinforcing horn, acted on by said diaphragm and having its bell located in proximity to one ear of the listener, seated in the chair aforesaid, so as to speak directly into such ear.

111. In an apparatus for producing sound softly electrically for a single listener, the combination of (a) a seat for the listener; (b) an electrical speaker; (c) a frame for mounting said speaker in proximity to one ear of the listener, when seated in the seat aforesaid; and (d) means for opposing a frictional resistance to the movement of the speaker aforesaid and for holding it in whatever position it may be moved into.

112. In an apparatus for producing sound softly electrically for a single person, the combination of (a) a support for the listener; (b) two electrical speakers; (c) a frame for mounting said speakers each in proximity to the corresponding ear of the listener aforesaid, so that it speaks directly into such ear; and (d) means for opposing a frictional resistance to the movement of the speakers aforesaid and for holding them in whatever positions they may be moved into.

113. In an apparatus for producing sound softly electrically for a single person, the combination of (a) a support for the listener; (b) two electrical speakers, each having (i) a diaphragm; (ii) an electro-magnet for vibrating said diaphragm; and (iii) a reinforcing horn, acted on by said diaphragm; (c) a frame for mounting said speakers each with its bell in proximity to the corresponding ear of the listener aforesaid, so that it speaks directly into such ear; and (d) means for opposing a frictional resistance to the movement of the speakers aforesaid and for holding them in whatever positions they may be moved into.

114. In an apparatus for producing sound softly electrically for a single person, the combination of (a) a soft-speaker; (b) an arm for mounting said soft-speaker; (c) an axle or shaft for mounting said arm; and (d) a frictional checking-device for pressing on one of the parts aforesaid, so as to oppose a frictional resistance to the movement of the soft-speaker and arm aforesaid and to hold said soft-speaker and arm in whatever positions the same may be moved into.

115. Apparatus for producing electrically for one person, sound corresponding to speech or music, with comfortable loudness for such person and with but little sound produced by such apparatus elsewhere in the same room, said apparatus comprising (a) a chair for the listener; (b) an electrical speaker having (i) a diaphragm; (ii) an electro-magnet for vibrating said diaphragm; and (iii) a reinforcing horn acted on by said diaphragm; said horn being mounted near to its small end on a support carried by the chair aforesaid and with the horn at one side of said chair, with the bell of the horn extending inwardly towards the ear of the listener seated in the chair aforesaid; said horn being adapted to swing on the support aforesaid, so that its bell moves in a front-to-rear direction by the ear of the listener, seated in said chair.

116. The combination of elements set forth in the next preceding claim, with the addition of means for opposing a frictional resistance to the movement of the horn aforesaid, so that said horn is adjustable by a push or a pull and remains in whatever position it may be set.

117. Apparatus for producing electrically for one person, sound corresponding to speech or music, said apparatus comprising (a) a chair for the listener; (b) two electrical speakers each having (i) a diaphragm; (ii) an electro-magnet for vibrating said diaphragm; and (iii) a reinforcing horn acted on by said diaphragm; said horns being each mounted near the small end of the horn, on a support carried by the chair aforesaid and with the two horns located at the two sides of said chair, and with the bells of said two horns extending inwardly towards the two ears respectively of the listener, seated in the chair aforesaid; said horns being adapted to swing on the support aforesaid, so that their bells move in a front-to-rear direction by the ears of the listener, seated in said chair.

118. The combination of elements set forth in the next preceding claim, with the addition of means for opposing a frictional resistance to the movement of the horns aforesaid, so that said horns are made to be adjustable by a push or a pull and remain in whatever positions they may be set.

119. Apparatus for producing electrically for one person, sound corresponding to speech or music, said apparatus comprising (a) a chair for the listener; (b) two electrical speakers, each having (i) a diaphragm; (ii) an electro-magnet for vibrating said diaphragm; (iii) a reinforcing horn acted on by said diaphragm; and (c) a rock-shaft supported by the chair aforesaid and having two arms to which the lower parts of the two horns aforesaid are attached, with the two horns located at the two sides, respectively, of the chair aforesaid, and with the bells of said horns extending inwardly towards the ears of the listener seated in the chair aforesaid; the rock-shaft aforesaid serving to permit movement vertically of the two horns aforesaid.

120. The combination of elements set forth in the next preceding claim, with the addition of means for opposing a frictional resistance to the vertical movement of the two horns aforesaid, so that they are adjustable vertically, by a push or a pull and remain in whatever position vertically they may be set.

121. Apparatus for producing electrically for one person, sound corresponding to speech or music, said apparatus comprising (a) a chair for the listener; (b) two electrical speakers each having (i) a diaphragm; (ii) an electro-magnet for vibrating said diaphragm; and (iii) a reinforcing horn acted on by said diaphragm; (c) a rock-shaft, supported by the chair aforesaid and having two arms, to which the lower parts of the two horns aforesaid are respectively attached, with the horns aforesaid located respectively at the two sides of the chair aforesaid and with the bells of said horns extending inwardly towards the ears of the listener, seated in said chair; the rock-shaft aforesaid serving to permit movement vertically of the two horns aforesaid; (d) another rock-shaft mounted in the chair aforesaid at a different level and having two arms; and (e) links connecting said arms with the horns aforesaid respectively, whereby facility is afforded for adjusting the bells of the two horns aforesaid, both vertically and in a front-to-rear direction.

122. The combination of elements set forth in the next preceding claim, with the addition of means for opposing a frictional resistance to the vertical movement of the two horns aforesaid and also means for opposing a frictional resistance to the movement of the two horns aforesaid in a front-to-rear direction, so that said horns are adjustable vertically and in a front-to-rear direction by a push or a pull, and remain in whatever position they may be set.

123. In combination (a) a source of electrical vibrations, corresponding to sound; (b) a seat for a listener; (c) one or more soft-speakers, located in proximity to the ears of a listener, seated in the seat aforesaid, and serving to produce sound of comfortable loudness for such person, while producing but little sound in other parts of the room in which such seat is located; (d) one or more loud-speakers, located in the same house with the soft-speaker aforesaid, and fed with electrical vibrations, corresponding to sound, from the same source of electrical vibrations that feeds the soft-speaker aforesaid; and (e) means whereby either the soft-speaker or the loud-speaker aforesaid is brought into action, as desired.

124. In combination (a) a source of electrical vibrations, corresponding to sound; (b) a chair for a listener; (c) one or more soft-speakers mounted on said chair and located in proximity to the ears of a listener seated in said chair and serving to produce sound of comfortable loudness for such person, while producing but little sound in other parts of the room in which said chair is located; (d) one or more loud-speakers, fed with electrical vibrations, corresponding to sound, from the same source of electrical vibrations that feeds the soft-speakers aforesaid, said loud-speaker serving to produce sound of comfortable loudness in the same room in which the soft-speaker aforesaid is located; and (e) means whereby either the soft-speaker or the loud-speaker aforesaid is brought into action, as desired.

125. In combination (a) a source of electrical vibrations, corresponding to sound; (b) a chair for a listener; (c) one or more soft-speakers, located in proximity to the ears of a listener seated in said chair and serving to produce sound of comfortable loudness for such person, while producing but little sound in other parts of the room in which said chair is located; (d) one or more loud-speakers, connected with the same house, with which the soft-speakers aforesaid are connected, and fed with electrical vibrations, corresponding to sound, from the same source of electrical vibrations that feeds the soft-speakers aforesaid; (e) means whereby a relatively small amount of electrical energy is supplied from the source aforesaid to the soft-speaker aforesaid, and whereby a relatively large amount of electrical energy is supplied from the same source to the loud-speaker aforesaid, so that the total volume of sound produced by the loud-speaker aforesaid is very much greater than that produced by the soft-speaker aforesaid; and (f) means whereby either the soft-speaker or the loud-speaker aforesaid is brought into action, as desired.

126. In combination (a) a radio-receiving set, serving to produce from modulated radio waves, electrical vibrations of audio-frequency, corresponding to sound; (b) a chair for a listener; (c) one or more soft-speakers, located in proximity to the ears of a listener, seated in the chair aforesaid, and fed with electrical vibrations corresponding to sound, by the radio-receiving set aforesaid, and serving to produce from these electrical vibrations, sound of comfortable loudness for the listener seated in the chair aforesaid, while producing but little sound in other parts of the room, in which said soft-speaker is located; (d) one or more loud-speakers, fed with electrical vibrations by the same radio-receiving set aforesaid, and serving to produce sound of comfortable loudness throughout the room in which they are located; and (e) means whereby either the soft-speaker or the loud-speaker aforesaid is brought into action, as desired.

127. The combination, set forth in the preceding claim, with the additional element of a volume-control device, whereby the loudness of the sound produced is controlled at will; said volume-control device being located within reach of a listener seated in the chair aforesaid, so that he can operate the same, without leaving such chair.

THADDEUS CAHILL.